(12) United States Patent
Busacca et al.

(10) Patent No.: US 10,177,400 B2
(45) Date of Patent: Jan. 8, 2019

(54) DIMENSIONAL CONSTRAINTS FOR THREE-DIMENSIONAL BATTERIES

(71) Applicant: Enovix Corporation, Fremont, CA (US)

(72) Inventors: Robert S. Busacca, San Francisco, CA (US); Ashok Lahiri, Cupertino, CA (US); Murali Ramasubramanian, Fremont, CA (US); Bruno A. Valdes, Sunnyvale, CA (US); Gardner Cameron Dales, Los Gatos, CA (US); Christopher J. Spindt, Menlo Park, CA (US); Geoffrey Matthew Ho, San Ramon, CA (US); Harrold J. Rust, III, Alamo, CA (US); James D. Wilcox, Pleasanton, CA (US); John F. Varni, Los Gatos, CA (US); Kim Han Lee, Pleasanton, CA (US); Nirav S. Shah, Pleasanton, CA (US); Richard J. Contreras, Campbell, CA (US); Lynn Van Erden, Pollock Pines, CA (US); Vladimir Dioumaev, San Jose, CA (US)

(73) Assignee: ENOVIX CORPORATION, Fremont, CA (US)

( * ) Notice: Subject to any disclaimer, the term of this patent is extended or adjusted under 35 U.S.C. 154(b) by 0 days.

(21) Appl. No.: 15/889,338

(22) Filed: Feb. 6, 2018

(65) Prior Publication Data

US 2018/0166735 A1  Jun. 14, 2018

Related U.S. Application Data

(63) Continuation of application No. PCT/US2017/032355, filed on May 12, 2017.
(Continued)

(51) Int. Cl.
 *H01M 10/02* (2006.01)
 *H01M 4/02* (2006.01)
 (Continued)

(52) U.S. Cl.
 CPC ............ *H01M 10/02* (2013.01); *H01M 4/02* (2013.01); *H01M 10/052* (2013.01);
 (Continued)

(58) Field of Classification Search
 CPC .... H01M 10/02; H01M 4/02; H01M 10/0525; H01M 2004/021
 See application file for complete search history.

(56) References Cited

U.S. PATENT DOCUMENTS

| 5,238,759 A | 8/1993 | Plichta et al. |
| 5,294,504 A | 3/1994 | Otagawa |

(Continued)

FOREIGN PATENT DOCUMENTS

| CA | 02388711 | 5/2001 |
| CN | 1286811 | 9/1993 |

(Continued)

OTHER PUBLICATIONS

Patent Cooperation Treaty, International Search Report for PCT/US2017/032355, 4 pages dated Aug. 25, 2017.
(Continued)

*Primary Examiner* — Sarah A. Slifka
*Assistant Examiner* — Brian R Ohara
(74) *Attorney, Agent, or Firm* — Bryan Cave Leighton Paisner LLP

(57) ABSTRACT

A secondary battery is provided for cycling between a charged and a discharged state, the secondary battery including a battery enclosure, an electrode assembly, carrier ions, a non-aqueous liquid electrolyte within the battery enclosure, and a set of electrode constraints. The set of electrode
(Continued)

constraints includes a primary constraint system having first and second primary growth constraints and at least one primary connecting member, the first and second primary growth constraints separated from each other in the longitudinal direction, wherein the primary constraint array restrains growth of the electrode assembly in the longitudinal direction such that any increase in the Feret diameter of the electrode assembly in the longitudinal direction over 20 consecutive cycles of the secondary battery is less than 20%. The set of electrode constraints further includes a secondary constraint system having first and second secondary growth constraints connected by at least one secondary connecting member, wherein the secondary constraint system at least partially restrains growth of the electrode assembly in a second direction upon cycling of the secondary battery.

30 Claims, 38 Drawing Sheets

Related U.S. Application Data

(60) Provisional application No. 62/335,912, filed on May 13, 2016, provisional application No. 62/422,958, filed on Nov. 16, 2016.

(51) Int. Cl.
*H01M 10/0525* (2010.01)
*H01M 10/44* (2006.01)
*H01M 10/054* (2010.01)
*H01M 10/058* (2010.01)
*H01M 10/052* (2010.01)
*H01M 10/0585* (2010.01)

(52) U.S. Cl.
CPC ....... *H01M 10/054* (2013.01); *H01M 10/058* (2013.01); *H01M 10/0525* (2013.01); *H01M 10/0585* (2013.01); *H01M 10/44* (2013.01); *H01M 2004/021* (2013.01)

(56) References Cited

U.S. PATENT DOCUMENTS

| | | | |
|---|---|---|---|
| 5,709,962 | A | 1/1998 | Bailey |
| 6,090,505 | A | 7/2000 | Shimamura et al. |
| 6,235,427 | B1 | 5/2001 | Idota et al. |
| 6,287,371 | B1 | 9/2001 | Ota et al. |
| 6,383,234 | B1* | 5/2002 | Noh .................. H01M 10/0413 29/623.1 |
| 6,432,579 | B1 | 8/2002 | Tsuji et al. |
| 6,432,585 | B1 | 8/2002 | Kawakami |
| 6,525,391 | B1 | 2/2003 | Bertrand et al. |
| 6,679,925 | B1 | 1/2004 | Tanizaki et al. |
| 6,791,737 | B2 | 9/2004 | Giron |
| 7,066,971 | B1 | 6/2006 | Carlson |
| 7,309,548 | B2 | 12/2007 | Ota et al. |
| 7,402,829 | B2 | 7/2008 | Green |
| 8,101,298 | B2 | 1/2012 | Green et al. |
| 8,192,788 | B1 | 6/2012 | Shah et al. |
| 8,475,957 | B2 | 7/2013 | Rust, III et al. |
| 8,527,395 | B2 | 9/2013 | Ramasubramanian et al. |
| 8,841,030 | B2 | 9/2014 | Lahriri et al. |
| 9,356,271 | B2 | 5/2016 | Ramasubramanian et al. |
| 9,362,553 | B2 | 6/2016 | Lahiri et al. |
| 9,660,292 | B2 | 5/2017 | Rust, III et al. |
| 9,806,331 | B2 | 10/2017 | Lahiri et al. |
| 9,991,490 | B2 | 6/2018 | Ramasubramanian et al. |
| 10,020,514 | B2 | 7/2018 | Ramasubramanian et al. |
| 10,038,214 | B2 | 7/2018 | Rust, III |
| 2002/0013986 | A1 | 2/2002 | Ahn et al. |
| 2003/0082446 | A1 | 5/2003 | Chiang et al. |
| 2004/0185336 | A1 | 9/2004 | Ito et al. |
| 2004/0214085 | A1 | 10/2004 | Sheem et al. |
| 2004/0234861 | A1 | 11/2004 | Kawase et al. |
| 2004/0241540 | A1 | 12/2004 | Tsutsumi et al. |
| 2005/0008939 | A1 | 1/2005 | Ota et al. |
| 2005/0095503 | A1 | 5/2005 | Adachi et al. |
| 2005/0130383 | A1 | 6/2005 | Divakaruni et al. |
| 2005/0208379 | A1 | 9/2005 | Musha et al. |
| 2006/0093871 | A1 | 5/2006 | Howard |
| 2007/0002523 | A1 | 1/2007 | Ando et al. |
| 2007/0097481 | A1 | 5/2007 | Burdis et al. |
| 2007/0172732 | A1 | 7/2007 | Jung et al. |
| 2007/0285051 | A1 | 12/2007 | Jeon et al. |
| 2008/0003490 | A1 | 1/2008 | Christensen |
| 2008/0081256 | A1 | 4/2008 | Madou et al. |
| 2008/0081257 | A1 | 4/2008 | Yoshida et al. |
| 2008/0233455 | A1 | 9/2008 | Deimede |
| 2009/0035664 | A1 | 2/2009 | Chiang et al. |
| 2009/0068567 | A1 | 3/2009 | Konishiike et al. |
| 2009/0123847 | A1 | 5/2009 | Okada et al. |
| 2009/0142656 | A1 | 6/2009 | Nathan et al. |
| 2009/0263716 | A1 | 10/2009 | Ramasubramanian et al. |
| 2009/0303660 | A1 | 12/2009 | Nair et al. |
| 2010/0040951 | A1 | 2/2010 | Yamamoto et al. |
| 2010/0051856 | A1 | 3/2010 | Kim et al. |
| 2010/0209775 | A1 | 8/2010 | Kim |
| 2010/0266907 | A1 | 10/2010 | Yazami |
| 2010/0285368 | A1 | 11/2010 | Yamamoto et al. |
| 2011/0008656 | A1 | 1/2011 | Takayuki et al. |
| 2011/0014522 | A1 | 1/2011 | Visco et al. |
| 2011/0020701 | A1 | 1/2011 | Park et al. |
| 2011/0020713 | A1 | 1/2011 | Cui et al. |
| 2011/0020719 | A1 | 1/2011 | Manabe et al. |
| 2011/0067228 | A1 | 3/2011 | Green |
| 2011/0111283 | A1 | 5/2011 | Rust, III et al. |
| 2011/0129732 | A1 | 6/2011 | Bachrach et al. |
| 2011/0171518 | A1 | 7/2011 | Dunn et al. |
| 2011/0200862 | A1 | 8/2011 | Kurosawa |
| 2012/0100438 | A1 | 4/2012 | Fasching et al. |
| 2012/0176093 | A1 | 7/2012 | Ramasubramanian et al. |
| 2012/0202113 | A1* | 8/2012 | Hodge .................. H01M 4/136 429/211 |
| 2012/0288742 | A1 | 11/2012 | Tanaka et al. |
| 2013/0143120 | A1 | 6/2013 | Ramasubramanian et al. |
| 2013/0189602 | A1 | 7/2013 | Lahiri et al. |
| 2013/0230751 | A1 | 9/2013 | Shaw |
| 2014/0050969 | A1 | 2/2014 | Rust, III et al. |
| 2014/0335395 | A1 | 11/2014 | Ramasubramanian et al. |
| 2015/0024253 | A1 | 1/2015 | Noh |
| 2015/0079452 | A1 | 3/2015 | Park et al. |
| 2015/0104686 | A1 | 4/2015 | Brommer et al. |
| 2018/0040876 | A1 | 2/2018 | Lahiri et al. |
| 2018/0145367 | A1 | 5/2018 | Busacca et al. |

FOREIGN PATENT DOCUMENTS

| | | |
|---|---|---|
| CN | 1555588 | 12/2004 |
| CN | 102007625 | 6/2011 |
| CN | 102569758 | 7/2012 |
| EP | 0883199 | 12/1998 |
| EP | 1028476 | 8/2000 |
| EP | 1100134 | 5/2001 |
| EP | 1102340 | 5/2001 |
| EP | 2048262 | 4/2009 |
| EP | 2277214 | 10/2009 |
| EP | 3295507 | 3/2018 |
| JP | H01132064 | 5/1989 |
| JP | H06236768 A | 8/1994 |
| JP | 2003323882 | 11/2003 |
| JP | 2006100280 | 4/2006 |
| JP | 2006173001 | 6/2006 |
| JP | 2006286427 | 10/2006 |
| JP | 2007258160 | 10/2007 |
| JP | 2008171732 | 7/2008 |
| JP | 2009170258 A | 7/2009 |
| JP | 2010146732 A | 7/2010 |
| JP | 2010225552 A | 10/2010 |
| JP | 2010262752 A | 11/2010 |
| JP | 2012516941 A | 7/2012 |

(56) References Cited

FOREIGN PATENT DOCUMENTS

| | | |
|---|---|---|
| JP | 2015064959 A | 4/2015 |
| KR | 20030044508 | 6/2003 |
| KR | 1020060050988 | 5/2006 |
| NL | 1015956 | 2/2002 |
| TW | 201225385 A | 6/2012 |
| WO | 0243168 A2 | 5/2002 |
| WO | 03105258 | 12/2003 |
| WO | 2008030215 | 3/2008 |
| WO | 2008089110 | 7/2008 |
| WO | 2009129490 | 10/2009 |
| WO | 2009140300 | 11/2009 |
| WO | 2010090956 A2 | 8/2010 |
| WO | 2010092059 | 8/2010 |
| WO | 2010138176 | 12/2010 |
| WO | 2011154862 | 12/2011 |
| WO | 2013112670 | 8/2013 |
| WO | 2014028230 A1 | 2/2014 |

OTHER PUBLICATIONS

Patent Cooperation Treaty, International Search Report issued on PCT/US2012/022393, dated Oct. 10, 2012, 4 pages.
Patent Cooperation Treaty, Written Opinion of the International Searching Authority issued on PCT/US2012/022393, dated Oct. 9, 2012, 5 pages.
Golodnitsky et al., Advanced materials for the 3D microbattery, Journal of Power Sources, 2006, 153, 281-287.
Long et al., Three-Dimensional battery Architectures, Chemical Reviews, 2004, 104, 4463-4492.
Broussely et al., Li-ion batteries and portable power source prospects for the next 5-10 years, Journal of Power Sources, 136, 2004, 386-394.
Long et al., "Three Dimensional Battery Architectures" Chemical Reviews, 2004, 104, 4463-4492 Dec. 4, 2003.
Whitehead et al., Current Collectors for positive electrodes of lithium-based batteries, Journal of the Electrochemical Society, 2005, A5105-A2113, 152(11) Sep. 8, 2005.
United Kingdom Search Report dated Dec. 18, 2012, 4 pages dated Dec. 18, 2012.
Patent Cooperation Treaty, International Search report issued for PCT/US2013/022868, dated May 15, 2013, 3 pages dated May 15, 2013.
Broussely, Michel et al., Li-ion batteries and portable power source prospects for the next 5-10 years, Journal of Power Sources, 2004, 386-394, 136 Mar. 31, 2004.
Harraz et al., Immersion plating of nickel onto porous silicon layer from fluoride solutions, Physica Status Solidi (a), 197, 1, 2003, pp. 51-56 Apr. 29, 2013.
Harraz et al., Different behavior in immersion plating of nickel on porous silicon from acidic and alkaline fuoride media, J. Electrochem. Soc, 150, 5, 2003, pp. C277-C284 Mar. 18, 2003.
Obrovac, M. N. et al., Reversible Cycling of Crystalline Silicon Powder, Journal of The Electrochemical Society, 2007, A103-A108, 154(2) Dec. 21, 2006.
Waidmann, S. et al., Tuning nickel silicide properties using a lamp based RTA, a heat conduction based RTA or a furnace anneal, Microelectronic Engineering 83, 2006, 2282-2286 Oct. 19, 2006.
Xu et al., Nickel Displacement Deposition of Porous Silicon with Ultrahigh Aspect Ratio, Journal of The Electrochemical Society, 2007, 170-174, 154(3) Jan. 19, 2007.
Xu, Chengkun et al., Theorectical studies of displacement disposition of nickel into porous silicon with ultrahigh aspect ratio, Electrochimica Acta, Dec. 4, 2006, 3901-3909, 52 Dec. 4, 2006.
Zhang Xi et al., High aspect ratio nickel structures fabricated by electrochemical replication of hydrofluoric acid etched silicon, Electrochem and Solid-State Letters, vol. 9, 9, 2006, pp. C150-C152 Jun. 27, 2006.
Patent Cooperation Treaty, International Search Report for PCT/US2009/041012, dated Sep. 8, 2009, 4 pages dated Sep. 8, 2009.
Golodnitsky et al., "Advanced materials for the 3D microbattery," 2006, Journal of Power Sources, 153, pp. 281-287. Jul. 12, 2005.
Liu, C., Bulk Micromachining and Silicon Anisotropic Etching, Foundations of MEMS, Prentice Hall Inc. Chapter 10, pp. 326-370; Prentice Hall Dec. 31, 2006.
Shin et al. Porous Silicon Negative Electrodes for Rachargeable Lithium Batteries, Journal of Power Sources, 139 (2005) 314-320 Sep. 13, 2004.
Vyatkin et al., Random and Ordered Macropore in p-type silicon J. Electrochem. Soc. 149, 1, G70-G76 (2002) Dec. 6, 2001.
Arora, P. et al., "Battery Separators", Chem. Reviews, 2004, 104, 4419-4462 Mar. 30, 2004.
Bourderau et al., "Amorphous Silicon As a Possible Anode Material for Li-Ion Batteries," Journal of Power Sources, 1999, 81-82, 233-236 Sep. 30, 1999.
Li et al., "The Crystal Structural Evolution of Nano-Si Anode Caused by Lithium Insertion and Extraction At Room Temperature," Solid State Ionics, 2000, 135, 181-191 Nov. 30, 2000.
Kasavajjula et al., Nano- and Bulk-Silicon-Based Insertion Anodes for Lithium-Ion Secondary Cells, Journal of Power Sources, 2007, 1003-1039, 163 Nov. 9, 2006.
Green et al., Structured silicon anodes for lithium battery applications, Electrochemical and Solid State Letters, 6, 2003, A75-A79 Mar. 5, 2003.
Patent Cooperation Treaty, International Search Report for PCT/US2013/053235, dated Jan. 28, 2014, 5 pages dated Jan. 28, 2014.
Patent Cooperation Treaty, International Search Report issued for PCT/US2014/025200, dated Jul. 29, 4 pages dated Jul. 29, 2014.
Mu et al., Silicon nanotube array/gold electrode for direct electrochemistry of cytochrome C, J. Phys. Chem. B, 2007, 111(6), 1491-1495.
European Patent Office, Extended Search Report for EP 13 74 0825, App. No. 13740825.8, dated Aug. 8, 2015, 9 pages.
Harraz et al., Immersion plating of nickel onto a porous silicon layer from fluoride solutions, Phys. Stat. Sol., 2003, 197(1): 51-56.
Harraz et al., Different behavior in immersion plating of nickel on porous silicon from acidic and and alkaline fluoride media, J. Elect. Soc., 2003, 150(5): C277-284.
Obrovac et al., Reversible cycling of crystalline silicon powder, J. Elect. Soc., 2007, 154(2): A103-A108.
Waidmann et al., Tuning nickel silicide properties using a lamp based RTA, a heat conduction based RTA or a furnace anneal, Microelectronic Engineering, 2006, 83, 2282-2286.
Xu et al., Theoretical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Zhang et al., High aspect ration nickel structions fabricated by electrochemical replication of hydrofluoric acid etched silicon, Electrochemical and Solid-State Letters, 2006, 9(9): C150-C152.
European Patent Office, Extended European Search Report for 12866772.2, EP 2807698, dated Oct. 8, 2015, 3 pages.
Su et al., Silicon-Based Nanomaterials for Lithium-Ion Batteries: A Review, Advanced Energy Materials, 2013, 1-23.
Maranchi et al., High capacity, reversible silicon thin-film anodes for lithium-ion batteries, Electronchemical and Solid-State Letters, 2001, 6(9), A198-A201.
Iaboni et al., Li15SI4 Formation in silicon thin film negative electrodes, Journal of the Electrochemical Society, 2016, 163(2), A255-A261.
European Patent Office, Extended European Search Report for 13829954.0, EP 2885830, dated Feb. 19, 2016, 7 pages.
European Patent Office, Extended European Search Report for 14768734.7, EP 2973785, 10 pages dated Jul. 15, 2016.
Patent Cooperation Treaty, International Search Report for PCT/US2016/032284, dated Aug. 26, 2016, 4 pages 2016.
Roberts et al., 3D lithium ion batteries-from fundamentals to fabrication, Journal of Materials Chemistry, Royal Society of Chemistry, 2011, 21: 9876-9890 2011.
Taiwan Search Report for App. No. 102129550, dated Sep. 9, 2016, 1 page dated Sep. 9, 2016.

(56) References Cited

OTHER PUBLICATIONS

Patent Cooperation Treaty, International Search Report for PCT/US2016/032255, dated Aug. 25, 2017, 4 pages 2017.

* cited by examiner

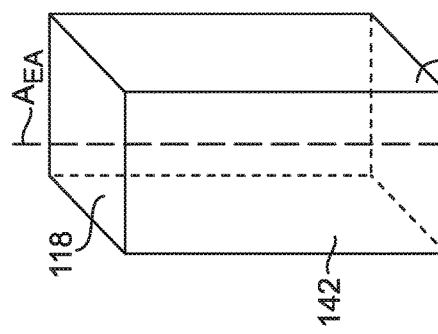
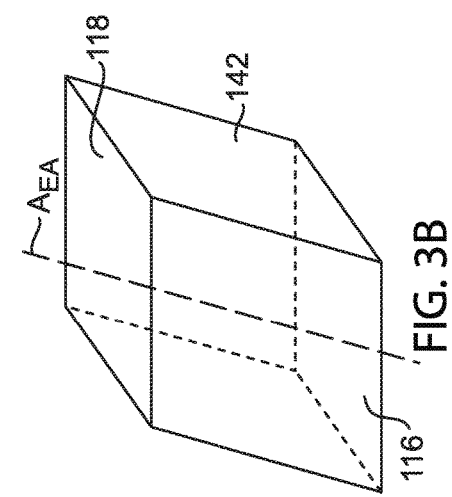
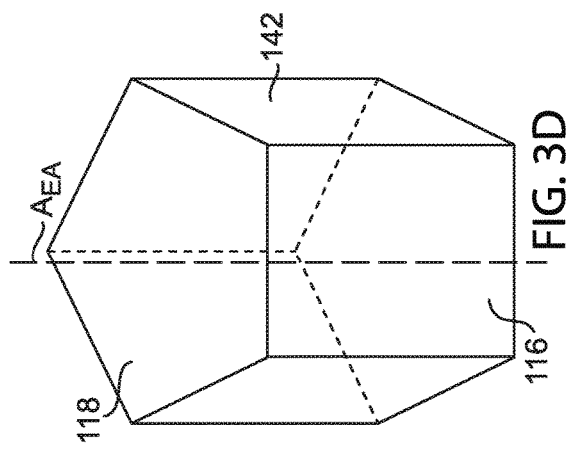
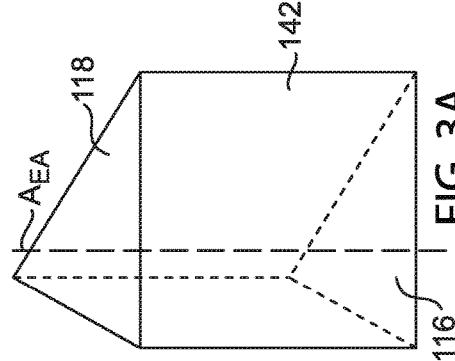

DIMENSIONAL CONSTRAINTS FOR THREE-DIMENSIONAL BATTERIES

CROSS REFERENCE TO RELATED APPLICATIONS

This application is a PCT application, which claims the benefit of priority from U.S. Patent Application No. 62/335,912 filed on 13 May 2016 and claims the benefit of priority from U.S. Patent Application No. 62/422,958 filed on 16 Nov. 2016, both of which are hereby incorporated by reference herein in their entireties.

FIELD OF THE INVENTION

This disclosure generally relates to structures for use in energy storage devices, to energy storage devices employing such structures, and to methods for producing such structures and energy devices.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two or more battery cells that have been electrically coupled to form the battery, with each battery cell comprising a positive electrode, a negative electrode, a microporous separator, and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

When the carrier ions move between electrodes, one of the persistent challenges resides in the fact that the electrodes tend to expand and contract as the battery is repeatedly charged and discharged. The expansion and contraction during cycling tends to be problematic for reliability and cycle life of the battery because when the electrodes expand, electrical shorts and battery failures occur.

Therefore, there remains a need for controlling the expansion and contraction of electrodes during battery cycling to improve reliability and cycle life of the battery.

SUMMARY

Briefly, therefore, one aspect of this disclosure relates to the implementation of constraint structures to mitigate or prevent the macroscopic expansion of electrodes, thereby improving the energy density, reliability, and cycle life of batteries.

According to one aspect, a secondary battery is provided for cycling between a charged and a discharged state, the secondary battery having a battery enclosure, an electrode assembly, carrier ions, a non-aqueous liquid electrolyte within the battery enclosure, and a set of electrode constraints. The electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, the ratio of each of $L_{EA}$ and $W_{EA}$ to $H_{EA}$ being at least 2:1, respectively. The electrode assembly has a population of electrode structures, a population of counter-electrode structures, and an electrically insulating microporous separator material electrically separating members of the electrode and counter-electrode populations, members of the electrode and counter-electrode structure populations being arranged in an alternating sequence in the longitudinal direction. Each member of the population of electrode structures has a layer of an electrode active material and each member of the population of counter-electrode structures comprises a layer of a counter-electrode active material, wherein the electrode active material has the capacity to accept more than one mole of carrier ion per mole of electrode active material when the secondary battery is charged from a discharged state to a charged state. The set of electrode constraints includes a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%. The set of electrode constraints further includes a secondary constraint system comprising first and second secondary growth constraints separated in a second direction and connected by at least one secondary connecting member, wherein the secondary constraint system at least partially restrains growth of the electrode assembly in the second direction upon cycling of the secondary battery, the second direction being orthogonal to the longitudinal direction. The charged state is at least 75% of a rated capacity of the secondary battery, and the discharged state is less than 25% of the rated capacity of the secondary battery.

According to another aspect, a secondary battery for cycling between a charged and a discharged state is provided, the secondary battery having a battery enclosure, an electrode assembly, carrier ions, a non-aqueous liquid electrolyte within the battery enclosure, and a set of electrode constraints. The electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, the ratio of each of $L_{EA}$ and $W_{EA}$ to $H_{EA}$ being at least 2:1, respectively. The electrode assembly further includes a population of electrode structures, a population of counter-electrode structures, and an electrically insulating microporous separator material electrically separating members of the electrode and counter-electrode populations, members of the electrode and counter-electrode structure populations being arranged in an alternating sequence in the longitudinal direction. Each member of the population of electrode structures has a layer of an electrode active material and each member of the population of counter-electrode structures comprises a layer of a counter-electrode active material, wherein the electrode active material has the capacity to accept more than one mole of carrier ion per mole of electrode active material when the secondary battery is charged from a discharged state to a charged state. The set of electrode constraints includes a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint array restrains growth of the electrode assembly in the longitudinal direction such that any increase in the Feret diameter of the electrode assembly in the longitudinal direction over 20 consecutive cycles of the secondary battery is less than 20%. The charged state is at least 75% of a rated capacity of the secondary battery, and the discharged state is less than 25% of the rated capacity of the secondary battery.

Other aspects, features and embodiments of the present disclosure will be, in part, discussed and, in part, apparent in the following description and drawing.

BRIEF DESCRIPTION OF THE DRAWING

FIGS. 3A-3H show exemplary embodiments of different shapes and sizes for an electrode assembly.

Figure 1:
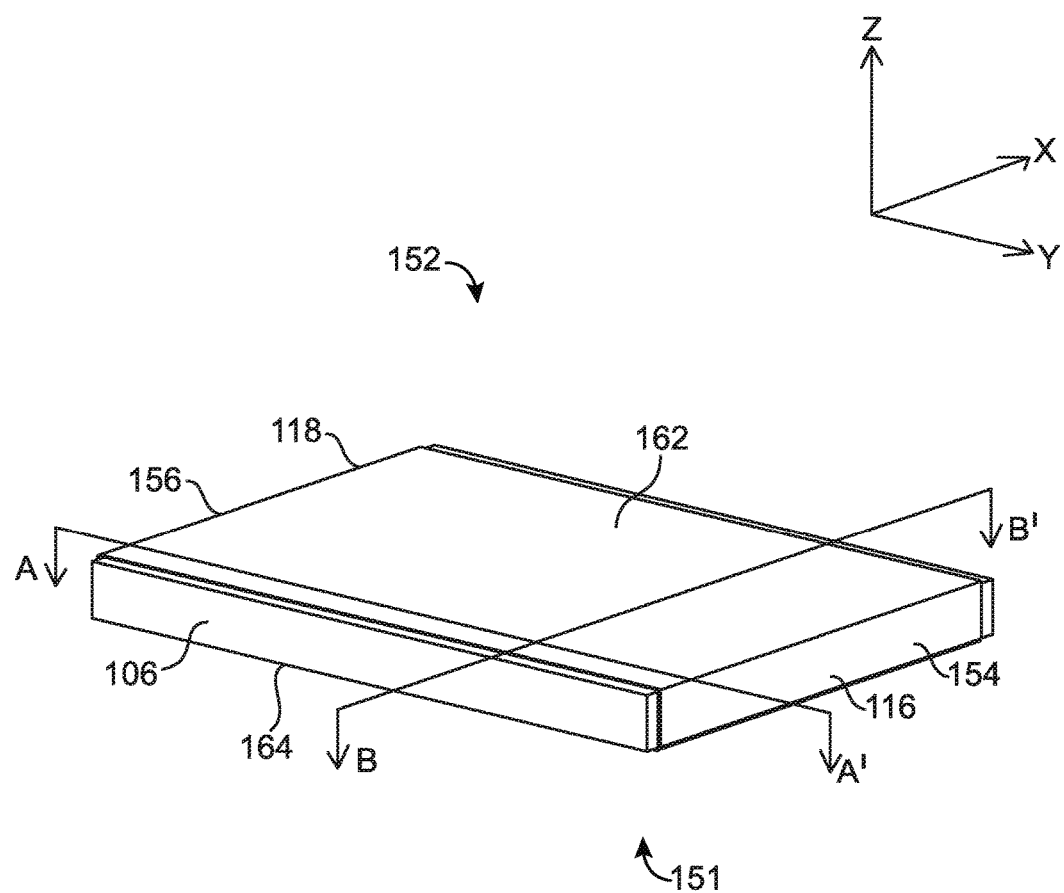
FIG. 1 is a perspective view of one embodiment of a constraint system employed with an electrode assembly.

Other aspects, embodiments and features of the inventive subject matter will become apparent from the following detailed description when considered in conjunction with the accompanying drawing. The accompanying figures are schematic and are not intended to be drawn to scale. For purposes of clarity, not every element or component is labeled in every figure, nor is every element or component of each embodiment of the inventive subject matter shown where illustration is not necessary to allow those of ordinary skill in the art to understand the inventive subject matter.

Definitions

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 µm would include 225 µm to 275 µm. By way of further example, in one instance, about 1,000 µm would include 900 µm to 1,100 µm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"C-rate" as used herein refers to a measure of the rate at which a secondary battery is discharged, and is defined as the discharge current divided by the theoretical current draw under which the battery would deliver its nominal rated capacity in one hour. For example, a C-rate of 1C indicates the discharge current that discharges the battery in one hour, a rate of 2C indicates the discharge current that discharges the battery in ½ hours, a rate of C/2 indicates the discharge current that discharges the battery in 2 hours, etc.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Feret diameter" as referred to herein with respect to the electrode assembly is defined as the distance between two parallel planes restricting the electrode assembly measured in a direction perpendicular to the two planes. For example, a Feret diameter of the electrode assembly in the longitudinal direction is the distance as measured in the longitudinal direction between two parallel planes restricting the electrode assembly that are perpendicular to the longitudinal direction. As another example, a Feret diameter of the electrode assembly in the transverse direction is the distance as measured in the transverse direction between two parallel planes restricting the electrode assembly that are perpendicular to the transverse direction. As yet another example, a Feret diameter of the electrode assembly in the vertical direction is the distance as measured in the vertical direction between two parallel planes restricting the electrode assembly that are perpendicular to the vertical direction.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver a specified current over a period of time, as measured under standard temperature conditions (25° C.). For example, the rated capacity may be measured in units of Amp·hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1C indicates the discharge current that discharges the battery in one hour, 2C indicates the discharge current that discharges the battery in ½ hours, C/2 indicates the discharge current that discharges the battery in 2 hours, etc. Thus, for example, a battery rated at 20 Amp·hr at a Crate of 1C would give a discharge current of 20 Amp for 1 hour, whereas a battery rated at 20 Amp·hr at a C-rate of 2C would give a discharge current of 40 Amps for ½ hour, and a battery rated at 20 Amp·hr at a C-rate of C/2 would give a discharge current of 10 Amps over 2 hours.

"Maximum width" ($W_{EA}$) as used herein in the context of a dimension of an electrode assembly corresponds to the greatest width of the electrode assembly as measured from opposing points of longitudinal end surfaces of the electrode assembly in the longitudinal direction.

"Maximum length" ($L_{EA}$) as used herein in the context of a dimension of an electrode assembly corresponds to the greatest length of the electrode assembly as measured from opposing points of a lateral surface of the electrode assembly in the transverse direction.

Figure 2A:
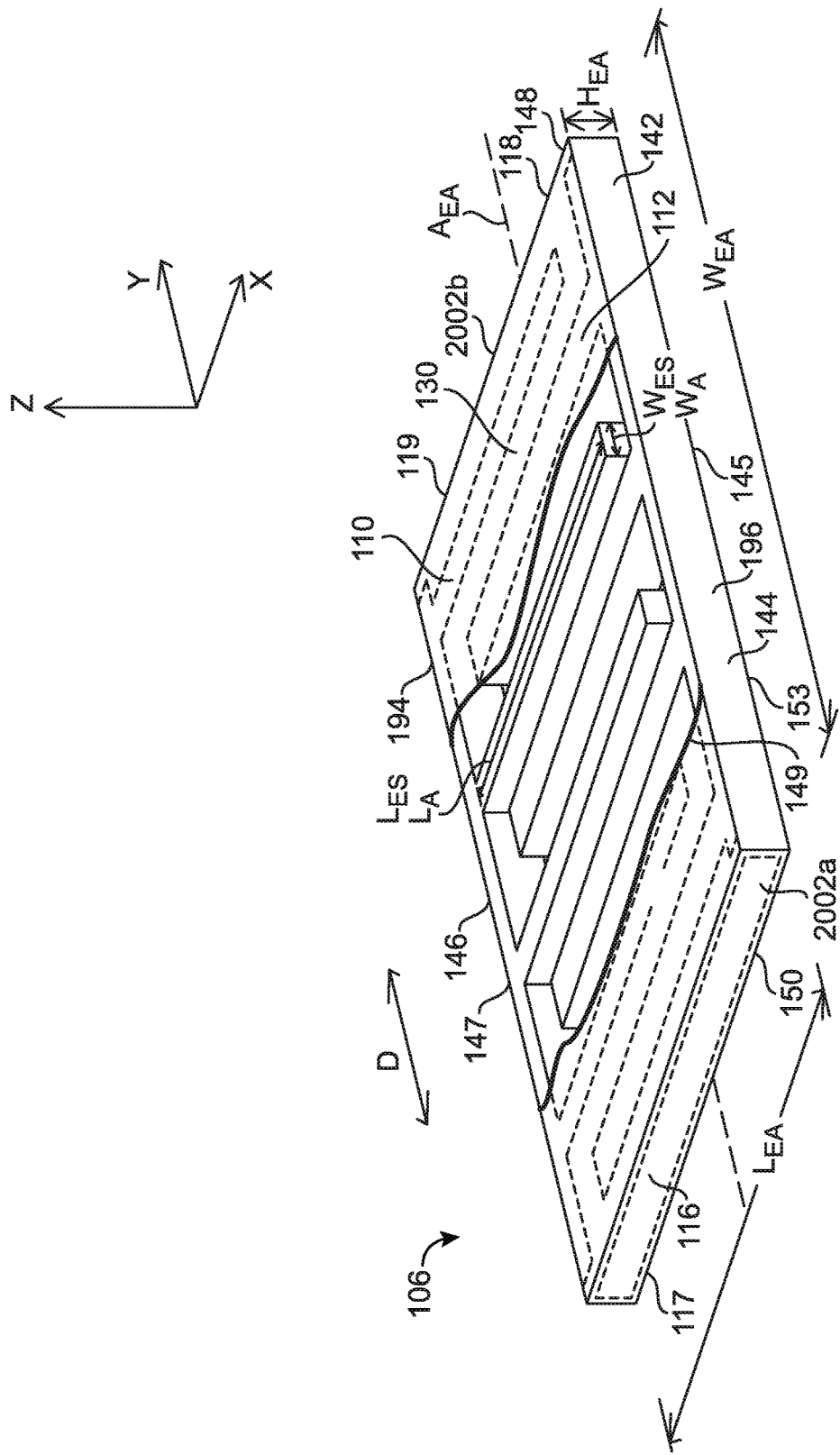
FIG. 2A is a schematic of one embodiment of a three-dimensional electrode assembly.
Figure 20:
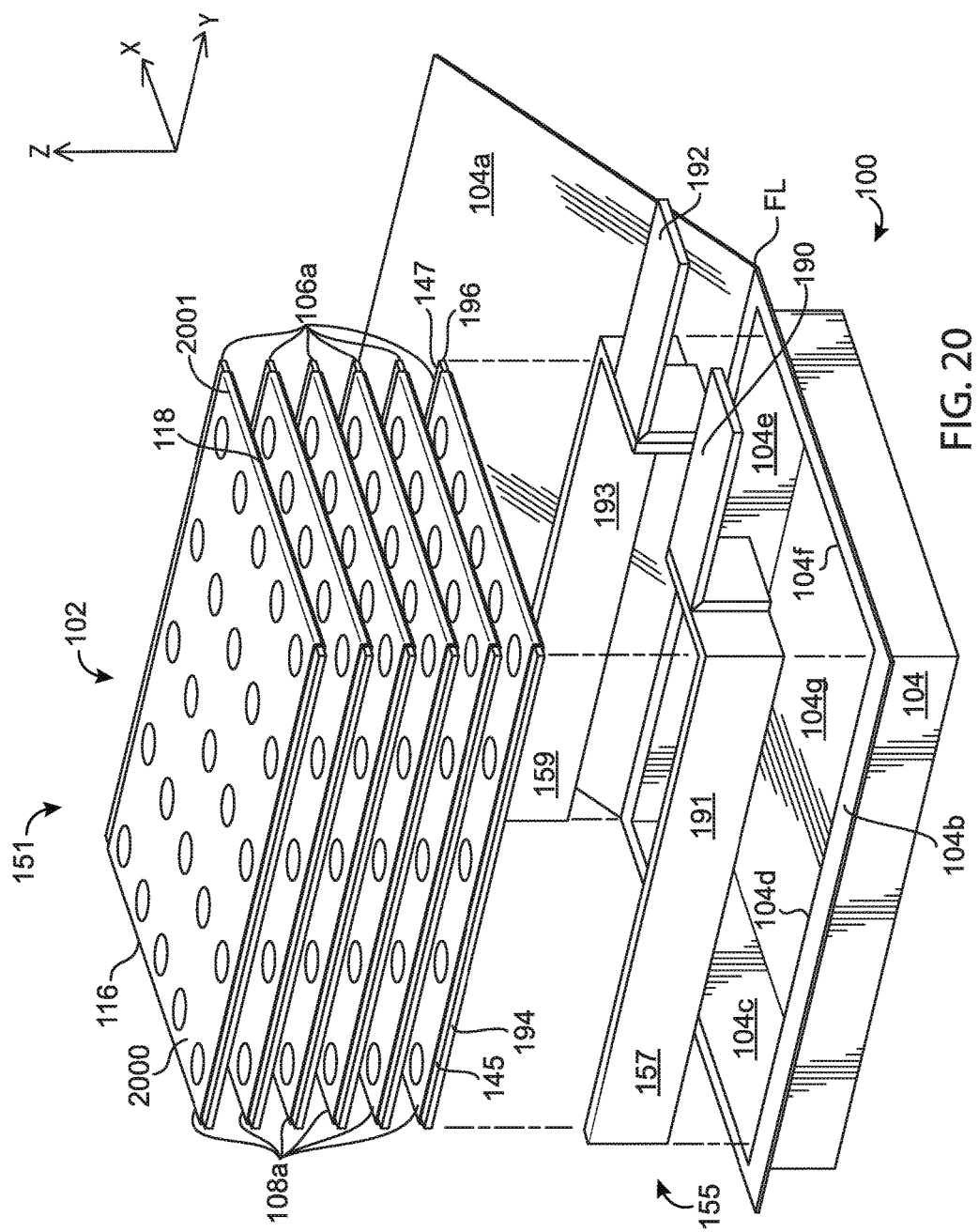
FIG. 20 illustrates an exploded view of an embodiment of an energy storage device or a secondary battery utilizing one embodiment of a set of growth constraints.

"Maximum height" ($H_{EA}$) as used herein in the context of a dimension of an electrode assembly corresponds to the greatest height of the electrode assembly as measured from opposing points of the lateral surface of the electrode assembly in the transverse direction. cl DETAILED DESCRIPTION In general, the present disclosure is directed to an energy storage device 100, such as a secondary battery 102, as shown for example in FIG. 2A and/or FIG. 20, that cycles between a charged and a discharged state. The secondary battery 102 includes a battery enclosure 104, an electrode assembly 106, carrier ions, and a non-aqueous liquid electrolyte within the battery enclosure. The secondary battery 102 also includes a set of electrode constraints 108 that restrain growth of the electrode assembly 106. The growth of the electrode assembly 106 that is being constrained may be a macroscopic increase in one or more dimensions of the electrode assembly 106.

Further, in general, various aspects of the present disclosure include three-dimensional constraint structures offering particular advantages when incorporated into energy storage devices 100 such as batteries, capacitors, fuel cells, and the like. In one embodiment, the constraint structures have a configuration and/or structure that is selected to resist at least one of growth, swelling, and/or expansion of an electrode assembly 106 that can otherwise occur when a secondary battery 102 is repeatedly cycled between charged and discharged states. In particular, in moving from a discharged state to a charged state, carrier ions such as, for example, one or more of lithium, sodium, potassium, calcium and magnesium, move between the positive and negative electrodes in the battery. Upon reaching the electrode, the carrier ions may then intercalate or alloy into the electrode material, thus increasing the size and volume of that electrode. Conversely, reversing to move from the charged state to the discharged state can cause the ions to de-intercalate or de-alloy, thus contracting the electrode. This alloying and/or intercalation and de-alloying and/or de-intercalation can cause significant volume change in the electrode. Thus, the repeated expansion and contraction of the electrodes upon charging and discharging can create strain in the electrode assembly 106, which can lead to reduced performance and ultimately even failure of the secondary battery.

Figure 2B:
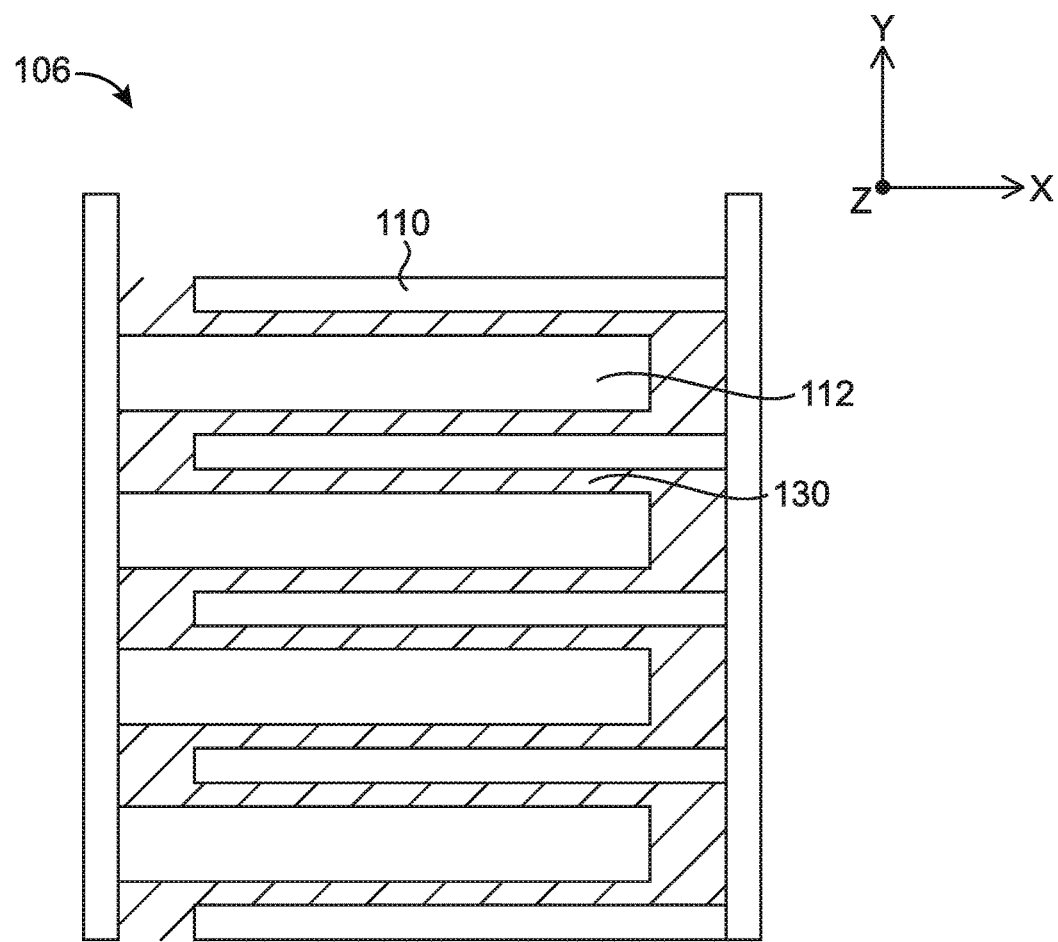
FIGS. 2B-2C are schematics of one embodiment of a three-dimensional electrode assembly, depicting anode structure population members in constrained and expanded configurations.
Figure 2C:
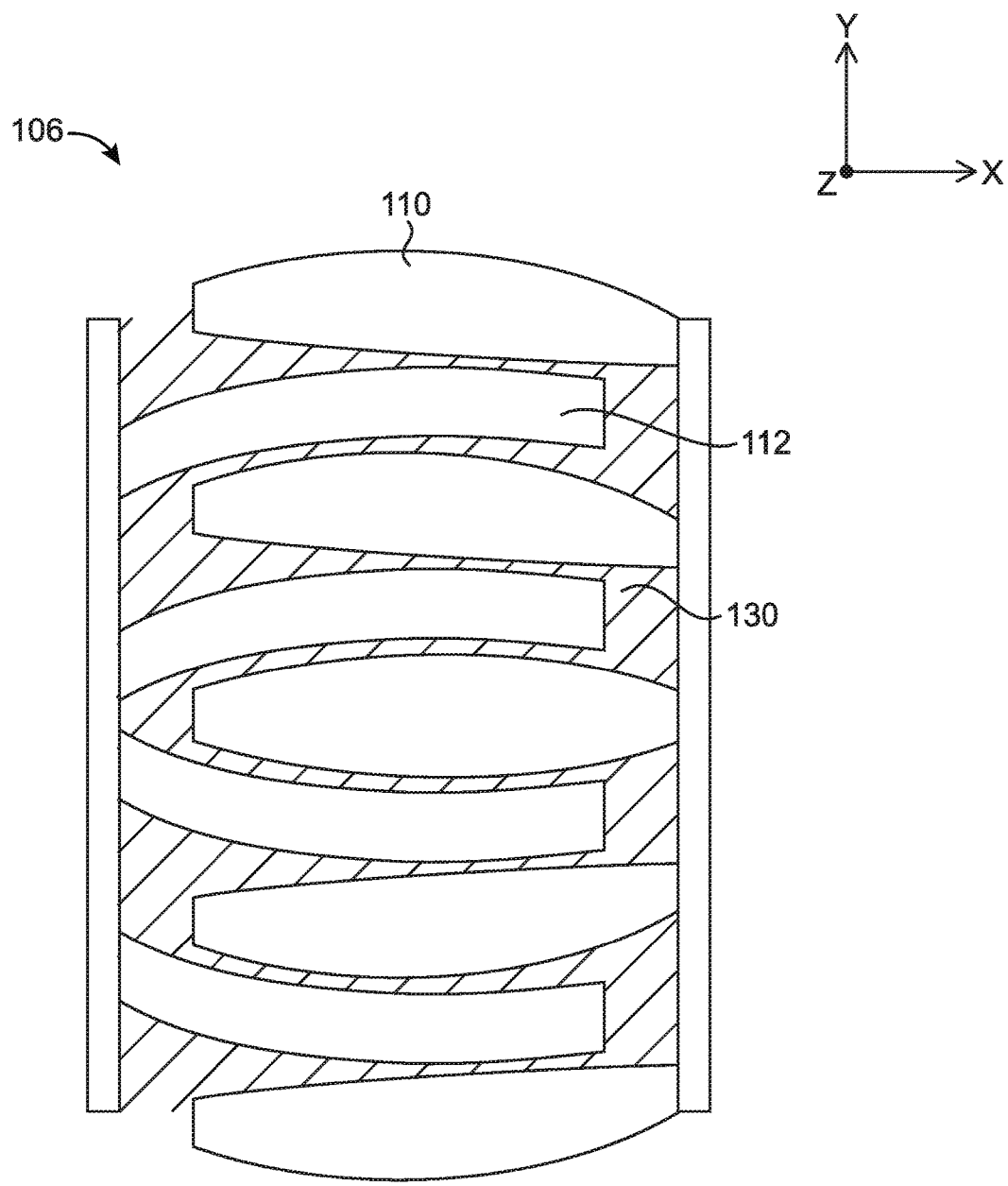

Referring to FIGS. 2A-2C, the effects of the repeated expansion and/or contraction of the electrode assembly 106, according to an embodiment of the disclosure, can be described. FIG. 2A shows an embodiment of a three-dimensional electrode assembly 106, with a population of electrode structures 110 and a population of counter-electrode structures 112 (e.g., population of anode and cathode structures, respectively). The three-dimensional electrode assembly 106 in this embodiment provides an alternating set of the electrodes structures 110 and counter electrode structures 112 that are interdigitated with one another and, in the embodiment shown in FIG. 2A, has a longitudinal axis $A_{EA}$ parallel to the Y axis, a transverse axis (not shown) parallel to the X axis, and a vertical axis (not shown) parallel to the Z axis. The X, Y and Z axes shown herein are arbitrary axes intended only to show a basis set where the axes are mutually perpendicular to one another in a reference space, and are not intended in any way to limit the structures herein to a specific orientation. Upon charge and discharge cycling of a secondary battery 102 having the electrode assembly 106, the carrier ions travel between the electrode and counter-electrode structures 110 and 112, respectively, such as generally in a direction that is parallel to the Y axis as shown in the embodiment depicted in FIG. 2A, and can intercalate into electrode material of one or more of the electrode structures 110 and counter-electrode structures 112 that is located within the direction of travel. The effect of intercalation and/or alloying of carrier ions into the electrode material can be seen in the embodiments illustrated in FIGS. 2B-2C. In particular, FIG. 2B depicts an embodiment of the electrode assembly 106 with electrode structures 110 in a relatively unexpanded state, such as prior to repeated cycling of the secondary battery 106 between charged and discharged states. By comparison, FIG. 2C depicts an embodiment of the electrode assembly 106 with electrode structures 110 after repeated cycling of the secondary battery for a predetermined number of cycles. As shown in this figure, the dimensions of the electrode structures 110 can increase significantly in the stacking direction (e.g., Y-direction), due to the intercalation and/or alloying of carrier ions into the electrode material. The dimensions of the electrode structures 110 can also significantly increase in another direction, such as in the Z-direction (not shown in FIG. 2C). Furthermore, the increase in size of the electrode structures 110 can result in the deformation of the structures inside the electrode assembly, such as deformation of the counter-electrode structures 112 and separator 130 in the assembly, to accommodate the expansion in the electrode structures 110. The expansion of the electrode structures 110 can ultimately result in the bulging and/or warping of the electrode assembly 106 at the longitudinal ends thereof, as depicted in the embodiment shown in FIG. 2C (as well as in other directions such as at the top and bottom surfaces in the Z-direction). Accordingly, the electrode assembly 106 according to one embodiment can exhibit significant expansion and contraction along the longitudinal (Y axis) of the assembly 106, as well as other axis, due to the intercalation and de-intercalation of the carrier ions during the charging and discharging process.

Thus, in one embodiment, a primary growth constraint system 151 is provided to mitigate and/or reduce at least one of growth, expansion, and/or swelling of the electrode assembly 106 in the longitudinal direction (i.e., in a direction that parallels the Y axis), as shown for example in FIG. 1. For example, the primary growth constraint system 151 can include structures configured to constrain growth by opposing expansion at longitudinal end surfaces 116, 118 of the electrode assembly 106. In one embodiment, the primary growth constraint system 151 comprises first and second primary growth constraints 154, 156, that are separated from each other in the longitudinal direction, and that operate in conjunction with at least one primary connecting member 162 that connects the first and second primary growth constraints 154, 156 together to restrain growth in the electrode assembly 106. For example, the first and second primary growth constraints 154, 156 may at least partially cover first and second longitudinal end surfaces 116, 118 of the electrode assembly 106, and may operate in conjunction with connecting members 162, 164 connecting the primary growth constraints 154, 156 to one another to oppose and restrain any growth in the electrode assembly 106 that occurs during repeated cycles of charging and/or discharging. Further discussion of embodiments and operation of the primary growth constraint system 151 is provided in more detail below.

In addition, repeated cycling through charge and discharge processes in a secondary battery 102 can induce growth and strain not only in a longitudinal direction of the electrode assembly 106 (e.g., Y-axis in FIG. 2A), but can also induce growth and strain in directions orthogonal to the longitudinal direction, as discussed above, such as the transverse and vertical directions (e.g., X and Z axes, respectively, in FIG. 2A). Furthermore, in certain embodiments, the incorporation of a primary growth constraint system 151 to inhibit growth in one direction can even exacerbate growth and/or swelling in one or more other directions. For example, in a case where the primary growth constraint system 151 is provided to restrain growth of the electrode assembly 106 in the longitudinal direction, the intercalation of carrier ions during cycles of charging and discharging and the resulting swelling of electrode structures can induce strain in one or more other directions. In particular, in one embodiment, the strain generated by the combination of electrode growth/swelling and longitudinal growth constraints can result in buckling or other failure(s) of the electrode assembly 106 in the vertical direction (e.g., the Z axis as shown in FIG. 2A), or even in the transverse direction (e.g., the X axis as shown in FIG. 2A).

Accordingly, in one embodiment of the present disclosure, the secondary battery 102 includes not only a primary growth constraint system 151, but also at least one secondary growth constraint system 152 that may operate in conjunction with the primary growth constraint system 151 to restrain growth of the electrode assembly 106 along multiple axes of the electrode assembly 106. For example, in one embodiment, the secondary growth constraint system 152 may be configured to interlock with, or otherwise synergistically operate with, the primary growth constraint system 151, such that overall growth of the electrode assembly 106 can be restrained to impart improved performance and reduced incidence of failure of the secondary battery having the electrode assembly 106 and primary and secondary growth constraint systems 151 and 152. respectively. Further discussion of embodiments of the interrelationship between the primary and secondary growth constraint systems 151 and 152, respectively, and their operation to restrain growth of the electrode assembly 106, is provided in more detail below.

By constraining the growth of the electrode assembly 106, it is meant that, as discussed above, an overall macroscopic increase in one or more dimensions of the electrode assembly 106 is being constrained. That is, the overall growth of the electrode assembly 106 may be constrained such that an increase in one or more dimensions of the electrode assembly 106 along (the X, Y, and Z axes) is controlled, even though a change in volume of one or more electrodes within the electrode assembly 106 may nonetheless occur on a smaller (e.g., microscopic) scale during charge and discharge cycles. The microscopic change in electrode volume may be observable, for example, via scanning electron microscopy (SEM). While the set of electrode constraints 108 may be capable of inhibiting some individual electrode growth on the microscopic level, some growth may still occur, although the growth may at least be restrained. The volume change in the individual electrodes upon charge/discharge, while it may be a small change on the microscopic level for each individual electrode, can nonetheless have an additive effect that results in a relatively larger volume change on the macroscopic level for the overall electrode assembly 106 in cycling between charged and discharged states, thereby potentially causing strain in the electrode assembly 106.

According to one embodiment, an electrode active material used in an electrode structure 110 corresponding to an anode of the electrode assembly 106 comprises a material that expands upon insertion of carrier ions into the electrode active material during charge of the secondary battery 102. For example, the electrode active materials may comprise anodically active materials that accept carrier ions during charging of the secondary battery, such as by intercalating with or alloying with the carrier ions, in an amount that is sufficient to generate an increase in the volume of the electrode active material. For example, in one embodiment the electrode active material may comprise a material that has the capacity to accept more than one mole of carrier ion per mole of electrode active material, when the secondary battery 102 is charged from a discharged to a charged state. By way of further example, the electrode active material may comprise a material that has the capacity to accept 1.5 or more moles of carrier ion per mole of electrode active material, such as 2.0 or more moles of carrier ion per mole of electrode active material, and even 2.5 or more moles of carrier ion per mole of electrode active material, such as 3.5 moles or more of carrier ion per mole of electrode active material. The carrier ion accepted by the electrode active material may be at least one of lithium, potassium, sodium, calcium, and magnesium. Examples of electrode active materials that expand to provide such a volume change include one or more of silicon, aluminum, tin, zinc, silver, antimony, bismuth, gold, platinum, germanium, palladium, and alloys thereof.

Electrode Assembly

Referring again to FIG. 2A, in one embodiment, an interdigitated electrode assembly 106 includes a population of electrode structures 110, a population of counter-electrode structures 112, and an electrically insulating microporous separator 130 electrically insulating the electrode structures 110 from the counter-electrode structures 112. In one embodiment, the electrode structures 110 comprise an electrode active material layer 132, an electrode backbone 134 that supports the electrode active material layer 132, and an electrode current collector 136, which may be an ionically porous current collector to allow ions to pass therethrough, as shown in the embodiment depicted in FIG. 7. For example, the electrode structure 110, in one embodiment, can comprise an anode structure, with an anodically active material layer, an anode backbone, and an anode current collector. Similarly, in one embodiment, the counter-electrode structures 112 comprise a counter-electrode active material layer 138, a counter-electrode current collector 140, and a counter-electrode backbone 141 that supports one or more of the counter-electrode current collector 140 and/or the counter-electrode active material layer 138, as shown for example in the embodiment depicted in FIG. 7. For example, the counter-electrode structure 112 can comprise, in one embodiment, a cathode structure comprising a cathodically active material layer, a cathode current collector, and a cathode backbone. The electrically insulating microporous separator 130 allows carrier ions to pass therethrough during charge and/or discharge processes, to travel between the electrode structures 110 and counter-electrode structures 112 in the electrode assembly 106. Furthermore, it should be understood that the electrode and counter electrode structures 110 and 112, respectively, are not limited to the specific embodiments and structures described herein, and other configurations, structures, and/or materials other than those specifically described herein can also be provided to form the electrode structures 110 and counter-electrode structures 112. For example, the electrode and counter electrode structures 110, 112 can be provided in a form where the structures are substantially absent any electrode and/or counter-electrode backbones 134, 141, such as in a case where the region of the electrode and/or counter-electrode structures 110, 112 that would contain the backbones is instead made up of electrode active material and/or counter-electrode active material.

According to the embodiment as shown in FIG. 2A, the members of the electrode and counter-electrode structure populations 110 and 112, respectively, are arranged in alternating sequence, with a direction of the alternating sequence corresponding to the stacking direction D. The electrode assembly 106 according to this embodiment further comprises mutually perpendicular longitudinal, transverse, and vertical axes, with the longitudinal axis $A_{EA}$ generally corresponding or parallel to the stacking direction D of the members of the electrode and counter-electrode structure populations. As shown in the embodiment in FIG. 2A, the longitudinal axis $A_{EA}$ is depicted as corresponding to the Y axis, the transverse axis is depicted as corresponding to the X axis, and the vertical axis is depicted as corresponding to the Z axis.

Further, the electrode assembly 106 has a maximum width $W_{EA}$ measured in the longitudinal direction (i.e., along the y-axis), a maximum length $L_{EA}$ bounded by the lateral surface and measured in the transverse direction (i.e., along the x-axis), and a maximum height $H_{EA}$ also bounded by the lateral surface and measured in the vertical direction (i.e., along the z-axis). The maximum width $W_{EA}$ can be understood as corresponding to the greatest width of the electrode assembly 106 as measured from opposing points of the longitudinal end surfaces 116, 118 of the electrode assembly 106 where the electrode assembly is widest in the longitudinal direction. For example, referring to the embodiment of the electrode assembly 106 in FIG. 2, the maximum width $W_{EA}$ can be understood as corresponding simply to the width of the assembly 106 as measured in the longitudinal direction. However, referring to the embodiment of the electrode assembly 106 shown in FIG. 3H, it can be seen that the maximum width $W_{EA}$ corresponds to the width of the electrode assembly as measured from the two opposing points 300a, 300b, where the electrode assembly is widest in the longitudinal direction, as opposed to a width as measured from opposing points 301a, 301b where the electrode assembly 106 is more narrow. Similarly, the maximum length $L_{EA}$ can be understood as corresponding to the greatest length of the electrode assembly as measured from opposing points of the lateral surface 142 of the electrode assembly 106 where the electrode assembly is longest in the transverse direction. Referring again to the embodiment in FIG. 2A, the maximum length $L_{EA}$ can be understood as simply the length of the electrode assembly 106, whereas in the embodiment shown in FIG. 3H, the maximum length $L_{EA}$ corresponds to the length of the electrode assembly as measured from two opposing points 302a, 302b, where the electrode assembly is longest in the transverse direction, as opposed to a length as measured from opposing points 303a, 303b where the electrode assembly is shorter. Along similar lines, the maximum height $H_{EA}$ can be understood as corresponding to the greatest height of the electrode assembly as measured from opposing points of the lateral surface 143 of the electrode assembly where the electrode assembly is highest in the vertical direction. That is, in the embodiment shown in FIG. 2A, the maximum height $H_{EA}$ is simply the height of the electrode assembly. While not specifically depicted in the embodiment shown in FIG. 3H, if the electrode assembly had different heights at points across one or more of the longitudinal and transverse directions, then the maximum height $H_{EA}$ of the electrode assembly would be understood to correspond to the height of the electrode assembly as measured from two opposing points where the electrode assembly is highest in the vertical direction, as opposed to a height as measured from opposing points where the electrode assembly is shorter, as analogously described for the maximum width $W_{EA}$ and maximum length $L_{EA}$. The maximum length $L_{EA}$, maximum width $W_{EA}$, and maximum height $H_{EA}$ of the electrode assembly 106 may vary depending upon the energy storage device 100 and the intended use thereof. For example, in one embodiment, the electrode assembly 106 may include maximum lengths $L_{EA}$, widths $W_{EA}$, and heights $H_{EA}$ typical of conventional secondary battery dimensions. By way of further example, in one embodiment, the electrode assembly 106 may include maximum lengths $L_{EA}$, widths $W_{EA}$, and heights $H_{EA}$ typical of thin-film battery dimensions.

In some embodiments, the dimensions $L_{EA}$, $W_{EA}$, and $H_{EA}$ are selected to provide an electrode assembly 106 having a maximum length $L_{EA}$ along the transverse axis (X axis) and/or a maximum width $W_{EA}$ along the longitudinal axis (Y axis) that is longer than the maximum height $H_{EA}$ along the vertical axis (Z axis). For example, in the embodiment shown in FIG. 2A, the dimensions $L_{EA}$, $W_{EA}$, and $H_{EA}$ are selected to provide an electrode assembly 106 having the greatest dimension along the transverse axis (X axis) that is orthogonal with electrode structure stacking direction D, as well as along the longitudinal axis (Y axis) coinciding with the electrode structure stacking direction D. That is, the maximum length $L_{EA}$ and/or maximum width $W_{EA}$ may be greater than the maximum height $H_{EA}$. For example, in one embodiment, a ratio of the maximum length $L_{EA}$ to the maximum height $H_{EA}$ may be at least 2:1. By way of further example, in one embodiment a ratio of the maximum length $L_{EA}$ to the maximum height $H_{EA}$ may be at least 5:1. By way of further example, in one embodiment, the ratio of the maximum length $L_{EA}$ to the maximum height $H_{EA}$ may be at least 10:1. By way of further example, in one embodiment, the ratio of the maximum length $L_{EA}$ to the maximum height $H_{EA}$ may be at least 15:1. By way of further example, in one embodiment, the ratio of the maximum length $L_{EA}$ to the maximum height $H_{EA}$ may be at least 20:1. The ratios of the different dimensions may allow for optimal configurations within an energy storage device to maximize the amount of active materials, thereby increasing energy density.

In some embodiments, the maximum width $W_{EA}$ may be selected to provide a width of the electrode assembly 106 that is greater than the maximum height $H_{EA}$. For example, in one embodiment, a ratio of the maximum width $W_{EA}$ to the maximum height $H_{EA}$ may be at least 2:1. By way of further example, in one embodiment, the ratio of the maximum width $W_{EA}$ to the maximum height $H_{EA}$ may be at least 5:1. By way of further example, in one embodiment, the ratio of the maximum width $W_{EA}$ to the maximum height $H_{EA}$ may be at least 10:1. By way of further example, in one embodiment, the ratio of the maximum width $W_{EA}$ to the maximum height $H_{EA}$ may be at least 15:1. By way of further example, in one embodiment, the ratio of the maximum width $W_{EA}$ to the maximum height $H_{EA}$ may be at least 20:1.

According to one embodiment, a ratio of the maximum width $W_{EA}$ to the maximum length $L_{EA}$ may be selected to be within a predetermined range that provides for an optimal configuration. For example, in one embodiment, a ratio of the maximum width $W_{EA}$ to the maximum length $L_{EA}$ may be in the range of from 1:5 to 5:1. By way of further example, in one embodiment a ratio of the maximum width $W_{EA}$ to the maximum length $L_{EA}$ may be in the range of from 1:3 to 3:1. By way of yet a further example, in one embodiment a ratio of the maximum width $W_{EA}$ to the maximum length $L_{EA}$ may be in the range of from 1:2 to 2:1.

In the embodiment as shown in FIG. 2A, the electrode assembly 106 has the first longitudinal end surface 116 and the opposing second longitudinal end surface 118 that is separated from the first longitudinal end surface 116 along the longitudinal axis $A_{EA}$. The electrode assembly 106 further comprises a lateral surface 142 that at least partially surrounds the longitudinal axis $A_{EA}$, and that connects the first and second longitudinal end surfaces 116, 118. In one embodiment, the maximum width $W_{EA}$ is the dimension along the longitudinal axis $A_{EA}$ as measured from the first longitudinal end surface 116 to the second longitudinal end surface 118. Similarly, the maximum length $L_{EA}$ may be bounded by the lateral surface 142, and in one embodiment, may be the dimension as measured from opposing first and second regions 144, 146 of the lateral surface 142 along the transverse axis that is orthogonal to the longitudinal axis. The maximum height $H_{EA}$, in one embodiment, may be bounded by the lateral surface 142 and may be measured from opposing first and second regions 148, 150 of the lateral surface 142 along the vertical axis that is orthogonal to the longitudinal axis.

For the purposes of clarity, only four electrode structures 110 and four counter-electrode structures 112 are illustrated in the embodiment shown in FIG. 2A. For example, the alternating sequence of members of the electrode and counter-electrode structure populations 110 and 112, respectively, may include any number of members for each population, depending on the energy storage device 100 and the intended use thereof, and the alternating sequence of members of the electrode and counter-electrode structure populations 110 and 112 may be interdigitated, for example, as shown in FIG. 2A. By way of further example, in one embodiment, each member of the population of electrode structures 110 may reside between two members of the population of counter-electrode structures 112, with the exception of when the alternating sequence terminates along the stacking direction, D. By way of further example, in one embodiment, each member of the population of counter-electrode structures 112 may reside between two members of the population of electrode structures 110, with the exception of when the alternating sequence terminates along the stacking direction, D. By way of further example, in one embodiment, and stated more generally, the population of electrode structures 110 and the population of counter-electrode structures 112 each have N members, each of N-1 electrode structure members 110 is between two counter-electrode structure members 112, each of N-1 counter-electrode structure members 112 is between two electrode structure members 110, and N is at least 2. By way of further example, in one embodiment, N is at least 4. By way of further example, in one embodiment, N is at least 5. By way of further example, in one embodiment, N is at least 10. By way of further example, in one embodiment, N is at least 25. By way of further example, in one embodiment, N is at least 50. By way of further example, in one embodiment, N is at least 100 or more. In one embodiment, members of the electrode and/or counter-electrode populations extend sufficiently from an imaginary backplane (e.g., a plane substantially coincident with a surface of the electrode assembly) to have a surface area (ignoring porosity) that is greater than twice the geometrical footprint (i.e., projection) of the members in the backplane. In certain embodiments, the ratio of the surface area of a non-laminar (i.e., three-dimensional) electrode and/or counter-electrode structure to its geometric footprint in the imaginary backplane may be at least about 5, at least about 10, at least about 50, at least about 100, or even at least about 500. In general, however, the ratio will be between about 2 and about 1000. In one such embodiment, members of the electrode population are non-laminar in nature. By way of further example, in one such embodiment, members of the counter-electrode population are non-laminar in nature. By way of further example, in one such embodiment, members of the electrode population and members of the counter-electrode population are non-laminar in nature.

According to one embodiment, the electrode assembly 106 has longitudinal ends 117, 119 at which the electrode assembly 106 terminates. According to one embodiment, the alternating sequence of electrode and counter-electrode structures 110, 112, respectively, in the electrode assembly 106 terminates in a symmetric fashion along the longitudinal direction, such as with electrode structures 110 at each end 117, 119 of the electrode assembly 106 in the longitudinal direction, or with counter-electrode structures 112 at each end 117, 119 of the electrode assembly 106, in the longitudinal direction. In another embodiment, the alternating sequence of electrode 110 and counter-electrode structures 112 may terminate in an asymmetric fashion along the longitudinal direction, such as with an electrode structure 110 at one end 117 of the longitudinal axis $A_{EA}$, and a counter-electrode structure 112 at the other end 119 of the longitudinal axis $A_{EA}$. According to yet another embodiment, the electrode assembly 106 may terminate with a substructure of one or more of an electrode structure 110 and/or counter-electrode structure 112 at one or more ends 117, 119 of the electrode assembly 106. By way of example, according to one embodiment, the alternating sequence of the electrode 110 and counter-electrode structures 112 can terminate at one or more substructures of the electrode 110 and counter-electrode structures 112, including an electrode backbone 134, counter-electrode backbone 141, electrode current collector 136, counter-electrode current collector 140, electrode active material layer 132, counter-electrode active material layer 138, and the like, and may also terminate with a structure such as the separator 130, and the structure at each longitudinal end 117, 119 of the electrode assembly 106 may be the same (symmetric) or different (asymmetric). The longitudinal terminal ends 117, 119 of the electrode assembly 106 can comprise the first and second longitudinal end surfaces 116, 118 that are contacted by the first and second primary growth constraints 154, 156 to constrain overall growth of the electrode assembly 106.

According to yet another embodiment, the electrode assembly 106 has first and second transverse ends 145, 147 (see, e.g., FIG. 2A) that may contact one or more electrode and/or counter electrode tabs 190, 192 (see, e.g., FIG. 20) that may be used to electrically connect the electrode and/or counter-electrode structures 110, 112 to a load and/or a voltage supply (not shown). For example, the electrode assembly 106 can comprise an electrode bus 194 (see, e.g., FIG. 2A), to which each electrode structure 110 can be connected, and that pools current from each member of the population of electrode structures 110. Similarly, the electrode assembly 106 can comprise a counter-electrode bus 196 to which each counter-electrode structure 112 may be connected, and that pools current from each member of the population of counter-electrode structures 112. The electrode and/or counter-electrode buses 194, 196 each have a length measured in direction D, and extending substantially the entire length of the interdigitated series of electrode structures 110, 112. In the embodiment illustrated in FIG. 20, the electrode tab 190 and/or counter electrode tab 192 includes electrode tab extensions 191, 193 which electrically connect with, and run substantially the entire length of electrode and/or counter-electrode bus 194, 196. Alternatively, the electrode and/or counter electrode tabs 190, 192 may directly connect to the electrode and/or counter-electrode bus 194, 196, for example, an end or position intermediate thereof along the length of the buses 194, 196, without requiring the tab extensions 191, 193. Accordingly, in one embodiment, the electrode and/or counter-electrode buses 194, 196 can form at least a portion of the terminal ends 145, 147 of the electrode assembly 106 in the transverse direction, and connect the electrode assembly to the tabs 190, 192 for electrical connection to a load and/or voltage supply (not shown). Furthermore, in yet another embodiment, the electrode assembly 106 comprises first and second terminal ends 149, 153 disposed along the vertical (Z) axis. For example, according to one embodiment, each electrode 110 and/or counter-electrode structure 112, is provided with a top and bottom coating of separator material, as shown in FIG. 2A, where the coatings form the terminal ends 149, 153 of the electrode assembly 106 in the vertical direction. The terminal ends 149, 153 that may be formed of the coating of separator material can comprise first and second surface regions 148, 150 of the lateral surface 142 along the vertical axis that can be placed in contact with the first and second secondary growth constraints 158, 160 to constrain growth in the vertical direction.

In general, the electrode assembly 106 can comprise longitudinal end surfaces 116, 118 that are planar, co-planar, or non-planar. For example, in one embodiment the opposing longitudinal end surfaces 116, 118 may be convex. By way of further example, in one embodiment the opposing longitudinal end surfaces 116, 118 may be concave. By way of further example, in one embodiment the opposing longitudinal end surfaces 116, 118 are substantially planar. In certain embodiments, electrode assembly 106 may include opposing longitudinal end surfaces 116, 118 having any range of two-dimensional shapes when projected onto a plane. For example, the longitudinal end surfaces 116, 118 may independently have a smooth curved shape (e.g., round, elliptical, hyperbolic, or parabolic), they may independently include a series of lines and vertices (e.g., polygonal), or they may independently include a smooth curved shape and include one or more lines and vertices. Similarly, the lateral surface 142 of the electrode assembly 106 may be a smooth curved shape (e.g., the electrode assembly 106 may have a round, elliptical, hyperbolic, or parabolic cross-sectional shape) or the lateral surface 142 may include two or more lines connected at vertices (e.g., the electrode assembly 106 may have a polygonal cross-section). For example, in one embodiment, the electrode assembly 106 has a cylindrical, elliptic cylindrical, parabolic cylindrical, or hyperbolic cylindrical shape. By way of further example, in one such embodiment, the electrode assembly 106 may have a prismatic shape, having opposing longitudinal end surfaces 116, 118 of the same size and shape and a lateral surface 142 (i.e., the faces extending between the opposing longitudinal end surfaces 116 and 118) being parallelogram-shaped. By way of further example, in one such embodiment, the electrode assembly 106 has a shape that corresponds to a triangular prism, the electrode assembly 106 having two opposing triangular longitudinal end surfaces 116 and 118 and a lateral surface 142 consisting of three parallelograms (e.g., rectangles) extending between the two longitudinal ends. By way of further example, in one such embodiment, the electrode assembly 106 has a shape that corresponds to a rectangular prism, the electrode assembly 106 having two opposing rectangular longitudinal end surfaces 116 and 118, and a lateral surface 142 comprising four parallelogram (e.g., rectangular) faces. By way of further example, in one such embodiment, the electrode assembly 106 has a shape that corresponds to a pentagonal prism, hexagonal prism, etc. wherein the electrode assembly 106 has two pentagonal, hexagonal, etc., respectively, opposing longitudinal end surfaces 116 and 118, and a lateral surface comprising five, six, etc., respectively, parallelograms (e.g., rectangular) faces.

Figure 3F:
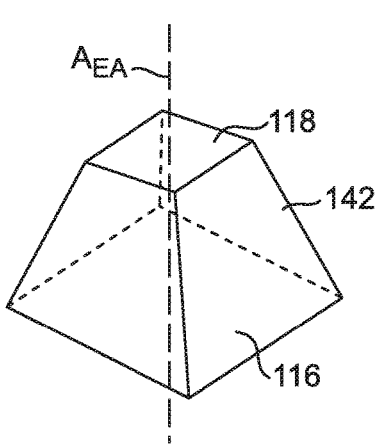
Figure 3G:
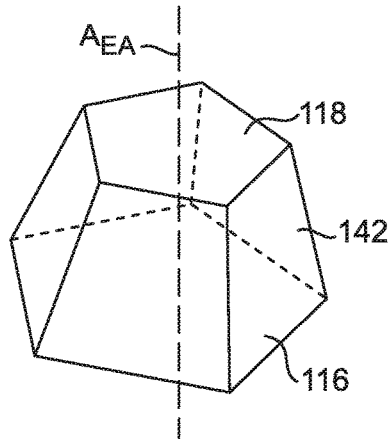
Figure 3H:
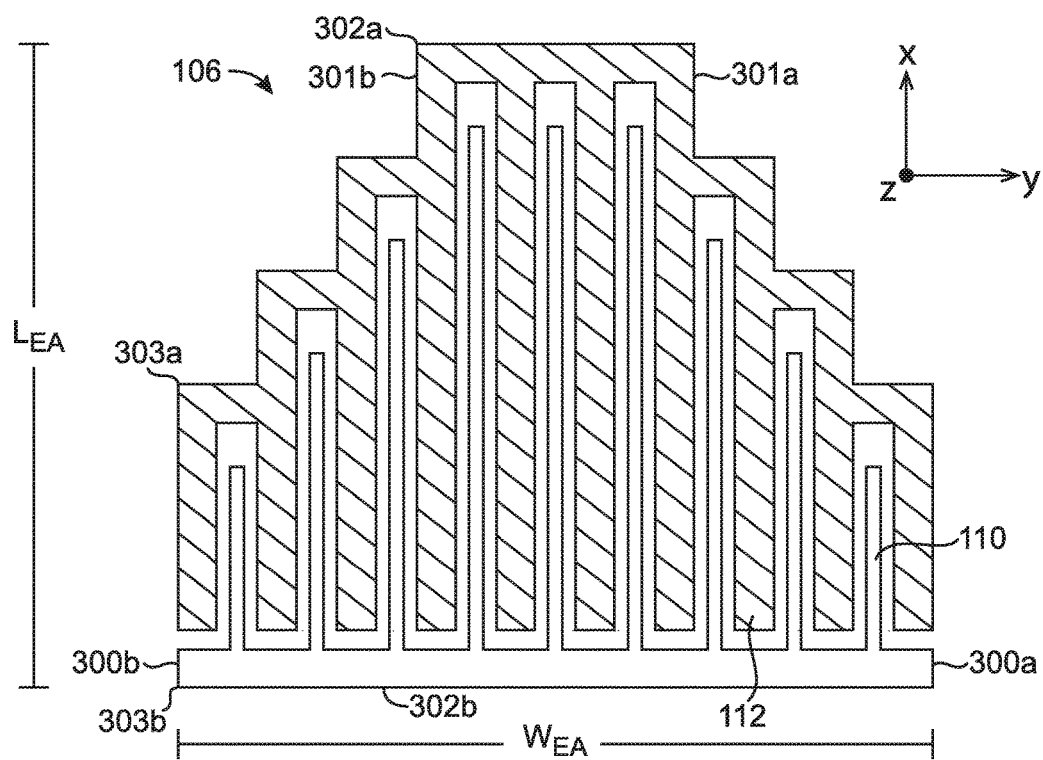

Referring now to FIGS. 3A-3H, several exemplary geometric shapes are schematically illustrated for electrode assembly 106. More specifically, in FIG. 3A, electrode assembly 106 has a triangular prismatic shape with opposing first and second longitudinal end surfaces 116, 118 separated along longitudinal axis $A_{EA}$, and a lateral surface 142 including the three rectangular faces connecting the longitudinal end surfaces 116, 118, that are about the longitudinal axis $A_{EA}$. In FIG. 3B, electrode assembly 106 has a parallelopiped shape with opposing first and second parallelogram longitudinal end surfaces 116, 118 separated along longitudinal axis $A_{EA}$, and a lateral surface 142 including the four parallelogram-shaped faces connecting the two longitudinal end surfaces 116, 118, and surrounding longitudinal axis $A_{EA}$. In FIG. 3C, electrode assembly 106 has a rectangular prism shape with opposing first and second rectangular longitudinal end surfaces 116, 118 separated along longitudinal axis $A_{EA}$, and a lateral surface 142 including the four rectangular faces connecting the two longitudinal end surfaces 116, 118 and surrounding longitudinal axis $A_{EA}$. In FIG. 3D, electrode assembly 106 has a pentagonal prismatic shape with opposing first and second pentagonal longitudinal end surfaces 116, 118 separated along longitudinal axis $A_{EA}$, and a lateral surface 142 including the five rectangular faces connecting the two longitudinal end surfaces 116, 118 and surrounding longitudinal axis $A_{EA}$. In FIG. 3E, electrode assembly 106 has a hexagonal prismatic shape with opposing first and second hexagonal longitudinal end surfaces 116, 118 separated along longitudinal axis $A_{EA}$, and a lateral surface 142 including the six rectangular faces connecting the two longitudinal end surfaces 116, 118 and surrounding longitudinal axis $A_{EA}$. In FIG. 3E, the electrode assembly has a square pyramidal frustum shape with opposing first and second square end surfaces 116, 118 separated along longitudinal axis $A_{EA}$, and a lateral surface 142 including four trapezoidal faces connecting the two longitudinal end surfaces 116, 118 and surrounding longitudinal axis $A_{EA}$, with the trapezoidal faces tapering in dimension along the longitudinal axis from a greater dimension at the first surface 116 to a smaller dimension at the second surface 118, and the size of the second surface being smaller than that of the first surface. In FIG. 3F, the electrode assembly has a pentagonal pyramidal frustum shape with opposing first and second square end surfaces 116, 118 separated along longitudinal axis $A_{EA}$, and a lateral surface 142 including five trapezoidal faces connecting the two longitudinal end surfaces 116, 118 and surrounding longitudinal axis $A_{EA}$, with the trapezoidal faces tapering in dimension along the longitudinal axis from a greater dimension at the first surface 116 to a smaller dimension at the second surface 118, and the size of the second surface being smaller than that of the first surface. In FIG. 3H, the electrode assembly 106 has a pyramidal shape in the longitudinal direction, by virtue of electrode and counter-electrode structures 110, 112 having lengths that decrease from a first length towards the middle of the electrode assembly 106 on the longitudinal axis, to second lengths at the longitudinal ends 117, 119 of the electrode assembly 106.

Electrode Constraints

In one embodiment, a set of electrode constraints 108 is provided that that restrains overall macroscopic growth of the electrode assembly 106, as illustrated for example in FIG. 1. The set of electrode constraints 108 may be capable of restraining growth of the electrode assembly 106 along one or more dimensions, such as to reduce swelling and deformation of the electrode assembly 106, and thereby improve the reliability and cycling lifetime of an energy storage device 100 having the set of electrode constraints 108. As discussed above, without being limited to any one particular theory, it is believed that carrier ions traveling between the electrode structures 110 and counter electrode structures 112 during charging and/or discharging of a secondary battery 102 can become inserted into electrode active material, causing the electrode active material and/or the electrode structure 110 to expand. This expansion of the electrode structure 110 can cause the electrodes and/or electrode assembly 106 to deform and swell, thereby compromising the structural integrity of the electrode assembly 106, and/or increasing the likelihood of electrical shorting or other failures. In one example, excessive swelling and/or expansion and contraction of the electrode active material layer 132 during cycling of an energy storage device 100 can cause fragments of electrode active material to break away and/or delaminate from the electrode active material layer 132, thereby compromising the efficiency and cycling lifetime of the energy storage device 100. In yet another example, excessive swelling and/or expansion and contraction of the electrode active material layer 132 can cause electrode active material to breach the electrically insulating microporous separator 130, thereby causing electrical shorting and other failures of the electrode assembly 106. Accordingly, the set of electrode constraints 108 inhibit this swelling or growth that can otherwise occur with cycling between charged and discharged states to improve the reliability, efficiency, and/or cycling lifetime of the energy storage device 100.

According to one embodiment, the set of electrode constraints 108 comprises a primary growth constraint system 151 to restrain growth and/or swelling along the longitudinal axis (e.g., Y-axis in FIG. 1) of the electrode assembly 106. In another embodiment, the set of electrode constraints 108 may include a secondary growth constraint system 152 that restrains growth along the vertical axis (e.g., Z-axis in FIG. 1). In yet another embodiment, the set of electrode constraints 108 may include a tertiary growth constraint system 155 that restrains growth along the transverse axis (e.g., X-axis in FIG. 4C). In one embodiment, the set of electrode constraints 108 comprises primary growth and secondary growth constraint systems 151, 152, respectively, and even tertiary growth constraint systems 155 that operate cooperatively to simultaneously restrain growth in one or more directions, such as along the longitudinal and vertical axis (e.g., Y axis and Z axis), and even simultaneously along all of the longitudinal, vertical, and transverse axes (e.g., Y, Z, and X axes). For example, the primary growth constraint system 151 may restrain growth that can otherwise occur along the stacking direction D of the electrode assembly 106 during cycling between charged and discharged states, while the secondary growth constraint system 152 may restrain swelling and growth that can occur along the vertical axis, to prevent buckling or other deformation of the electrode assembly 106 in the vertical direction. By way of further example, in one embodiment, the secondary growth constraint system 152 can reduce swelling and/or expansion along the vertical axis that would otherwise be exacerbated by the restraint on growth imposed by the primary growth constraint system 151. The tertiary growth constraint system 155 can also optionally reduce swelling and/or expansion along the transverse axis that could occur during cycling processes. That is, according to one embodiment, the primary growth and secondary growth constraint systems 151, 152, respectively, and optionally the tertiary growth constraint system 155, may operate together to cooperatively restrain multi-dimensional growth of the electrode assembly 106.

Figure 4A:
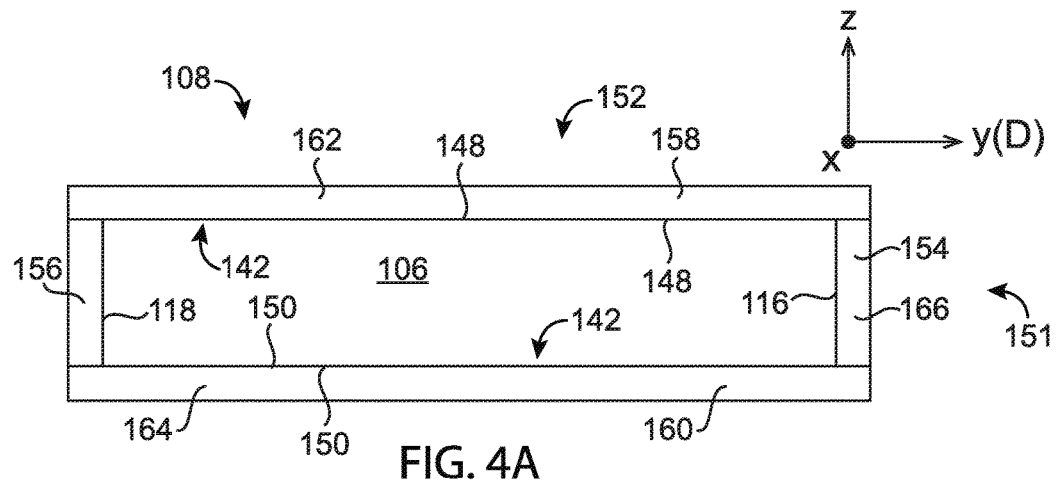
FIG. 4A illustrates a cross-section of an embodiment of the electrode assembly taken along the line A-A' as shown in FIG. 1, and further illustrates elements of the primary and secondary growth constraint systems.
Figure 4B:
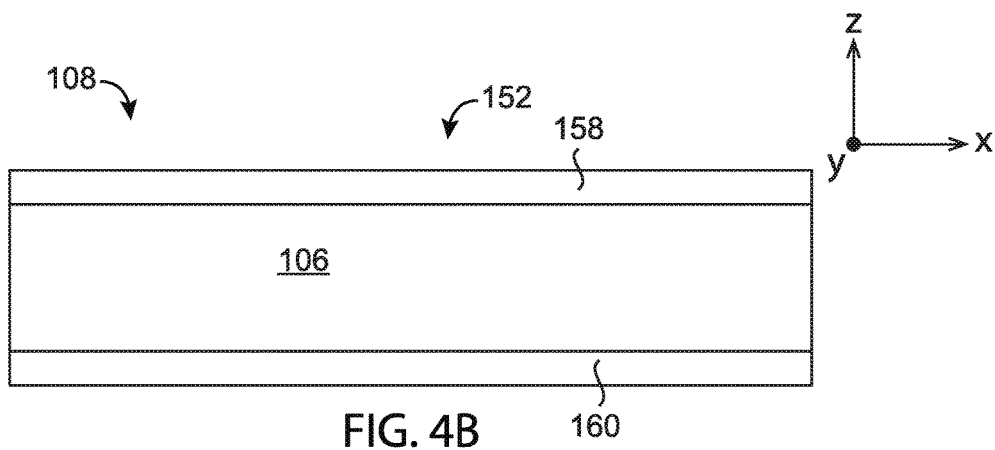
FIG. 4B illustrates a cross-section of an embodiment of the electrode assembly taken along the line B-B' as shown in FIG. 1, and further illustrates elements of the primary and secondary growth constraint systems.

Referring to FIGS. 4A-4B, an embodiment of a set of electrode constraints 108 is shown having a primary growth constraint system 151 and a secondary growth constraint system 152 for an electrode assembly 106. FIG. 4A shows a cross-section of the electrode assembly 106 in FIG. 1 taken along the longitudinal axis (Y axis), such that the resulting 2-D cross-section is illustrated with the vertical axis (Z axis) and longitudinal axis (Y axis). FIG. 4B shows a cross-section of the electrode assembly 106 in FIG. 1 taken along the transverse axis (X axis), such that the resulting 2-D cross-section is illustrated with the vertical axis (Z axis) and transverse axis (X axis). As shown in FIG. 4A, the primary growth constraint system 151 can generally comprise first and second primary growth constraints 154, 156, respectively, that are separated from one another along the longitudinal direction (Y axis). For example, in one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In yet another version, one or more of the first and second primary growth constraints 154, 156 may be interior to a longitudinal end 117, 119 of the electrode assembly 106, such as when one or more of the primary growth constraints comprise an internal structure of the electrode assembly 106. The primary growth constraint system 151 can further comprise at least one primary connecting member 162 that connects the first and second primary growth constraints 154, 156, and that may have a principal axis that is parallel to the longitudinal direction. For example, the primary growth constraint system 151 can comprise first and second primary connecting members 162, 164, respectively, that are separated from each other along an axis that is orthogonal to the longitudinal axis, such as along the vertical axis (Z axis) as depicted in the embodiment. The first and second primary connecting members 162, 164, respectively, can serve to connect the first and second primary growth constraints 154, 156, respectively, to one another, and to maintain the first and second primary growth constraints 154, 156, respectively, in tension with one another, so as to restrain growth along the longitudinal axis of the electrode assembly 106.

According to one embodiment, the set of electrode constraints 108 including the primary growth constraint system 151 may be capable of restraining growth of the electrode assembly 106 in the longitudinal direction (i.e., electrode stacking direction, D) such that any increase in the Feret diameter of the electrode assembly in the longitudinal direction over 20 consecutive cycles of the secondary battery is less than 20% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction such that any increase in the Feret diameter of the electrode assembly in the longitudinal direction over 500 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery to less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 20%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 20%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction such that any increase in the Feret diameter of the electrode assembly in the longitudinal direction over 800 consecutive cycles of the secondary battery is less than 10% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 10%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 10%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction over 5 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery, is less than 5. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 5% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 5% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery is less than 5%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery is less than 5%.

In yet another embodiment, the set of electrode constraints 108 including the primary growth constraint system 151 may be capable of restraining growth of the electrode assembly 106 in the longitudinal direction such that any increase in the Feret diameter of the electrode assembly in the longitudinal direction per cycle of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 5 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 10 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 20 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 30 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 50 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 80 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 100 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 200 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 300 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 500 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 800 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 1000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 2000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 3000 consecutive cycles of the secondary battery is less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 5000 consecutive cycles of the secondary battery is less than 1% between charged and discharged states. By way of further example, in one embodiment the primary growth constraint system 151 may be capable of restraining growth of the electrode assembly 106 in the longitudinal direction such that any increase in the Feret diameter of the electrode assembly in the longitudinal direction over 8000 consecutive cycles of the secondary battery to less than 1%. By way of further example, in one embodiment the primary growth constraint system 151 may be capable of restraining growth of the electrode assembly 106 in the longitudinal direction such that any increase in the Feret diameter of the electrode assembly in the longitudinal direction over 10,000 consecutive cycles of the secondary battery to less than 1%.

By charged state it is meant that the secondary battery 102 is charged to at least 75% of its rated capacity, such as at least 80% of its rated capacity, and even at least 90% of its rated capacity, such as at least 95% of its rated capacity, and even 100% of its rated capacity. By discharged state it is meant that the secondary battery is discharged to less than 25% of its rated capacity, such as less than 20% of its rated capacity, and even less than 10%, such as less than 5%, and even 0% of its rated capacity. Furthermore, it is noted that the actual capacity of the secondary battery 102 may vary over time and with the number of cycles the battery has gone through. That is, while the secondary battery 102 may initially exhibit an actual measured capacity that is close to its rated capacity, the actual capacity of the battery will decrease over time, with the secondary battery 102 being considered to be at the end of its life when the actual capacity drops below 80% of the rated capacity as measured in going from a charged to a discharged state.

Further shown in FIGS. 4A and 4B, the set of electrode constraints 108 can further comprise the secondary growth constraint system 152, that can generally comprise first and second secondary growth constraints 158, 160, respectively, that are separated from one another along a second direction orthogonal to the longitudinal direction, such as along the vertical axis (Z axis) in the embodiment as shown. For example, in one embodiment, the first secondary growth constraint 158 at least partially extends across a first region 148 of the lateral surface 142 of the electrode assembly 106, and the second secondary growth constraint 160 at least partially extends across a second region 150 of the lateral surface 142 of the electrode assembly 106 that opposes the first region 148. In yet another version, one or more of the first and second secondary growth constraints 154, 156 may be interior to the lateral surface 142 of the electrode assembly 106, such as when one or more of the secondary growth constraints comprise an internal structure of the electrode assembly 106. In one embodiment, the first and second secondary growth constraints 158, 160, respectively, are connected by at least one secondary connecting member 166, which may have a principal axis that is parallel to the second direction, such as the vertical axis. The secondary connecting member 166 may serve to connect and hold the first and second secondary growth constraints 158, 160, respectively, in tension with one another, so as to restrain growth of the electrode assembly 106 along a direction orthogonal to the longitudinal direction, such as for example to restrain growth in the vertical direction (e.g., along the Z axis). In the embodiment depicted in FIG. 4A, the at least one secondary connecting member 166 can correspond to at least one of the first and second primary growth constraints 154, 156. However, the secondary connecting member 166 is not limited thereto, and can alternatively and/or in addition comprise other structures and/or configurations.

According to one embodiment, the set of constraints including the secondary growth constraint system 152 may be capable of restraining growth of the electrode assembly 106 in a second direction orthogonal to the longitudinal direction, such as the vertical direction (Z axis), such that any increase in the Feret diameter of the electrode assembly in the second direction over 20 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 20%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 20%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 20%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 20% between charged and discharged states.

In embodiment, the set of constraints including the secondary growth constraint system 152 may be capable of restraining growth of the electrode assembly 106 in the second direction such that any increase in the Feret diameter of the electrode assembly in the second direction over 10 consecutive cycles of the secondary battery is less than 10% between charged and discharged states. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 10%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 10%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 10%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 10%.

In embodiment, the set of constraints including the secondary growth constraint system 152 may be capable of restraining growth of the electrode assembly 106 in the second direction such that any increase in the Feret diameter of the electrode assembly in the second direction over 5 consecutive cycles of the secondary battery is less than 5% between charged and discharged states. By way of further example, in one embodiment the secondary growth constraint system 152 may be capable of restraining growth of the electrode assembly 106 in the second direction such that any increase in the Feret diameter of the electrode assembly in the second direction over 10 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 5%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 5%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 5%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 5%.

In embodiment, the set of constraints including the secondary growth constraint system 152 may be capable of restraining growth of the electrode assembly 106 in the second direction such that any increase in the Feret diameter of the electrode assembly in the second direction per cycle of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 5 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 10 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 20 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 30 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 50 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 80 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 100 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 200 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 300 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 500 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 800 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 1000 consecutive cycles of the secondary battery is less than 1%. By way of further example, in one embodiment the secondary growth constraint system 151 may be capable of restraining growth of the electrode assembly 106 in the second direction such that any increase in the Feret diameter of the electrode assembly in the second direction over 2000 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 3000 consecutive cycles of the secondary battery is less than 1 between charged and discharged states. By way of further example, in one embodiment the secondary growth constraint system 152 may be capable of restraining growth of the electrode assembly 106 in the second direction such that any increase in the Feret diameter of the electrode assembly in the second direction over 5000 consecutive cycles of the secondary battery is less than 1%. By way of further example, in one embodiment the secondary growth constraint system 152 may be capable of restraining growth of the electrode assembly 106 in the second direction such that any increase in the Feret diameter of the electrode assembly in the second direction over 8000 consecutive cycles of the secondary battery is less than 1%. By way of further example, in one embodiment the secondary growth constraint system 151 may be capable of restraining growth of the electrode assembly 106 in the second direction such that any increase in the Feret diameter of the electrode assembly in the second direction over 10,000 consecutive cycles of the secondary battery is less than 1%.

Figure 4C:
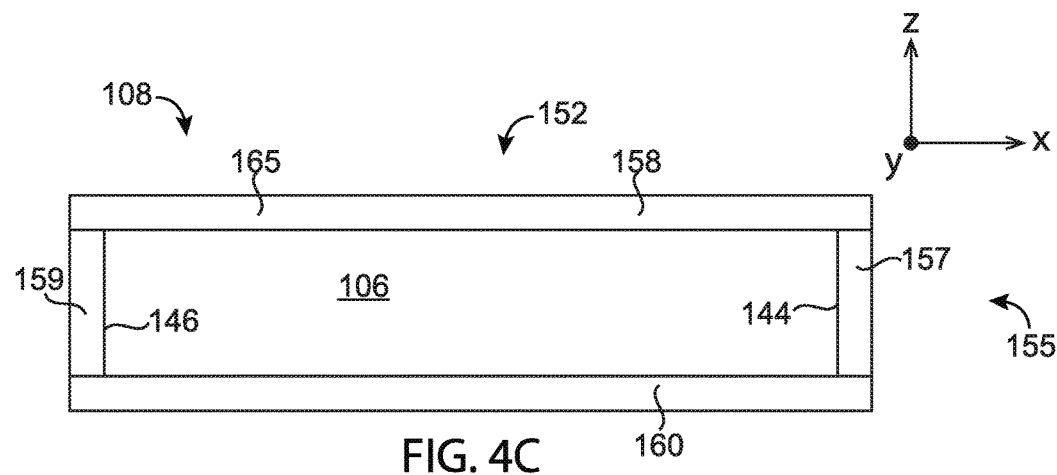
FIG. 4C illustrates a cross-section of an embodiment of the electrode assembly taken along the line B-B' as shown in FIG. 1, and further illustrates elements of the primary and secondary growth constraint systems.

FIG. 4C shows an embodiment of a set of electrode constraints 108 that further includes a tertiary growth constraint system 155 to constrain growth of the electrode assembly in a third direction that is orthogonal to the longitudinal and second directions, such as the transverse direction (X) direction. The tertiary growth constraint system 155 can be provided in addition to the primary and secondary growth constraint systems 151, 152, respectively, to constrain overall growth of the electrode assembly 106 in three dimensions, and/or may be provided in combination with one of the primary or secondary growth constraint systems 151, 152, respectively, to constrain overall growth of the electrode assembly 106 in two dimensions. FIG. 4C shows a cross-section of the electrode assembly 106 in FIG. 1 taken along the transverse axis (X axis), such that the resulting 2-D cross-section is illustrated with the vertical axis (Z axis) and transverse axis (X axis). As shown in FIG. 4C, the tertiary growth constraint system 155 can generally comprise first and second tertiary growth constraints 157, 159, respectively, that are separated from one another along the third direction such as the transverse direction (X axis). For example, in one embodiment, the first tertiary growth constraint 157 at least partially extends across a first region 144 of the lateral surface 142 of the electrode assembly 106, and the second tertiary growth constraint 159 at least partially extends across a second region 146 of the lateral surface 142 of the electrode assembly 106 that opposes the first region 144 in the transverse direction. In yet another version, one or more of the first and second tertiary growth constraints 157, 159 may be interior to the lateral surface 142 of the electrode assembly 106, such as when one or more of the tertiary growth constraints comprise an internal structure of the electrode assembly 106. In one embodiment, the first and second tertiary growth constraints 157, 159, respectively, are connected by at least one tertiary connecting member 165, which may have a principal axis that is parallel to the third direction. The tertiary connecting member 165 may serve to connect and hold the first and second tertiary growth constraints 157, 159, respectively, in tension with one another, so as to restrain growth of the electrode assembly 106 along a direction orthogonal to the longitudinal direction, for example, to restrain growth in the transverse direction (e.g., along the X axis). In the embodiment depicted in FIG. 4C, the at least one tertiary connecting member 165 can correspond to at least one of the first and second secondary growth constraints 158, 160. However, the tertiary connecting member 165 is not limited thereto, and can alternatively and/or in addition comprise other structures and/or configurations. For example, the at least one tertiary connecting member 165 can, in one embodiment, correspond to at least one of the first and second primary growth constraints 154, 156 (not shown).

According to one embodiment, the set of constraints having the tertiary growth constraint system 155 may be capable of restraining growth of the electrode assembly 106 in a third direction orthogonal to the longitudinal direction, such as the transverse direction (X axis), such that any increase in the Feret diameter of the electrode assembly in the third direction over 20 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 20%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 20%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 20%.

In one embodiment, the set of constraints having the tertiary growth constraint system 155 may be capable of restraining growth of the electrode assembly 106 in the third direction such that any increase in the Feret diameter of the electrode assembly in the third direction over 10 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 10%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 10% between charged and discharged states. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 10%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 10%.

In one embodiment, the set of constraints having the tertiary growth constraint system 155 may be capable of restraining growth of the electrode assembly 106 in the third direction such that any increase in the Feret diameter of the electrode assembly in the third direction over 5 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 10 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 5%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 5%.

In one embodiment, the set of constraints having the tertiary growth constraint system 155 may be capable of restraining growth of the electrode assembly 106 in the third direction such that any increase in the Feret diameter of the electrode assembly in the third direction per cycle of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 5 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 10 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 20 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 30 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 50 consecutive cycles of the secondary battery is less than 5%. By way of further example, in one embodiment the tertiary growth constraint system 155 may be capable of restraining growth of the electrode assembly 106 in the third direction such that any increase in the Feret diameter of the electrode assembly in the third direction over 80 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 100 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 200 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 300 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 500 consecutive cycles of the secondary battery is less than 1%. By way of further example, in one embodiment the tertiary growth constraint system 152 may be capable of restraining growth of the electrode assembly 106 in the third direction such that any increase in the Feret diameter of the electrode assembly in the third direction over 800 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 1000 consecutive cycles of the secondary battery is less than 1% between charged and discharged states. By way of further example, in one embodiment the tertiary growth constraint system 155 may be capable of restraining growth of the electrode assembly 106 in the third direction such that any increase in the Feret diameter of the electrode assembly in the third direction over 2000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 3000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 5000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 8000 consecutive cycles of the secondary battery is less than 1%. By way of further example, in one embodiment the tertiary growth constraint system 155 may be capable of restraining growth of the electrode assembly 106 in the third direction such that any increase in the Feret diameter of the electrode assembly in the third direction over 10,000 consecutive cycles of the secondary battery is less than 1%.

According to one embodiment, the primary and secondary growth constraint systems 151, 152, respectively, and optionally the tertiary growth constraint system 155, are configured to cooperatively operate such that portions of the primary growth constraint system 151 cooperatively act as a part of the secondary growth constraint system 152, and/or portions of the secondary growth constraint system 152 cooperatively act as a part of the primary growth constraint system 151, and the portions of any of the primary and/or secondary constraint systems 151, 152, respectively, may also cooperatively act as a part of the tertiary growth constraint system, and vice versa. For example, in the embodiment shown in in FIGS. 4A and 4B, the first and second primary connecting members 162, 164, respectively, of the primary growth constraint system 151 can serve as at least a portion of, or even the entire structure of, the first and second secondary growth constraints 158, 160 that constrain growth in the second direction orthogonal to the longitudinal direction. In yet another embodiment, as mentioned above, one or more of the first and second primary growth constraints 154, 156, respectively, can serve as one or more secondary connecting members 166 to connect the first and second secondary growth constrains 158, 160, respectively. Conversely, at least a portion of the first and second secondary growth constraints 158, 160, respectively, can act as first and second primary connecting members 162, 164, respectively, of the primary growth constraint system 151, and the at least one secondary connecting member 166 of the secondary growth constraint system 152 can, in one embodiment, act as one or more of the first and second primary growth constraints 154, 156, respectively. In yet another embodiment, at least a portion of the first and second primary connecting members 162, 164, respectively, of the primary growth constraint system 151, and/or the at least one secondary connecting member 166 of the secondary growth constraint system 152 can serve as at least a portion of, or even the entire structure of, the first and second tertiary growth constraints 157, 159, respectively, that constrain growth in the transverse direction orthogonal to the longitudinal direction. In yet another embodiment, one or more of the first and second primary growth constraints 154, 156, respectively, and/or the first and second secondary growth constraints 158, 160, respectively, can serve as one or more tertiary connecting members 166 to connect the first and second tertiary growth constraints 157, 159, respectively. Conversely, at least a portion of the first and second tertiary growth constraints 157, 159, respectively, can act as first and second primary connecting members 162, 164, respectively, of the primary growth constraint system 151, and/or the at least one secondary connecting member 166 of the secondary growth constraint system 152, and the at least one tertiary connecting member 165 of the tertiary growth constraint system 155 can in one embodiment act as one or more of the first and second primary growth constraints 154, 156, respectively, and/or one or more of the first and second secondary growth constraints 158, 160, respectively. Alternatively and/or additionally, the primary and/or secondary and/or tertiary growth constraints can comprise other structures that cooperate to restrain growth of the electrode assembly 106. Accordingly, the primary and secondary growth constraint systems 151, 152, respectively, and optionally the tertiary growth constraint system 155, can share components and/or structures to exert restraint on the growth of the electrode assembly 106.

In one embodiment, the set of electrode constraints 108 can comprise structures such as the primary and secondary growth constraints, and primary and secondary connecting members, that are structures that are external to and/or internal to the battery enclosure 104, or may be a part of the battery enclosure 104 itself. For example, the set of electrode constraints 108 can comprise a combination of structures that includes the battery enclosure 104 as well as other structural components. In one such embodiment, the battery enclosure 104 may be a component of the primary growth constraint system 151 and/or the secondary growth constraint system 152; stated differently, in one embodiment, the battery enclosure 104, alone or in combination with one or more other structures (within and/or outside the battery enclosure 104, for example, the primary growth constraint system 151 and/or a secondary growth constraint system 152) restrains growth of the electrode assembly 106 in the electrode stacking direction D and/or in the second direction orthogonal to the stacking direction, D. For example, one or more of the primary growth constraints 154, 156 and secondary growth constraints 158, 160 can comprise a structure that is internal to the electrode assembly. In another embodiment, the primary growth constraint system 151 and/or secondary growth constraint system 152 does not include the battery enclosure 104, and instead one or more discrete structures (within and/or outside the battery enclosure 104) other than the battery enclosure 104 restrains growth of the electrode assembly 106 in the electrode stacking direction, D, and/or in the second direction orthogonal to the stacking direction, D. The electrode assembly 106 may be restrained by the set of electrode constraints 108 at a pressure that is greater than the pressure exerted by growth and/or swelling of the electrode assembly 106 during repeated cycling of an energy storage device 100 or a secondary battery having the electrode assembly 106.

In one exemplary embodiment, the primary growth constraint system 151 includes one or more discrete structure(s) within the battery enclosure 104 that restrains growth of the electrode structure 110 in the stacking direction D by exerting a pressure that exceeds the pressure generated by the electrode structure 110 in the stacking direction D upon repeated cycling of a secondary battery 102 having the electrode structure 110 as a part of the electrode assembly 106. In another exemplary embodiment, the primary growth constraint system 151 includes one or more discrete structures within the battery enclosure 104 that restrains growth of the counter-electrode structure 112 in the stacking direction D by exerting a pressure in the stacking direction D that exceeds the pressure generated by the counter-electrode structure 112 in the stacking direction D upon repeated cycling of a secondary battery 102 having the counter-electrode structure 112 as a part of the electrode assembly 106. The secondary growth constraint system 152 can similarly include one or more discrete structures within the battery enclosure 104 that restrain growth of at least one of the electrode structures 110 and counter-electrode structures 112 in the second direction orthogonal to the stacking direction D, such as along the vertical axis (Z axis), by exerting a pressure in the second direction that exceeds the pressure generated by the electrode or counter-electrode structure 110, 112, respectively, in the second direction upon repeated cycling of a secondary battery 102 having the electrode or counter electrode structures 110, 112, respectively.

In yet another embodiment, the first and second primary growth constraints 154, 156, respectively, of the primary growth constraint system 151 restrain growth of the electrode assembly 106 by exerting a pressure on the first and second longitudinal end surfaces 116, 118 of the electrode assembly 106, meaning, in a longitudinal direction, that exceeds a pressure exerted by the first and second primary growth constraints 154, 156 on other surfaces of the electrode assembly 106 that would be in a direction orthogonal to the longitudinal direction, such as opposing first and second regions of the lateral surface 142 of the electrode assembly 106 along the transverse axis and/or vertical axis. That is, the first and second primary growth constraints 154, 156 may exert a pressure in a longitudinal direction (Y axis) that exceeds a pressure generated thereby in directions orthogonal thereto, such as the transverse (X axis) and vertical (Z axis) directions. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 3. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D by a factor of at least 4. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

Similarly, in one embodiment, the first and second secondary growth constraints 158, 160, respectively, of the primary growth constraint system 151 restrain growth of the electrode assembly 106 by exerting a pressure on first and second opposing regions of the lateral surface 142 of the electrode assembly 106 in a second direction orthogonal to the longitudinal direction, such as first and second opposing surface regions along the vertical axis 148, 150, respectively (i.e., in a vertical direction), that exceeds a pressure exerted by the first and second secondary growth constraints 158, 160, respectively, on other surfaces of the electrode assembly 106 that would be in a direction orthogonal to the second direction. That is, the first and second secondary growth constraints 158, 160, respectively, may exert a pressure in a vertical direction (Z axis) that exceeds a pressure generated thereby in directions orthogonal thereto, such as the transverse (X axis) and longitudinal (Y axis) directions. For example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 by the secondary growth constraint system 152 in at least one, or even both, of the two directions that are perpendicular thereto, by a factor of at least 3. By way of further example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 by the secondary growth constraint system 152 in at least one, or even both, of the two directions that are perpendicular thereto, by a factor of at least 4. By way of further example, in one such embodiment, the secondary growth constraint system 152 restrains growth of the electrode assembly 106 with a pressure on first and second opposing surface regions 148, 150, respectively (i.e., in the vertical direction), that exceeds the pressure maintained on the electrode assembly 106 in at least one, or even both, of the two directions that are perpendicular thereto, by a factor of at least 5.

In yet another embodiment, the first and second tertiary growth constraints 157, 159, respectively, of the tertiary growth constraint system 155 restrain growth of the electrode assembly 106 by exerting a pressure on first and second opposing regions of the lateral surface 142 of the electrode assembly 106 in a direction orthogonal to the longitudinal direction and the second direction, such as first and second opposing surface regions along the transverse axis 161, 163, respectively (i.e., in a transverse direction), that exceeds a pressure exerted by the tertiary growth constraint system 155 on other surfaces of the electrode assembly 106 that would be in a direction orthogonal to the transverse direction. That is, the first and second tertiary growth constraints 157, 159, respectively, may exert a pressure in a transverse direction (X axis) that exceeds a pressure generated thereby in directions orthogonal thereto, such as the vertical (Z axis) and longitudinal (Y axis) directions. For example, in one such embodiment, the tertiary growth constraint system 155 restrains growth of the electrode assembly 106 with a pressure on first and second opposing surface regions 144, 146 (i.e., in the transverse direction) that exceeds the pressure maintained on the electrode assembly 106 by the tertiary growth constraint system 155 in at least one, or even both, of the two directions that are perpendicular thereto, by a factor of at least 3. By way of further example, in one such embodiment, the tertiary growth constraint system 155 restrains growth of the electrode assembly 106 with a pressure on first and second opposing surface regions 144, 146, respectively (i.e., in the transverse direction), that exceeds the pressure maintained on the electrode assembly 106 by the tertiary growth constraint system 155 in at least one, or even both, of the two directions that are perpendicular thereto, by a factor of at least 4. By way of further example, in one such embodiment, the tertiary growth constraint system 155 restrains growth of the electrode assembly 106 with a pressure on first and second opposing surface regions 144, 146, respectively (i.e., in the transverse direction), that exceeds the pressure maintained on the electrode assembly 106 in at least one, or even both, of the two directions that are perpendicular thereto, by a factor of at least 5.

In one embodiment, the set of electrode constraints 108, which may include the primary growth constraint system 151, the secondary growth constraint system 152, and optionally the tertiary growth constraint system 155, is configured to exert pressure on the electrode assembly 106 along two or more dimensions thereof (e.g., along the longitudinal and vertical directions, and optionally along the transverse direction), with a pressure being exerted along the longitudinal direction by the set of electrode constraints 108 being greater than any pressure(s) exerted by the set of electrode constraints 108 in any of the directions orthogonal to the longitudinal direction (e.g., the Z and X directions). That is, when the pressure(s) exerted by the primary, secondary, and optionally tertiary growth constraint systems 151, 152, 155, respectively, making up the set of electrode constraints 108 are summed together, the pressure exerted on the electrode assembly 106 along the longitudinal axis exceeds the pressure(s) exerted on the electrode assembly 106 in the directions orthogonal thereto. For example, in one such embodiment, the set of electrode constraints 108 exerts a pressure on the first and second longitudinal end surfaces 116, 118 (i.e., in the stacking direction D) that exceeds the pressure maintained on the electrode assembly 106 by the set of electrode constraints 108 in at least one or even both of the two directions that are perpendicular to the stacking direction D, by a factor of at least 3. By way of further example, in one such embodiment, the set of electrode constraints 108 exerts a pressure on first and second longitudinal end surfaces 116, 118 (i.e., in the stacking direction D) that exceeds the pressure maintained on the electrode assembly 106 by the set of electrode constraints 108 in at least one, or even both, of the two directions that are perpendicular to the stacking direction D by a factor of at least 4. By way of further example, in one such embodiment, the set of electrode constraints 108 exerts a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

According to one embodiment, the first and second longitudinal end surfaces 116, 118, respectively, have a combined surface area that is less than a predetermined amount of the overall surface area of the entire electrode assembly 106. For example, in one embodiment, the electrode assembly 106 may have a geometric shape corresponding to that of a rectangular prism with first and second longitudinal end surfaces 116, 118, respectively, and a lateral surface 142 extending between the end surfaces 116, 118, respectively, that makes up the remaining surface of the electrode assembly 106, and that has opposing surface regions 144, 146 in the X direction (i.e., the side surfaces of the rectangular prism) and opposing surface regions 148, 150 in the Z direction (i.e., the top and bottom surfaces of the rectangular prism, wherein X, Y and Z are dimensions measured in directions corresponding to the X, Y, and Z axes, respectively). The overall surface area is thus the sum of the surface area covered by the lateral surface 142 (i.e., the surface area of the opposing surfaces 144, 146, 148, and 150 in X and Z), added to the surface area of the first and second longitudinal end surfaces 116, 118, respectively. In accordance with one aspect of the present disclosure, the sum of the surface areas of the first and second longitudinal end surfaces 116, 118, respectively, is less than 33% of the surface area of the total surface of the electrode assembly 106. For example, in one such embodiment, the sum of the surface areas of the first and second longitudinal end surfaces 116, 118, respectively, is less than 25% of the surface area of the total surface of the electrode assembly 106. By way of further example, in one embodiment, the sum of the surface areas of the first and second longitudinal end surfaces 116, 118, respectively, is less than 20% of the surface area of the total surface of the electrode assembly. By way of further example, in one embodiment, the sum of the surface areas of the first and second longitudinal end surfaces 116, 118, respectively, is less than 15% of the surface area of the total surface of the electrode assembly. By way of further example, in one embodiment, the sum of the surface areas of the first and second longitudinal end surfaces 116, 118, respectively, is less than 10% of the surface area of the total surface of the electrode assembly.

In yet another embodiment, the electrode assembly 106 is configured such that a surface area of a projection of the electrode assembly 106 in a plane orthogonal to the stacking direction (i.e., the longitudinal direction), is smaller than the surface areas of projections of the electrode assembly 106 onto other orthogonal planes. For example, referring to the electrode assembly 106 embodiment shown in FIG. 2A (e.g., a rectangular prism), it can be seen that surface area of a projection of the electrode assembly 106 into a plane orthogonal to the stacking direction (i.e., the X-Z plane) corresponds to $L_{EA} \times H_{EA}$. Similarly, a projection of the electrode assembly 106 into the Z-Y plane corresponds to $W_{EA} \times H_{EA}$, and a projection of the electrode assembly 106 into the X-Y plane corresponds to $L_{EA} \times W_{EA}$. Accordingly, the electrode assembly 106 is configured such that the stacking direction intersects the plane in which the projection having the smallest surface area lies. Accordingly, in the embodiment in FIG. 2A, the electrode assembly 106 is positioned such that the stacking direction intersects the X-Z plane in which the smallest surface area projection corresponding to $H_{EA} \times L_{EA}$ lies. That is, the electrode assembly is positioned such that the projection having the smallest surface area (e.g., $H_{EA} \times L_{EA}$) is orthogonal to the stacking direction.

In yet another embodiment, the secondary battery 102 can comprise a plurality of electrode assemblies 106 that are stacked together to form an electrode stack, and can be constrained by one or more shared electrode constraints. For example, in one embodiment, at least a portion of one or more of the primary growth constraint system 151 and the secondary growth constraint system 152 can be shared by a plurality of electrode assemblies 106 forming the electrode assembly stack. By way of further example, in one embodiment, a plurality of electrode assemblies forming an electrode assembly stack may be constrained in a vertical direction by a secondary growth constraint system 152 having a first secondary growth constraint 158 at a top electrode assembly 106 of the stack, and a second secondary growth constraint 160 at a bottom electrode assembly 106 of the stack, such that the plurality of electrode assemblies 106 forming the stack are constrained in the vertical direction by the shared secondary growth constraint system. Similarly, portions of the primary growth constraint system 151 could also be shared. Accordingly, in one embodiment, similarly to the single electrode assembly described above, a surface area of a projection of the stack of electrode assemblies 106 in a plane orthogonal to the stacking direction (i.e., the longitudinal direction), is smaller than the surface areas of projections of the stack of electrode assemblies 106 onto other orthogonal planes. That is, the plurality of electrode assemblies 106 may be configured such that the stacking direction (i.e., longitudinal direction) intersects and is orthogonal to a plane that has a projection of the stack of electrode assemblies 106 that is the smallest of all the other orthogonal projections of the electrode assembly stack.

Figure 7:
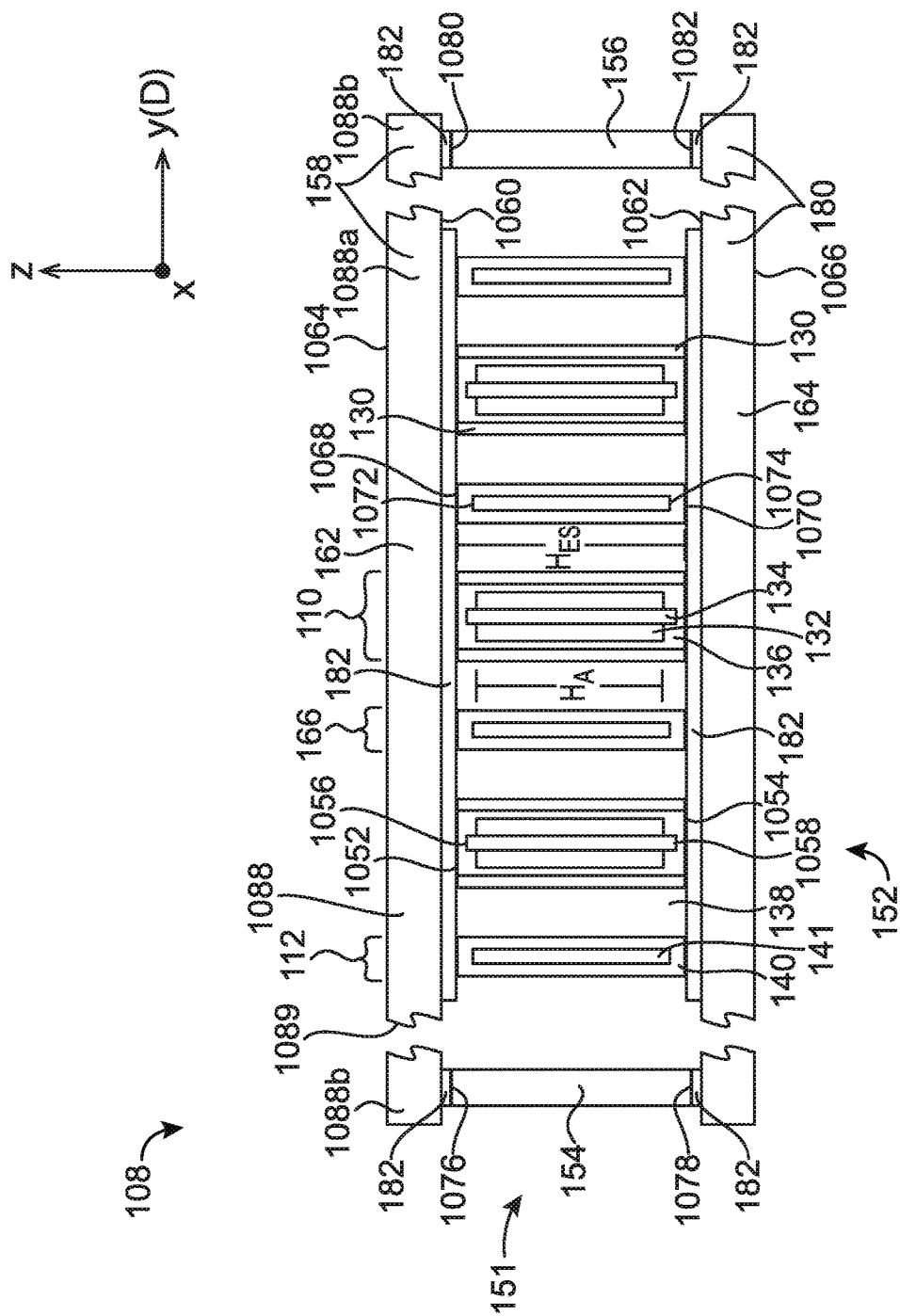
FIG. 7 illustrates a cross-section of an embodiment of the electrode assembly taken along the line A-A' as shown in FIG. 1, further including a set of electrode constraints, including one embodiment of a primary constraint system and one embodiment of a secondary constraint system.

According to one embodiment, the electrode assembly 106 further comprises electrode structures 110 that are configured such that a surface area of a projection of the electrode structures 110 into a plane orthogonal to the stacking direction (i.e., the longitudinal direction), is larger than the surface areas of projections of the electrode structures 100 onto other orthogonal planes. For example, referring to the embodiments as shown in FIGS. 2 and 7, the electrodes 110 can each be understood to have a length $L_{ES}$ measured in the transverse direction, a width $W_{ES}$ measured in the longitudinal direction, and a height $H_{ES}$ measured in the vertical direction. The projection into the X-Z plane as shown in FIGS. 2 and 7 thus has a surface area $L_{ES} \times H_{ES}$, the projection into the Y-Z plane has a surface area $W_{ES} \times H_{ES}$, and the projection into the XY plane has a surface area $L_{ES} \times W_{ES}$. Of these, the plane corresponding to the projection having the largest surface area is the one that is selected to be orthogonal to the stacking direction. Similarly, the electrodes 110 may also be configured such that a surface area of a projection of the electrode active material layer 132 into a plane orthogonal to the stacking direction is larger than the surface areas of projections of the electrode active material layer onto other orthogonal planes. For example, in the embodiments shown in FIGS. 2 and 7, the electrode active material layer may have a length $L_A$ measured in the transverse direction, a width $W_A$ measured in the longitudinal direction, and a height $H_A$ measured in the vertical direction, from the surface areas of projections can be calculated ($L_{ES}$, $L_A$, $W_{ES}$, $W_A$ $H_{ES}$ and $H_A$ may also correspond to the maximum of these dimensions, in a case where the dimensions of the electrode structure and/or electrode active material layer 132 vary along one or more axes). In one embodiment, by positioning the electrode structures 110 such that the plane having the highest projection surface area of the electrode structure 100 and/or electrode active material layer 132 is orthogonal to the stacking direction, a configuration can be achieved whereby the surface of the electrode structure 110 having the greatest surface area of electrode active material faces the direction of travel of the carrier ions, and thus experiences the greatest growth during cycling between charged and discharged states due to intercalation and/or alloying.

In one embodiment, the electrode structure 110 and electrode assembly 106 can be configured such that the largest surface area projection of the electrode structure 110 and/or electrode active material layer 132, and the smallest surface area projection of the electrode assembly 106 are simultaneously in a plane that is orthogonal to the stacking direction. For example, in a case as shown in FIGS. 2 and 7, where the projection of the electrode active material layer 132 in the X-Z plane ($L_A \times H_A$) of the electrode active material layer 132 is the highest, the electrode structure 110 and/or electrode active material layer 132 is positioned with respect to the smallest surface area projection of the electrode assembly ($L_{EA} \times H_{EA}$) such the projection plane for both projections is orthogonal to the stacking direction. That is, the plane having the greatest surface area projection of the electrode structure 110 and/or electrode active material is parallel to (and/or in the same plane with) the plane having the smallest surface area projection of the electrode assembly 106. In this way, according to one embodiment, the surfaces of the electrode structures that are most likely to experience the highest volume growth, i.e., the surfaces having the highest content of electrode active material layer, and/or surfaces that intersect (e.g., are orthogonal to) a direction of travel of carrier ions during charge/discharge of a secondary battery, face the surfaces of the electrode assembly 106 having the lowest surface area. An advantage of providing such a configuration may be that the growth constraint system used to constrain in this greatest direction of growth, e.g. along the longitudinal axis, can be implemented with growth constraints that themselves have a relatively small surface area, as compared to the area of other surfaces of the electrode assembly 106, thereby reducing the volume required for implementing a constraint system to restrain growth of the electrode assembly.

In one embodiment, the constraint system 108 occupies a relatively low volume % of the combined volume of the electrode assembly 106 and constraint system 108. That is, the electrode assembly 106 can be understood as having a volume bounded by its exterior surfaces (i.e., the displacement volume), namely the volume enclosed by the first and second longitudinal end surfaces 116, 118 and the lateral surface 42 connecting the end surfaces. Portions of the constraint system 108 that are external to the electrode assembly 106 (i.e., external to the longitudinal end surfaces 116, 118 and the lateral surface), such as where first and second primary growth constraints 154, 156 are located at the longitudinal ends 117, 119 of the electrode assembly 106, and first and second secondary growth constraints 158, 160 are at the opposing ends of the lateral surface 142, the portions of the constrain system 108 similarly occupy a volume corresponding to the displacement volume of the constraint system portions. Accordingly, in one embodiment, the external portions of the set of electrode constraints 108, which can include external portions of the primary growth constraint system 151 (i.e., any of the first and second primary growth constraints 154, 156 and at least one primary connecting member that are external, or external portions thereof), as well as external portions of the secondary growth constraint system 152 (i.e., any of the first and second secondary growth constraints 158, 160 and at least one secondary connecting member that are external, or external portions thereof) occupies no more than 80% of the total combined volume of the electrode assembly 106 and external portion of the set of electrode constraints 108. By way of further example, in one embodiment the external portions of the set of electrode constraints occupies no more than 60% of the total combined volume of the electrode assembly 106 and the external portion of the set of electrode constraints. By way of yet a further example, in one embodiment the external portion of the set of electrode constraints 106 occupies no more than 40% of the total combined volume of the electrode assembly 106 and the external portion of the set of electrode constraints. By way of yet a further example, in one embodiment the external portion of the set of electrode constraints 106 occupies no more than 20% of the total combined volume of the electrode assembly 106 and the external portion of the set of electrode constraints. In yet another embodiment, the external portion of the primary growth constraint system 151 (i.e., any of the first and second primary growth constraints 154, 156 and at least one primary connecting member that are external, or external portions thereof) occupies no more than 40% of the total combined volume of the electrode assembly 106 and the external portion of the primary growth constraint system 151. By way of further example, in one embodiment the external portion of the primary growth constraint system 151 occupies no more than 30% of the total combined volume of the electrode assembly 106 and the external portion of the primary growth constraint system 151. By way of yet a further example, in one embodiment the external portion of the primary growth constraint system 151 occupies no more than 20% of the total combined volume of the electrode assembly 106 and the external portion of the primary growth constraint system 151. By way of yet a further example, in one embodiment the external portion of the primary growth constraint system 151 occupies no more than 10% of the total combined volume of the electrode assembly 106 and the external portion of the primary growth constraint system 151. In yet another embodiment, the external portion of the secondary growth constraint system 152 (i.e., any of the first and second secondary growth constraints 158, 160 and at least one secondary connecting member that are external, or external portions thereof) occupies no more than 40% of the total combined volume of the electrode assembly 106 and the external portion of the secondary growth constraint system 152. By way of further example, in one embodiment, the external portion of the secondary growth constraint system 152 occupies no more than 30% of the total combined volume of the electrode assembly 106 and the external portion of the secondary growth constraint system 152. By way of yet another example, in one embodiment, the external portion of the secondary growth constraint system 152 occupies no more than 20% of the total combined volume of the electrode assembly 106 and the external portion of the secondary growth constraint system 152. By way of yet another example, in one embodiment, the external portion of the secondary growth constraint system 152 occupies no more than 10% of the total combined volume of the electrode assembly 106 and the external portion of the secondary growth constraint system 152.

Figure 8A:
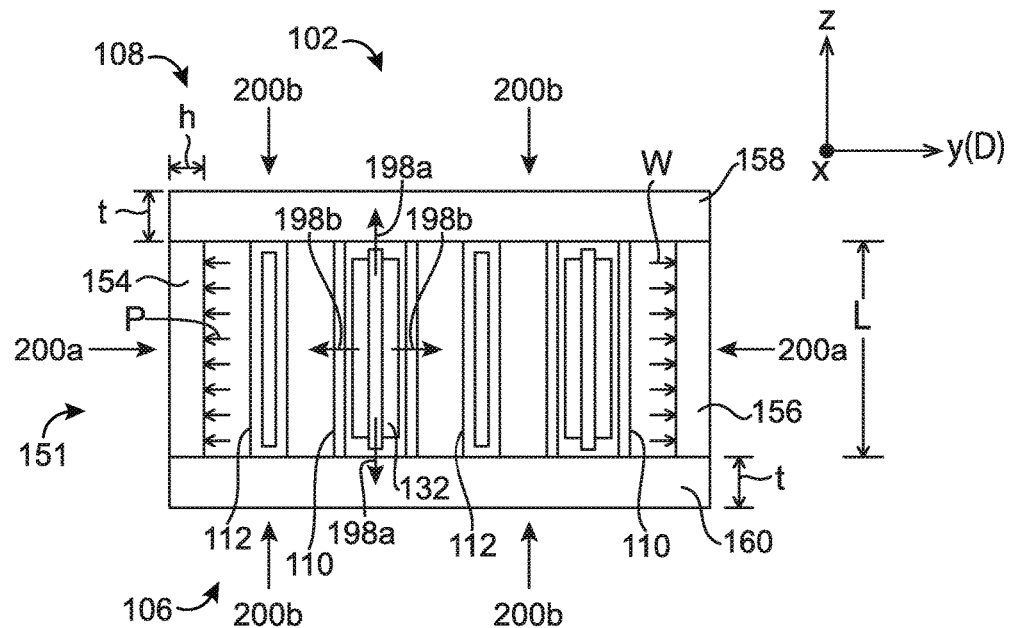
FIGS. 8A-8B illustrate a force schematics, according to one embodiment, showing the forces exerted on the electrode assembly by the set of electrode constraints, as well as the forces being exerted by electrode structures upon repeated cycling of a battery containing the electrode assembly.
Figure 8B:
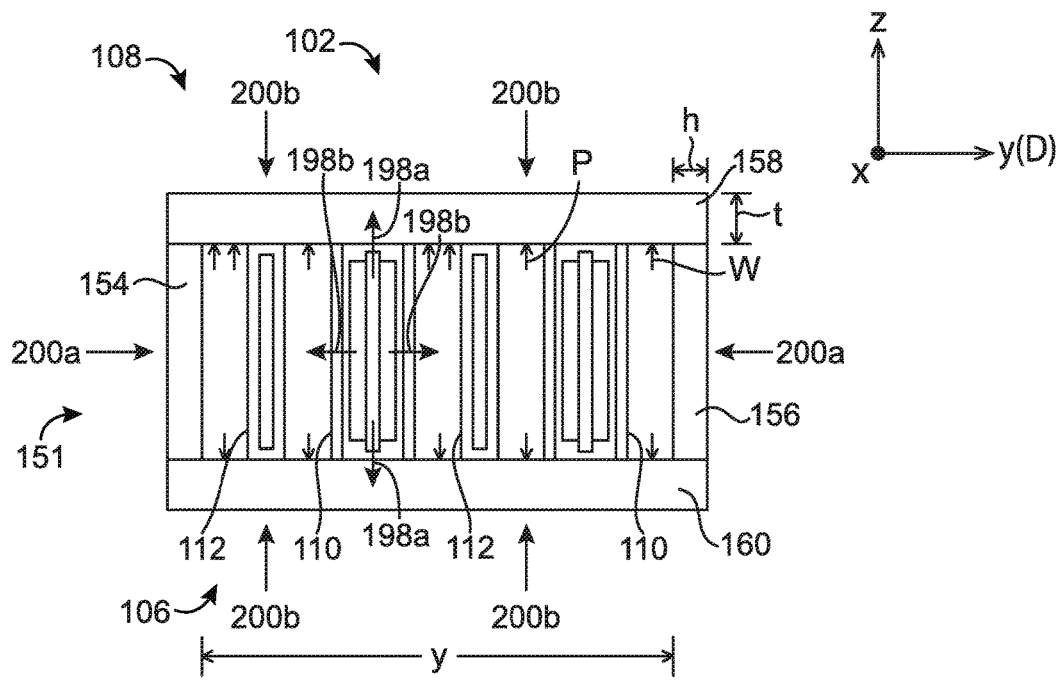

According to one embodiment, a rationale for the relatively low volume occupied by portions of the set of electrode constraints 108 can be understood by referring to the force schematics shown in FIGS. 8A and 8B. FIG. 8A depicts an embodiment showing the forces exerted on the first and second primary growth constraints 154, 156 upon cycling of the secondary battery 102, due to the increase in volume of the electrode active material layers 132. The arrows 198b depict the forces exerted by the electrode active material layers 132 upon expansion thereof, where w shows the load applied to the first and second primary growth constraints 154, 156, due to the growth of the electrode active material layers 132, and P shows the pressure applied to the first and second primary growth constraints 154, 156 as a result of the increase in volume of the electrode active material layers 132. Similarly, FIG. 8B depicts an embodiment showing the forces exerted on the first and second secondary growth constraints 158, 160 upon cycling of the secondary battery 102, due to the increase in volume of the electrode active material layers 132. The arrows 198a depict the forces exerted by the electrode active material layers 132 upon expansion thereof, where w shows the load applied to the first and second secondary growth constraints 158, 160, due to the growth of the electrode active material layers 132, and P shows the pressure applied to the first and second secondary growth constraints 158, 160 as a result of the increase in volume of the electrode active material layers 132. While the electrode active material expands isotropically (i.e., in all directions), during cycling of the secondary battery, and thus the pressure P in each direction is the same, the load w exerted in each direction is different. By way of explanation, referring to the embodiment depicted in FIGS. 8A and 8B, it can be understood that the load in the X-Z plane on a first or secondary primary growth constraint 154, 156 is proportional to $P \times L_{ES} \times H_{ES}$, where P is the pressure exerted due to the expansion of the electrode active material layers 132 on the primary growth constraints 154, 156, $L_{ES}$ is length of the electrode structures 110 in the transverse direction, and $H_{ES}$ is the height of the electrode structures 110 in the vertical direction. Similarly, the load in the X-Y plane on a first or second secondary growth constraint 158, 160 is proportional to $P \times L_{ES} \times W_{ES}$, where P is the pressure exerted due to the expansion of the electrode active material layers 132 on the secondary growth constraints 158, 160, $L_{ES}$ is length of the electrode structures 110 in the transverse direction, and $W_{ES}$ is the width of the electrode structures 110 in the longitudinal direction. In a case where a tertiary constraint system is provided, the load in the Y-Z plane on a first or secondary tertiary growth constraint 157, 159 is proportional to $P \times H_{ES} \times W_{ES}$, where P is the pressure exerted due to the expansion of the electrode active material layers 132 on the tertiary growth constraints 157, 159, $H_{ES}$ is height of the electrode structures 110 in the vertical direction, and $W_{ES}$ is the width of the electrode structures in the longitudinal direction. Accordingly, in a case where $L_{ES}$ is greater than both $W_{ES}$ and $H_{ES}$, the load in the Y-Z plane will be the least, and in a case where $H_{ES} > W_{ES}$, the load in the X-Y plane will be less than the load in the X-Z plane, meaning that the X-Z plane has the highest load to be accommodated among the orthogonal planes.

Furthermore, according to one embodiment, if a primary constraint is provided in the X-Z plane in a case where the load in that plane is the greatest, as opposed to providing a primary constraint in the X-Y plane, then the primary constraint in the X-Z plane may require a much lower volume that the primary constraint would be required to have if it were in the X-Y plane. This is because if the primary constraint were in the X-Y plane instead of the X-Z plane, then the constraint would be required to be much thicker in order to have the stiffness against growth that would be required. In particular, as is described herein in further detail below, as the distance between primary connecting members increases, the buckling deflection can also increase, and the stress also increases. For example, the equation governing the deflection due to bending of the primary growth constraints 154, 156 can be written as:

$$\delta = 60wL^4/Eh^3$$

where w=total distributed load applied on the primary growth constraint 154, 156 due to the electrode expansion; L=distance between the primary connecting members 158, 160 along the vertical direction; E=elastic modulus of the primary growth constraints 154, 156, and h=thickness (width) of the primary growth constraints 154, 156. The stress on the primary growth constraints 154, 156 due to the expansion of the electrode active material 132 can be calculated using the following equation:

$$\sigma = 3wL^2/4h^2$$

where w=total distributed load applied on the primary growth constraints 154, 156 due to the expansion of the electrode active material layers 132; L=distance between primary connecting members 158, 160 along the vertical direction; and h=thickness (width) of the primary growth constraints 154, 156. Thus, if the primary growth constraints were in the X-Y plane, and if the primary connecting members were much further apart (e.g., at longitudinal ends) than they would otherwise be if the primary constraint were in the X-Z plane, this can mean that the primary growth constraints would be required to be thicker and thus occupy a larger volume that they otherwise would if they were in the X-Z plane.

According to one embodiment, a projection of the members of the electrode and counter-electrode populations onto first and second longitudinal end surfaces 116, 118 circumscribes a first and second projected areas 2002a, 2002b. In general, first and second projected areas 2002a, 2002b will typically comprise a significant fraction of the surface area of the first and second longitudinal end surfaces 122, 124, respectively. For example, in one embodiment the first and second projected areas each comprise at least 50% of the surface area of the first and second longitudinal end surfaces, respectively. By way of further example, in one such embodiment the first and second projected areas each comprise at least 75% of the surface area of the first and second longitudinal end surfaces, respectively. By way of further example, in one such embodiment the first and second projected areas each comprise at least 90% of the surface area of the first and second longitudinal end surfaces, respectively.

In certain embodiments, the longitudinal end surfaces 116, 118 of the electrode assembly 106 will be under a significant compressive load. For example, in some embodiments, each of the longitudinal end surfaces 116, 118 of the electrode assembly 106 will be under a compressive load of at least 0.7 kPa (e.g., averaged over the total surface area of each of the longitudinal end surfaces, respectively). For example, in one embodiment, each of the longitudinal end surfaces 116, 118 of the electrode assembly 106 will be under a compressive load of at least 1.75 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 2.8 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 3.5 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 5.25 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 7 kPa (e.g., averaged over the total surface area of each of the longitudinal end surfaces, respectively). By way of further example, in one such embodiment, each of the longitudinal end surfaces 116, 118 of the electrode assembly 106 will be under a compressive load of at least 8.75 kPa (e.g., averaged over the total surface area of each of the longitudinal end surfaces, respectively). In general, however, the longitudinal end surfaces 116, 118 of the electrode assembly 106 will be under a compressive load of no more than about 10 kPa (e.g., averaged over the total surface area of each of the longitudinal end surfaces, respectively). The regions of the longitudinal end surface of the electrode assembly that are coincident with the projection of members of the electrode and counter-electrode populations onto the longitudinal end surfaces (i.e., the projected surface regions) may also be under the above compressive loads (as averaged over the total surface area of each projected surface region, respectively). In each of the foregoing exemplary embodiments, the longitudinal end surfaces 116, 118 of the electrode assembly 106 will experience such compressive loads when an energy storage device 100 having the electrode assembly 106 is charged to at least about 80% of its rated capacity.

According to one embodiment, the secondary growth constraint system 152 is capable of restraining growth of the electrode assembly 106 in the vertical direction (Z direction) by applying a restraining force at a predetermined value, and without excessive skew of the growth restraints. For example, in one embodiment, the secondary growth constraint system 152 may restrain growth of the electrode assembly 106 in the vertical direction by applying a restraining force to opposing vertical regions 148, 150 of greater than 1000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 5% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 3% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 with less than 1% displacement at less than or equal to 10,000 psi and a skew of less than 0.2 mm/m. By way of further example, in one embodiment, the secondary growth constraint system 152 may restrain growth of the electrode assembly 106 in the vertical direction by applying a restraining force to opposing vertical regions 148, 150 in the vertical direction with less than 15% displacement at less than or equal to 10,000 psi and a skew of less than 0.2 mm/m after 50 battery cycles. By way of further example, in one embodiment, the secondary growth constraint system 152 may restrain growth of the electrode assembly 106 in the vertical direction by applying a restraining force to opposing vertical regions 148, 150 with less than 5% displacement at less than or equal to 10,000 psi and a skew of less than 0.2 mm/m after 150 battery cycles.

Figure 5:
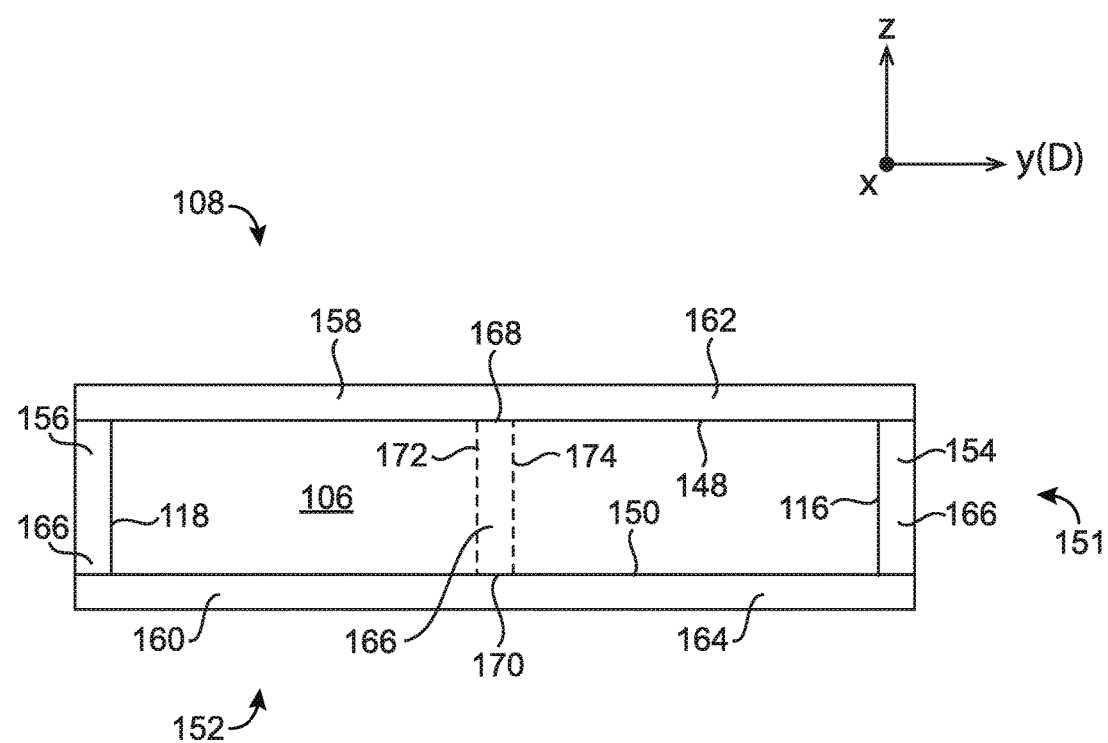
FIG. 5 illustrates a cross section of an embodiment of the electrode assembly taken along the line A-A1' as shown in FIG. 1.

Referring now to FIG. 5, an embodiment of an electrode assembly 106 with a set of electrode constraints 108 is shown, with a cross-section taken along the line A-A' as shown in FIG. 1. In the embodiment shown in FIG. 5, the primary growth constraint system 151 can comprise first and second primary growth constraints 154, 156, respectively, at the longitudinal end surfaces 116, 118 of the electrode assembly 106, and the secondary growth constraint system 152 comprises first and second secondary growth constraints 158, 160 at the opposing first and second surface regions 148, 150 of the lateral surface 142 of the electrode assembly 106. According to this embodiment, the first and second primary growth constraints 154, 156 can serve as the at least one secondary connecting member 166 to connect the first and second secondary growth constrains 158, 160 and maintain the growth constraints in tension with one another in the second direction (e.g., vertical direction) that is orthogonal to the longitudinal direction. However, additionally and/or alternatively, the secondary growth constraint system 152 can comprise at least one secondary connecting member 166 that is located at a region other than the longitudinal end surfaces 116, 118 of the electrode assembly 106. Also, the at least one secondary connecting member 166 can be understood to act as at least one of a first and second primary growth constraint 154, 156 that is internal to the longitudinal ends 116, 118 of the electrode assembly, and that can act in conjunction with either another internal primary growth restraint and/or a primary growth restraint at a longitudinal end 116, 118 of the electrode assembly 106 to restrain growth. Referring to the embodiment shown in FIG. 5, a secondary connecting member 166 can be provided that is spaced apart along the longitudinal axis away from the first and second longitudinal end surfaces 116, 118, respectively, of the electrode assembly 106, such as toward a central region of the electrode assembly 106. The secondary connecting member 166 can connect the first and second secondary growth constraints 158, 160, respectively, at an interior position from the electrode assembly end surfaces 116, 118, and may be under tension between the secondary growth constraints 158, 160 at that position. In one embodiment, the secondary connecting member 166 that connects the secondary growth constraints 158, 160 at an interior position from the end surfaces 116, 118 is provided in addition to one or more secondary connecting members 166 provided at the electrode assembly end surfaces 116, 118, such as the secondary connecting members 166 that also serve as primary growth constraints 154, 156 at the longitudinal end surfaces 116, 118. In another embodiment, the secondary growth constraint system 152 comprises one or more secondary connecting members 166 that connect with first and second secondary growth constraints 158, 160, respectively, at interior positions that are spaced apart from the longitudinal end surfaces 116, 118, with or without secondary connecting members 166 at the longitudinal end surfaces 116, 118. The interior secondary connecting members 166 can also be understood to act as first and second primary growth constraints 154, 156, according to one embodiment. For example, in one embodiment, at least one of the interior secondary connecting members 166 can comprise at least a portion of an electrode or counter electrode structure 110, 112, as described in further detail below.

More specifically, with respect to the embodiment shown in FIG. 5, secondary growth constraint system 152 may include a first secondary growth constraint 158 that overlies an upper region 148 of the lateral surface 142 of electrode assembly 106, and an opposing second secondary growth constraint 160 that overlies a lower region 150 of the lateral surface 142 of electrode assembly 106, the first and second secondary growth constraints 158, 160 being separated from each other in the vertical direction (i.e., along the Z-axis). Additionally, secondary growth constraint system 152 may further include at least one interior secondary connecting member 166 that is spaced apart from the longitudinal end surfaces 116, 118 of the electrode assembly 106. The interior secondary connecting member 166 may be aligned parallel to the Z axis and connects the first and second secondary growth constraints 158, 160, respectively, to maintain the growth constraints in tension with one another, and to form at least a portion of the secondary constraint system 152. In one embodiment, the at least one interior secondary connecting member 166, either alone or with secondary connecting members 166 located at the longitudinal end surfaces 116, 118 of the electrode assembly 106, may be under tension between the first and secondary growth constraints 158, 160 in the vertical direction (i.e., along the Z axis), during repeated charge and/or discharge of an energy storage device 100 or a secondary battery 102 having the electrode assembly 106, to reduce growth of the electrode assembly 106 in the vertical direction. Furthermore, in the embodiment as shown in FIG. 5, the set of electrode constraints 108 further comprises a primary growth constraint system 151 having first and second primary growth constraints 154, 156, respectively, at the longitudinal ends 117, 119 of the electrode assembly 106, that are connected by first and second primary connecting members 162, 164, respectively, at the upper and lower lateral surface regions 148, 150, respectively, of the electrode assembly 106. In one embodiment, the secondary interior connecting member 166 can itself be understood as acting in concert with one or more of the first and second primary growth constraints 154, 156, respectively, to exert a constraining pressure on each portion of the electrode assembly 106 lying in the longitudinal direction between the secondary interior connecting member 166 and the longitudinal ends 117, 119 of the electrode assembly 106 where the first and second primary growth constraints 154, 156, respectively, can be located.

In one embodiment, one or more of the primary growth constraint system 151 and secondary growth constraint system 152 includes first and secondary primary growth constraints 154, 156, respectively, and/or first and second secondary growth constraints 158, 160, respectively, that include a plurality of constraint members. That is, each of the primary growth constraints 154, 156 and/or secondary growth constraints 158, 160 may be a single unitary member, or a plurality of members may be used to make up one or more of the growth constraints. For example, in one embodiment, the first and second secondary growth constraints 158, 160, respectively, can comprise single constraint members extending along the upper and lower surface regions 148, 150, respectively, of the electrode assembly lateral surface 142. In another embodiment, the first and second secondary growth constraints 158, 160, respectively, comprise a plurality of members extending across the opposing surface regions 148, 150, of the lateral surface. Similarly, the primary growth constraints 154, 156 may also be made of a plurality of members, or can each comprise a single unitary member at each electrode assembly longitudinal end 117, 119. To maintain tension between each of the primary growth constraints 154, 156 and secondary growth constraints 158, 160, the connecting members (e.g., 162, 164, 165, 166) are provided to connect the one or plurality of members comprising the growth constraints to the opposing growth constraint members in a manner that exerts pressure on the electrode assembly 106 between the growth constraints.

In one embodiment, the at least one secondary connecting member 166 of the secondary growth constraint system 152 forms areas of contact 168, 170 with the first and second secondary growth constraints 158, 160, respectively, to maintain the growth constraints in tension with one another. The areas of contact 168, 170 are those areas where the surfaces at the ends 172, 174 of the at least one secondary connecting member 166 touches and/or contacts the first and second secondary growth constraints 158, 160, respectively, such as where a surface of an end of the at least one secondary connecting member 166 is adhered or glued to the first and second secondary growth constraints 158, 160, respectively. The areas of contact 168, 170 may be at each end 172, 174 and may extend across a surface area of the first and second secondary growth constraints 158, 160, to provide good contact therebetween. The areas of contact 168, 170 provide contact in the longitudinal direction (Y axis) between the second connecting member 166 and the growth constraints 158, 160, and the areas of contact 168, 170 can also extend into the transverse direction (X-axis) to provide good contact and connection to maintain the first and second secondary growth constraints 158, 160 in tension with one another. In one embodiment, the areas of contact 168, 170 provide a ratio of the total area of contact (e.g., the sum of all areas 168, and the sum of all areas 170) of the one or more secondary connecting members 166 in the longitudinal direction (Y axis) with the growth constraints 158, 160, per $W_{EA}$ of the electrode assembly 106 in the longitudinal direction that is at least 1%. For example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction is at least 2%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 5%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 10%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 25%. By way of further example, in one embodiment, a ratio of the total area of contact of the one or more secondary connecting members 166 in the longitudinal direction (Y axis) with the growth constraints 158, 160, per $W_{EA}$ of the electrode assembly 106 in the longitudinal direction, is at least 50%. In general, a ratio of the total area of contact of the one or more secondary connecting members 166 in the longitudinal direction (Y axis) with the growth constraints 158, 160, per $W_{EA}$ of the electrode assembly 106 in the longitudinal direction, will be less than 100%, such as less than 90%, and even less than 75%, as the one or more connecting members 166 typically do not have an area of contact 168, 170 that extends across the entire longitudinal axis. However, in one embodiment, an area of contact 168, 170 of the secondary connecting members 166 with the growth constraints 158, 160, may extend across a significant portion of the transverse axis (X axis), and may even extend across the entire $L_{EA}$ of the electrode assembly 106 in the transverse direction. For example, a ratio of the total area of contact (e.g., the sum of all areas 168, and the sum of all areas 170) of the one or more secondary connecting members 166 in the transverse direction (X axis) with the growth constraints 158, 160, per $L_{EA}$ of the electrode assembly 106 in the transverse direction, may be at least about 50%. By way of further example, a ratio of the total area of contact of the one or more secondary connecting members 166 in the transverse direction (X axis) with the growth constraints 158, 160, per $L_{EA}$ of the electrode assembly 106 in the transverse direction (X-axis), may be at least about 75%. By way of further example, a ratio of the total area of contact of the one or more secondary connecting members 166 in the transverse direction (X axis) with the growth constraints 158, 160, per $L_{EA}$ of the electrode assembly 106 in the transverse direction (X axis), may be at least about 90%. By way of further example, a ratio of the total area of contact of the one or more secondary connecting members 166 in the transverse direction (X axis) with the growth constraints 158, 160, per $L_{EA}$ of the electrode assembly 106 in the transverse direction (X axis), may be at least about 95%.

According to one embodiment, the areas of contact 168, 170 between the one or more secondary connecting members 166 and the first and second secondary growth constraints 158, 160, respectively, are sufficiently large to provide for adequate hold and tension between the growth constraints 158, 160 during cycling of an energy storage device 100 or a secondary battery 102 having the electrode assembly 106. For example, the areas of contact 168, 170 may form an area of contact with each growth constraint 158, 160 that makes up at least 2% of the surface area of the lateral surface 142 of the electrode assembly 106, such as at least 10% of the surface area of the lateral surface 142 of the electrode assembly 106, and even at least 20% of the surface area of the lateral surface 142 of the electrode assembly 106. By way of further example, the areas of contact 168, 170 may form an area of contact with each growth constraint 158, 160 that makes up at least 35% of the surface area of the lateral surface 142 of the electrode assembly 106, and even at least 40% of the surface area of the lateral surface 142 of the electrode assembly 106. For example, for an electrode assembly 106 having upper and lower opposing surface regions 148, 150, respectively, the at least one secondary connecting member 166 may form areas of contact 168, 170 with the growth constraints 158, 160 along at least 5% of the surface area of the upper and lower opposing surface regions 148, 150, respectively, such as along at least 10% of the surface area of the upper and lower opposing surface regions 148, 150, respectively, and even at least 20% of the surface area of the upper and lower opposing surface regions 148, 150, respectively. By way of further example, an electrode assembly 106 having upper and lower opposing surface regions 148, 150, respectively, the at least one secondary connecting member 166 may form areas of contact 168, 170 with the growth constraints 158, 160 along at least 40% of the surface area of the upper and lower opposing surface regions 148, 150, respectively, such as along at least 50% of the surface area of the upper and lower opposing surface regions 148, 150, respectively. By forming a contact between the at least one connecting member 166 and the growth constraints 158, 160 that makes up a minimum surface area relative to a total surface area of the electrode assembly 106, proper tension between the growth constraints 158, 160 can be provided. Furthermore, according to one embodiment, the areas of contact 168, 170 can be provided by a single secondary connecting member 166, or the total area of contact may be the sum of multiple areas of contact 168, 170 provided by a plurality of secondary connecting members 166, such as one or a plurality of secondary connecting members 166 located at longitudinal ends 117, 119 of the electrode assembly 106, and/or one or a plurality of interior secondary connecting members 166 that are spaced apart from the longitudinal ends 117, 119 of the electrode assembly 106.

Further still, in one embodiment, the primary and secondary growth constraint systems 151, 152, respectively, (and optionally the tertiary growth constraint system) are capable of restraining growth of the electrode assembly 106 in both the longitudinal direction and the second direction orthogonal to the longitudinal direction, such as the vertical direction (Z axis) (and optionally in the third direction, such as along the X axis), to restrain a volume growth % of the electrode assembly.

Figure 6A:
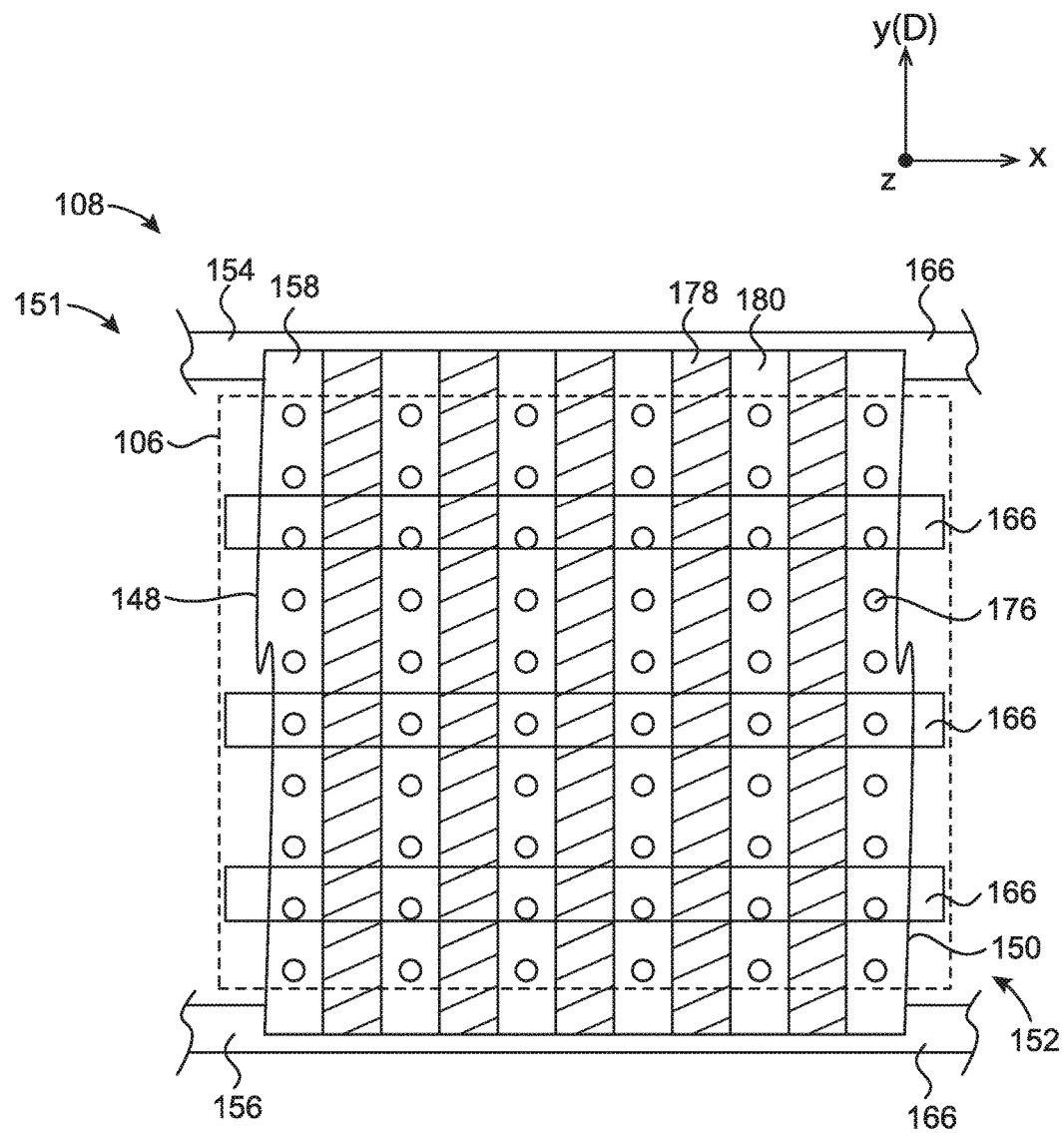
FIG. 6A illustrates one embodiment of a top view of a porous secondary growth constraint over an electrode assembly, and one embodiment for adhering the secondary growth constraint to the electrode assembly.

In certain embodiments, one or more of the primary and secondary growth constraint systems 151, 152, respectively, comprises a member having pores therein, such as a member made of a porous material. For example, referring to FIG. 6A depicting a top view of a secondary growth constraint 158 over an electrode assembly 106, the secondary growth constraint 158 can comprise pores 176 that permit electrolyte to pass therethrough, so as to access an electrode assembly 106 that is at least partially covered by the secondary growth constraint 158. In one embodiment, the first and second secondary growth constraints 158, 160, respectively, have the pores 176 therein. In another embodiment, each of the first and second primary growth constraints 154, 156, respectively, and the first and second secondary growth constraints 158, 160, respectively, have the pores 176 therein. In yet another embodiment, only one or only a portion of the first and second secondary growth constraints 158, 160, respectively, contain the pores therein. In yet a further embodiment, one or more of the first and second primary connecting members 162, 164, respectively, and the at least one secondary connecting member 166 contains pores therein. Providing the pores 176 may be advantageous, for example, when the energy storage device 100 or secondary battery 102 contains a plurality of electrode assemblies 106 stacked together in the battery enclosure 104, to permit electrolyte to flow between the different electrode assemblies 106 in, for example, the secondary battery 102 as shown in the embodiment depicted in FIG. 20. For example, in one embodiment, a porous member making up at least a portion of the primary and secondary growth constraint system 151, 152, respectively, may have a void fraction of at least 0.25. By way of further example, in some embodiments, a porous member making up at least a portion of the primary and secondary growth constraint systems 151, 152, respectively, may have a void fraction of at least 0.375. By way of further example, in some embodiments, a porous member making up at least a portion of the primary and secondary growth constraint systems 151, 152, respectively, may have a void fraction of at least 0.5. By way of further example, in some embodiments, a porous member making up at least a portion of the primary and secondary growth constraint systems 151, 152, respectively, may have a void fraction of at least 0.625. By way of further example, in some embodiments, a porous member making up at least a portion of the primary and secondary growth constraint systems 151, 152, respectively, may have a void fraction of at least 0.75.

In one embodiment, the set of electrode constraints 108 may be assembled and secured to restrain growth of the electrode assembly 106 by at least one of adhering, bonding, and/or gluing components of the primary growth constraint system 151 to components of the secondary growth constraint system 152. For example, components of the primary growth constraint system 151 may be glued, welded, bonded, or otherwise adhered and secured to components of the secondary growth constraint system 152. For example, as shown in FIG. 4A, the first and second primary growth constraints 154, 156, respectively, can be adhered to first and second primary connecting members 162, 164, respectively, that may also serve as first and second secondary growth constraints 158, 160, respectively. Conversely, the first and second secondary growth constraints 158, 150, respectively, can be adhered to at least one secondary connecting member 166 that serves as at least one of the first and second primary growth constraints 154, 156, respectively, such as growth constraints at the longitudinal ends 117, 119 of the electrode assembly 106. Referring to FIG. 5, the first and second secondary growth constraints 158, 160, respectively, can also be adhered to at least one secondary connecting member 166 that is an interior connecting member 166 spaced apart from the longitudinal ends 117, 119. In one embodiment, by securing portions of the primary and secondary growth constraint systems 151, 152, respectively, to one another, the cooperative restraint of the electrode assembly 106 growth can be provided.

FIGS. 6A-6D illustrate embodiments for securing one or more of the first and second secondary growth constraints 158, 160, respectively, to one or more secondary connecting members 166. FIGS. 6A-6D provide a top view of an embodiment of the electrode assembly 106 having the first secondary growth constraint 158 over an upper surface region 148 of the lateral surface 142 of the electrode assembly 106. Also shown are first and second primary growth constraints 154, 156, respectively, spaced apart along a longitudinal axis (Y axis). A secondary connecting member 166 which may correspond to at least a part of an electrode structure 110 and/or counter electrode structure 112 is also shown. In the embodiment as shown, the first secondary growth constraint 158 has pores 176 therein to allow electrolyte and carrier ions to reach the electrode 110 and counter-electrode 112 structures. As described above, in certain embodiments, the first and second primary growth constraints 154, 156, respectively, can serve as the at least one secondary connecting member 166 to connect the first and second secondary growth constraints 158, 160, respectively. Thus, in the version as shown, the first and second secondary growth constraints 158, 160, respectively, can be connected at the periphery of the electrode assembly 106 to the first and second primary growth constraints 154, 156, respectively. However, in one embodiment, the first and second secondary growth constraints 158, 160, respectively, can also be connected via a secondary connecting member 166 that is an interior secondary connecting member 166. In the version as shown, the first secondary growth constraint 158 comprises bonded regions 178 where the growth constraint 158 is bonded to an underlying interior secondary connecting member 166, and further comprises non-bonded regions 180 where the growth constraint 158 is not bonded to an underlying secondary connecting member 166, so as to provide areas of contact 168 between the growth constraint 158 and underlying secondary connecting member 166 in the form of columns of bonded regions 178 that alternate with areas of non-bonded regions 180. In one embodiment, the non-bonded regions 180 further contain open pores 176 where electrolyte and carrier ions can pass. According to one embodiment, the first and second secondary growth constraints 158, 160, respectively, are adhered to a secondary connecting member 166 that comprises at least a portion of an electrode 110 or counter electrode 112 structure, or other interior structure of the electrode assembly 106. The first and second secondary growth constraints 158, 160, respectively, in one embodiment, can be adhered to the top and bottom ends of the counter-electrode structures 112 or other interior structures forming the secondary connecting member 166, to form columns of adhered areas 178 corresponding to where the constraint is adhered to a counter-electrode 112 or other interior structure, and columns of non-adhered areas 180 between the counter-electrode 112 or other interior structures. Furthermore, the first and second secondary growth constraints 158, 160, respectively, may be bonded or adhered to the counter-electrode structure 112 or other structure forming the at least one secondary connecting member 166 such that pores 176 remain open at least in the non-bonded areas 180, and may also be adhered such that pores 176 in the bonded regions 178 can remain relatively open to allow electrolyte and carrier ions to pass therethrough.

Figure 6B:
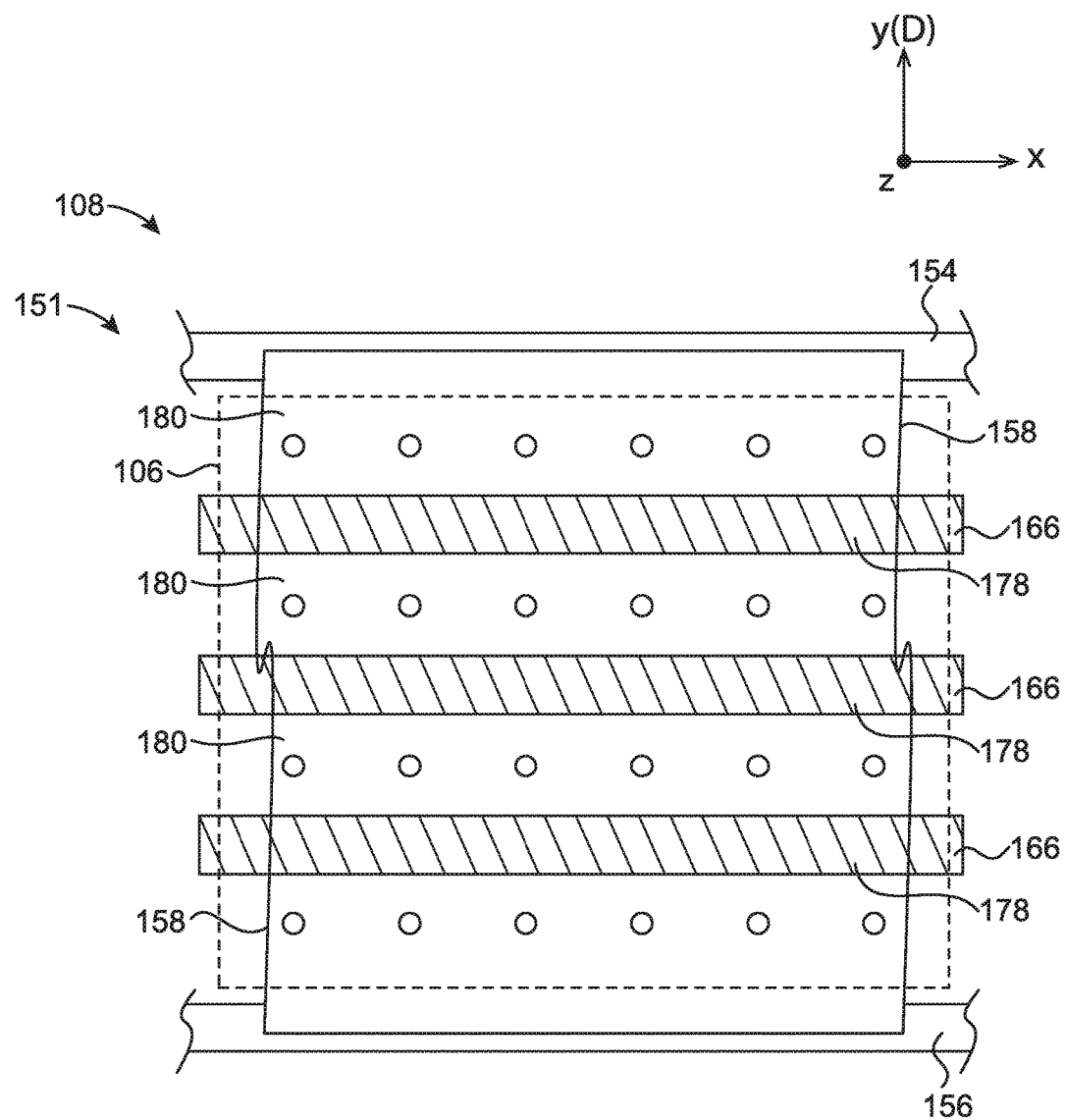
FIG. 6B illustrates one embodiment of a top view of a porous secondary growth constraint over an electrode assembly, and another embodiment for adhering the secondary growth constraint to the electrode assembly.

In yet another embodiment as shown in FIG. 6B, the first and second secondary growth constraints 158, 160, respectively, are connected at the periphery of the electrode assembly 106 to the first and second primary growth constraints 154, 156, respectively, and may also be connected via a secondary connecting member 166 that is an interior secondary connecting member 166. In the version as shown, the first secondary growth constraint 158 comprises bonded regions 178 where the growth constraint 158 is bonded to an underlying interior secondary connecting member 166, and further comprises non-bonded regions 180 where the growth constraint 158 is not bonded to an underlying secondary connecting member 166, so as to provide areas of contact 168 between the growth constraint 158 and underlying secondary connecting member 166 in the form of rows of bonded regions 178 that alternate with areas of non-bonded regions 180. These bonded and non-bonded regions 178, 180, respectively, in this embodiment can extend across a dimension of the secondary connecting member 166, which may be in the transverse direction (X axis) as shown in FIG. 6B, as opposed to in the longitudinal direction (Y axis) as in FIG. 6A. Alternatively, the bonded and non-bonded regions 178, 180, respectively, can extend across both longitudinal and transverse directions in a predetermined pattern. In one embodiment, the non-bonded regions 180 further contain open pores 176 where electrolyte and carrier ions can pass. The first and second secondary growth constraints 158, 160, respectively, can in one embodiment, be adhered to the top and bottom ends of the counter-electrode structures 112 or other interior structures forming the secondary connecting member 166, to form rows of adhered areas 178 corresponding to where the growth constraint is adhered to a counter-electrode 112 or other interior structure, and areas of non-adhered areas 180 between the counter-electrode 112 or other interior structures. Furthermore, the first and second secondary growth constraints 158, 160, respectively, may be bonded or adhered to the counter-electrode structure 112 or other structure forming the at least one secondary connecting member 166 such that pores 176 remain open at least in the non-bonded areas 180, and may also be adhered such that pores 176 in the bonded regions 178 can remain relatively open to allow electrolyte and carrier ions to pass therethrough.

Figure 6C:
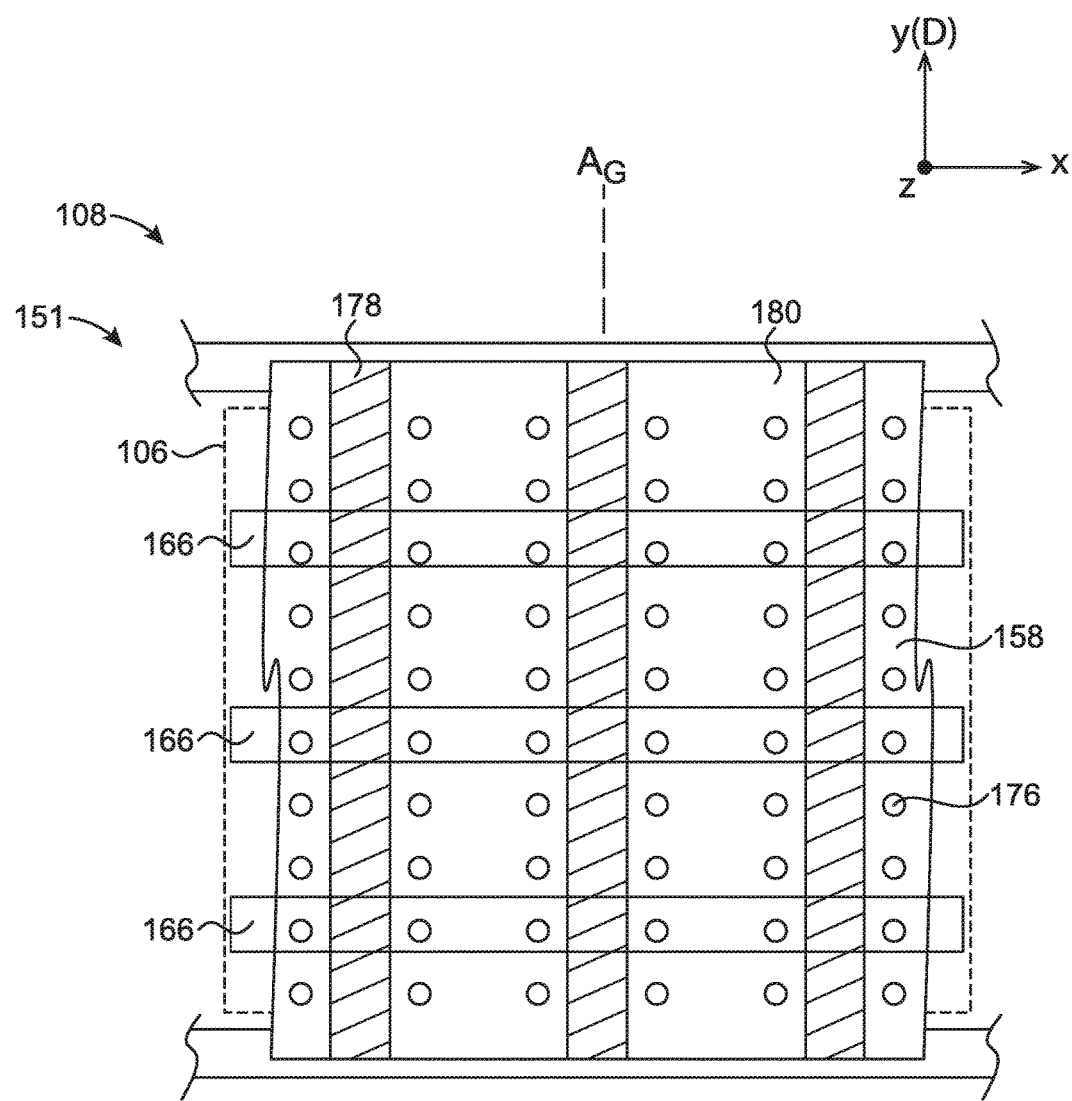
FIG. 6C illustrates one embodiment of a top view of a porous secondary growth constraint over an electrode assembly, and yet another embodiment for adhering the secondary growth constraint to the electrode assembly.

In yet another embodiment as shown in FIG. 6C, an alternative configuration for connection of the first and second secondary growth constraint members 158, 160, respectively, to the at least one secondary connecting member 166 is shown. More specifically, the bonded and non-bonded regions 178, 180, respectively, of the secondary growth constraints 158, 160 are shown to be symmetric about an axis of adhesion $A_G$ located towards the center of the electrode assembly 106 in the longitudinal direction (Y axis). As shown in this embodiment, the first and second secondary growth constraints 158, 160, respectively, are attached to the ends of secondary connecting members 166 that comprise an electrode 110, counter-electrode 112, or other interior electrode assembly structure, but the columns of bonded and non-bonded areas are not of equal size. That is, the growth constraints 158, 160 can be selectively bonded to interior secondary connecting members 166 in an alternating or other sequence, such that the amount of non-bonded area 180 exceeds the amount of bonded area 178, for example, to provide for adequate numbers of pores 176 open for passage of electrolyte therethrough. That is, the first and second secondary growth constraints 158, 160, respectively, may be bonded to every other counter-electrode 112 or other interior structure making up the secondary connecting members 166, or to one of every 1+n structures (e.g., counter-electrodes 112), according to an area of the bonded to non-bonded region to be provided.

Figure 6D:
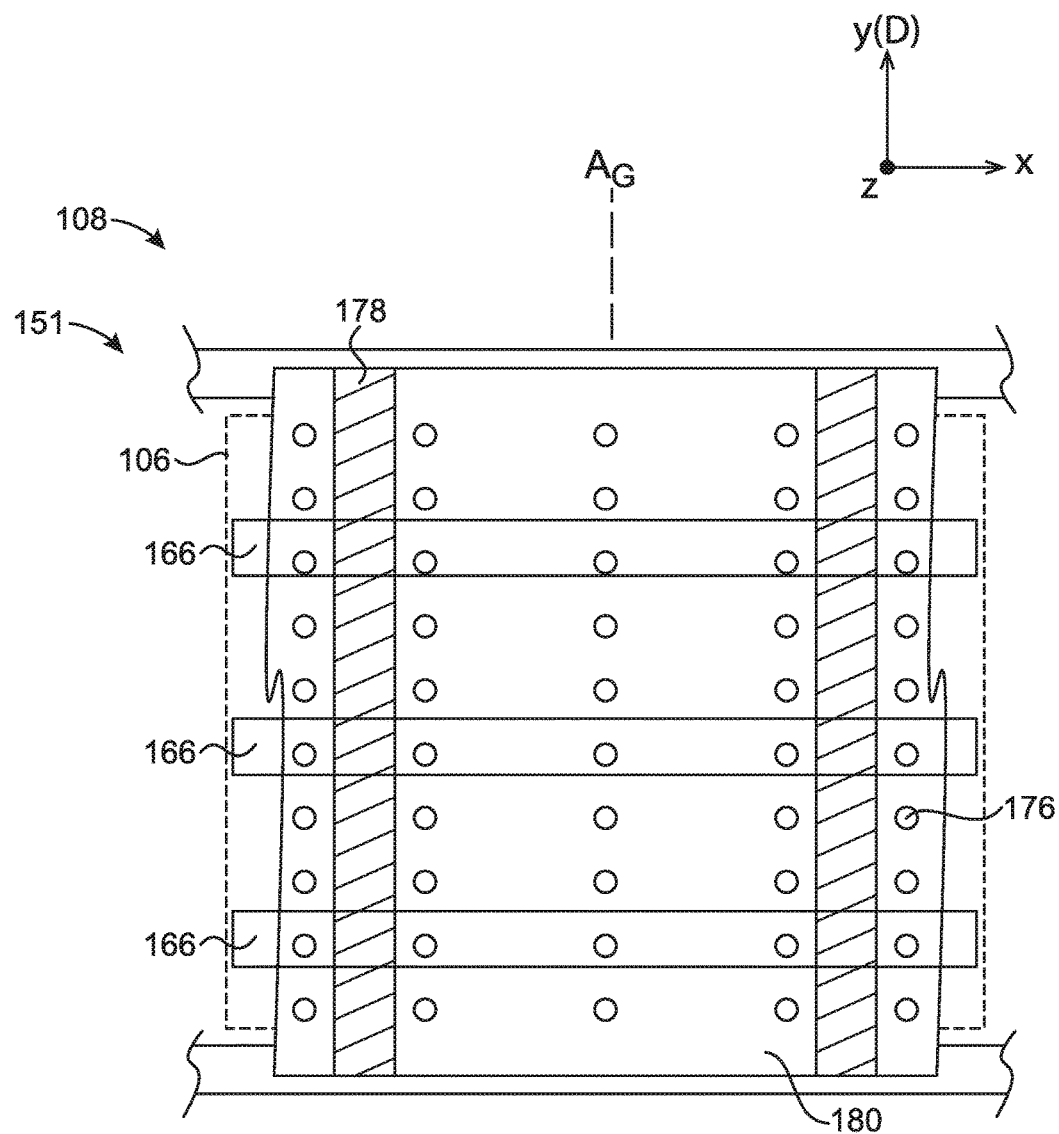
FIG. 6D illustrates one embodiment of a top view of a porous secondary growth constraint over and electrode assembly, and still yet another embodiment for adhering the secondary growth constraint to the electrode assembly.

FIG. 6D illustrates yet another embodiment of an alternative configuration for connection of the first and second secondary growth constraint members 158, 160, respectively, to the at least one secondary connecting member 166. In this version, the bonded and non-bonded regions 178, 180, respectively, of the first and second secondary growth constraints 158, 160, respectively, form an asymmetric pattern of columns about the axis of adhesion $A_G$. That is, the first and second secondary growth constraints 158, 160, respectively, can be adhered to the secondary connecting member 166 corresponding to the electrode 110 or counter-electrode 112 structure or other internal structure in a pattern that is non-symmetric, such as by skipping adhesion to interior structures according to a random or other non-symmetric pattern. In the pattern in the embodiment as shown, the bonded and non-bonded regions 178, 180, respectively, form alternating columns with different widths that are not symmetric about the axis of adhesion $A_G$. Furthermore, while an axis of adhesion $A_G$ is shown herein as lying in a longitudinal direction (Y axis), the axis of adhesion $A_G$ may also lie along the transverse direction (X axis), or there may be two axes of adhesion along the longitudinal and transverse directions, about which the patterns of the bonded and non-bonded regions 178, 180, respectively, can be formed. Similarly, for each pattern described and/or shown with respect to FIGS. 6A-6D, it is understood that a pattern shown along the longitudinal direction (Y axis) could instead be formed along the transverse direction (X axis), or vice versa, or a combination of patterns in both directions can be formed.

In one embodiment, an area of a bonded region 178 of the first or second secondary growth constraints 158, 160, respectively, along any secondary connecting member 166, and/or along at least one of the first or second primary growth constraints 154, 156, respectively, to a total area of the bonded and non-bonded regions along the constraint, is at least 50%, such as at least 75%, and even at least 90%, such as 100%. In another embodiment, the first and second secondary growth constraints 158, 160, respectively, can be adhered to a secondary connecting member 166 corresponding to an electrode 110 or counter-electrode 112 structure or other interior structure of the electrode assembly 106 in such a way that the pores 176 in the bonded regions 178 remain open. That is, the first and second secondary growth constraints 158, 160, respectively, can be bonded to the secondary connecting member 166 such that the pores 176 in the growth constraints are not occluded by any adhesive or other means used to adhere the growth constraint(s) to the connecting member(s). According to one embodiment, the first and second secondary growth constraints 158, 160, respectively, are connected to the at least one secondary connecting members 166 to provide an open area having the pores 176 of at least 5% of the area of the growth constraints 158, 160, and even an open area having the pores 176 of at least 10% of the area of the growth constraints 158, 160, and even an open area having the pores 176 of at least 25% of the area of the growth constraints 158, 160, such as an open area having the pores 176 of at least 50% of the area of the growth constraints 158, 160.

While the embodiments described above may be characterized with the pores 176 aligned as columns along the Y axis, it will be appreciated by those of skill in the art that the pores 176 may be characterized as being oriented in rows along the X axis in FIGS. 6A-6D, as well, and the adhesive or other means of adhesion may be applied horizontally or along the X axis to assemble the set of electrode constraints 108. Furthermore, the adhesive or other bonding means may be applied to yield mesh-like air pores 176. Further, the axis of adhesion $A_G$, as described above, may also be oriented horizontally, or along the X axis, to provide analogous symmetric and asymmetric adhesion and/or bonding patterns.

Further, while the pores 176 and non-bonded regions 180 have been described above as being aligned in columns along the Y axis and in rows along the X axis (i.e., in a linear fashion), it has been further contemplated that the pores 176 and/or non-bonded regions 180 may be arranged in a non-linear fashion. For example, in certain embodiments, the pores 176 may be distributed throughout the surface of the first and second secondary growth constraints 158, 160, respectively, in a non-organized or random fashion. Accordingly, in one embodiment, adhesive or other adhesion means may be applied in any fashion, so long as the resulting structure has adequate pores 176 that are not excessively occluded, and contains the non-bonded regions 180 having the non-occluded pores 176.

Secondary Constraint System Sub-Architecture

According to one embodiment, as discussed above, one or more of the first and second secondary growth constraints 158, 160, respectively, can be connected together via a secondary connecting member 166 that is a part of an interior structure of the electrode assembly 106, such as a part of an electrode 110 and/or counter-electrode structure 112. In one embodiment, by providing connection between the constraints via structures within the electrode assembly 106, a tightly constrained structure can be realized that adequately compensates for strain produced by growth of the electrode structure 110. For example, in one embodiment, the first and second secondary growth constraints 158, 160, respectively, may constrain growth in a direction orthogonal to the longitudinal direction, such as the vertical direction, by being placed in tension with one another via connection through a connecting member 166 that is a part of an electrode 110 or counter-electrode structure 112. In yet a further embodiment, growth of an electrode structure 110 (e.g., an anode structure) can be countered by connection of the secondary growth constraints 158, 160 through a counter-electrode structure 112 (e.g., cathode) that serves as the secondary connecting member 166.

In general, in certain embodiments, components of the primary growth constraint system 151 and the secondary growth constraint system 152 may be attached to the electrode 110 and/or counter-electrode structures 112, respectively, within an electrode assembly 106, and components of the secondary growth constraint system 152 may also be embodied as the electrode 110 and/or counter-electrode structures 112, respectively, within an electrode assembly 106, not only to provide effective restraint but also to more efficiently utilize the volume of the electrode assembly 106 without excessively increasing the size of an energy storage device 110 or a secondary battery 102 having the electrode assembly 106. For example, in one embodiment, the primary growth constraint system 151 and/or secondary growth constraint system 152 may be attached to one or more electrode structures 110. By way of further example, in one embodiment, the primary growth constraint system 151 and/or secondary growth constraint system 152 may be attached to one or more counter-electrode structures 112. By way of further example, in certain embodiments, the at least one secondary connecting member 166 may be embodied as the population of electrode structures 110. By way of further example, in certain embodiments, the at least one secondary connecting member 166 may be embodied as the population of counter-electrode structures 112.

Referring now to FIG. 7, a Cartesian coordinate system is shown for reference having a vertical axis (Z axis), a longitudinal axis (Y axis), and a transverse axis (X axis); wherein the X axis is oriented as coming out of the plane of the page; and a designation of the stacking direction D, as described above, co-parallel with the Y axis. More specifically, FIG. 7 shows a cross section, along the line A-A' as in FIG. 1, of a set of electrode constraints 108, including one embodiment of both a primary growth constraint system 151 and one embodiment of a secondary growth constraint system 152. Primary growth constraint system 151 includes a first primary growth constraint 154 and a second primary growth constraint 156, as described above, and a first primary connecting member 162 and a second primary connecting member 164, as described above. Secondary growth constraint system 152 includes a first secondary growth constraint 158, a second secondary growth constraint 160, and at least one secondary connecting member 166 embodied as the population of electrode structures 110 and/or the population of counter-electrode structures 112; therefore, in this embodiment, the at least one secondary connecting member 166, electrode structures 110, and/or counter-electrode structures 112 can be understood to be interchangeable. Furthermore, the separator 130 may also form a portion of a secondary connecting member 166. Further, in this embodiment, first primary connecting member 162 and first secondary growth constraint 158 are interchangeable, as described above. Further still, in this embodiment, second primary connecting member 164 and second secondary growth constraint 160 are interchangeable, as described above. More specifically, illustrated in FIG. 7 is one embodiment of a flush connection of the secondary connecting member 166 corresponding to the electrode 110 or counter-electrode structure 112 with the first secondary growth constraint 158 and second secondary growth constraint 160. The flush connection may further include a layer of glue 182 between the first secondary growth constraint 158 and secondary connecting member 166, and a layer of glue 182 between the second secondary growth constraint 160 and secondary connecting member 166. The layers of glue 182 affix first secondary growth constraint 158 to secondary connecting members 166, and affix the second secondary growth constraint 160 to secondary connecting member 166.

Also, one or more of the first and second primary growth constraints 154, 156, first and second primary connecting members 162, 164, first and second secondary growth constraints 158, 160, and at least one secondary connecting member 166 may be provided in the form of a plurality of segments 1088 or parts that can be joined together to form a single member. For example, as shown in the embodiment as illustrated in FIG. 7, a first secondary growth constraint 158 is provided in the form of a main middle segment 1088a and first and second end segments 1088b located towards the longitudinal ends 117, 119 of the electrode assembly 106, with the middle segment 1088a being connected to each first and second end segment 1088b by a connecting portion 1089 provided to connect the segments 1088, such as notches formed in the segments 1088 that can be interconnected to join the segments 1088 to one another. A second secondary growth constraint 160 may similarly be provided in the form of a plurality of segments 1088 that can be connected together to form the constraint, as shown in FIG. 7. In one embodiment, one or more of the secondary growth constraints 158, 160, at least one primary connecting member 162, and/or at least one secondary connecting member 166 may also be provided in the form of a plurality of segments 1088 that can be connected together via a connecting portions such as notches to form the complete member. According to one embodiment, the connection of the segments 1088 together via the notch or other connecting portion may provide for pre-tensioning of the member formed of the plurality of segments when the segments are connected.

Further illustrated in FIG. 7, in one embodiment, are members of the electrode population 110 having an electrode active material layer 132, an ionically porous electrode current collector 136, and an electrode backbone 134 that supports the electrode active material layer 132 and the electrode current collector 136. Similarly, in one embodiment, illustrated in FIG. 7 are members of the counter-electrode population 112 having a counter-electrode active material layer 138, a counter-electrode current collector 140, and a counter-electrode backbone 141 that supports the counter-electrode active material layer 138 and the counter-electrode current collector 140.

Without being bound to any particular theory (e.g., as in FIG. 7), in certain embodiments, members of the electrode population 110 include an electrode active material layer 132, an electrode current collector 136, and an electrode backbone 134 that supports the electrode active material layer 132 and the electrode current collector 136. Similarly, in certain embodiments, members of the counter-electrode population 112 include a counter-electrode active material layer 138, a counter-electrode current collector 140, and a counter-electrode backbone 141 that supports the counter-electrode active material layer 138 and the counter-electrode current collector 140.

While members of the electrode population 110 have been illustrated and described herein to include the electrode active material layer 132 being directly adjacent to the electrode backbone 134, and the electrode current collector 136 directly adjacent to and effectively surrounding the electrode backbone 134 and the electrode active material layer 132, those of skill in the art will appreciate other arrangements of the electrode population 110 have been contemplated. For example, in one embodiment (not shown), the electrode population 110 may include the electrode active material layer 132 being directly adjacent to the electrode current collector 136, and the electrode current collector 136 being directly adjacent to the electrode backbone 134. Stated alternatively, the electrode backbone 134 may be effectively surrounded by the electrode current collector 136, with the electrode active material layer 132 flanking and being directly adjacent to the electrode current collector 136. As will be appreciated by those of skill in the art, any suitable configuration of the electrode population 110 and/or the counter-electrode population 112 may be applicable to the inventive subject matter described herein, so long as the electrode active material layer 132 is separated from the counter-electrode active material layer 138 via separator 130. Also, the electrode current collector 136 is required to be ion permeable if it is located between the electrode active material layer 132 and separator 130; and the counter-electrode current collector 140 is required to be ion permeable if it is located between the counter-electrode active material layer 138 and separator 130.

For ease of illustration, only three members of the electrode population 110 and four members of the counter-electrode population 112 are depicted; in practice, however, an energy storage device 100 or secondary battery 102 using the inventive subject matter herein may include additional members of the electrode 110 and counter-electrode 112 populations depending on the application of the energy storage device 100 or secondary battery 102, as described above. Further still, illustrated in FIG. 7 is a microporous separator 130 electrically insulating the electrode active material layer 132 from the counter-electrode active material layer 138.

As described above, in certain embodiments, each member of the population of electrode structures 110 may expand upon insertion of carrier ions (not shown) within an electrolyte (not shown) into the electrode structures 110, and contract upon extraction of carrier ions from electrode structures 110. For example, in one embodiment, the electrode structures 110 may be anodically active. By way of further example, in one embodiment, the electrode structures 110 may be cathodically active.

Furthermore, to connect the first and second secondary growth constraints 158, 160, respectively, the constraints 158, 160 can be attached to the at least one connecting member 166 by a suitable means, such as by gluing as shown, or alternatively by being welded, such as by being welded to the current collectors 136, 140. For example, the first and/or second secondary growth constraints 158, 160, respectively, can be attached to a secondary connecting member 166 corresponding to at least one of an electrode structure 110 and/or counter-electrode structure 112, such as at least one of an electrode and/or counter-electrode backbone 134, 141, respectively, an electrode and/or counter-electrode current collector 136, 140, respectively, by at least one of adhering, gluing, bonding, welding, and the like. According to one embodiment, the first and/or second secondary growth constraints 158, 160, respectively, can be attached to the secondary connecting member 166 by mechanically pressing the first and/or second secondary growth constraint 158, 160, respectively, to an end of one or more secondary connecting member 166, such as ends of the population of electrode 100 and/or counter-electrode structures 112, while using a glue or other adhesive material to adhere one or more ends of the electrode 110 and/or counter-electrode structures 112 to at least one of the first and/or second secondary growth constraints 158, 160, respectively.

FIGS. 8A-B depict force schematics, according to one embodiment, showing the forces exerted on the electrode assembly 106 by the set of electrode constraints 108, as well as the forces being exerted by electrode structures 110 upon repeated cycling of a secondary battery 102 containing the electrode assembly 106. As shown in FIGS. 8A-B, repeated cycling through charge and discharge of the secondary battery 102 can cause growth in electrode structures 110, such as in electrode active material layers 132 of the electrode structures 110, due to intercalation and/or alloying of ions (e.g., Li) into the electrode active material layers 132 of the electrode structures 110. Thus, the electrode structures 110 can exert opposing forces 198$a$ in the vertical direction, as well as opposing forces 198$b$ in the longitudinal direction, due to the growth in volume of the electrode structure 110. While not specifically shown, the electrode structure 110 may also exert opposing forces in the transverse direction due to the change in volume. To counteract these forces, and to restrain overall growth of the electrode assembly 106, in one embodiment, the set of electrode constraints 108 includes the primary growth constraint system 151 with the first and second primary growth constraints 154, 156, respectively, at the longitudinal ends 117, 119 of the electrode assembly 106, which exert forces 200$a$ in the longitudinal direction to counter the longitudinal forces 198$b$ exerted by the electrode structure 110. Similarly, in one embodiment, the set of electrode constraints 108 includes the secondary growth constraint system 152 with the first and second secondary growth constraints 158, 160, respectively, at opposing surfaces along the vertical direction of the electrode assembly 106, which exert forces 200b in the vertical direction to counter the vertical forces 198$a$ exerted by the electrode structure 110. Furthermore, a tertiary growth constraint system 155 (not shown) can also be provided, alternatively or in addition, to one or more of the first and second growth constraint systems 151, 152, respectively, to exert counter forces in the transverse direction to counteract transverse forces exerted by volume changes of the electrode structures 110 in the electrode assembly 106. Accordingly, the set of electrode constraints 108 may be capable of at least partially countering the forces exerted by the electrode structure 110 by volume change of the electrode structure 110 during cycling between charge and discharge, such that an overall macroscopic growth of the electrode assembly 106 can be controlled and restrained.

Population of Electrode Structures

Referring again to FIG. 7, each member of the population of electrode structures 110 may also include a top 1052 adjacent to the first secondary growth constraint 158, a bottom 1054 adjacent to the second secondary growth constraint 160, and a lateral surface (not marked) surrounding a vertical axis $A_{ES}$ (not marked) parallel to the Z axis, the lateral surface connecting the top 1052 and the bottom 1054. The electrode structures 110 further include a length $L_{ES}$, a width $W_{ES}$, and a height $H_{ES}$. The length $L_{ES}$ being bounded by the lateral surface and measured along the X axis. The width $W_{ES}$ being bounded by the lateral surface and measured along the Y axis, and the height $H_{ES}$ being measured along the vertical axis $A_{ES}$ or the Z axis from the top 1052 to the bottom 1054.

The $L_{ES}$ of the members of the electrode population 110 will vary depending upon the energy storage device 100 or the secondary battery 102 and their intended use(s). In general, however, the members of the electrode population 110 will typically have a $L_{ES}$ in the range of about 5 mm to about 500 mm. For example, in one such embodiment, the members of the electrode population 110 have a $L_{ES}$ of about 10 mm to about 250 mm. By way of further example, in one such embodiment, the members of the electrode population 110 have a $L_{ES}$ of about 20 mm to about 100 mm.

The $W_{ES}$ of the members of the electrode population 110 will also vary depending upon the energy storage device 100 or the secondary battery 102 and their intended use(s). In general, however, each member of the electrode population 110 will typically have a $W_{ES}$ within the range of about 0.01 mm to 2.5 mm. For example, in one embodiment, the $W_{ES}$ of each member of the electrode population 110 will be in the range of about 0.025 mm to about 2 mm. By way of further example, in one embodiment, the $W_{ES}$ of each member of the electrode population 110 will be in the range of about 0.05 mm to about 1 mm.

The $H_{ES}$ of the members of the electrode population 110 will also vary depending upon the energy storage device 100 or the secondary battery 102 and their intended use(s). In general, however, members of the electrode population 110 will typically have a $H_{ES}$ within the range of about 0.05 mm to about 10 mm. For example, in one embodiment, the $H_{ES}$ of each member of the electrode population 110 will be in the range of about 0.05 mm to about 5 mm. By way of further example, in one embodiment, the $H_{ES}$ of each member of the electrode population 110 will be in the range of about 0.1 mm to about 1 mm.

In another embodiment, each member of the population of electrode structures 110 may include an electrode structure backbone 134 having a vertical axis $A_{ESB}$ parallel to the Z axis. The electrode structure backbone 134 may also include a layer of electrode active material 132 surrounding the electrode structure backbone 134 about the vertical axis $A_{ESB}$. Stated alternatively, the electrode structure backbone 134 provides mechanical stability for the layer of electrode active material 132, and may provide a point of attachment for the primary growth constraint system 151 and/or secondary constraint system 152. In certain embodiments, the layer of electrode active material 132 expands upon insertion of carrier ions into the layer of electrode active material 132, and contracts upon extraction of carrier ions from the layer of electrode active material 132. For example, in one embodiment, the layer of electrode active material 132 may be anodically active. By way of further example, in one embodiment, the layer of electrode active material 132 may be cathodically active. The electrode structure backbone 134 may also include a top 1056 adjacent to the first secondary growth constraint 158, a bottom 1058 adjacent to the second secondary growth constraint 160, and a lateral surface (not marked) surrounding the vertical axis $A_{ESB}$ and connecting the top 1056 and the bottom 1058. The electrode structure backbone 134 further includes a length $L_{ESB}$, a width $W_{ESB}$, and a height $H_{ESB}$. The length $L_{ESB}$ being bounded by the lateral surface and measured along the X axis. The width $W_{ESB}$ being bounded by the lateral surface and measured along the Y axis, and the height $H_{ESB}$ being measured along the Z axis from the top 1056 to the bottom 1058.

The $L_{ESB}$ of the electrode structure backbone 134 will vary depending upon the energy storage device 100 or the secondary battery 102 and their intended use(s). In general, however, the electrode structure backbone 134 will typically have a $L_{ESB}$ in the range of about 5 mm to about 500 mm. For example, in one such embodiment, the electrode structure backbone 134 will have a $L_{ESB}$ of about 10 mm to about 250 mm. By way of further example, in one such embodiment, the electrode structure backbone 134 will have a $L_{ESB}$ of about 20 mm to about 100 mm. According to one embodiment, the electrode structure backbone 134 may be the substructure of the electrode structure 110 that acts as the at least one connecting member 166.

The $W_{ESB}$ of the electrode structure backbone 134 will also vary depending upon the energy storage device 100 or the secondary battery 102 and their intended use(s). In general, however, each electrode structure backbone 134 will typically have a $W_{ESB}$ of at least 1 micrometer. For example, in one embodiment, the $W_{ESB}$ of each electrode structure backbone 134 may be substantially thicker, but generally will not have a thickness in excess of 500 micrometers. By way of further example, in one embodiment, the $W_{ESB}$ of each electrode structure backbone 134 will be in the range of about 1 to about 50 micrometers.

The $H_{ESB}$ of the electrode structure backbone 134 will also vary depending upon the energy storage device 100 or the secondary battery 102 and their intended use(s). In general, however, the electrode structure backbone 134 will typically have a $H_{ESB}$ of at least about 50 micrometers, more typically at least about 100 micrometers. Further, in general, the electrode structure backbone 134 will typically have a $H_{ESB}$ of no more than about 10,000 micrometers, and more typically no more than about 5,000 micrometers. For example, in one embodiment, the $H_{ESB}$ of each electrode structure backbone 134 will be in the range of about 0.05 mm to about 10 mm. By way of further example, in one embodiment, the $H_{ESB}$ of each electrode structure backbone 134 will be in the range of about 0.05 mm to about 5 mm. By way of further example, in one embodiment, the $H_{ESB}$ of each electrode structure backbone 134 will be in the range of about 0.1 mm to about 1 mm.

Depending upon the application, electrode structure backbone 134 may be electrically conductive or insulating. For example, in one embodiment, the electrode structure backbone 134 may be electrically conductive and may include electrode current collector 136 for electrode active material 132. In one such embodiment, electrode structure backbone 134 includes an electrode current collector 136 having a conductivity of at least about $10^3$ Siemens/cm. By way of further example, in one such embodiment, electrode structure backbone 134 includes an electrode current collector 136 having a conductivity of at least about $10^4$ Siemens/cm. By way of further example, in one such embodiment, electrode structure backbone 134 includes an electrode current collector 136 having a conductivity of at least about $10^5$ Siemens/cm. In other embodiments, electrode structure backbone 134 is relatively nonconductive. For example, in one embodiment, electrode structure backbone 134 has an electrical conductivity of less than 10 Siemens/cm. By way of further example, in one embodiment, electrode structure backbone 134 has an electrical conductivity of less than 1 Siemens/cm. By way of further example, in one embodiment, electrode structure backbone 134 has an electrical conductivity of less than $10^{-1}$ Siemens/cm.

In certain embodiments, electrode structure backbone 134 may include any material that may be shaped, such as metals, semiconductors, organics, ceramics, and glasses. For example, in certain embodiments, materials include semiconductor materials such as silicon and germanium. Alternatively, however, carbon-based organic materials, or metals, such as aluminum, copper, nickel, cobalt, titanium, and tungsten, may also be incorporated into electrode structure backbone 134. In one exemplary embodiment, electrode structure backbone 134 comprises silicon. The silicon, for example, may be single crystal silicon, polycrystalline silicon, amorphous silicon, or a combination thereof.

In certain embodiments, the electrode active material layer 132 may have a thickness of at least one micrometer. Typically, however, the electrode active material layer 132 thickness will not exceed 200 micrometers. For example, in one embodiment, the electrode active material layer 132 may have a thickness of about 1 to 50 micrometers. By way of further example, in one embodiment, the electrode active material layer 132 may have a thickness of about 2 to about 75 micrometers. By way of further example, in one embodiment, the electrode active material layer 132 may have a thickness of about 10 to about 100 micrometers. By way of further example, in one embodiment, the electrode active material layer 132 may have a thickness of about 5 to about 50 micrometers.

In certain embodiments, the electrode current collector 136 includes an ionically permeable conductor material that has sufficient ionic permeability to carrier ions to facilitate the movement of carrier ions from the separator 130 to the electrode active material layer 132, and sufficient electrical conductivity to enable it to serve as a current collector. Being positioned between the electrode active material layer 132 and the separator 130, the electrode current collector 136 may facilitate more uniform carrier ion transport by distributing current from the electrode current collector 136 across the surface of the electrode active material layer 132. This, in turn, may facilitate more uniform insertion and extraction of carrier ions and thereby reduce stress in the electrode active material layer 132 during cycling; since the electrode current collector 136 distributes current to the surface of the electrode active material layer 132 facing the separator 130, the reactivity of the electrode active material layer 132 for carrier ions will be the greatest where the carrier ion concentration is the greatest.

The electrode current collector 136 includes an ionically permeable conductor material that is both ionically and electrically conductive. Stated differently, the electrode current collector 136 has a thickness, an electrical conductivity, and an ionic conductivity for carrier ions that facilitates the movement of carrier ions between an immediately adjacent electrode active material layer 132 on one side of the ionically permeable conductor layer and an immediately adjacent separator layer 130 on the other side of the electrode current collector 136 in an electrochemical stack or electrode assembly 106. On a relative basis, the electrode current collector 136 has an electrical conductance that is greater than its ionic conductance when there is an applied current to store energy in the device 100 or an applied load to discharge the device 100. For example, the ratio of the electrical conductance to the ionic conductance (for carrier ions) of the electrode current collector 136 will typically be at least 1,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 is at least 5,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 is at least 10,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 layer is at least 50,000:1, respectively, when there is an applied current to store energy in the device 100 or an applied load to discharge the device 100. By way of further example, in one such embodiment, the ratio of the electrical conductance to the ionic conductance (for carrier ions) of the electrode current collector 136 is at least 100,000:1, respectively, when there is an applied current to store energy in the device 100 or an applied load to discharge the device 100.

In one embodiment, and when there is an applied current to store energy in the device 100 or an applied load to discharge the device 100, such as when a secondary battery 102 is charging or discharging, the electrode current collector 136 has an ionic conductance that is comparable to the ionic conductance of an adjacent separator layer 130. For example, in one embodiment, the electrode current collector 136 has an ionic conductance (for carrier ions) that is at least 50% of the ionic conductance of the separator layer 130 (i.e., a ratio of 0.5:1, respectively) when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 1:1 when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 1.25:1 when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 1.5:1 when there is an applied current to store energy in the device 100 or an applied load to discharge the device 100. By way of further example, in some embodiments, the ratio of the ionic conductance (for carrier ions) of the electrode current collector 136 to the ionic conductance (for carrier ions) of the separator layer 130 is at least 2:1 when there is an applied current to store energy in the device 100 or an applied load to discharge the device 100.

In one embodiment, the electrode current collector 136 also has an electrical conductance that is substantially greater than the electrical conductance of the electrode active material layer 132. For example, in one embodiment, the ratio of the electrical conductance of the electrode current collector 136 to the electrical conductance of the electrode active material layer 132 is at least 100:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 500:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 1000:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 5000:1 when there is an applied current to store energy in the device 100 or an applied load to discharge the device 100. By way of further example, in some embodiments, the ratio of the electrical conductance of the electrode current collector 136 to the electrical conductance of the electrode active material layer 132 is at least 10,000:1 when there is an applied current to store energy in the device 100 or an applied load to discharge the device 100.

The thickness of the electrode current collector layer 136 (i.e., the shortest distance between the separator 130 and, in one embodiment, the anodically active material layer (e.g., electrode active material layer 132) between which the electrode current collector layer 136 is sandwiched) in certain embodiments will depend upon the composition of the layer 136 and the performance specifications for the electrochemical stack. In general, when an electrode current collector layer 136 is an ionically permeable conductor layer, it will have a thickness of at least about 300 Angstroms. For example, in some embodiments, it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the electrode current collector layer 136 will have a thickness in the range of about 0.1 to about 10 micrometers. By way of further example, in some embodiments, the electrode current collector layer 136 will have a thickness in the range of about 0.1 to about 5 micrometers. By way of further example, in some embodiments, the electrode current collector layer 136 will have a thickness in the range of about 0.5 to about 3 micrometers. In general, it is preferred that the thickness of the electrode current collector layer 136 be approximately uniform. For example, in one embodiment, it is preferred that the electrode current collector layer 136 have a thickness non-uniformity of less than about 25%. In certain embodiments, the thickness variation is even less. For example, in some embodiments, the electrode current collector layer 136 has a thickness non-uniformity of less than about 20%. By way of further example, in some embodiments, the electrode current collector layer 136 has a thickness non-uniformity of less than about 15%. In some embodiments the ionically permeable conductor layer has a thickness non-uniformity of less than about 10%.

In one embodiment, the electrode current collector layer 136 is an ionically permeable conductor layer including an electrically conductive component and an ion conductive component that contribute to the ionic permeability and electrical conductivity. Typically, the electrically conductive component will include a continuous electrically conductive material (e.g., a continuous metal or metal alloy) in the form of a mesh or patterned surface, a film, or composite material comprising the continuous electrically conductive material (e.g., a continuous metal or metal alloy). Additionally, the ion conductive component will typically comprise pores, for example, interstices of a mesh, spaces between a patterned metal or metal alloy containing material layer, pores in a metal film, or a solid ion conductor having sufficient diffusivity for carrier ions. In certain embodiments, the ionically permeable conductor layer includes a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 7, electrode current collector layer 136 is the sole anode current collector for electrode active material layer 132. Stated differently, electrode structure backbone 134 may include an anode current collector. In certain other embodiments, however, electrode structure backbone 134 may optionally not include an anode current collector.

Population of Counter-Electrode Structures

Referring again to FIG. 7, each member of the population of counter-electrode structures 112 may also include a top 1068 adjacent to the first secondary growth constraint 158, a bottom 1070 adjacent to the second secondary growth constraint 160, and a lateral surface (not marked) surrounding a vertical axis $A_{CES}$ (not marked) parallel to the Z axis, the lateral surface connecting the top 1068 and the bottom 1070. The counter-electrode structures 112 further include a length $L_{CES}$, a width $W_{CES}$, and a height $H_{CES}$. The length $L_{CES}$ being bounded by the lateral surface and measured along the X axis. The width $W_{CES}$ being bounded by the lateral surface and measured along the Y axis, and the height $H_{CES}$ being measured along the vertical axis $A_{CES}$ or the Z axis from the top 1068 to the bottom 1070.

The $L_{CES}$ of the members of the counter-electrode population 112 will vary depending upon the energy storage device 100 or the secondary battery 102 and their intended use(s). In general, however, the members of the counter-electrode population 112 will typically have a $L_{CES}$ in the range of about 5 mm to about 500 mm. For example, in one such embodiment, the members of the counter-electrode population 112 have a $L_{CES}$ of about 10 mm to about 250 mm. By way of further example, in one such embodiment, the members of the counter-electrode population 112 have a $L_{CES}$ of about 25 mm to about 100 mm.

The $W_{CES}$ of the members of the counter-electrode population 112 will also vary depending upon the energy storage device 100 or the secondary battery 102 and their intended use(s). In general, however, each member of the counter-electrode population 112 will typically have a $W_{CES}$ within the range of about 0.01 mm to 2.5 mm. For example, in one embodiment, the $W_{CES}$ of each member of the counter-electrode population 112 will be in the range of about 0.025 mm to about 2 mm. By way of further example, in one embodiment, the $W_{CES}$ of each member of the counter-electrode population 112 will be in the range of about 0.05 mm to about 1 mm.

The $H_{CES}$ of the members of the counter-electrode population 112 will also vary depending upon the energy storage device 100 or the secondary battery 102 and their intended use(s). In general, however, members of the counter-electrode population 112 will typically have a $H_{CES}$ within the range of about 0.05 mm to about 10 mm. For example, in one embodiment, the $H_{CES}$ of each member of the counter-electrode population 112 will be in the range of about 0.05 mm to about 5 mm. By way of further example, in one embodiment, the $H_{CES}$ of each member of the electrode population 112 will be in the range of about 0.1 mm to about 1 mm.

In another embodiment, each member of the population of counter-electrode structures 112 may include a counter-electrode structure backbone 141 having a vertical axis $A_{CESB}$ parallel to the Z axis. The counter-electrode structure backbone 141 may also include a layer of counter-electrode active material 138 surrounding the counter-electrode structure backbone 141 about the vertical axis $A_{CESB}$. Stated alternatively, the counter-electrode structure backbone 141 provides mechanical stability for the layer of counter-electrode active material 138, and may provide a point of attachment for the primary growth constraint system 151 and/or secondary growth constraint system 152. In certain embodiments, the layer of counter-electrode active material 138 expands upon insertion of carrier ions into the layer of counter-electrode active material 138, and contracts upon extraction of carrier ions from the layer of counter-electrode active material 138. For example, in one embodiment, the layer of counter-electrode active material 138 may be anodically active. By way of further example, in one embodiment, the layer of counter-electrode active material 138 may be cathodically active. The counter-electrode structure backbone 141 may also include a top 1072 adjacent to the first secondary growth constraint 158, a bottom 1074 adjacent to the second secondary growth constraint 160, and a lateral surface (not marked) surrounding the vertical axis $A_{CESB}$ and connecting the top 1072 and the bottom 1074. The counter-electrode structure backbone 141 further includes a length $L_{CESB}$, a width $W_{CESB}$, and a height $H_{CESB}$. The length $L_{CESB}$ being bounded by the lateral surface and measured along the X axis. The width $W_{CESB}$ being bounded by the lateral surface and measured along the Y axis, and the height $H_{CESB}$ being measured along the Z axis from the top 1072 to the bottom 1074.

The $L_{CESB}$ of the counter-electrode structure backbone 141 will vary depending upon the energy storage device 100 or the secondary battery 102 and their intended use(s). In general, however, the counter-electrode structure backbone 141 will typically have a $L_{CESB}$ in the range of about 5 mm to about 500 mm. For example, in one such embodiment, the counter-electrode structure backbone 141 will have a $L_{CESB}$ of about 10 mm to about 250 mm. By way of further example, in one such embodiment, the counter-electrode structure backbone 141 will have a $L_{CESB}$ of about 20 mm to about 100 mm.

The $W_{CESB}$ of the counter-electrode structure backbone 141 will also vary depending upon the energy storage device 100 or the secondary battery 102 and their intended use(s). In general, however, each counter-electrode structure backbone 141 will typically have a $W_{CESB}$ of at least 1 micrometer. For example, in one embodiment, the $W_{CESB}$ of each counter-electrode structure backbone 141 may be substantially thicker, but generally will not have a thickness in excess of 500 micrometers. By way of further example, in one embodiment, the $W_{CESB}$ of each counter-electrode structure backbone 141 will be in the range of about 1 to about 50 micrometers.

The $H_{CESB}$ of the counter-electrode structure backbone 141 will also vary depending upon the energy storage device 100 or the secondary battery 102 and their intended use(s). In general, however, the counter-electrode structure backbone 141 will typically have a $H_{CESB}$ of at least about 50 micrometers, more typically at least about 100 micrometers. Further, in general, the counter-electrode structure backbone 141 will typically have a $H_{CESB}$ of no more than about 10,000 micrometers, and more typically no more than about 5,000 micrometers. For example, in one embodiment, the $H_{CESB}$ of each counter-electrode structure backbone 141 will be in the range of about 0.05 mm to about 10 mm. By way of further example, in one embodiment, the $H_{CESB}$ of each counter-electrode structure backbone 141 will be in the range of about 0.05 mm to about 5 mm. By way of further example, in one embodiment, the $H_{CESB}$ of each counter-electrode structure backbone 141 will be in the range of about 0.1 mm to about 1 mm.

Depending upon the application, counter-electrode structure backbone 141 may be electrically conductive or insulating. For example, in one embodiment, the counter-electrode structure backbone 141 may be electrically conductive and may include counter-electrode current collector 140 for counter-electrode active material 138. In one such embodiment, counter-electrode structure backbone 141 includes a counter-electrode current collector 140 having a conductivity of at least about $10^3$ Siemens/cm. By way of further example, in one such embodiment, counter-electrode structure backbone 141 includes a counter-electrode current collector 140 having a conductivity of at least about $10^4$ Siemens/cm. By way of further example, in one such embodiment, counter-electrode structure backbone 141 includes a counter-electrode current collector 140 having a conductivity of at least about $10^5$ Siemens/cm. In other embodiments, counter-electrode structure backbone 141 is relatively nonconductive. For example, in one embodiment, counter-electrode structure backbone 141 has an electrical conductivity of less than 10 Siemens/cm. By way of further example, in one embodiment, counter-electrode structure backbone 141 has an electrical conductivity of less than 1 Siemens/cm. By way of further example, in one embodiment, counter-electrode structure backbone 141 has an electrical conductivity of less than $10^{-1}$ Siemens/cm.

In certain embodiments, counter-electrode structure backbone 141 may include any material that may be shaped, such as metals, semiconductors, organics, ceramics, and glasses. For example, in certain embodiments, materials include semiconductor materials such as silicon and germanium. Alternatively, however, carbon-based organic materials, or metals, such as aluminum, copper, nickel, cobalt, titanium, and tungsten, may also be incorporated into counter-electrode structure backbone 141. In one exemplary embodiment, counter-electrode structure backbone 141 comprises silicon. The silicon, for example, may be single crystal silicon, polycrystalline silicon, amorphous silicon, or a combination thereof.

In certain embodiments, the counter-electrode active material layer 138 may have a thickness of at least one micrometer. Typically, however, the counter-electrode active material layer 138 thickness will not exceed 200 micrometers. For example, in one embodiment, the counter-electrode active material layer 138 may have a thickness of about 1 to 50 micrometers. By way of further example, in one embodiment, the counter-electrode active material layer 138 may have a thickness of about 2 to about 75 micrometers. By way of further example, in one embodiment, the counter-electrode active material layer 138 may have a thickness of about 10 to about 100 micrometers. By way of further example, in one embodiment, the counter-electrode active material layer 138 may have a thickness of about 5 to about 50 micrometers.

In certain embodiments, the counter-electrode current collector 140 includes an ionically permeable conductor that has sufficient ionic permeability to carrier ions to facilitate the movement of carrier ions from the separator 130 to the counter-electrode active material layer 138, and sufficient electrical conductivity to enable it to serve as a current collector. Whether or not positioned between the counter-electrode active material layer 138 and the separator 130, the counter-electrode current collector 140 may facilitate more uniform carrier ion transport by distributing current from the counter-electrode current collector 140 across the surface of the counter-electrode active material layer 138. This, in turn, may facilitate more uniform insertion and extraction of carrier ions and thereby reduce stress in the counter-electrode active material layer 138 during cycling; since the counter-electrode current collector 140 distributes current to the surface of the counter-electrode active material layer 138 facing the separator 130, the reactivity of the counter-electrode active material layer 138 for carrier ions will be the greatest where the carrier ion concentration is the greatest.

The counter-electrode current collector 140 includes an ionically permeable conductor material that is both ionically and electrically conductive. Stated differently, the counter-electrode current collector 140 has a thickness, an electrical conductivity, and an ionic conductivity for carrier ions that facilitates the movement of carrier ions between an immediately adjacent counter-electrode active material layer 138 on one side of the ionically permeable conductor layer and an immediately adjacent separator layer 130 on the other side of the counter-electrode current collector 140 in an electrochemical stack or electrode assembly 106. On a relative basis, the counter-electrode current collector 140 has an electrical conductance that is greater than its ionic conductance when there is an applied current to store energy in the device 100 or an applied load to discharge the device 100. For example, the ratio of the electrical conductance to the ionic conductance (for carrier ions) of the counter-electrode current collector 140 will typically be at least 1,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 is at least 5,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 is at least 10,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 layer is at least 50,000:1, respectively, when there is an applied current to store energy in the device 100 or an applied load to discharge the device 100. By way of further example, in one such embodiment, the ratio of the electrical conductance to the ionic conductance (for carrier ions) of the counter-electrode current collector 140 is at least 100,000:1, respectively, when there is an applied current to store energy in the device 100 or an applied load to discharge the device 100.

In one embodiment, and when there is an applied current to store energy in the device 100 or an applied load to discharge the device 100, such as when an energy storage device 100 or a secondary battery 102 is charging or discharging, the counter-electrode current collector 140 has an ionic conductance that is comparable to the ionic conductance of an adjacent separator layer 130. For example, in one embodiment, the counter-electrode current collector 140 has an ionic conductance (for carrier ions) that is at least 50% of the ionic conductance of the separator layer 130 (i.e., a ratio of 0.5:1, respectively) when there is an applied current to store energy in the device 100 or an applied load to discharge the device 100. By way of further example, in some embodiments, the ratio of the ionic conductance (for carrier ions) of the counter-electrode current collector 140 to the ionic conductance (for carrier ions) of the separator layer 130 is at least 1:1 when there is an applied current to store energy in the device 100 or an applied load to discharge the device 100. By way of further example, in some embodiments, the ratio of the ionic conductance (for carrier ions) of the counter-electrode current collector 140 to the ionic conductance (for carrier ions) of the separator layer 130 is at least 1.25:1 when there is an applied current to store energy in the device 100 or an applied load to discharge the device 100. By way of further example, in some embodiments, the ratio of the ionic conductance (for carrier ions) of the counter-electrode current collector 140 to the ionic conductance (for carrier ions) of the separator layer 130 is at least 1.5:1 when there is an applied current to store energy in the device 100 or an applied load to discharge the device 100. By way of further example, in some embodiments, the ratio of the ionic conductance (for carrier ions) of the counter-electrode current collector 140 to the ionic conductance (for (anode current collector layer) carrier ions) of the separator layer 130 is at least 2:1 when there is an applied current to store energy in the device 100 or an applied load to discharge the device 100.

In one embodiment, the counter-electrode current collector 140 also has an electrical conductance that is substantially greater than the electrical conductance of the counter-electrode active material layer 138. For example, in one embodiment, the ratio of the electrical conductance of the counter-electrode current collector 140 to the electrical conductance of the counter-electrode active material layer 138 is at least 100:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 500:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 1000:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 5000:1 when there is an applied current to store energy in the device 100 or an applied load to discharge the device 100. By way of further example, in some embodiments, the ratio of the electrical conductance of the counter-electrode current collector 140 to the electrical conductance of the counter-electrode active material layer 138 is at least 10,000:1 when there is an applied current to store energy in the device 100 or an applied load to discharge the device 100.

The thickness of the counter-electrode current collector layer 140 (i.e., the shortest distance between the separator 130 and, in one embodiment, the cathodically active material layer (e.g., counter-electrode active material layer 138) between which the counter-electrode current collector layer 140 is sandwiched) in certain embodiments will depend upon the composition of the layer 140 and the performance specifications for the electrochemical stack. In general, when an counter-electrode current collector layer 140 is an ionically permeable conductor layer, it will have a thickness of at least about 300 Angstroms. For example, in some embodiments, it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the counter-electrode current collector layer 140 will have a thickness in the range of about 0.1 to about 10 micrometers. By way of further example, in some embodiments, the counter-electrode current collector layer 140 will have a thickness in the range of about 0.1 to about 5 micrometers. By way of further example, in some embodiments, the counter-electrode current collector layer 140 will have a thickness in the range of about 0.5 to about 3 micrometers. In general, it is preferred that the thickness of the counter-electrode current collector layer 140 be approximately uniform. For example, in one embodiment, it is preferred that the counter-electrode current collector layer 140 have a thickness non-uniformity of less than about 25%. In certain embodiments, the thickness variation is even less. For example, in some embodiments, the counter-electrode current collector layer 140 has a thickness non-uniformity of less than about 20%. By way of further example, in some embodiments, the counter-electrode current collector layer 140 has a thickness non-uniformity of less than about 15%. In some embodiments, the counter-electrode current collector layer 140 has a thickness non-uniformity of less than about 10%.

In one embodiment, the counter-electrode current collector layer 140 is an ionically permeable conductor layer including an electrically conductive component and an ion conductive component that contributes to the ionic permeability and electrical conductivity. Typically, the electrically conductive component will include a continuous electrically conductive material (e.g., a continuous metal or metal alloy) in the form of a mesh or patterned surface, a film, or composite material comprising the continuous electrically conductive material (e.g., a continuous metal or metal alloy). Additionally, the ion conductive component will typically comprise pores, for example, interstices of a mesh, spaces between a patterned metal or metal alloy containing material layer, pores in a metal film, or a solid ion conductor having sufficient diffusivity for carrier ions. In certain embodiments, the ionically permeable conductor layer includes a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

In the embodiment illustrated in FIG. 7, counter-electrode current collector layer 140 is the sole cathode current collector for counter-electrode active material layer 138. Stated differently, counter-electrode structure backbone 141 may include a cathode current collector 140. In certain other embodiments, however, counter-electrode structure backbone 141 may optionally not include a cathode current collector 140.

In one embodiment, first secondary growth constraint 158 and second secondary growth constraint 160 each may include an inner surface 1060 and 1062, respectively, and an opposing outer surface 1064 and 1066, respectively, separated along the z-axis thereby defining a first secondary growth constraint 158 height $H_{158}$ and a second secondary growth constraint 160 height $H_{160}$. According to aspects of the disclosure, increasing the heights of either the first and/or second secondary growth constraints 158, 160, respectively, can increase the stiffness of the constraints, but can also require increased volume, thus causing a reduction in energy density for an energy storage device 100 or a secondary battery 102 containing the electrode assembly 106 and set of constraints 108. Accordingly, the thickness of the constraints 158, 160 can be selected in accordance with the constraint material properties, the strength of the constraint required to offset pressure from a predetermined expansion of an electrode 100, and other factors. For example, in one embodiment, the first and second secondary growth constraint heights $H_{158}$ and $H_{160}$, respectively, may be less than 50% of the height $H_{ES}$. By way of further example, in one embodiment, the first and second secondary growth constraint heights $H_{158}$ and $H_{160}$, respectively, may be less than 25% of the height $H_{ES}$. By way of further example, in one embodiment, the first and second secondary growth constraint heights $H_{158}$ and $H_{160}$, respectively, may be less than 10% of the height $H_{ES}$. By way of further example, in one embodiment, the first and second secondary growth constraint heights $H_{158}$ and $H_{160}$ may be may be less than about 5% of the height $H_{ES}$. In some embodiments, the first secondary growth constraint height $H_{158}$ and the second secondary growth constraint height $H_{160}$ may be different, and the materials used for each of the first and second secondary growth constraints 158, 160 may also be different.

In certain embodiments, the inner surfaces 1060 and 1062 may include surface features amenable to affixing the population of electrode structures 110 and/or the population of counter-electrode structures 112 thereto, and the outer surfaces 1064 and 1066 may include surface features amenable to the stacking of a plurality of constrained electrode assemblies 106 (i.e., inferred within FIG. 7, but not shown for clarity). For example, in one embodiment, the inner surfaces 1060 and 1062 or the outer surfaces 1064 and 1066 may be planar. By way of further example, in one embodiment, the inner surfaces 1060 and 1062 or the outer surfaces 1064 and 1066 may be non-planar. By way of further example, in one embodiment, the inner surfaces 1060 and 1062 and the outer surfaces 1064 and 1066 may be planar. By way of further example, in one embodiment, the inner surfaces 1060 and 1062 and the outer surfaces 1064 and 1066 may be non-planar. By way of further example, in one embodiment, the inner surfaces 1060 and 1062 and the outer surfaces 1064 and 1066 may be substantially planar.

As described elsewhere herein, modes for affixing the at least one secondary connecting member 166 embodied as electrode structures 110 and/or counter-electrodes 112 to the inner surfaces 1060 and 1062 may vary depending upon the energy storage device 100 or secondary battery 102 and their intended use(s). As one exemplary embodiment shown in FIG. 7, the top 1052 and the bottom 1054 of the population of electrode structures 110 (i.e., electrode current collector 136, as shown) and the top 1068 and bottom 1070 of the population of counter-electrode structures 112 (i.e., counter-electrode current collector 140, as shown) may be affixed to the inner surface 1060 of the first secondary growth constraint 158 and the inner surface 1062 of the second secondary growth constraint 160 via a layer of glue 182. Similarly, a top 1076 and a bottom 1078 of the first primary growth constraint 154, and a top 1080 and a bottom 1082 of the second primary growth constraint 156 may be affixed to the inner surface 1060 of the first secondary growth constraint 158 and the inner surface 1062 of the second secondary growth constraint 160 via a layer of glue 182.

Stated alternatively, in the embodiment shown in FIG. 7, the top 1052 and the bottom 1054 of the population of electrode structures 110 include a height $H_{ES}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment. In addition, the top 1068 and the bottom 1070 of the population of counter-electrode structures 112 include a height $H_{CES}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment.

Further, in another exemplary embodiment, a top 1056 and a bottom 1058 of the electrode backbones 134, and a top 1072 and a bottom 1074 of the counter-electrode backbones 141 may be affixed to the inner surface 1060 of the first secondary growth constraint 158 and the inner surface 1062 of the second secondary growth constraint 160 via a layer of glue 182 (not illustrated). Similarly, a top 1076 and a bottom 1078 of the first primary growth constraint 154, and a top 1080 and a bottom 1082 of the second primary growth constraint 156 may be affixed to the inner surface 1060 of the first secondary growth constraint 158 and the inner surface 1062 of the second secondary growth constraint 160 via a layer of glue 182 (not illustrated with respect to the embodiment described in this paragraph). Stated alternatively, the top 1056 and the bottom 1058 of the electrode backbones 134 include a height $H_{ESB}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment. In addition, the top 1072 and the bottom 1074 of the counter-electrode backbones 141 include a height $H_{CESB}$ that effectively meets both the inner surface 1060 of the first secondary growth constraint 158 and the inner surface 1062 of the second secondary growth constraint 160, and may be affixed to the inner surface 1060 of the first secondary growth constraint 158 and the inner surface 1062 of the second secondary growth constraint 160 via a layer of glue 182 in a flush embodiment.

Accordingly, in one embodiment, at least a portion of the population of electrode 110 and/or counter electrode structures 112, and/or the separator 130 may serve as one or more secondary connecting members 166 to connect the first and second secondary growth constraints 158, 160, respectively, to one another in a secondary growth constraint system 152, thereby providing a compact and space-efficient constraint system to restrain growth of the electrode assembly 106 during cycling thereof. According to one embodiment, any portion of the electrode 110 and/or counter-electrode structures 112, and/or separator 130 may serve as the one or more secondary connecting members 166, with the exception of any portion of the electrode 110 and/or counter-electrode structure 112 that swells in volume with charge and discharge cycles. That is, that portion of the electrode 110 and/or counter-electrode structure 112, such as the electrode active material 132, that is the cause of the volume change in the electrode assembly 106, typically will not serve as a part of the set of electrode constraints 108. In one embodiment, first and second primary growth constraints 154, 156, respectively, provided as a part of the primary growth constraint system 151 further inhibit growth in a longitudinal direction, and may also serve as secondary connecting members 166 to connect the first and second secondary growth constraints 158, 160, respectively, of the secondary growth constraint system 152, thereby providing a cooperative, synergistic constraint system (i.e., set of electrode constraints 108) for restraint of electrode growth/swelling.

Connections via Counter-Electrode Structures

Figure 9A:
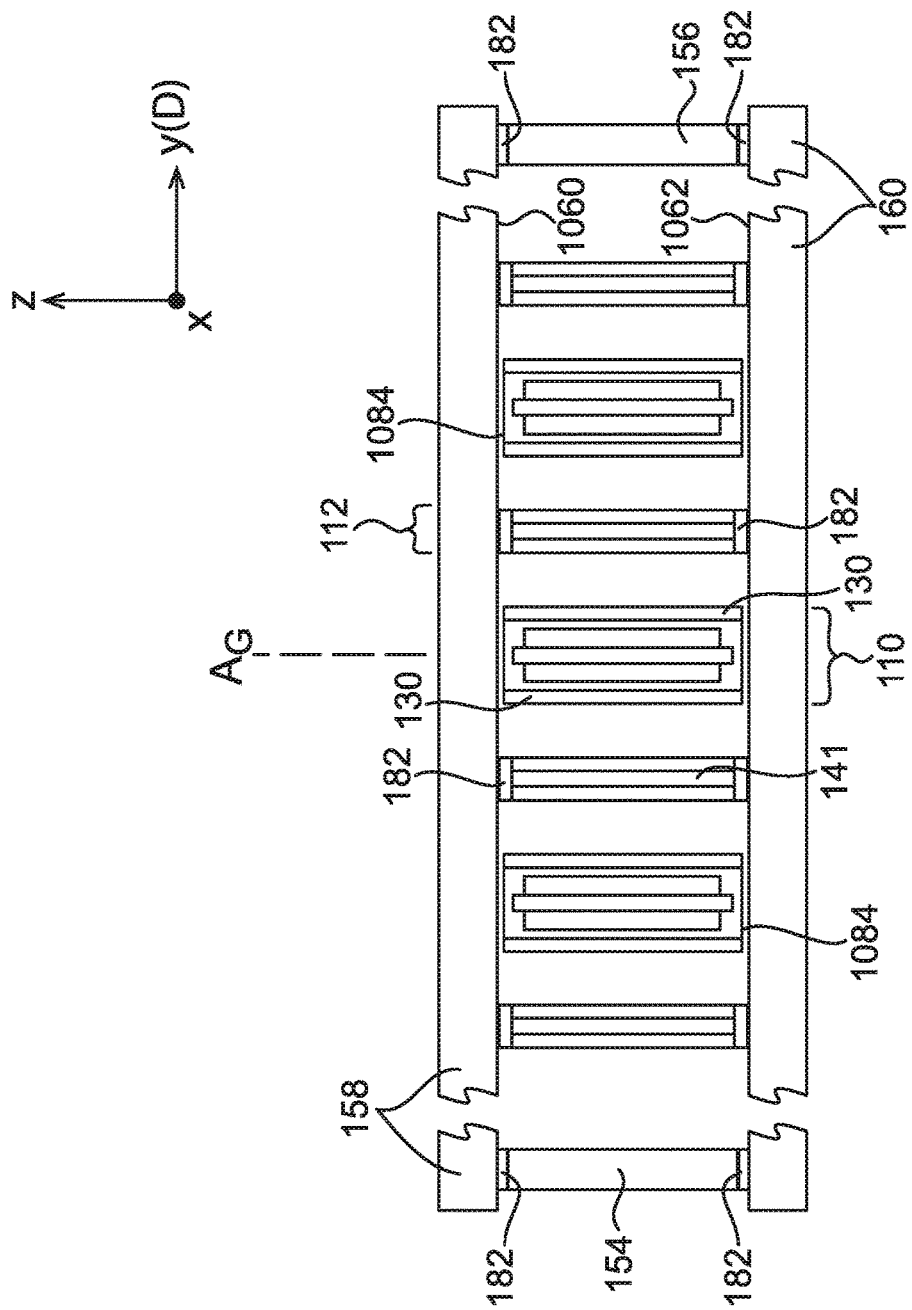
FIG. 9A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the counter-electrode backbones are used for assembling the set of electrode constraints.
Figure 9B:
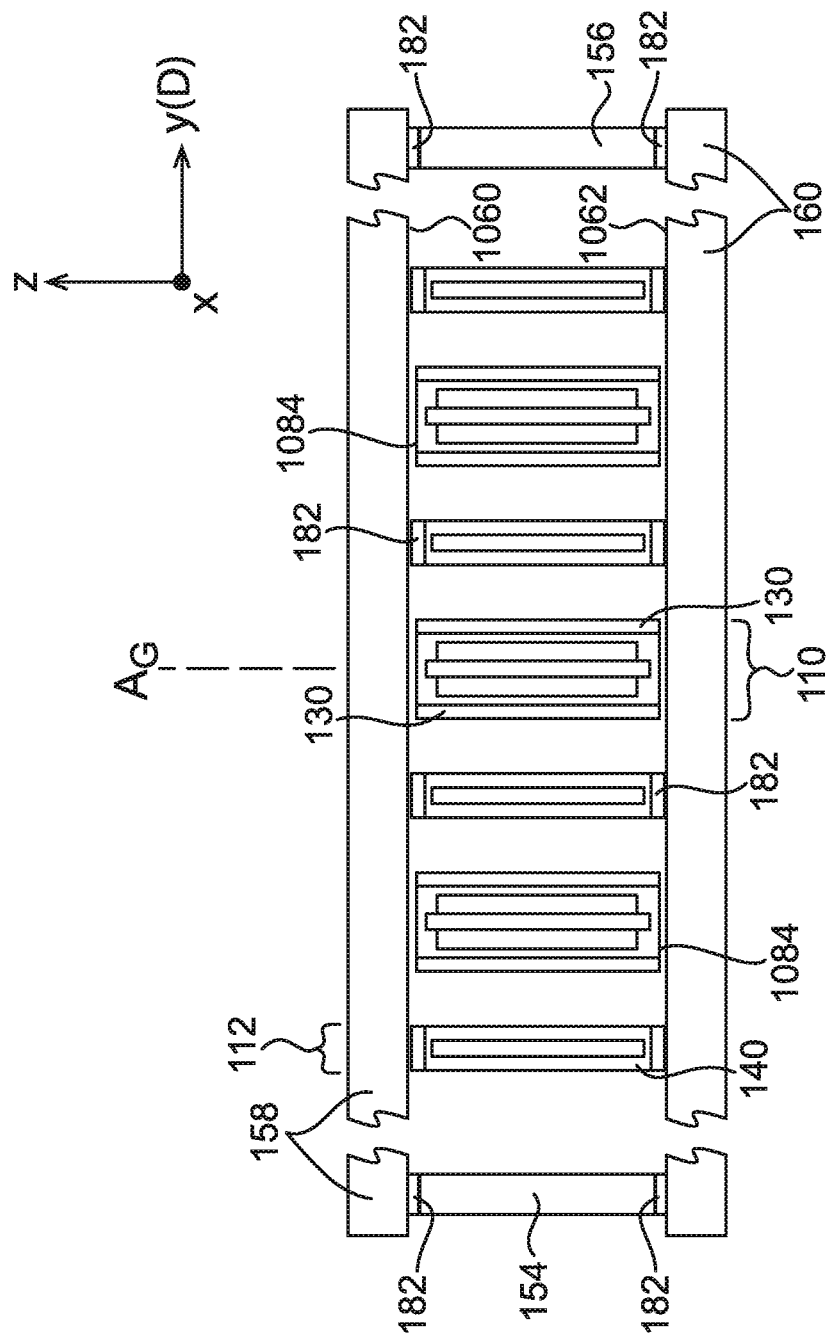
FIG. 9B illustrates a cross-section of an embodiment of the electrode assembly taken along the line A-A' as shown in FIG. 1, further including a set of electrode constraints, including another embodiment of a primary growth constraint system and another embodiment of a secondary growth constraint system where the counter-electrode current collectors are used for assembling the set of electrode constraints.
Figure 9C:
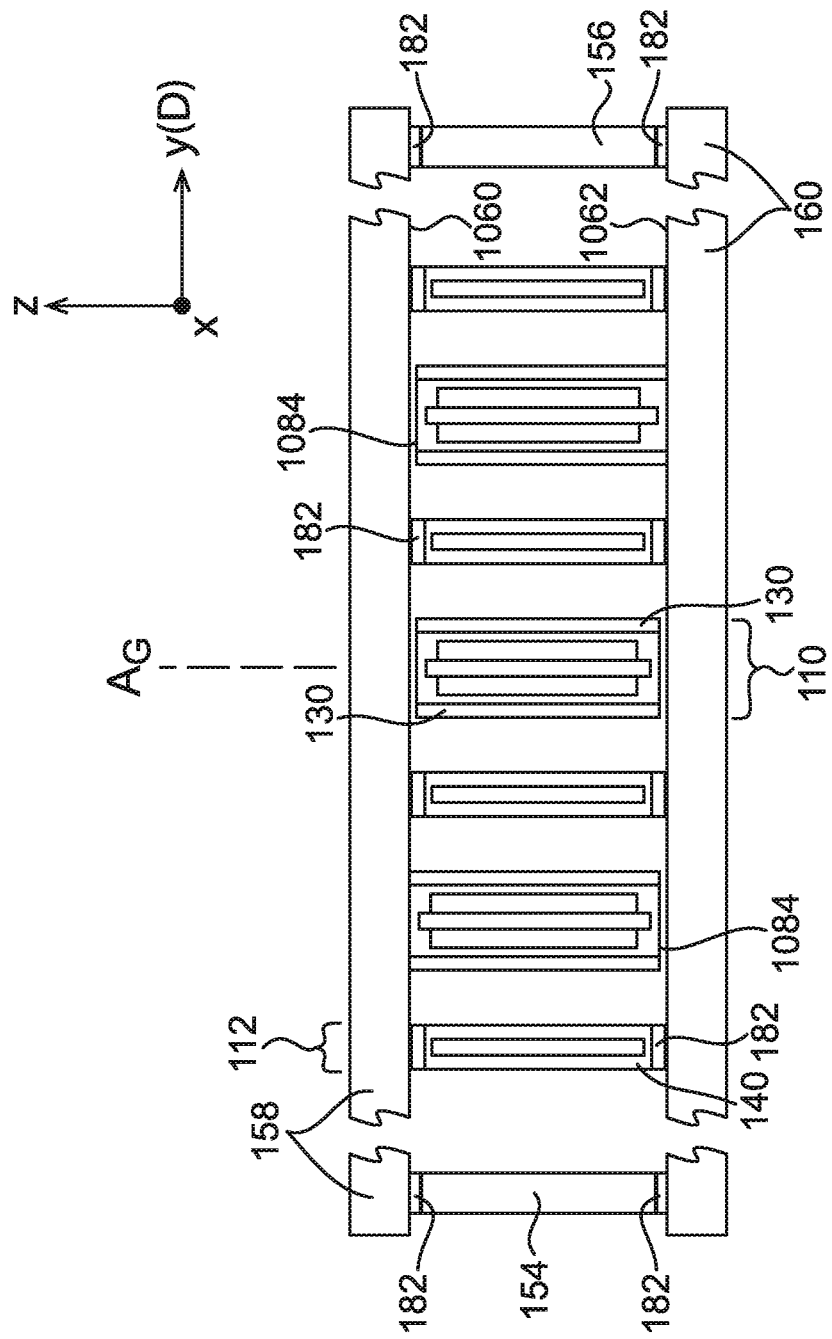
FIG. 9C illustrates a cross-section of an embodiment of the electrode assembly taken along the line A-A' as shown in FIG. 1, further including a set of electrode constraints, including yet another embodiment of a primary growth constraint system and yet another embodiment of a secondary growth constraint system where the counter-electrode current collectors are used for assembling the set of electrode constraints.

Referring now to FIGS. 9A-9C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, and co-parallel with the Y axis. More specifically, FIGS. 9A-9C each show a cross section, along the line A-A' as in FIG. 1, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 9A-9C, non-affixed electrode structures 110 may include electrode gaps 1084 between their tops and the first secondary growth constraint 158, and their bottoms and the second secondary growth constraint 160. Stated alternatively, in certain embodiments, the top and the bottom 1052, 1054, respectively, of each electrode structure 110 may have a gap between the first and second secondary growth constraints 158, 160, respectively. Further, in certain embodiments as shown in FIG. 9C, the top 1052 of the electrode structure 110 may be in contact with, but not affixed to, the first secondary growth constraint 158, the bottom 1054 of the electrode structure 110 may be in contact with, but not affixed to, the second secondary growth constraint 160, or the top 1052 of the electrode structure 110 may be in contact with, but not affixed to, the first secondary growth constraint 158 and the bottom 1054 of the electrode structure 110 may in in contact with, but not affixed to, the second secondary growth constraint 160 (not illustrated).

More specifically, in one embodiment, as shown in FIG. 9A, a plurality of counter-electrode backbones 141 may be affixed to the inner surface 1160 of the first secondary growth constraint 158 and the inner surface 1062 of the second secondary growth constraint 160 via a layer of glue 182. In certain embodiments, the plurality of counter-electrode backbones 112 affixed to the first and second secondary growth constraints 158, 160, respectively, may include a symmetrical pattern about a gluing axis $A_G$ with respect to affixed counter-electrode backbones 141. In certain embodiments, the plurality of counter-electrode backbones 141 affixed to the first and second secondary growth constraints 158, 160, respectively, may include an asymmetric or random pattern about a gluing axis $A_G$ with respect to affixed counter-electrode backbones 141.

In one exemplary embodiment, a first symmetric attachment pattern unit may include two counter-electrode backbones 141 affixed to the first secondary growth constraint 158 and the second secondary growth constraint 160, as above, where the two affixed counter-electrode backbones 141 flank one electrode structure 110. Accordingly, the first symmetric attachment pattern unit may repeat, as needed, along the stacking direction D depending upon the energy storage device 100 or the secondary battery 102 and the intended use(s) thereof. In another exemplary embodiment, a second symmetric attachment pattern unit may include two counter-electrode backbones 141 affixed to the first secondary growth constraint 158 and the second secondary growth constraint 160, as above, the two affixed counter-electrode backbones 141 flanking two or more electrode structures 110 and one or more non-affixed counter-electrode backbones 141. Accordingly, the second symmetric attachment pattern unit may repeat, as needed, along the stacking direction D depending upon the energy storage device 100 or the secondary battery 102 and the intended use(s) thereof. Other exemplary symmetric attachment pattern units have been contemplated, as would be appreciated by a person having skill in the art.

In one exemplary embodiment, a first asymmetric or random attachment pattern may include two or more counter-electrode backbones 141 affixed to the first secondary growth constraint 158 and the second secondary growth constraint 160, as above, where the two or more affixed counter-electrode backbones 141 may be individually designated as affixed counter-electrode backbone 141A, affixed counter-electrode backbone 141B, affixed counter-electrode backbone 141C, and affixed counter-electrode backbone 141D. Affixed counter-electrode backbone 141A and affixed counter-electrode backbone 141B may flank (1+x) electrode structures 110, affixed counter-electrode backbone 141B and affixed counter-electrode backbone 141C may flank (1+y) electrode structures 110, and affixed counter-electrode backbone 141C and affixed counter-electrode backbone 141 D may flank (1+z) electrode structures 110, wherein the total amount of electrode structures 110 (i.e., x, y, or z) between any two affixed counter-electrode backbones 141A-141D are non-equal (i.e., x≠y≠z) and may be further separated by non-affixed counter-electrode backbones 141. Stated alternatively, any number of counter-electrode backbones 141 may be affixed to the first secondary growth constraint 158 and the second secondary growth constraint 160, as above, whereby between any two affixed counter-electrode backbones 141 may include any non-equivalent number of electrode structures 110 separated by non-affixed counter-electrode backbones 141. Other exemplary asymmetric or random attachment patterns have been contemplated, as would be appreciated by a person having skill in the art.

More specifically, in one embodiment, as shown in FIG. 9B, a plurality of counter-electrode current collectors 140 may be affixed to the inner surface 1160 of the first secondary growth constraint 158 and the inner surface 1062 of the second secondary growth constraint 160 via a layer of glue 182. In certain embodiments, the plurality of counter-electrode current collectors 140 affixed to the first and second secondary growth constraints 158 and 160 may include a symmetrical pattern about a gluing axis $A_G$ with respect to affixed counter-electrode current collectors 140. In certain embodiments, the plurality of counter-electrode current collectors 140 affixed to the first and second secondary growth constraints 158 and 160, respectively, may include an asymmetric or random pattern about a gluing axis $A_G$ with respect to affixed counter-electrode current collectors 140.

In one exemplary embodiment, a first symmetric attachment pattern unit may include two counter-electrode current collectors 140 affixed to the first secondary growth constraint 158 and the second secondary growth constraint 160, as above, where the two affixed counter-electrode current collectors 140 flank one electrode structure 110. Accordingly, the first symmetric attachment pattern unit may repeat, as needed, along the stacking direction D depending upon the energy storage device 100 or the secondary battery 102 and the intended use(s) thereof. In another exemplary embodiment, a second symmetric attachment pattern unit may include two counter-electrode current collectors 140 affixed to the first secondary growth constraint 158 and the second secondary growth constraint 160, as above, the two affixed counter-electrode current collectors 140 flanking two or more electrode structures 110 and one or more non-affixed counter-electrode current collectors 140. Accordingly, the second symmetric attachment pattern unit may repeat, as needed, along the stacking direction D depending upon the energy storage device 100 or the secondary battery 102 and the intended use(s) thereof. Other exemplary symmetric attachment pattern units have been contemplated, as would be appreciated by a person having skill in the art..

In one exemplary embodiment, a first asymmetric or random attachment pattern may include two or more counter-electrode current collectors 140 affixed to the first secondary growth constraint 158 and the second secondary growth constraint 160, as above, where the two or more affixed counter-electrode current collectors 140 may be individually designated as affixed counter-electrode current collector 140A, affixed counter-electrode current collector 1406, affixed counter-electrode current collector 140C, and affixed counter-electrode current collector 140D. Affixed counter-electrode current collector 140A and affixed counter-electrode structure current collector 140B may flank (1+x) electrode structures 110, affixed counter-electrode current collector 140B and affixed counter-electrode current collector 140C may flank (1+y) electrode structures 110, and affixed counter-electrode current collector 140C and affixed counter-electrode current collector 140D may flank (1+z) electrode structures 110, wherein the total amount of electrode structures 110 (i.e., x, y, or z) between any two affixed counter-electrode current collectors 140A-140D are non-equal (i.e., x≠y≠z) and may be further separated by non-affixed counter-electrode current collectors 140. Stated alternatively, any number of counter-electrode current collectors 140 may be affixed to the first secondary growth constraint 158 and the second secondary growth constraint 160, as above, whereby between any two affixed counter-electrode current collectors 140 may include any non-equivalent number of electrode structures 110 separated by non-affixed counter-electrode current collectors 140. Other exemplary asymmetric or random attachment patterns have been contemplated, as would be appreciated by a person having skill in the art.

Figure 10:
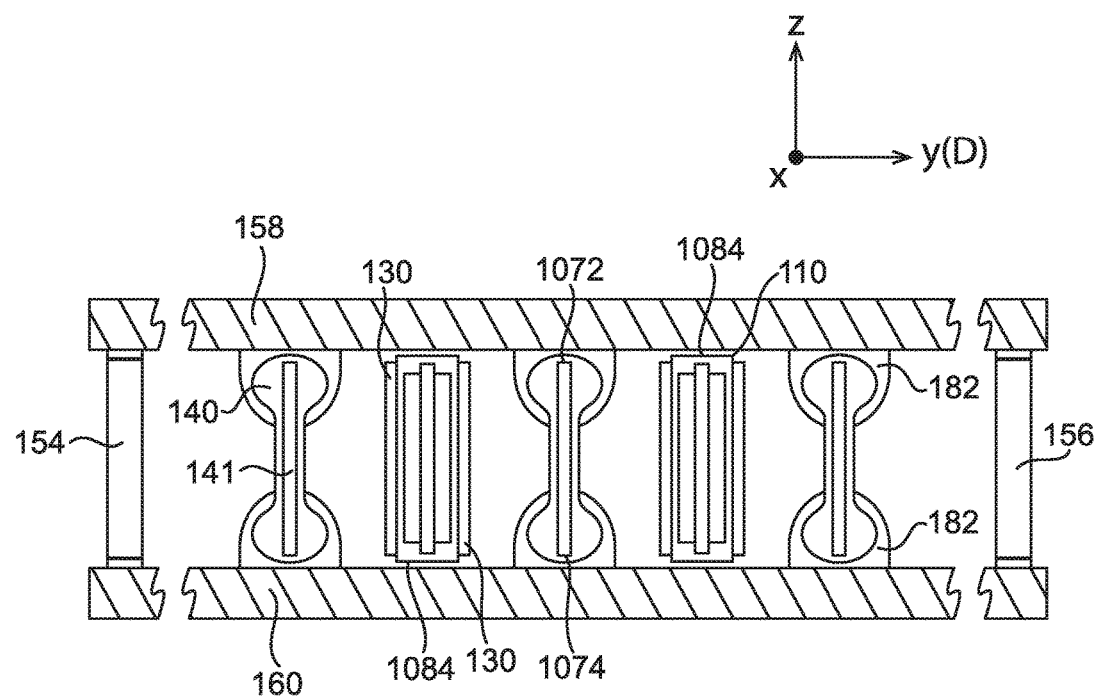
FIG. 10 illustrates a cross-section of an embodiment of the electrode assembly taken along the line A-A' as shown in FIG. 1, further including a set of electrode constraints, including still yet another embodiment of a primary growth constraint system and still yet another embodiment of a secondary growth constraint system where the counter-electrode current collectors are used for assembling the set of electrode constraints.

Referring now to FIG. 10, a Cartesian coordinate system is shown for reference having a vertical axis (Z axis), a longitudinal axis (Y axis), and a transverse axis (X axis); wherein the X axis is oriented as coming out of the plane of the page); and a designation of the stacking direction D, as described above, co-parallel with the Y axis. More specifically, FIG. 10 shows a cross section, along the line A-A' as in FIG. 1, having the first and second primary growth constraints 154, 166, respectively, affixed to the first and second secondary growth constraints 158, 160, respectively, via glue 182, as described above. Further, in one embodiment, illustrated is a plurality of counter-electrode current collectors 140 affixed to the first and second secondary growth constraints 158, 160, respectively, via glue 182. More specifically, the plurality of counter-electrode current collectors 140 may include a bulbous or dogbone shaped cross section. Stated alternatively, the counter-electrode current collectors 140 may have increased current collector 140 width near the top 1072 and the bottom 1074 of the counter-electrode backbone 141 with respect to a width of the current collector 140 near a midpoint between the top 1072 and the bottom 1074 of the counter-electrode backbone 141. That is, the bulbous cross-section of the counter-electrode current collector 140 width towards the top of the current collector 140 may taper towards the middle of the counter-electrode current collector 140, and increase again to provide a bulbous cross-section towards the bottom of the counter-electrode current collector 140. Accordingly, the application of glue 182 may surround the bulbous or dogbone portions of counter-electrode current collector 140 and affix counter-electrode current collector 140 to first and second secondary growth constraints 158, 160, respectively, as described above. In this embodiment, the bulbous or dogbone shaped counter-electrode current collector 140 may provide an increased strength of attachment to the first and second secondary growth constraints 158, 160, respectively, compared to other embodiments described herein. Also illustrated in FIG. 10 are electrode structures 110 with corresponding electrode gaps 1084, each as described above, and separators 130. Further, in this embodiment, the plurality of counter-electrode current collectors 140 may be affixed in a symmetric or asymmetric pattern as described above. Further still, in this embodiment, electrode structures 110 may be in contact with, but not affixed to, the first and second secondary growth constraints 158, 160, respectively, as described above.

Figure 11A:
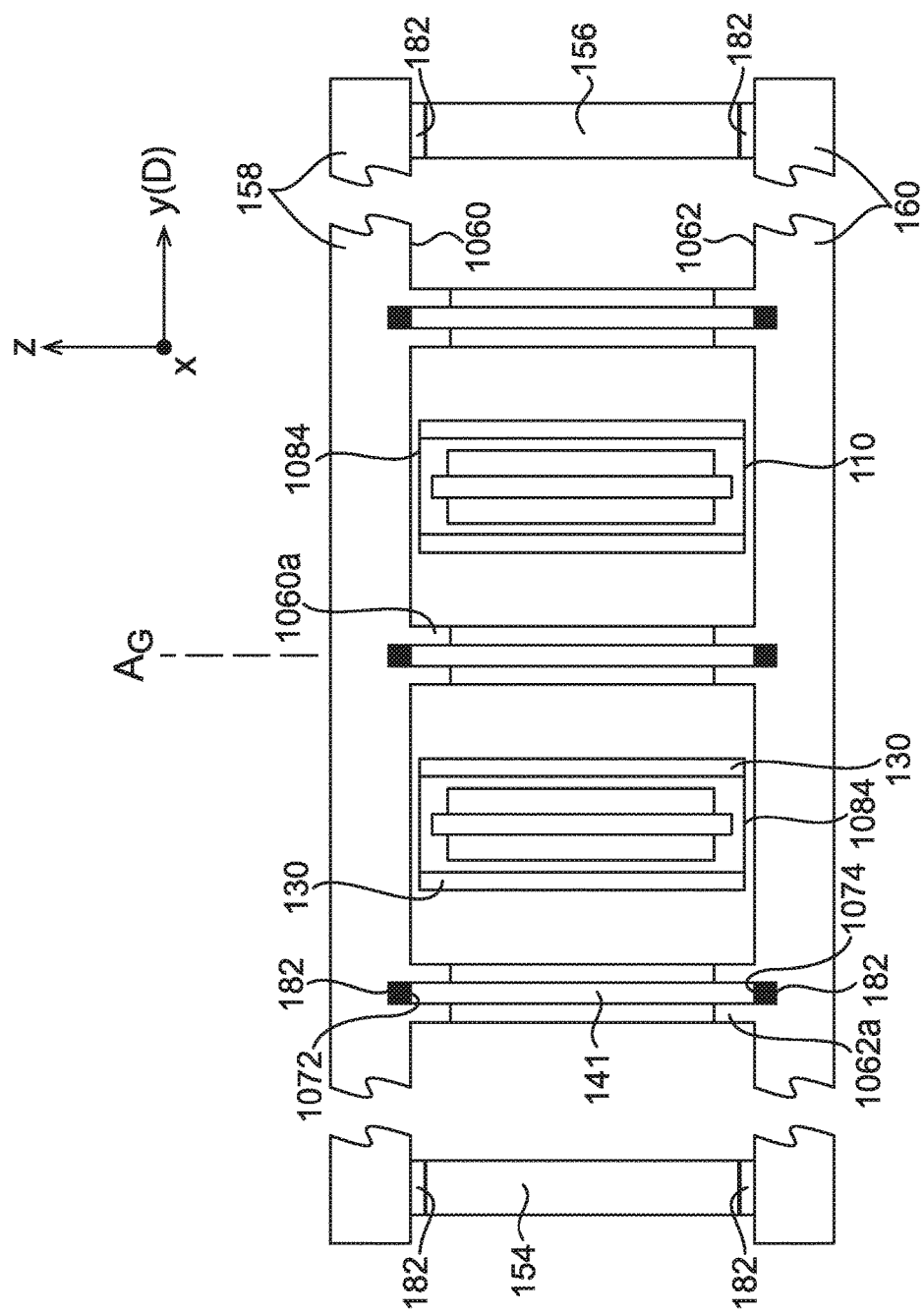
FIG. 11A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the counter-electrode backbones are used for assembling the set of electrode constraints via notches.
Figure 11B:
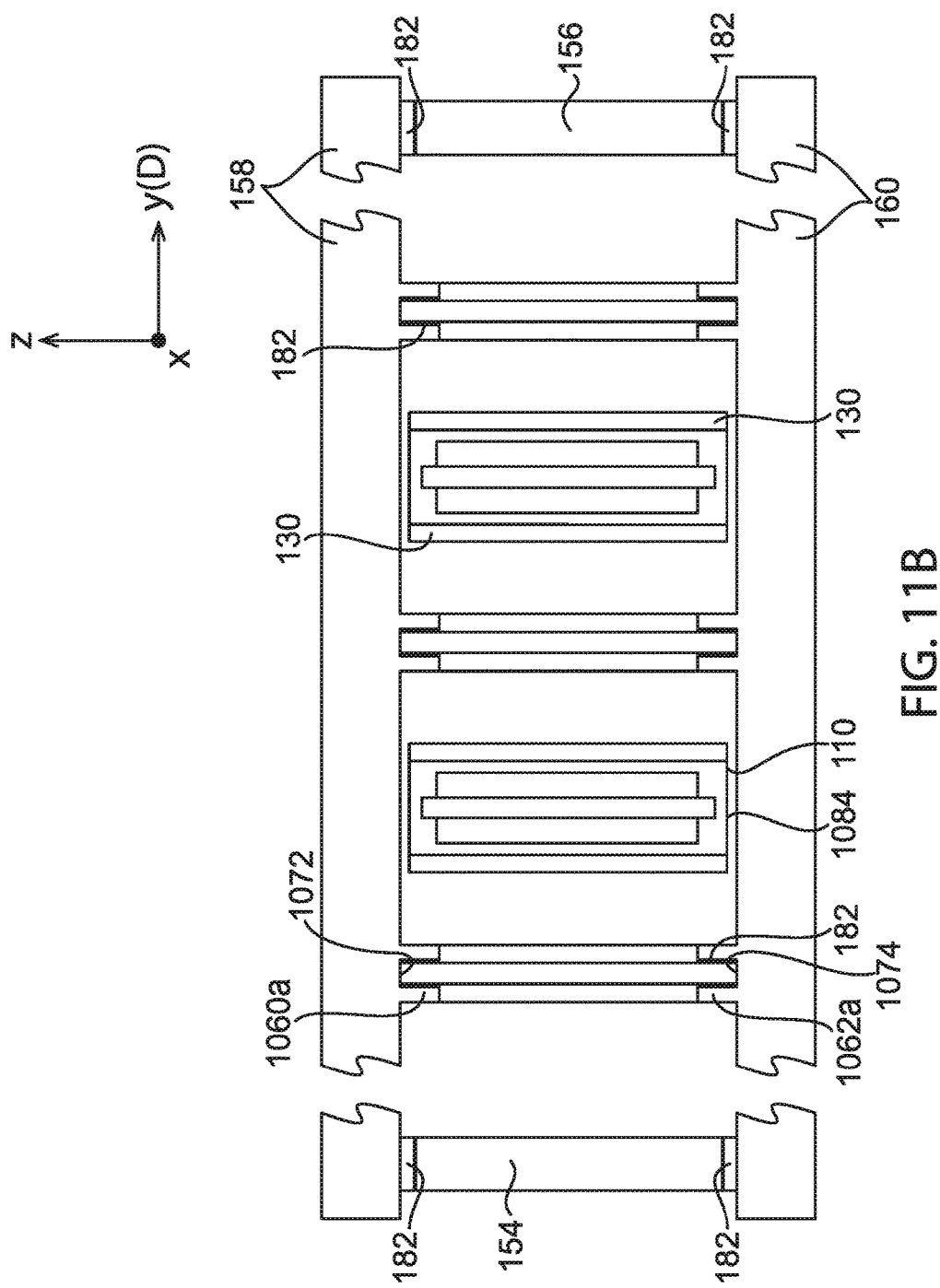
FIG. 11B illustrates a cross-section of an embodiment of the electrode assembly taken along the line A-A' as shown in FIG. 1, further including a set of electrode constraints, including another embodiment of a primary growth constraint system and another embodiment of a secondary growth constraint system where the counter-electrode backbones are used for assembling the set of electrode constraints via notches.
Figure 11C:
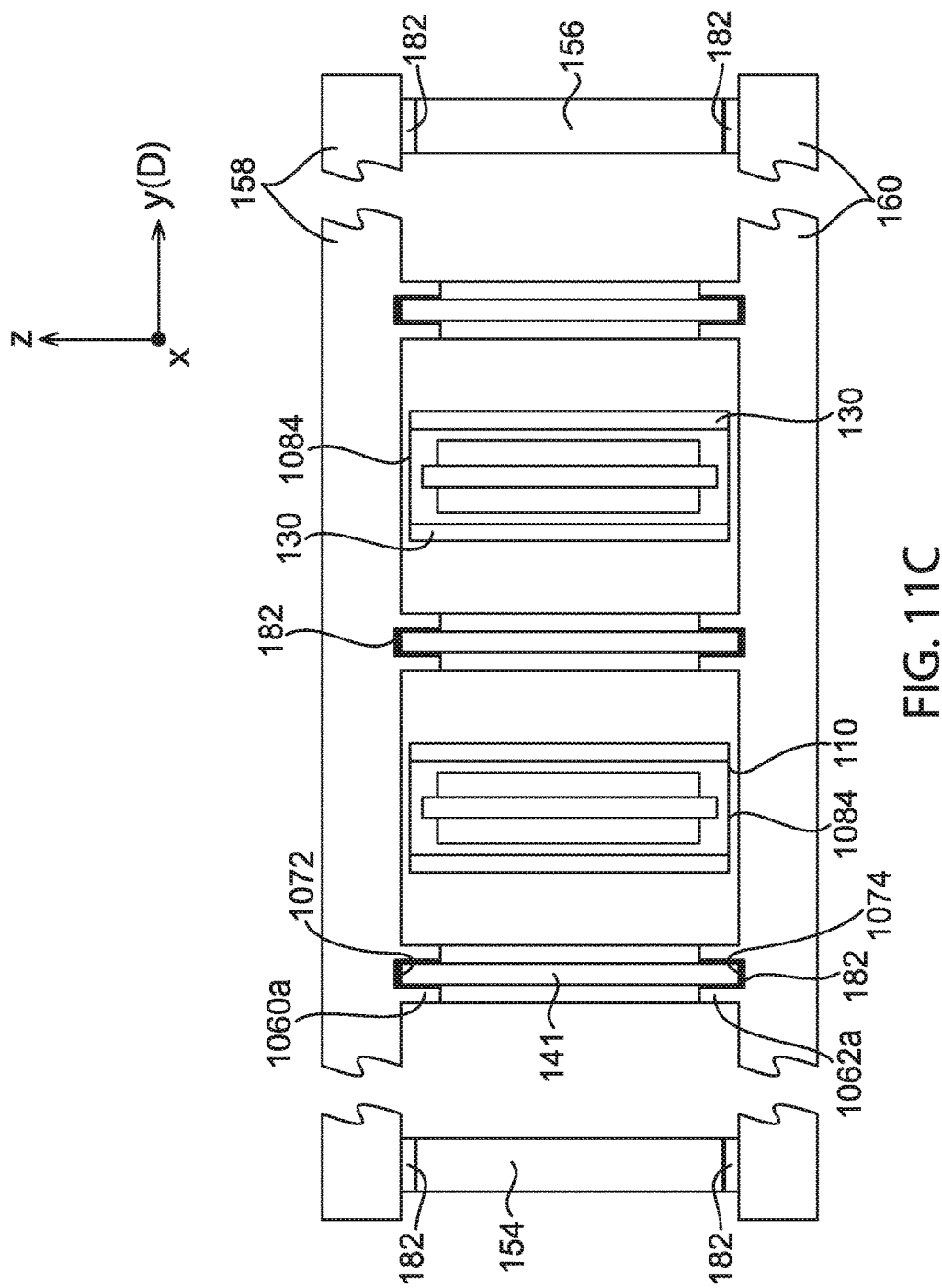
FIG. 11C illustrates a cross-section of an embodiment of the electrode assembly taken along the line A-A' as shown in FIG. 1, further including a set of electrode constraints, including yet another embodiment of a primary growth constraint system and yet another embodiment of a secondary growth constraint system where the counter-electrode backbones are used for assembling the set of electrode constraints via notches.

Another mode for affixing the counter-electrode structures 112 to the first and second secondary growth constraints 158, 160, respectively, via glue 182 includes the use of notches within the inner surface 1060 of the first secondary growth constraint 158 and the inner surface 1062 of the second secondary growth constraint 160. Referring now to FIGS. 11A-11C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 11A-11C each show a cross section, along the line A-A' as in FIG. 1, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 11A-11C, non-affixed electrode structures 110 may include electrode gaps 1084 between their tops and the first secondary growth constraint 158, and their bottoms and the second secondary growth constraint 160, as described in more detail above.

More specifically, in one embodiment, as shown in FIG. 11A, a plurality of counter-electrode backbones 141 may be affixed to the inner surface 1060 of the first secondary growth constraint 158 and the inner surface 1062 of the second secondary growth constraint 160 via a notch 1060a and 1062a, and a layer of glue 182. Accordingly, in certain embodiments, the plurality of counter-electrode backbones 141 affixed to the first and second secondary growth constraints 158, 160, respectively, via notches 1060a, 1062a may include a symmetrical pattern about a gluing axis $A_G$ with respect to affixed counter-electrode backbones 141, as described above. In certain embodiments, the plurality of counter-electrode backbones 141 affixed to the first and second secondary growth constraints 158, 160, respectively, via notches 1060a, 1062a may include an asymmetric or random pattern about a gluing axis $A_G$ with respect to affixed counter-electrode backbones 141, as described above.

In certain embodiments, notches 1060a, 1062a may have a depth within the first and second secondary growth constraints 158, 160, respectively. For example, in one embodiment, a notch 1060a or 1062a may have a depth within the first and second secondary growth constraints 158, 160, respectively, of 25% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a or 1062a may have a depth within the first and second secondary growth constraints 158, 160, respectively, of 50% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a or 1060b may have a depth within the first and second secondary growth constraints 158, 160, respectively, of 75% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a or 1062a may have a depth within the first and second secondary growth constraints 158, 160, respectively, of 90% of the height of the first and the second secondary growth constraints 158, 160, respectively (i.e., the heights of the first and second secondary growth constraints in this embodiment may be analogous to $H_{158}$ and $H_{160}$, as described above). Alternatively stated, each member of the plurality of the counter-electrode backbones 141 may include a height $H_{CESB}$ that effectively meets and extends into both the inner surface 1060 of the first secondary growth constraint 158 and the inner surface 1062 of the second secondary growth constraint 160, and may be affixed into the notch 1060a of the first secondary growth constraint 158 and into the notch 1062a of the second secondary growth constraint 160 via glue 182 in a notched embodiment.

Further, FIGS. 11A-11C also depict different embodiments for gluing the plurality of the counter-electrode backbones 141 in a notched embodiment. For example, in one embodiment depicted in FIG. 11A, the plurality of counter-electrode backbones 141 may be glued 182 via a counter-electrode backbone top 1072 and a counter-electrode backbone bottom 1074. By way of further example, in one embodiment depicted in FIG. 11B, the plurality of counter-electrode backbones 141 may be glued 182 via the lateral surfaces of the counter-electrode backbones 141. By way of further example, in one embodiment depicted in FIG. 11C, the plurality of counter-electrode backbones 141 may be glued 182 via the top 1072, the bottom 1074, and the lateral surfaces of the counter-electrode backbones 141.

Figure 12A:
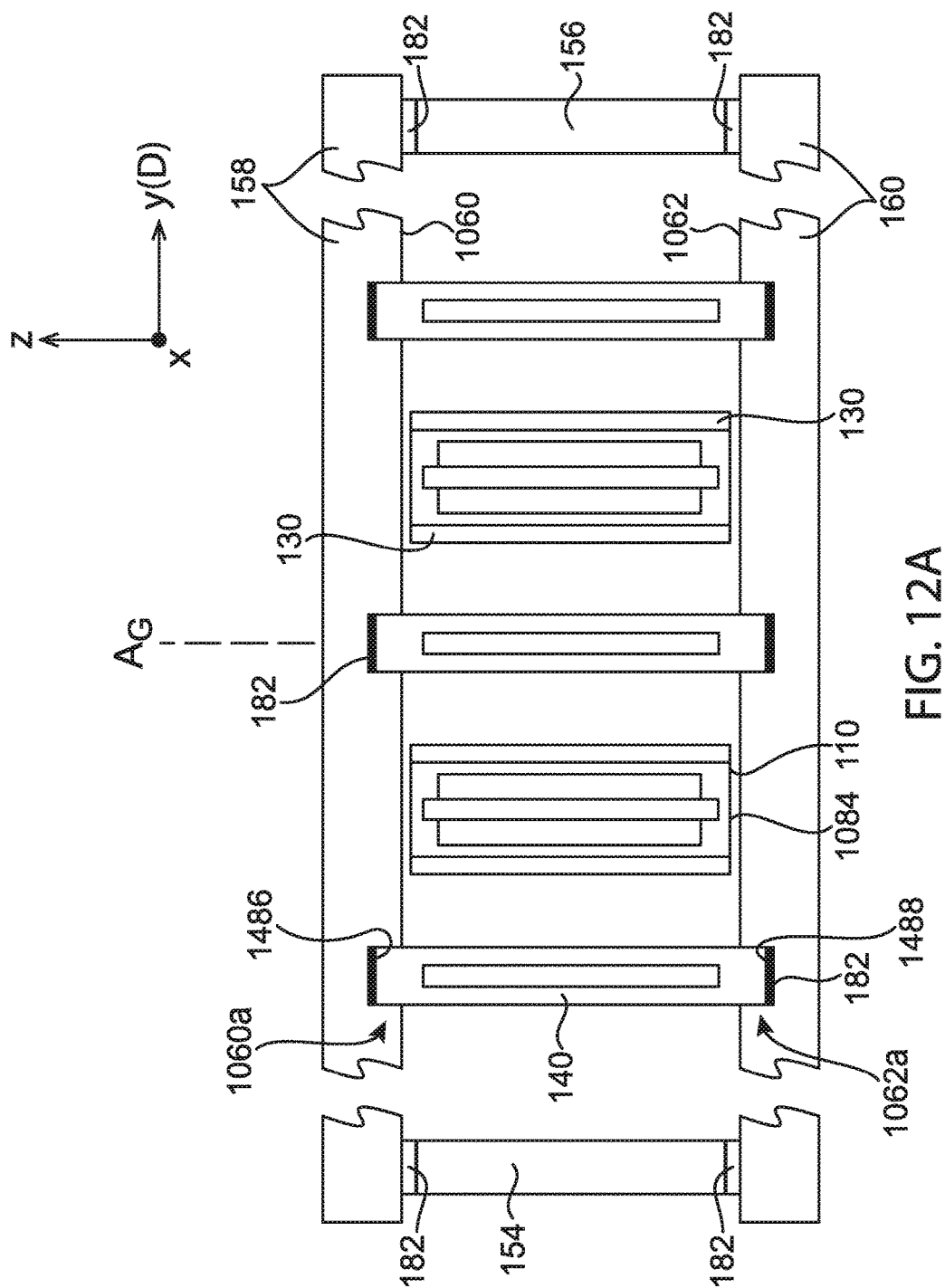
FIG. 12A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the counter-electrode current collectors are used for assembling the set of electrode constraints via notches.
Figure 12B:
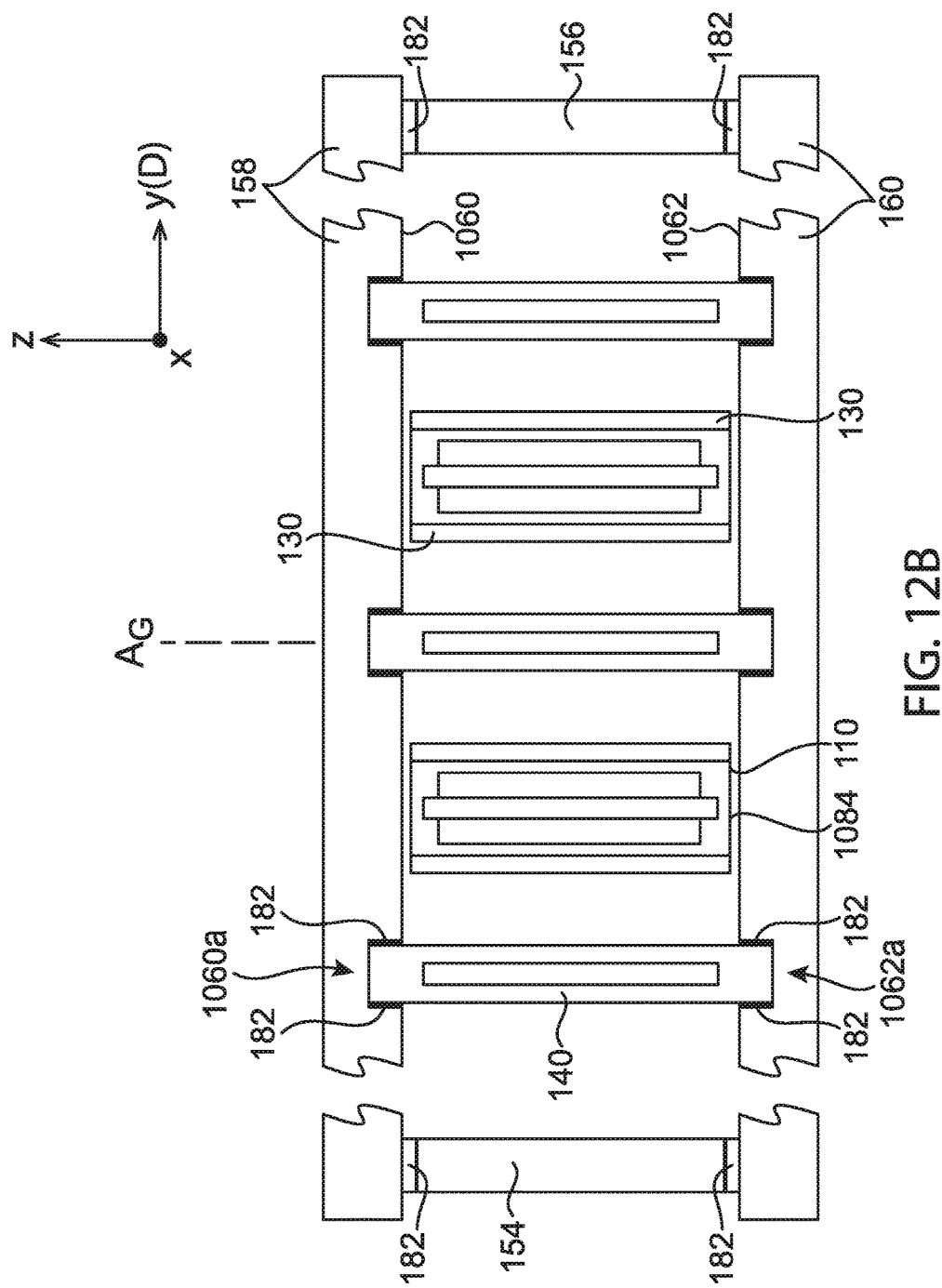
FIG. 12B illustrates a cross-section of an embodiment of the electrode assembly taken along the line A-A' as shown in FIG. 1, further including a set of electrode constraints, including another embodiment of a primary growth constraint system and another embodiment of a secondary growth constraint system where the counter-electrode current collectors are used for assembling the set of electrode constraints via notches.
Figure 12C:
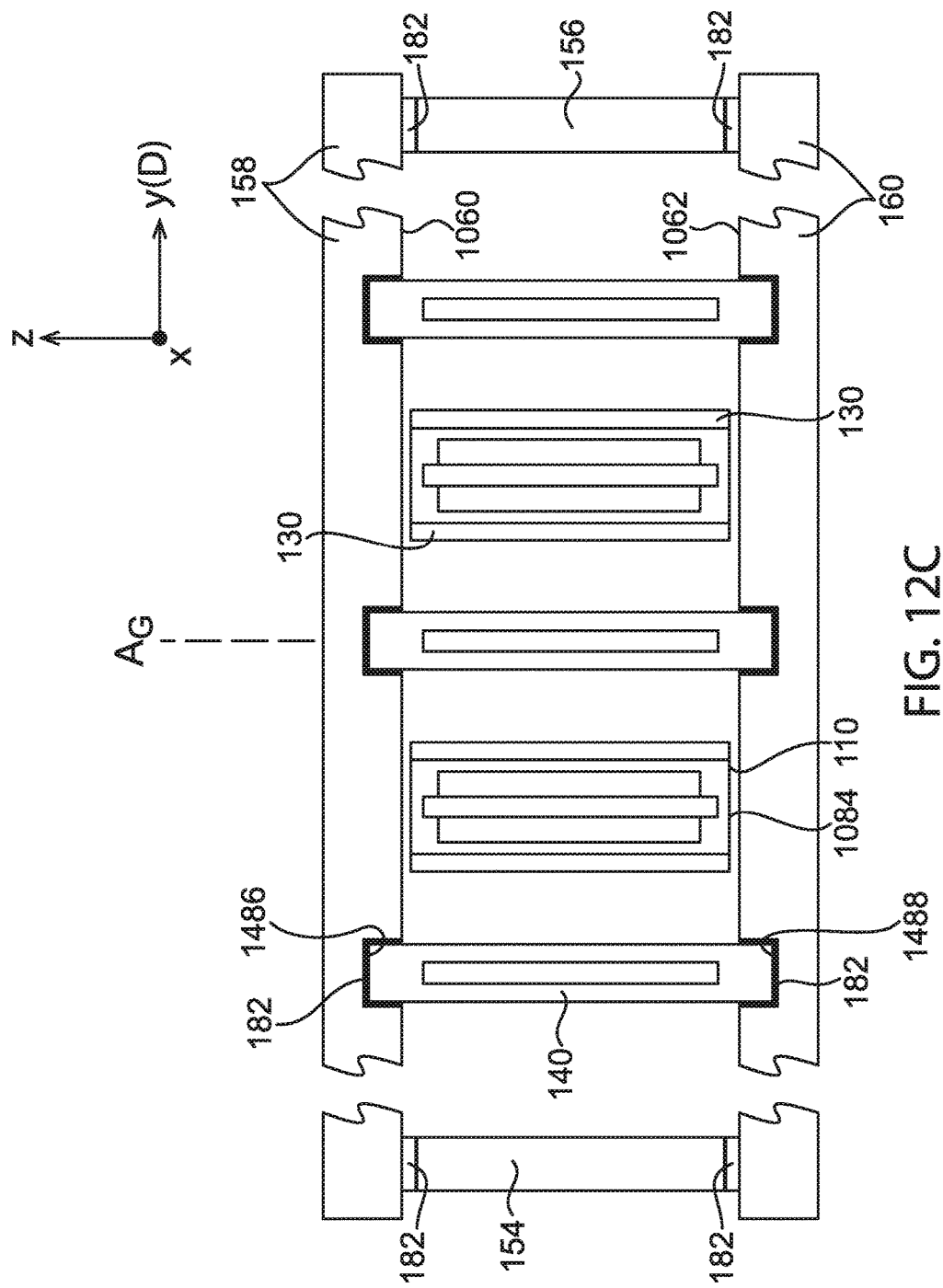
FIG. 12C illustrates a cross-section of an embodiment of the electrode assembly taken along the line A-A' as shown in FIG. 1, further including a set of electrode constraints, including yet another embodiment of a primary growth constraint system and yet another embodiment of a secondary growth constraint system where the counter-electrode current collectors are used for assembling the set of electrode constraints via notches.

Further, another mode for affixing the counter-electrode structures 112 to the first and second secondary growth constraints 158, 160, respectively, via glue 182 includes, again, the use of notches 1060a and 1062a within the inner surface 1060 of the first secondary growth constraint 158 and the inner surface 1062 of the second secondary growth constraint 160. Referring now to FIGS. 12A-12C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 12A-12C each show a cross section, along the line A-A' as in FIG. 1, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 12A-12C, non-affixed electrode structures 110 may include electrode gaps 1084 between their tops 1052 and the first secondary growth constraint 158, and their bottoms 1054 and the second secondary growth constraint 160, as described in more detail above.

More specifically, in one embodiment, as shown in FIG. 12A, a plurality of counter-electrode current collectors 140 may be affixed to the inner surface 1060 of the first secondary growth constraint 158 and the inner surface 1062 of the second secondary growth constraint 160 via a notch 1060a and 1062a, and a layer of glue 182. Accordingly, in certain embodiments, the plurality of counter-electrode current collectors 140 affixed to the first and second secondary growth constraints 158, 160, respectively, via notches 1060a, 1062a may include a symmetrical pattern about a gluing axis $A_G$ with respect to affixed counter-electrode current collectors 140, as described above. In certain embodiments, the plurality of counter-electrode current collectors 140 affixed to the first and second secondary growth constraints 158, 160, respectively, via notches 1060a, 1062a may include an asymmetric or random pattern about a gluing axis $A_G$ with respect to affixed counter-electrode current collectors 140, as described above.

In certain embodiments, notches 1060a, 1062a may have a depth within the first and second secondary growth constraints 158, 160, respectively. For example, in one embodiment, a notch 1060a or 1062a may have a depth within the first and second secondary growth constraints 158, 160, respectively, of 25% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a or 1062a may have a depth within the first and second secondary growth constraints 158, 160, respectively, of 50% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a or 1062a may have a depth within the first and second secondary growth constraints 158, 160, respectively, of 75% of the height of the first and the second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a or 1062a may have a depth within the first and second secondary growth constraints 158, 160, respectively, of 90% of the height of the first and the second secondary growth constraints 158, 160, respectively (i.e., the heights of the first and second secondary growth constraints in this embodiment may be analogous to $H_{158}$ and $H_{160}$, as described above). Alternatively stated, each member of the plurality of the counter-electrode current collectors 140 may effectively meet and extend into both the inner surface 1060 of the first secondary growth constraint 158 and the inner surface 1062 of the second secondary growth constraint 160 (akin to the height $H_{CESB}$, as described above), and may be affixed into the notch 1060a of the first secondary growth constraint 158 and into the notch 1062a of the second secondary growth constraint 160 via glue 182 in a notched embodiment.

Further, FIGS. 12A-12C also depict different embodiments for gluing the plurality of the counter-electrode current collectors 140 in a notched embodiment. For example, in one embodiment depicted in FIG. 12A, the plurality of counter-electrode current collectors 140 may be glued 182 via a counter-electrode current collector top 1486 and a counter-electrode current collector bottom 1488. By way of further example, in one embodiment depicted in FIG. 12B, the plurality of counter-electrode current collectors 140 may be glued 182 via the lateral surfaces of the counter-electrode current collectors 140 (akin to the lateral surfaces of the counter-electrode backbones 141, as described above). By way of further example, in one embodiment depicted in FIG. 12C, the plurality of counter-electrode current collectors 140 may be glued 182 via the top 1486, the bottom 1488, and the lateral surfaces of the counter-electrode current collectors 140.

In certain embodiments, a plurality of counter-electrode backbones 141 or a plurality of counter-electrode current collectors 140 may be affixed to the first secondary growth constraint 158 and the second secondary growth constraint 160 via a slot in each of the first secondary growth constraint 158 and the second secondary growth constraint 160, via an interlocking connection embodiment. Referring now to FIGS. 13A-13C and 14, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 13A-13C and 14 each show a cross section, along the line A-A' as in FIG. 1, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 13A-13C and 14, non-affixed electrode structures 110 may include electrode gaps 1084 between their tops 1052 and the first secondary growth constraint 158, and their bottoms 1054 and the second secondary growth constraint 160, as described in more detail above.

Figure 13A:
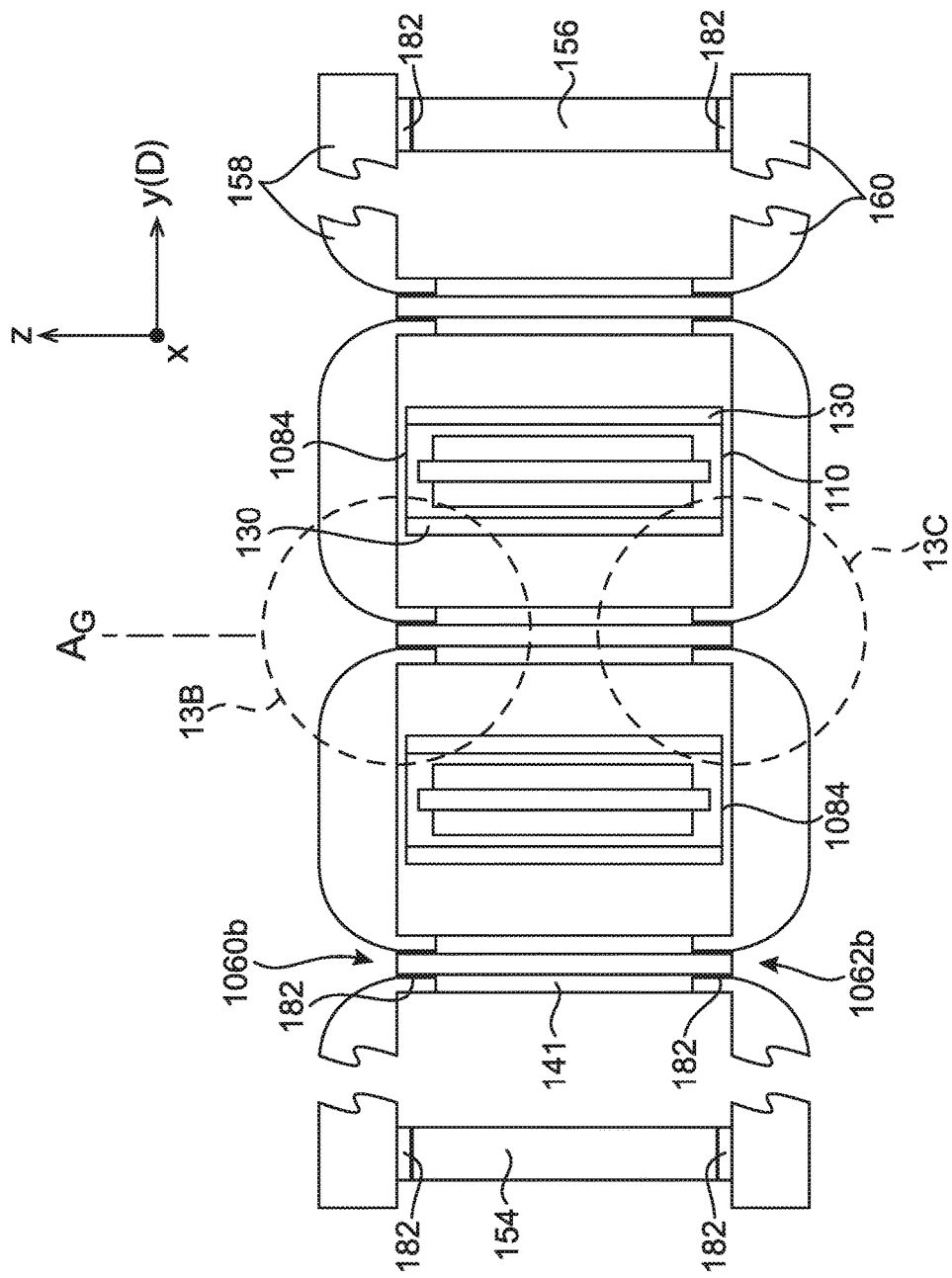
FIG. 13A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the counter-electrode backbones are used for assembling the set of electrode constraints via slots.

More specifically, in one embodiment shown in FIG. 13A, a plurality of counter-electrode backbones 141 may be affixed to the first secondary growth constraint 158 and the second secondary growth constraint 160 via a slot 1060b and 1062b, and a layer of glue 182. Accordingly, in certain embodiments, the plurality of counter-electrode backbones 141 affixed to the first and second secondary growth constraints 158, 160, respectively, via slots 1060b and 1062b may include a symmetrical pattern about a gluing axis $A_G$ with respect to affixed counter-electrode backbones 141, as described above. In certain embodiments, the plurality of counter-electrode backbones 141 affixed to the first and second secondary growth constraints 158, 160, respectively, via slots 1060b and 1062b may include an asymmetric or random pattern about a gluing axis $A_G$ with respect to affixed counter-electrode backbones 141, as described above.

In certain embodiments, slots 1060b and 1062b in each of the first secondary growth constraint 158 and the second secondary growth constraint 160 may extend through the first secondary growth constraint 158 and the second secondary growth constraint 160, respectively, in order to receive the plurality of counter-electrode backbones 141 in an interlocked embodiment. Stated alternatively, the plurality of counter-electrode backbones 141 include a height $H_{CESB}$ that meets and extends entirely through both the first secondary growth constraint height $H_{158}$, as described above, via slot 1060b and the second secondary growth constraint height $H_{160}$, as described above via slot 1062b, thereby interlocking with both the first secondary growth constraint 158 and the second secondary growth constraint 160 in an interlocked embodiment. In certain embodiments, glue 182 may be used to affix or reinforce the interlocking connection between the lateral surfaces of the plurality of counter-electrode backbones 141 and the slots 1060b, 1062b, respectively.

Figure 13B:
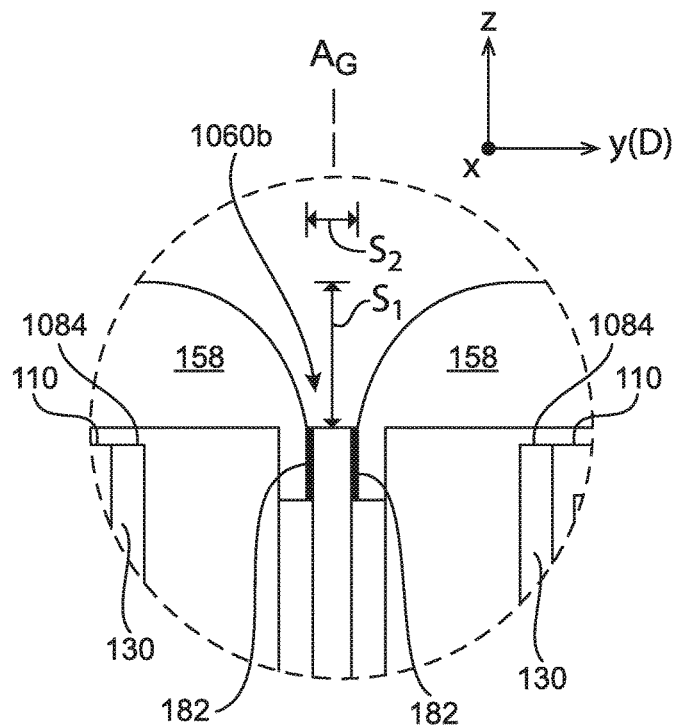
FIG. 13B illustrates a inset cross-section from FIG. 13A of an embodiment of the electrode assembly taken along the line A-A' as shown in FIG. 1, further including a set of electrode constraints, including one embodiment of a primary growth constraint system and one embodiment of a secondary growth constraint system where the counter-electrode backbones are used for assembling the set of electrode constraints via slots.
Figure 13C:
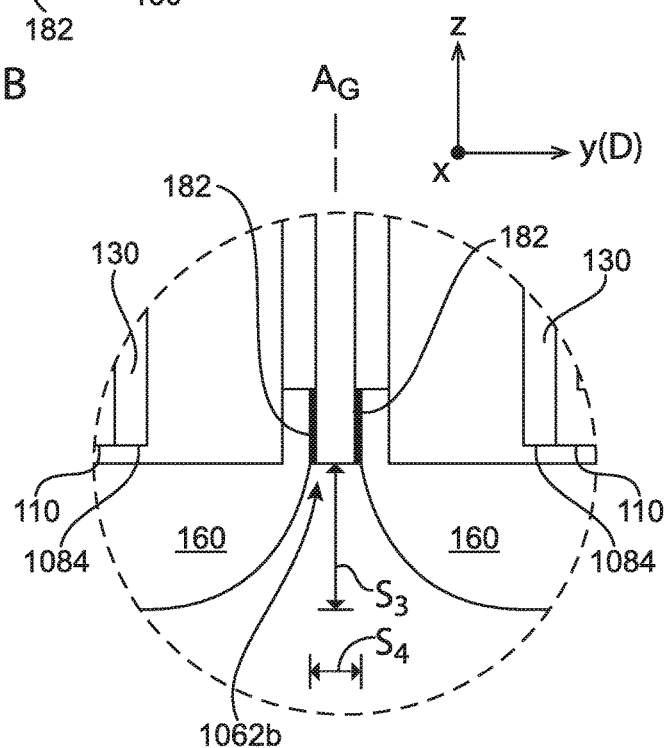
FIG. 13C illustrates a inset cross-section from FIG. 13A of an embodiment of the electrode assembly taken along the line A-A' as shown in FIG. 1, further including a set of electrode constraints, including one embodiment of a primary growth constraint system and one embodiment of a secondary growth constraint system where the counter-electrode backbones are used for assembling the set of electrode constraints via slots.

More specifically, as illustrated by FIGS. 13B-13C, slots 1060b and 1062b may be characterized by an aspect ratio. For example, in certain embodiments as illustrated in FIG. 13B, slot 1060b may include a first dimension $S_1$ defined as the distance between the top 1072 of the counter-electrode backbone 141 and the outer surface 1064 of the first secondary growth constraint 158, and a second dimension $S_2$ defined as the distance between two lateral surfaces of the counter-electrode backbone 141, as described above. Accordingly, for example, in one embodiment $S_1$ may be the same and/or similar dimension as the secondary growth constraint heights $H_{158}$ and $H_{160}$ described above, which in turn may have a height selected in relation to a counter-electrode structure height $H_{CES}$. For example, in one embodiment, $S_1$ may be less than 50% of a counter-electrode height $H_{CES}$. By way of further example, in one embodiment, $S_1$ may be less than 25% of a counter-electrode height $H_{CES}$. By way of further example, in one embodiment, $S_1$ may be less than 10% of a counter-electrode height $H_{CES}$, such as less than 5% of a counter-electrode height $H_{CES}$. Accordingly, for a counter-electrode height $H_{CES}$ in the range of 0.05 mm to 10 mm, $S_1$ may have a value in the range of 0.025 mm to 0.5 mm. Furthermore, in one embodiment, $S_2$ may be at least 1 micrometer. By way of further example, in one embodiment, $S_2$ may generally not exceed 500 micrometers. By way of further example, in one embodiment, $S_2$ may be in the range of 1 to about 50 micrometers. As such, for example, in one embodiment, the aspect ratio $S_1:S_2$ may be in a range of from 0.05 to 500. By way of further example, in one embodiment, the aspect ratio $S_1:S_2$ may be in a range of from 0.5 to 100.

Further, as illustrated in FIG. 13C, slot 1062b may include a first dimension $S_3$ defined as the distance between the bottom 1074 of the counter-electrode backbone 141 and the outer surface 1066 of the second secondary growth constraint 160, and a second dimension $S_4$ defined as the distance between two lateral surfaces of the counter-electrode backbone 141, as described above. In one embodiment, $S_3$ may be the same and/or similar dimension as the secondary growth constraint heights $H_{158}$ and $H_{160}$ described above, which in turn may have a height selected in relation to a counter-electrode height $H_{CES}$. For example, in one embodiment, $S_3$ may be less than 50% of a counter-electrode height $H_{CES}$. By way of further example, in one embodiment, $S_3$ may be less than 25% of a counter-electrode height $H_{CES}$. By way of further example, in one embodiment, $S_3$ may be less than 10% of a counter-electrode height $H_{CES}$, such as less than 5% of a counter-electrode height $H_{CES}$. Furthermore, in one embodiment $S_2$ may be at least 1 micrometer. By way of further example, in one embodiment, $S_2$ may generally not exceed 500 micrometers. By way of further example, in one embodiment, $S_2$ may be in the range of 1 to about 50 micrometers. As such, for example, in one embodiment, the aspect ratio $S_3:S_4$ may be in a range of from 0.05 to 500. By way of further example, in one embodiment, the aspect ratio $S_3:S_4$ may be in a range of from 0.5 to 100.

Figure 14:
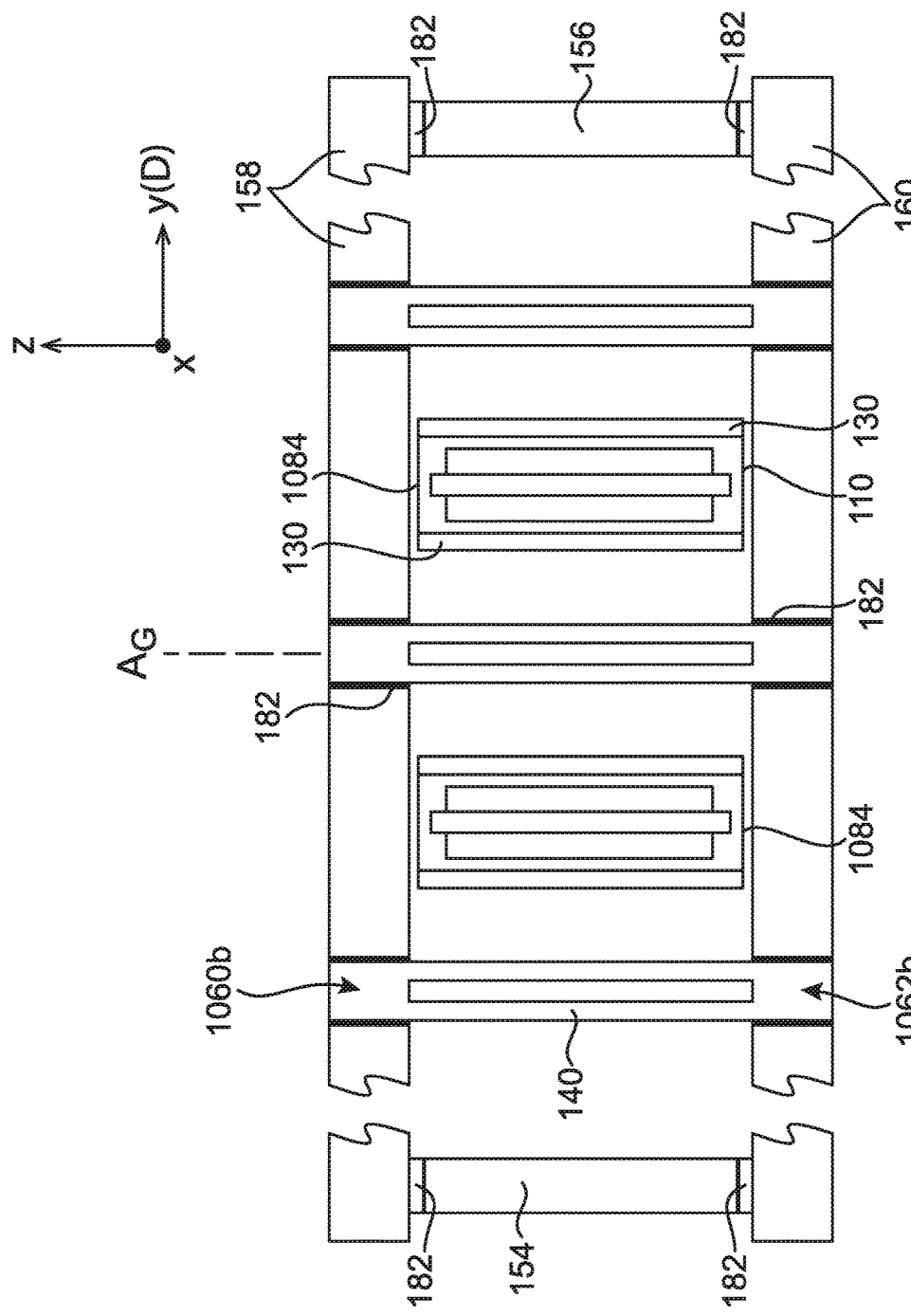
FIG. 14 illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the counter-electrode current collectors are used for assembling the set of electrode constraints via slots.

Referring now to FIG. 14, in another embodiment, a plurality of counter-electrode current collectors 140 may be affixed to the first secondary growth constraint 158 and the second secondary growth constraint 160 via a slot 1060b and 1062b, and a layer of glue 182. Accordingly, in certain embodiments, the plurality of counter-electrode current collectors 140 affixed to the first and second secondary growth constraints 158, 160, respectively, via slots 1060b, 1062b may include a symmetrical pattern about a gluing axis $A_G$ with respect to affixed counter-electrode current collectors 140, as described above. In certain embodiments, the plurality of counter-electrode current collectors 140 affixed to the first and second secondary growth constraints 158, 160, respectively, via slots 1060b, 1062b may include an asymmetric or random pattern about a gluing axis $A_G$ with respect to affixed counter-electrode current collectors 140, as described above.

In certain embodiments, slots 1060b, 1062b in each of the first secondary growth constraint 158 and the second secondary growth constraint 160 may extend through the first secondary growth constraint 158 and the second secondary growth constraint 160, respectively, in order to receive the plurality of counter-electrode current collectors 140 in another interlocked embodiment. Stated alternatively, the plurality of counter-electrode current collectors 140 may effectively meet and extend entirely through both the first secondary growth constraint 158 and the second secondary growth constraint 160 (akin to the height $H_{CESB}$, as described above), and may be affixed into slots 1060b and 1062b via glue 182 in another interlocked embodiment.

Connections via Electrode Structures

Figure 15A:
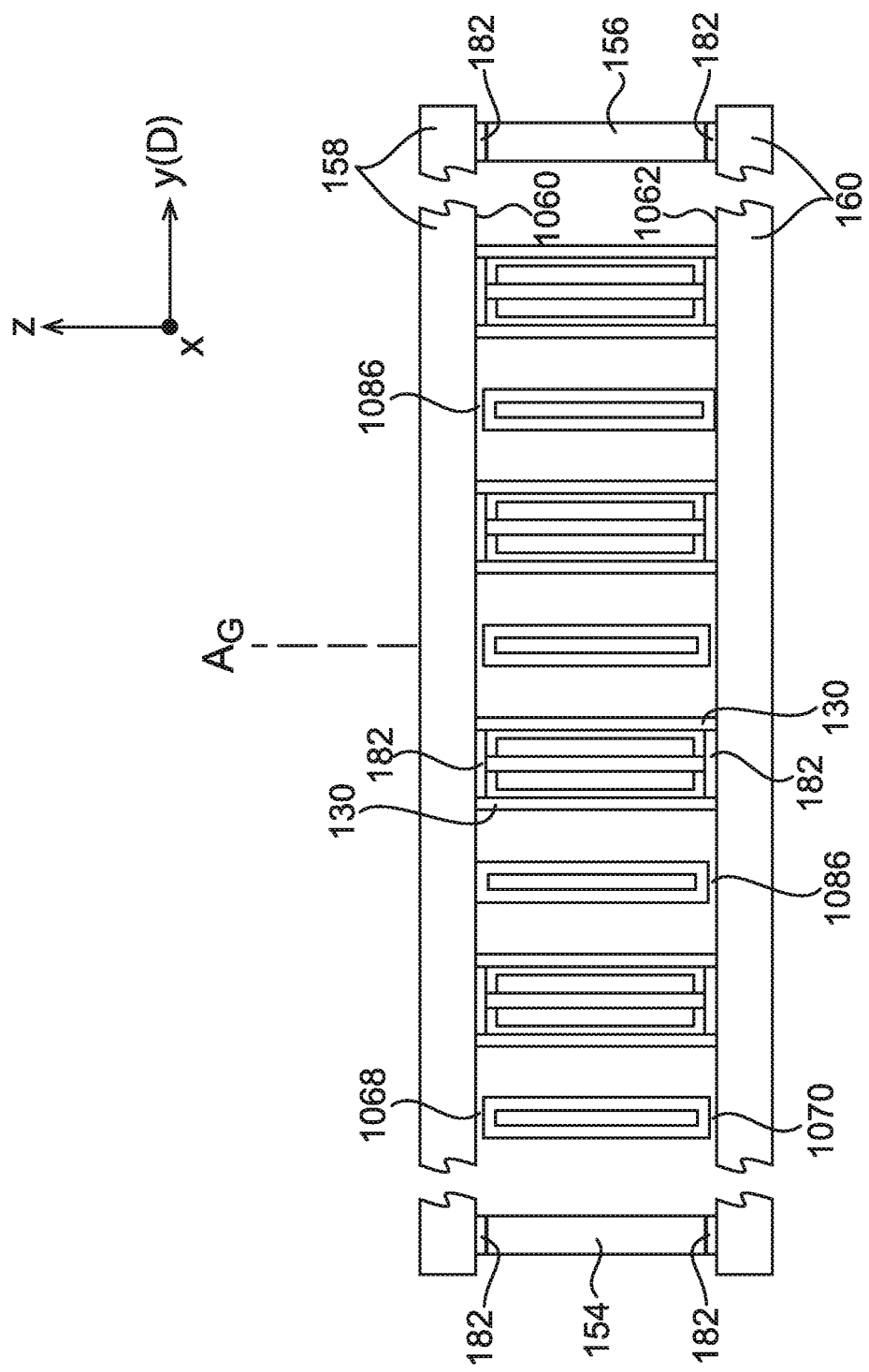
FIG. 15A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the electrode backbones are used for assembling the set of electrode constraints.
Figure 15B:
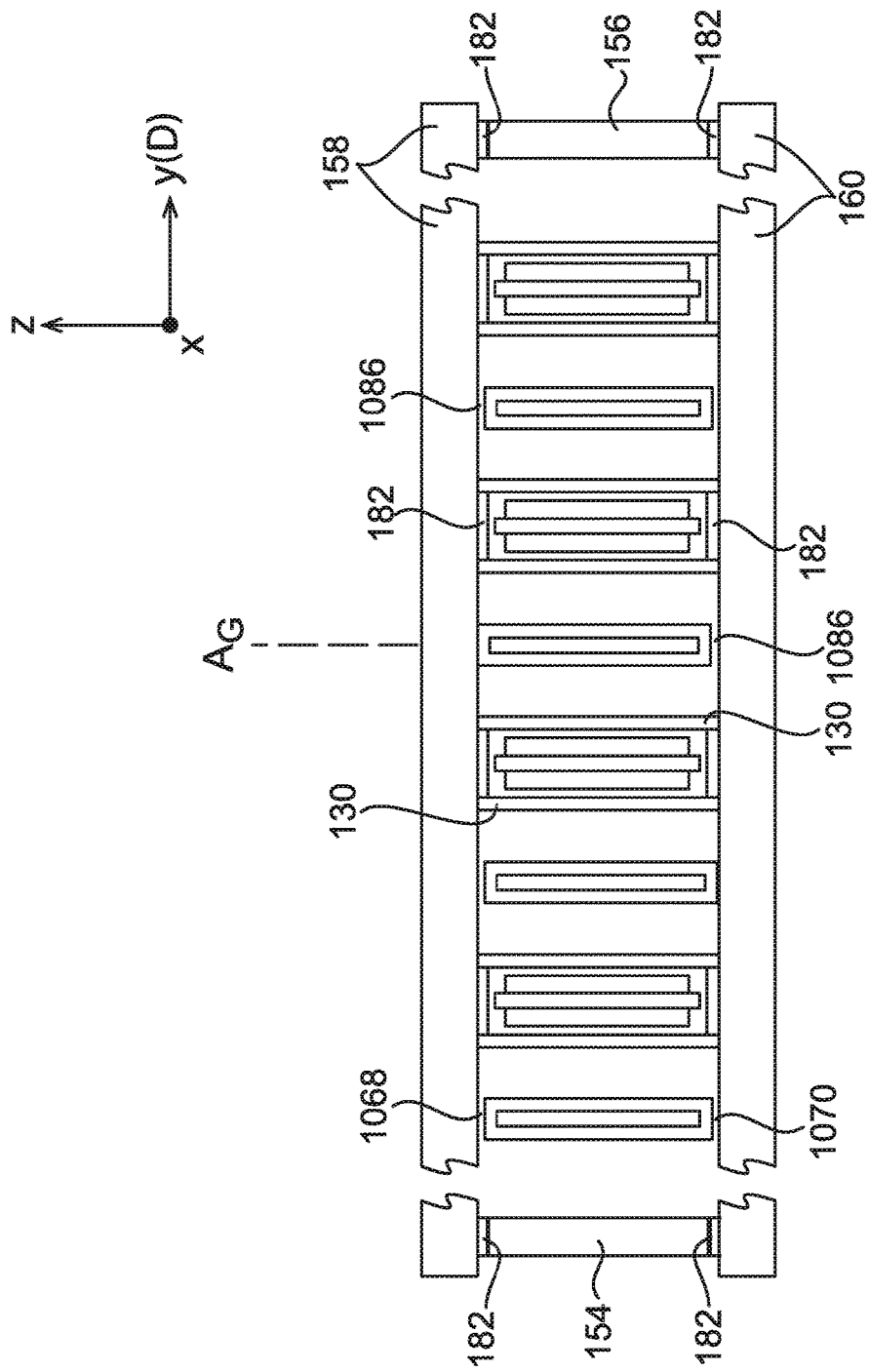
FIG. 15B illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the electrode current collectors are used for assembling the set of electrode constraints.

In alternative embodiments described below, the electrode structures 110 may also be independently affixed to the first and second secondary growth constraints 158, 160, respectively. Referring now to FIGS. 15A-15B, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 15A-15B each show a cross section, along the line A-A' as in FIG. 1, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 15A-15B, non-affixed counter-electrode structures 112 may include counter-electrode gaps 1086 between their tops 1068 and the first secondary growth constraint 158, and their bottoms 1070 and the second secondary growth constraint 160. Stated alternatively, in certain embodiments, the top 1068 and the bottom 1070 of each counter-electrode structure 112 may have a gap 1086 between the first and second secondary constraints 158, 160, respectively. Further, in certain embodiments, also shown in FIGS. 15A-15B, the top 1068 of the counter-electrode structure 112 may be in contact with, but not affixed to, the first secondary growth constraint 158, the bottom 1070 of the counter-electrode structure 112 may be in contact with, but not affixed to, the second secondary growth constraint 160, or the top 1068 of the counter-electrode structure 112 may be in contact with, but not affixed to, the first secondary growth constraint 158 and the bottom 1070 of the counter-electrode structure 112 may in in contact with, but not affixed to, the second secondary growth constraint 160 (not illustrated).

More specifically, in one embodiment, as shown in FIG. 15A, a plurality of electrode backbones 134 may be affixed to the inner surface 1060 of the first secondary growth constraint 158 and the inner surface 1062 of the second secondary growth constraint 160 via a layer of glue 182. In certain embodiments, the plurality of electrode backbones 134 affixed to the first and second secondary growth constraints 158, 160, respectively, may include a symmetrical pattern about a gluing axis $A_G$ with respect to affixed electrode backbones 134. In certain embodiments, the plurality of electrode backbones 134 affixed to the first and second secondary growth constraints 158, 160, respectively, may include an asymmetric or random pattern about a gluing axis $A_G$ with respect to affixed electrode backbones 134.

In one exemplary embodiment, a first symmetric attachment pattern unit may include two electrode backbones 134 affixed to the first secondary growth constraint 158 and the second secondary growth constraint 160, as above, where the two affixed electrode backbones 134 flank one counter-electrode structure 112. Accordingly, the first symmetric attachment pattern unit may repeat, as needed, along the stacking direction D depending upon the energy storage device 100 or the secondary battery 102 and their intended use(s) thereof. In another exemplary embodiment, a second symmetric attachment pattern unit may include two electrode backbones 134 affixed to the first secondary growth constraint 158 and the second secondary growth constraint 160, as above, the two affixed electrode backbones 134 flanking two or more counter-electrode structures 112 and one or more non-affixed electrode backbones 134. Accordingly, the second symmetric attachment pattern unit may repeat, as needed, along the stacking direction D depending upon the energy storage device 100 or the secondary battery 102 and their intended use(s) thereof. Other exemplary symmetric attachment pattern units have been contemplated, as would be appreciated by a person having skill in the art.

In one exemplary embodiment, a first asymmetric or random attachment pattern may include two or more electrode backbones 134 affixed to the first secondary growth constraint 158 and the second secondary growth constraint 160, as above, where the two or more affixed electrode backbones 134 may be individually designated as affixed electrode backbone 134A, affixed electrode backbone 134B, affixed electrode backbone 134C, and affixed electrode backbone 134D. Affixed electrode backbone 134A and affixed electrode backbone 134B may flank (1+x) counter-electrode structures 112, affixed electrode backbone 134B and affixed electrode backbone 134C may flank (1+y) counter-electrode structures 112, and affixed electrode backbone 134C and affixed electrode backbone 134D may flank (1+z) counter-electrode structures 112, wherein the total amount of counter-electrode structures 112 (i.e., x, y, or z) between any two affixed electrode backbones 134A-134D are non-equal (i.e., x≠y≠z) and may be further separated by non-affixed electrode backbones 134. Stated alternatively, any number of electrode backbones 134 may be affixed to the first secondary growth constraint 158 and the second secondary growth constraint 160, as above, whereby between any two affixed electrode backbones 134 may include any non-equivalent number of counter-electrode structures 112 separated by non-affixed electrode backbones 134. Other exemplary asymmetric or random attachment patterns have been contemplated, as would be appreciated by a person having skill in the art.

More specifically, in one embodiment, as shown in FIG. 15B, a plurality of electrode current collectors 136 may be affixed to the inner surface 1060 of the first secondary growth constraint 158 and the inner surface 1062 of the second secondary growth constraint 160 via a layer of glue 182. In certain embodiments, the plurality of electrode current collectors 136 affixed to the first and second secondary growth constraints 158, 160, respectively, may include a symmetrical pattern about a gluing axis $A_G$ with respect to affixed electrode current collectors 136. In certain embodiments, the plurality of electrode current collectors 136 affixed to the first and second secondary growth constraints 158, 160, respectively, may include an asymmetric or random pattern about a gluing axis $A_G$ with respect to affixed electrode current collectors 136.

In one exemplary embodiment, a first symmetric attachment pattern unit may include two electrode current collectors 136 affixed to the first secondary growth constraint 158 and the second secondary growth constraint 160, as above, where the two affixed electrode current collectors 136 flank one counter-electrode structure 112. Accordingly, the first symmetric attachment pattern unit may repeat, as needed, along the stacking direction D depending upon the energy storage device 100 or the secondary battery 102 and their intended use(s) thereof. In another exemplary embodiment, a second symmetric attachment pattern unit may include two electrode current collectors 136 affixed to the first secondary growth constraint 158 and the second secondary growth constraint 160, as above, the two affixed electrode current collectors 136 flanking two or more counter-electrode structures 112 and one or more non-affixed electrode current collectors 136. Accordingly, the second symmetric attachment pattern unit may repeat, as needed, along the stacking direction D depending upon the energy storage device 100 or the secondary battery 102 and their intended use(s) thereof. Other exemplary symmetric attachment pattern units have been contemplated, as would be appreciated by a person having skill in the art.

In one exemplary embodiment, a first asymmetric or random attachment pattern may include two or more electrode current collectors 136 affixed to the first secondary growth constraint 158 and the second secondary growth constraint 160, as above, where the two or more affixed electrode current collectors 136 may be individually designated as affixed electrode current collector 136A, affixed electrode current collector 136B, affixed electrode current collector 136C, and affixed electrode current collector 136D. Affixed electrode current collector 136A and affixed electrode current collector 1366 may flank (1+x) counter-electrode structures 112, affixed electrode current collector 136B and affixed electrode current collector 136C may flank (1+y) counter-electrode structures 112, and affixed electrode current collector 136C and affixed electrode current collector 136D may flank (1+z) counter-electrode structures 112, wherein the total amount of counter-electrode structures 112 (i.e., x, y, or z) between any two affixed electrode current collectors 136A-136D are non-equal (i.e., x≠y≠z) and may be further separated by non-affixed electrode current collectors 136. Stated alternatively, any number of electrode current collectors 136 may be affixed to the first secondary growth constraint 158 and the second secondary growth constraint 160, as above, whereby between any two affixed electrode current collectors 136 may include any non-equivalent number of counter-electrode structures 112 separated by non-affixed electrode current collectors 136. Other exemplary asymmetric or random attachment patterns have been contemplated, as would be appreciated by a person having skill in the art.

Figure 16A:
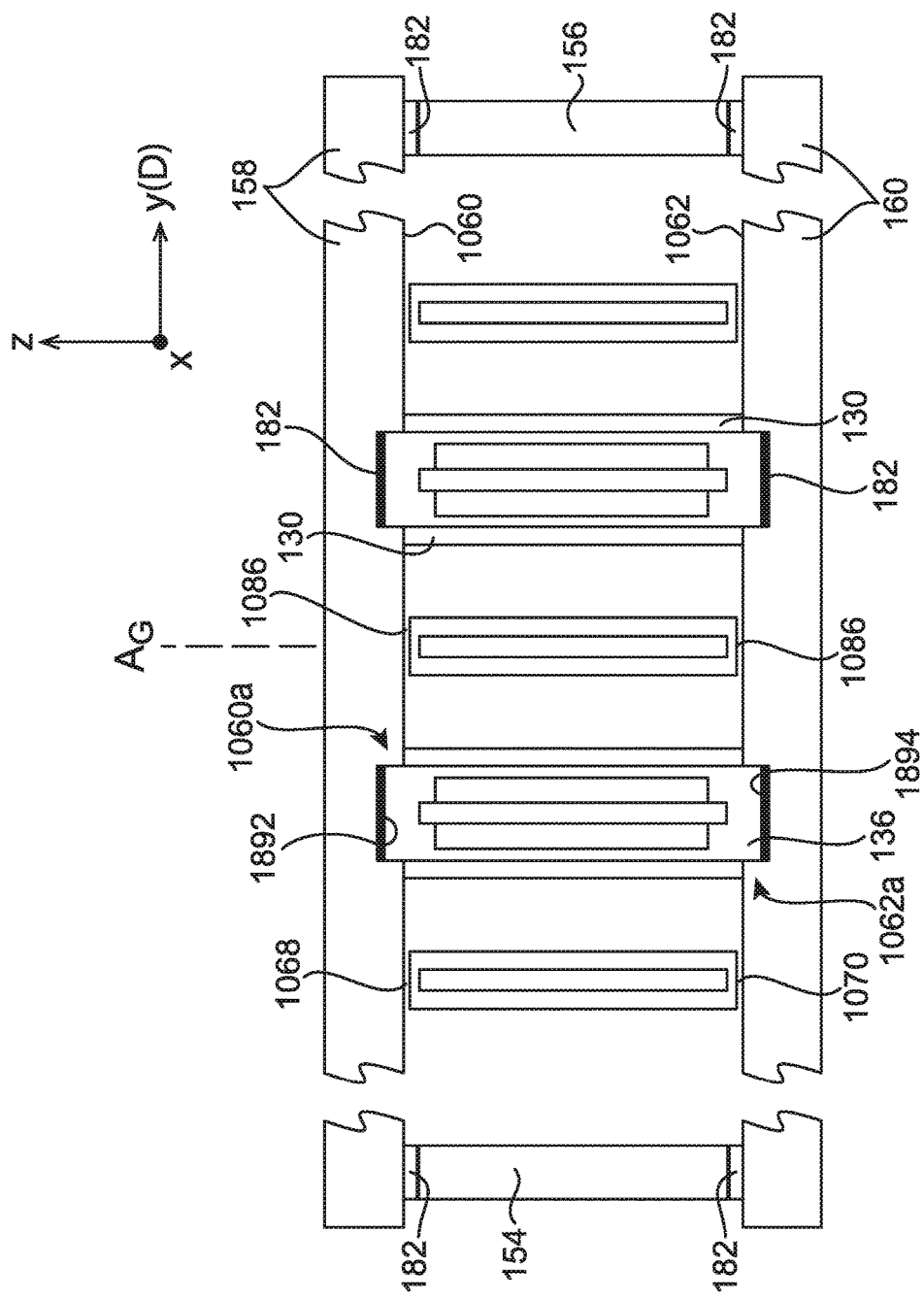
FIG. 16A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the electrode current collectors are used for assembling the set of electrode constraints via notches.
Figure 16B:
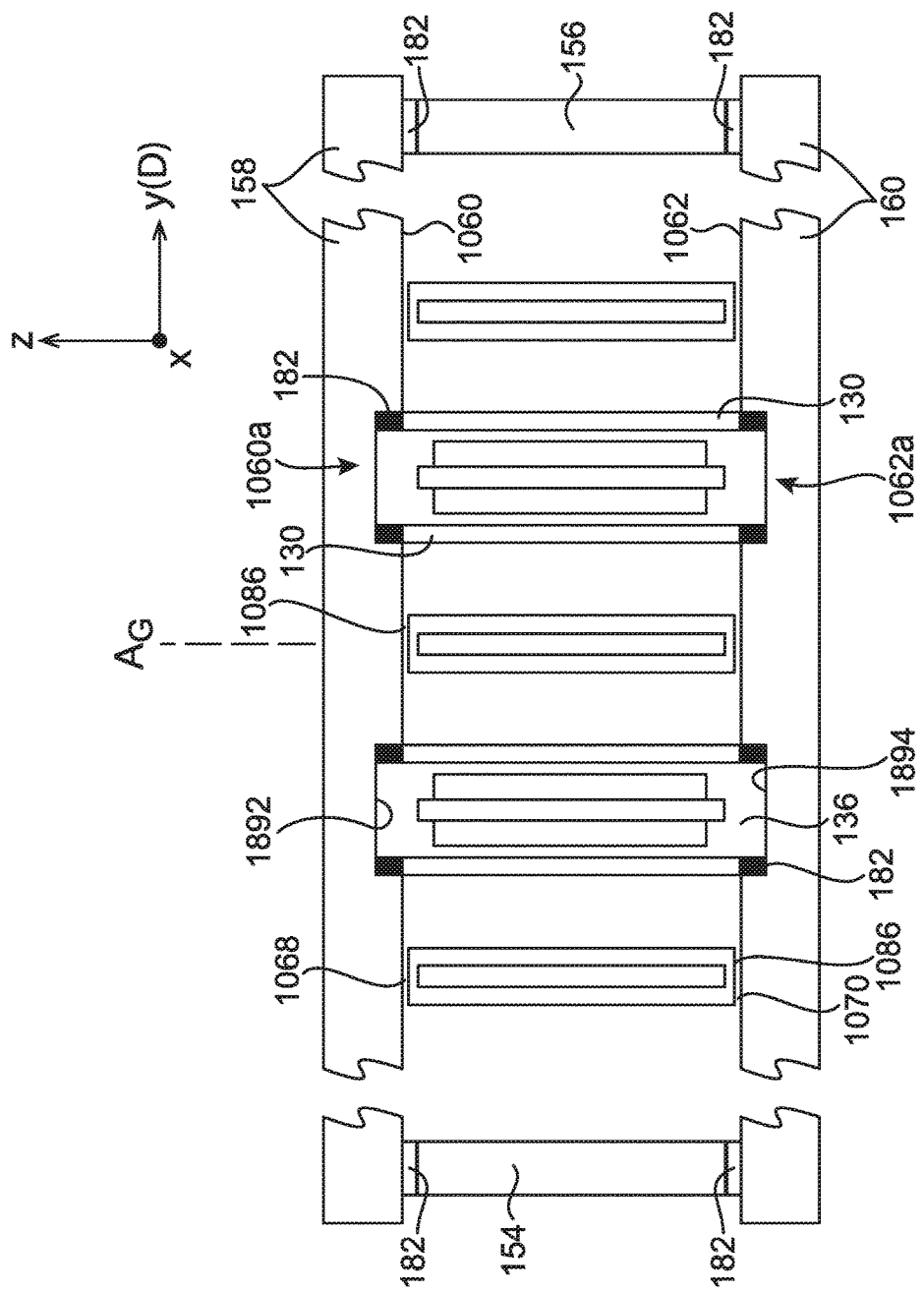
FIG. 16B illustrates a cross-section of an embodiment of the electrode assembly taken along the line A-A' as shown in FIG. 1, further including a set of electrode constraints, including another embodiment of a primary growth constraint system and another embodiment of a secondary growth constraint system where the electrode current collectors are used for assembling the set of electrode constraints via notches.
Figure 16C:
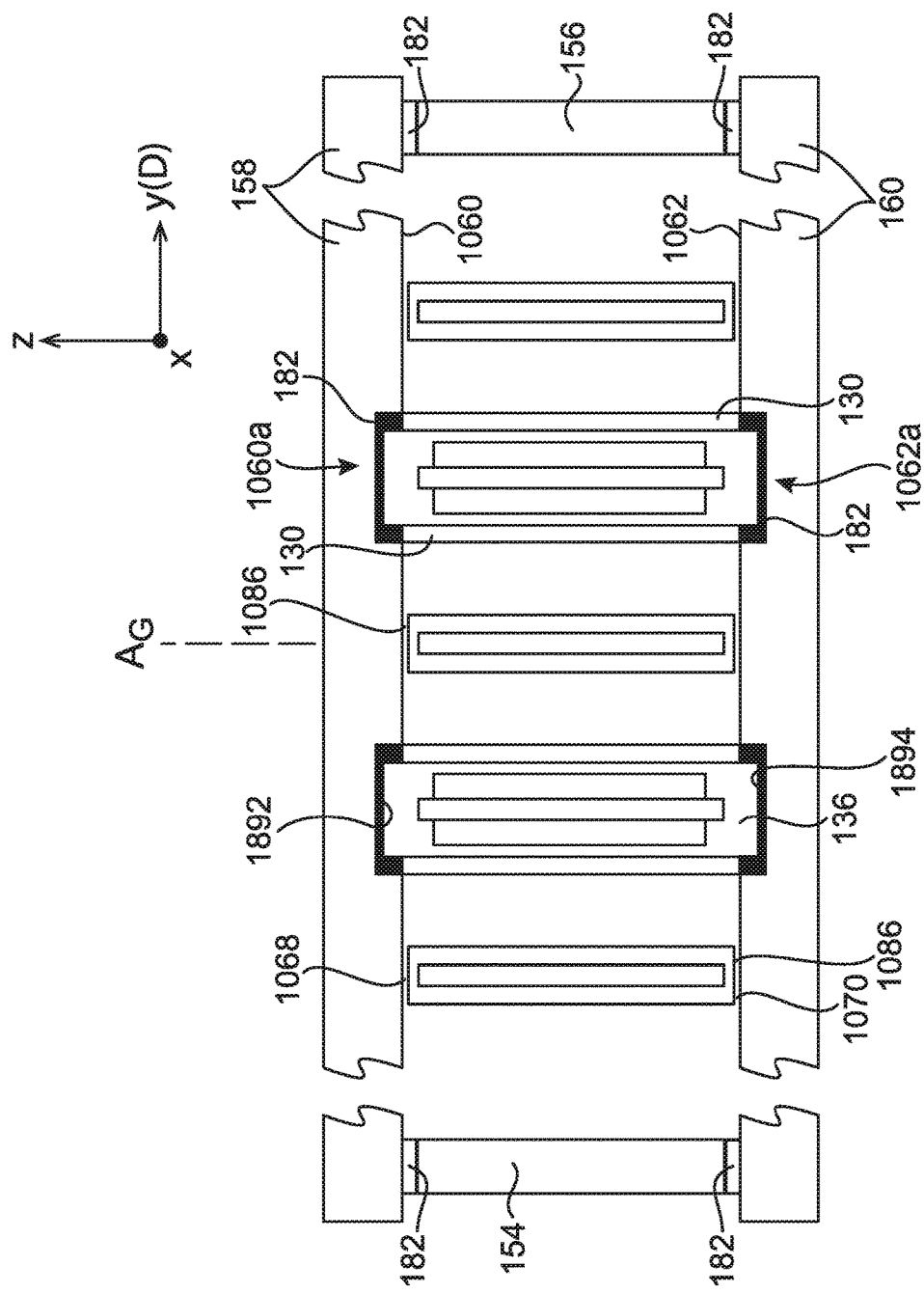
FIG. 16C illustrates a cross-section of an embodiment of the electrode assembly taken along the line A-A' as shown in FIG. 1, further including a set of electrode constraints, including yet another embodiment of a primary growth constraint system and yet another embodiment of a secondary growth constraint system where the electrode current collectors are used for assembling the set of electrode constraints via notches.

Another mode for affixing the electrode structures 110 to the first and second secondary growth constraints 158, 160, respectively, via glue 182 includes the use of notches 1060a, 1062a within the inner surface 1060 of the first secondary growth constraint 158 and the inner surface 1062 of the second secondary growth constraint 160. Referring now to FIGS. 16A-16C, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIGS. 16A-16C each show a cross section, along the line A-A' as in FIG. 1, where each first primary growth constraint 154 and each second primary growth constraint 156 may be attached via a layer of glue 182 to the first secondary growth constraint 158 and second secondary growth constraint 160, as described above. In certain embodiments, as shown in each of FIGS. 16A-16C, non-affixed counter-electrode structures 112 may include counter-electrode gaps 1086 between their tops 1068 and the first secondary growth constraint 158, and their bottoms 1070 and the second secondary growth constraint 160, as described in more detail above.

More specifically, in one embodiment, as shown in FIG. 16A, a plurality of electrode current collectors 136 may be affixed to the inner surface 1060 of the first secondary growth constraint 158 and the inner surface 1062 of the second secondary growth constraint 160 via a notch 1060a and 1062a, and a layer of glue 182. Accordingly, in certain embodiments, the plurality of electrode current collectors 136 affixed to the first and second secondary growth constraints 158, 160, respectively, via notches 1060a, 1062a may include a symmetrical pattern about a gluing axis $A_G$ with respect to affixed electrode current collectors 136, as described above. In certain embodiments, the plurality of electrode current collectors 136 affixed to the first and second secondary growth constraints 158, 160, respectively, via notches 1060a, 1062a may include an asymmetric or random pattern about a gluing axis $A_G$ with respect to affixed electrode current collectors 136, as described above.

In certain embodiments, notches 1060a, 1062a may have a depth within the first and second secondary growth constraints 158, 160, respectively. For example, in one embodiment, a notch 1060a, 1062a may have a depth within the first and second secondary growth constraints 158, 160, respectively, of 25% of the height of the first and second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a, 1062a may have a depth within the first and second secondary growth constraints 158, 160, respectively, of 50% of the height of the first and second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a, 1062a may have a depth within the first and second secondary growth constraints 158, 160, respectively, of 75% of the height of the first and second secondary growth constraints 158, 160, respectively (i.e., the heights of the first and second secondary growth constraints in this embodiment may be analogous to $H_{158}$ and $H_{160}$, as described above). By way of further example, in one embodiment, a notch 1060a, 1062a may have a depth within the first and second secondary growth constraints 158, 160, respectively, of 90% of the height of the first and second secondary growth constraints 158, 160, respectively (i.e., the heights of the first and second secondary growth constraints in this embodiment may be analogous to $H_{158}$ and $H_{160}$, as described above). Alternatively stated, each member of the plurality of the electrode current collectors 136 may effectively meet and extend into both the inner surface 1060 of the first secondary growth constraint 158 and the inner surface 1062 of the second secondary growth constraint 160 (akin to the height $H_{CESB}$, as described above), and may be affixed into the notch 1060a of the first secondary growth constraint 158 and into the notch 1062a of the second secondary growth constraint 160 via glue 182 in a notched embodiment.

Further, FIGS. 16A-16C also depict different embodiments for gluing the plurality of the electrode current collectors 136 in a notched embodiment. For example, in one embodiment depicted in FIG. 16A, the plurality of electrode current collectors 136 may be glued 182 via an electrode current collector top 1892 and an electrode current collector bottom 1894. By way of further example, in one embodiment depicted in FIG. 16B, the plurality of electrode current collectors 136 may be glued 182 via the lateral surfaces of the electrode current collectors 136 (akin to the lateral surfaces of the electrode backbones 134, as described above). By way of further example, in one embodiment depicted in FIG. 16C, the plurality of electrode current collectors 136 may be glued 182 via the top 1892, the bottom 1894, and the lateral surfaces of the electrode current collectors 136.

Figure 17:
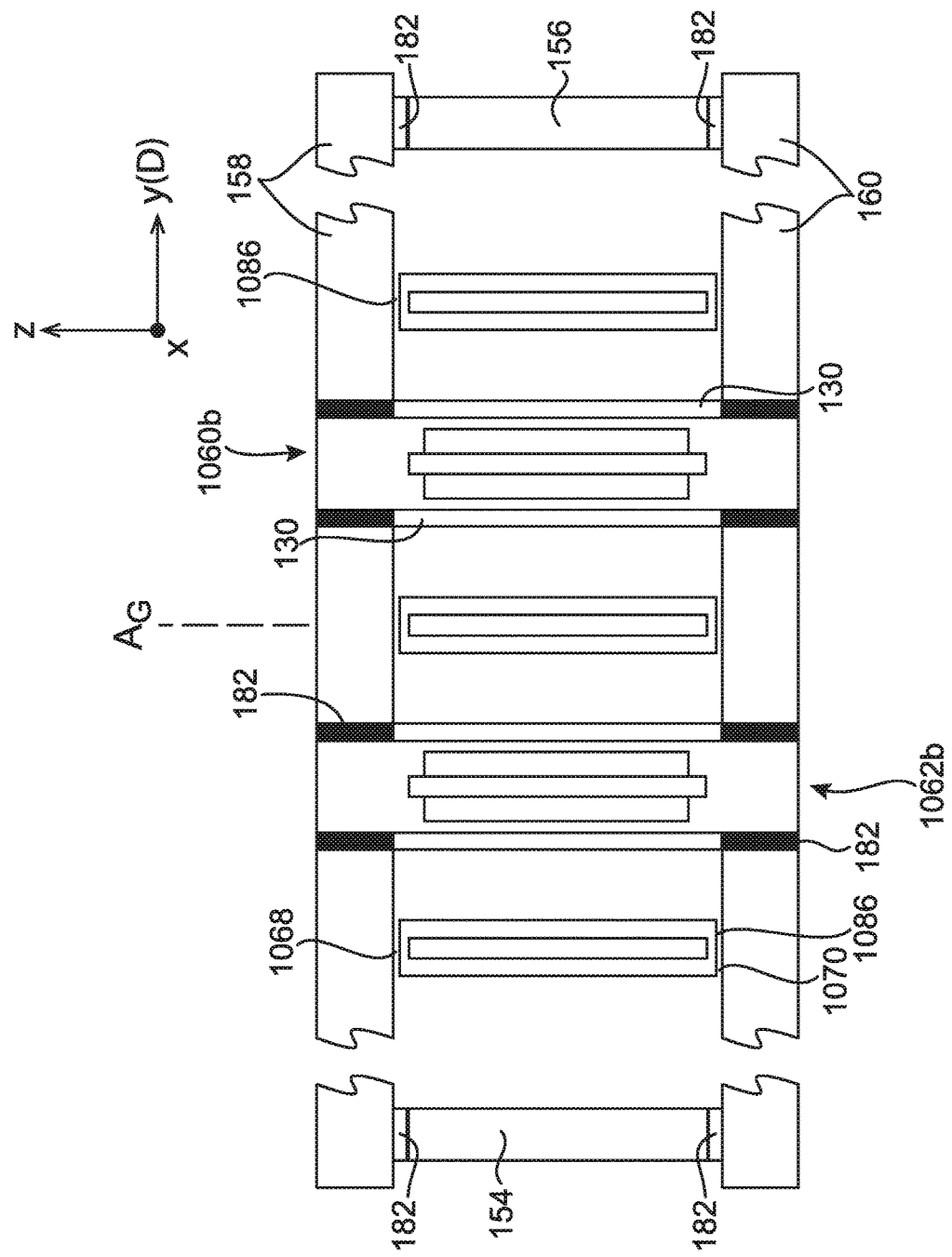
FIG. 17 illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the electrode current collectors are used for assembling the set of electrode constraints via slots.

In certain embodiments, a plurality of electrode current collectors 136 may be affixed to the first secondary growth constraint 158 and the second secondary growth constraint 160 via a slot 1060b, 1062b in each of the first secondary growth constraint 158 and the second secondary growth constraint 160, via an interlocking connection embodiment. Referring now to FIG. 17, a Cartesian coordinate system is shown for reference having a vertical axis (Z axis), a longitudinal axis (Y axis), and a transverse axis (X axis); wherein the X axis is oriented as coming out of the plane of the page); a separator 130, and a designation of the stacking direction D, as described above, co-parallel with the Y axis. More specifically, FIG. 17 shows a cross section, along the line A-A' as in FIG. 1, where first primary growth constraint 154 and second primary growth constraint 156 may be attached via a layer of glue 182 to the first secondary growth constraint 158 and second secondary growth constraint 160, as described above. In certain embodiments, as shown in FIG. 17, non-affixed counter-electrode structures 112 may include counter-electrode gaps 1086 between their tops 1068 and the first secondary growth constraint 158, and their bottoms 1070 and the second secondary growth constraint 160, as described in more detail above.

More specifically, in one embodiment shown in FIG. 17, a plurality of electrode current collectors 136 may be affixed to the first secondary growth constraint 158 and the second secondary growth constraint 160 via a slot 1060b and 1062b and a layer of glue 182. Accordingly, in certain embodiments, the plurality of electrode current collectors 136 affixed to the first and second secondary growth constraints 158, 160, respectively, via slots 1060b, 1062b may include a symmetrical pattern about a gluing axis $A_G$ with respect to affixed electrode current collectors 136, as described above. In certain embodiments, the plurality of electrode current collectors 136 affixed to the first and second secondary growth constraints 158, 160, respectively, via slots 1060b, 1062b may include an asymmetric or random pattern about a gluing axis $A_G$ with respect to affixed electrode current collectors 136, as described above.

In certain embodiments, slots 1060b, 1062b in each of the first secondary growth constraint 158 and the second secondary growth constraint 160 may extend through the first secondary growth constraint 158 and the second secondary growth constraint 160, respectively, in order to receive the plurality of electrode current collectors 136 in an interlocked embodiment. Stated alternatively, the plurality of electrode current collectors 136 may effectively meet and extend entirely through both the first secondary growth constraint 158 and the second secondary growth constraint 160 (akin to the height $H_{CESB}$, as described above), and may be affixed into slots 1060b and 1062b via glue 182 in another interlocked embodiment.

Connections via Primary Growth Constraints

Figure 18A:
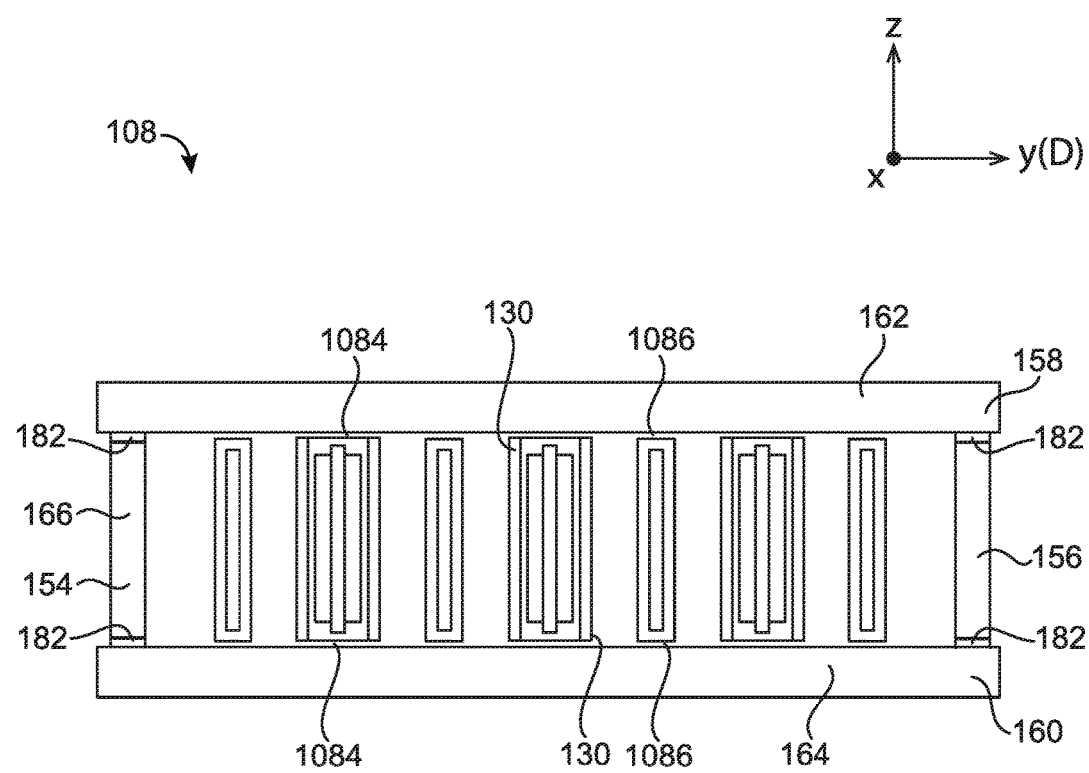
FIG. 18A illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the primary growth constraint system is hybridized with the secondary growth constraint system and used for assembling the set of electrode constraints.
Figure 18B:
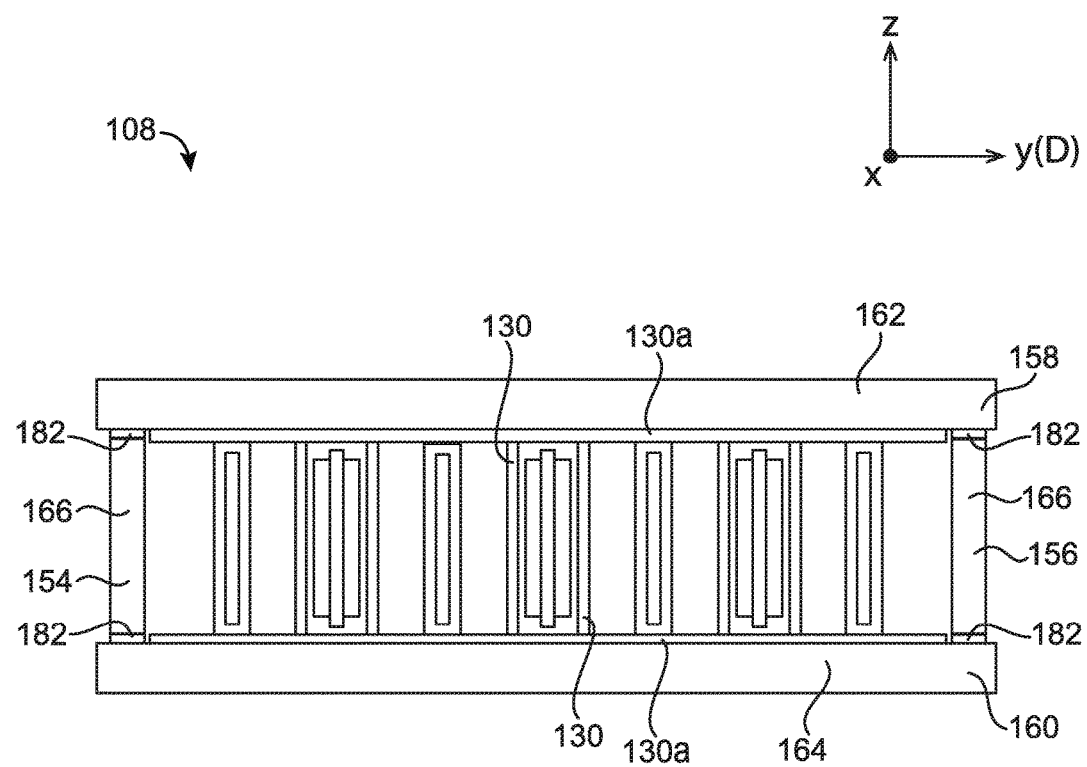
FIG. 18B illustrates a cross-section of an embodiment of the electrode assembly taken along the line A-A' as shown in FIG. 1, further including a set of electrode constraints, including another embodiment of a primary growth constraint system and another embodiment of a secondary growth constraint system where the primary growth constraint system is hybridized with the secondary growth constraint system and used for assembling the set of electrode constraints.

In another embodiment, a constrained electrode assembly 106 may include a set of electrode constraints 108 wherein the secondary connecting member 166 includes the first and second primary growth constraints 154, 156 respectively, and yet still restrains growth of an electrode assembly 106 in both the longitudinal direction (i.e., along the Y axis) and/or the stacking direction D, and the vertical direction (i.e., along the Z axis) simultaneously, as described above. Referring now to FIGS. 18A-18B, a Cartesian coordinate system is shown for reference having a vertical axis (Z axis), a longitudinal axis (Y axis), and a transverse axis (X axis); wherein the X axis is oriented as coming out of the plane of the page; a separator 130, and a designation of the stacking direction D, as described above, co-parallel with the Y axis. More specifically, FIGS. 18A-18B each show a cross section, along the line A-A' as in FIG. 1, of a set of electrode constraints 108, including one embodiment of both a primary growth constraint system 151 and one embodiment of a secondary growth constraint system 152. Primary growth constraint system 151 includes a first primary growth constraint 154 and a second primary growth constraint 156, as described above, and a first primary connecting member 162 and a second primary connecting member 164, as described above. Secondary growth constraint system 152 includes a first secondary growth constraint 158, a second secondary growth constraint 160, and a secondary connecting member 166 embodied as first primary growth constraint 154 and/or second primary growth constraint 156; therefore, in this embodiment, secondary connecting member 166, first primary growth constraint 154, and second primary growth constraint 156 are interchangeable. Further, in this embodiment, first primary connecting member 162 and first secondary growth constraint 158 are interchangeable, as described above. Further still, in this embodiment, second primary connecting member 164 and second secondary growth constraint 160 are interchangeable, as described above.

First primary growth constraint 154 and second primary growth constraint 156 may be attached via a layer of glue 182 to the first secondary growth constraint 158 and second secondary growth constraint 160, as described above. Stated alternatively, in the embodiments shown in FIGS. 18A-18B, the set of electrode constraints 108 include a first primary connecting member 162 that may be the first secondary growth constraint 158 in a hybridized embodiment, and a second primary connecting member 164 that may be the second secondary growth constraint 160 in a hybridized embodiment. As such, the first and second primary connecting members 162, 164, respectively, may be under tension when restraining growth in the longitudinal direction, and may also function as first and second secondary growth constraints 158, 160, respectively (i.e., compression members) when restraining growth in the vertical direction.

More specifically, in one embodiment as shown in FIG. 18A, non-affixed electrode structures 110 and non-affixed counter-electrode structures 112B may include corresponding electrode gaps 1084 and corresponding counter-electrode gaps 1086 between each of their tops, respectively (i.e., 1052 and 1068), and the first secondary growth constraint 158, and each of their bottoms, respectively (i.e., 1054 and 1070), and the second secondary growth constraint 160, as described in more detail above.

More specifically, in one embodiment as shown in FIG. 18B, the set of electrode constraints 108 further includes a second separator 130a adjacent to both the hybridized first secondary growth constraint 158/first primary connecting member 162 and the hybridized second secondary growth constraint 160/second primary connecting member 164.

Fused Constraint System

Figure 19:
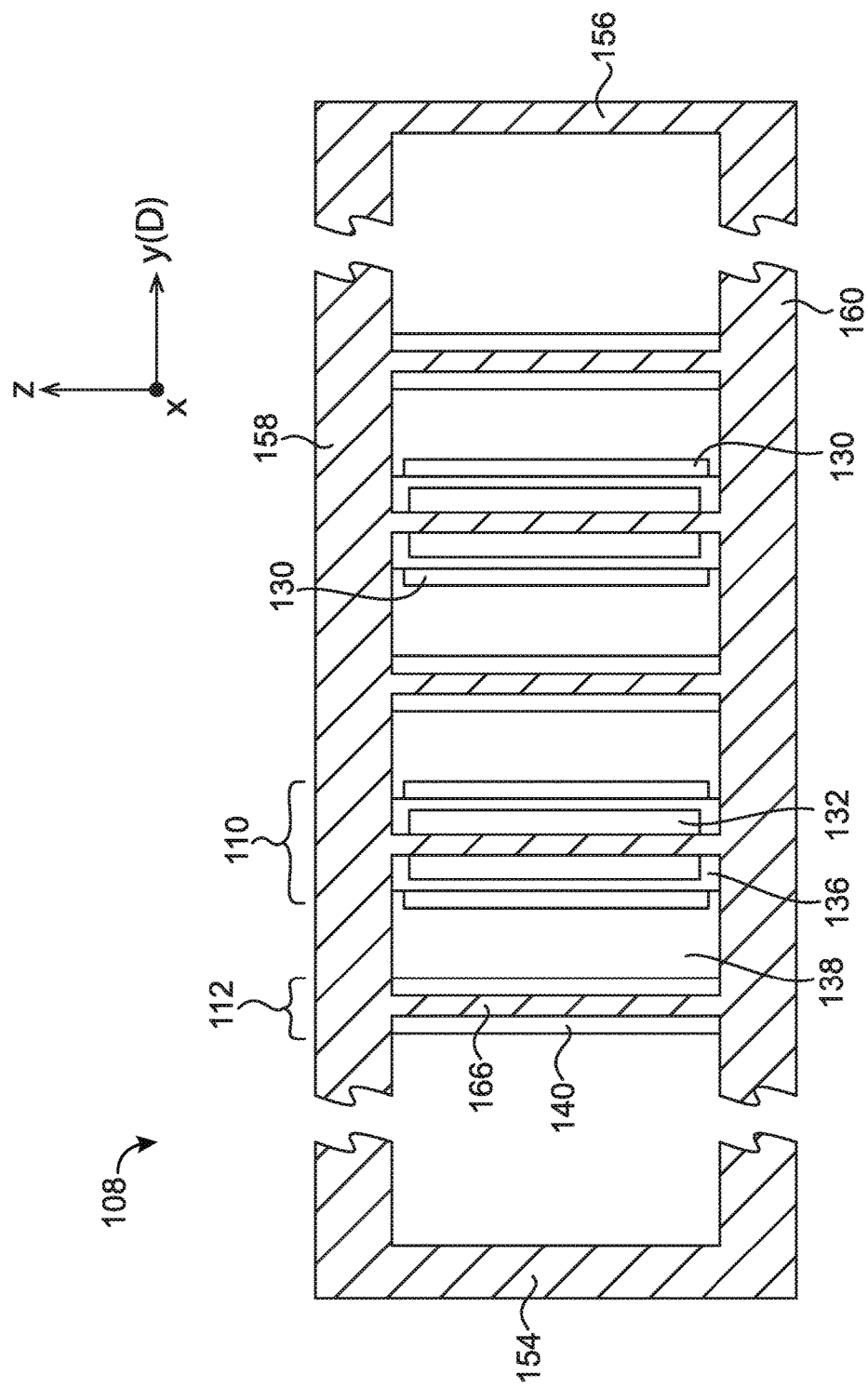
FIG. 19 illustrates a cross-section of an embodiment of the electrode assembly taken along the line A-A' as shown in FIG. 1, further including a set of electrode constraints, including one embodiment of a primary growth constraint system and one embodiment of a secondary growth constraint system where the primary growth constraint system is fused with the secondary growth constraint system and used for assembling the set of electrode constraints.

In some embodiments, a set of electrode constraints 108 may be fused together. For example, in one embodiment, the primary growth constraint system 151 may be fused with the secondary growth constraint system 152. By way of further example, in one embodiment, the secondary growth constraint system 152 may be fused with the primary growth constraint system 151. Stated alternatively, aspects of the primary growth constraint system 151 (e.g., the first and second primary growth constraints 154, 156, respectively) may coexist (i.e., may be fused with) aspects of the secondary growth constraint system 152 (e.g., the first and second secondary growth constraints 158, 160, respectively) in a unibody-type system. Referring now to FIG. 19, a Cartesian coordinate system is shown for reference having a vertical axis (Z axis), a longitudinal axis (Y axis), and a transverse axis (X axis); wherein the X axis is oriented as coming out of the plane of the page; a separator 130, and a designation of the stacking direction D, as described above, co-parallel with the Y axis. More specifically, FIG. 19 shows a cross section, along the line A-A' as in FIG. 1, of a fused electrode constraint 108, including one embodiment of a primary growth constraint system 151 fused with one embodiment of a secondary growth constraint system 152.

Further illustrated in FIG. 19, in one embodiment, are members of the electrode population 110 having an electrode active material layer 132, and an electrode current collector 136. Similarly, in one embodiment, illustrated in FIG. 19 are members of the counter-electrode population 112 having a counter-electrode active material layer 138, and a counter-electrode current collector 140. For ease of illustration, only two members of the electrode population 110 and three members of the counter-electrode population 112 are depicted; in practice, however, an energy storage device 100 or a secondary battery 102 using the inventive subject matter herein may include additional members of the electrode 110 and counter-electrode 112 populations depending on the application of the energy storage device 100 or secondary battery 102, as described above. More specifically, illustrated in the fused embodiment of FIG. 19, the secondary connecting member 166 may be embodied as the electrode and/or counter-electrode backbones 134, 141, respectively, as described above, but each may be fused to each of the first and second secondary growth constraints 158, 160, respectively, as described above. Similarly, the first primary growth constraint 154 and the second primary growth constraint 156 may be fused to the first and second secondary growth constraints 158, 160, respectively, thereby ultimately forming a fused or unibody constraint 108.

Secondary Battery

Referring now to FIG. 20, illustrated is an exploded view of one embodiment of a secondary battery 102 having a plurality of sets of electrode constraints 108a of the present disclosure. The secondary battery 102 includes battery enclosure 104 and a set of electrode assemblies 106a within the battery enclosure 104, each of the electrode assemblies 106 having a first longitudinal end surface 116, an opposing second longitudinal end surface 118 (i.e., separated from first longitudinal end surface 116 along the Y axis the Cartesian coordinate system shown), as described above. Each electrode assembly 106 includes a population of electrode structures 110 and a population of counter-electrode structures 112, stacked relative to each other within each of the electrode assemblies 106 in a stacking direction D; stated differently, the populations of electrode 110 and counter-electrode 112 structures are arranged in an alternating series of electrodes 110 and counter-electrodes 112 with the series progressing in the stacking direction D between first and second longitudinal end surfaces 116, 118, respectively (see, e.g., FIG. 2A; as illustrated in FIG. 2A and FIG. 20, stacking direction D parallels the Y axis of the Cartesian coordinate system(s) shown), as described above. In addition, the stacking direction D within an individual electrode assembly 106 is perpendicular to the direction of stacking of a collection of electrode assemblies 106 within a set 106a (i.e., an electrode assembly stacking direction); stated differently, the electrode assemblies 106 are disposed relative to each other in a direction within a set 106a that is perpendicular to the stacking direction D within an individual electrode assembly 106 (e.g., the electrode assembly stacking direction is in a direction corresponding to the Z axis of the Cartesian coordinate system shown, whereas the stacking direction D within individual electrode assemblies 106 is in a direction corresponding to the Y axis of the Cartesian coordinate system shown).

While the set of electrode assemblies 106a depicted in the embodiment shown in FIG. 20 contains individual electrode assemblies 106 having the same general size, one or more of the individual electrode assemblies 106 may also and/or alternatively have different sizes in at least one dimension thereof, than the other electrode assemblies 106 in the set 106a. For example, according to one embodiment, the electrode assemblies 106 that are stacked together to form the set 106a provided in the secondary battery 102 may have different maximum widths $W_{EA}$ in the longitudinal direction (i.e., stacking direction D) of each assembly 106. According to another embodiment, the electrode assemblies 106 making up the stacked set 106a provided in the secondary battery 102 may have different maximum lengths $L_{EA}$ along the transverse axis that is orthogonal to the longitudinal axis. By way of further example, in one embodiment, each electrode assembly 106 that is stacked together to form the set of electrode assemblies 106a in the secondary battery 102 has a maximum width $W_{EA}$ along the longitudinal axis and a maximum length $L_{EA}$ along the transverse axis that is selected to provide an area of $L_{EA} \times W_{EA}$ that decreases along a direction in which the electrode assemblies 106 are stacked together to form the set of electrode assemblies 106a. For example, the maximum width $W_{EA}$ and maximum length $L_{EA}$ of each electrode assembly 106 may be selected to be less than that of an electrode assembly 106 adjacent thereto in a first direction in which the assemblies 106 are stacked, and to be greater than that of an electrode assembly 106 adjacent thereto in a second direction that is opposite thereto, such that the electrode assemblies 106 are stacked together to form a secondary battery 102 having a set of electrode assemblies 106a in a pyramidal shape. Alternatively, the maximum lengths $L_{EA}$ and maximum widths $W_{EA}$ for each electrode assembly 106 can be selected to provide different shapes and/or configurations for the stacked electrode assembly set 106a. The maximum vertical height $H_{EA}$ for one or more of the electrode assemblies 106 can also and/or alternatively be selected to be different from other assemblies 106 in the set 106a and/or to provide a stacked set 106a having a predetermined shape and/or configuration.

Tabs 190, 192 project out of the battery enclosure 104 and provide an electrical connection between the electrode assemblies 106 of set 106a and an energy supply or consumer (not shown). More specifically, in this embodiment tab 190 is electrically connected to tab extension 191 (e.g., using an electrically conductive glue), and tab extension 191 is electrically connected to the electrodes 110 comprised by each of the electrode assemblies 106. Similarly, tab 192 is electrically connected to tab extension 193 (e.g., using an electrically conductive glue), and tab extension 193 is electrically connected to the counter-electrodes 112 comprised by each of electrode assemblies 106.

Each electrode assembly 106 in the embodiment illustrated in FIG. 20 has an associated primary growth constraint system 151 to restrain growth in the longitudinal direction (i.e., stacking direction D). Alternatively, in one embodiment, a plurality of electrode assemblies 106 making up a set 106a may share at least a portion of the primary growth constraint system 151. In the embodiment as shown, each primary growth constraint system 151 includes first and second primary growth constraints 154, 156, respectively, that may overlie first and second longitudinal end surfaces 116, 118, respectively, as described above; and first and second opposing primary connecting members 162, 164, respectively, that may overlie lateral surfaces 142, as described above. First and second opposing primary connecting members 162, 164, respectively, may pull first and second primary growth constraints 154, 156, respectively, towards each other, or alternatively stated, assist in restraining growth of the electrode assembly 106 in the longitudinal direction, and primary growth constraints 154, 156 may apply a compressive or restraint force to the opposing first and second longitudinal end surfaces 116, 118, respectively. As a result, expansion of the electrode assembly 106 in the longitudinal direction is inhibited during formation and/or cycling of the battery 102 between charged and discharged states. Additionally, primary growth constraint system 151 exerts a pressure on the electrode assembly 106 in the longitudinal direction (i.e., stacking direction D) that exceeds the pressure maintained on the electrode assembly 106 in either of the two directions that are mutually perpendicular to each other and are perpendicular to the longitudinal direction (e.g., as illustrated, the longitudinal direction corresponds to the direction of the Y axis, and the two directions that are mutually perpendicular to each other and to the longitudinal direction correspond to the directions of the X axis and the Z axis, respectively, of the illustrated Cartesian coordinate system).

Further, each electrode assembly 106 in the embodiment illustrated in FIG. 20 has an associated secondary growth constraint system 152 to restrain growth in the vertical direction (i.e., expansion of the electrode assembly 106, electrodes 110, and/or counter-electrodes 112 in the vertical direction (i.e., along the Z axis of the Cartesian coordinate system)). Alternatively, in one embodiment, a plurality of electrode assemblies 106 making up a set 106*a* share at least a portion of the secondary growth constraint system 152. Each secondary growth constraint system 152 includes first and second secondary growth constraints 158, 160, respectively, that may overlie corresponding lateral surfaces 142, respectively, and at least one secondary connecting member 166, each as described in more detail above. Secondary connecting members 166 may pull first and second secondary growth constraints 158, 160, respectively, towards each other, or alternatively stated, assist in restraining growth of the electrode assembly 106 in the vertical direction, and first and second secondary growth constraints 158, 160, respectively, may apply a compressive or restraint force to the lateral surfaces 142), each as described above in more detail. As a result, expansion of the electrode assembly 106 in the vertical direction is inhibited during formation and/or cycling of the battery 102 between charged and discharged states. Additionally, secondary growth constraint system 152 exerts a pressure on the electrode assembly 106 in the vertical direction (i.e., parallel to the Z axis of the Cartesian coordinate system) that exceeds the pressure maintained on the electrode assembly 106 in either of the two directions that are mutually perpendicular to each other and are perpendicular to the vertical direction (e.g., as illustrated, the vertical direction corresponds to the direction of the Z axis, and the two directions that are mutually perpendicular to each other and to the vertical direction correspond to the directions of the X axis and the Y axis, respectively, of the illustrated Cartesian coordinate system).

Further still, each electrode assembly 106 in the embodiment illustrated in FIG. 20 has an associated primary growth constraint system 151—and an associated secondary growth constraint system 152—to restrain growth in the longitudinal direction and the vertical direction, as described in more detail above. Furthermore, according to certain embodiments, the electrode and/or counter-electrode tabs 190, 192, respectively, and tab extensions 191, 193 can serve as a part of the tertiary growth constraint system 155. For example, in certain embodiments, the tab extensions 191, 193 may extend along the opposing transverse surface regions 144, 146 to act as a part of the tertiary constraint system 155, such as the first and second tertiary growth constraints 157, 159. The tab extensions 191, 193 can be connected to the primary growth constraints 154, 156 at the longitudinal ends 117, 119 of the electrode assembly 106, such that the primary growth constraints 154, 156 serve as the at least one tertiary connecting member 165 that places the tab extensions 191, 193 in tension with one another to compress the electrode assembly 106 along the transverse direction, and act as first and second tertiary growth constraints 157, 159, respectively. Conversely, the tabs 190, 192 and/or tab extensions 191, 193 can also serve as the first and second primary connecting members 162, 164, respectively, for the first and second primary growth constraints 154, 156, respectively, according to one embodiment. In yet another embodiment, the tabs 190, 192 and/or tab extensions 191, 193 can serve as a part of the secondary growth constraint system 152, such as by forming a part of the at least one secondary connecting member 166 connecting the secondary growth constraints 158, 160. Accordingly, the tabs 190, 192 and/or tab extensions 191, 193 can assist in restraining overall macroscopic growth of the electrode assembly 106 by either serving as a part of one or more of the primary and secondary constraint systems 151, 152, respectively, and/or by forming a part of a tertiary growth constraint system 155 to constrain the electrode assembly 106 in a direction orthogonal to the direction being constrained by one or more of the primary and secondary growth constraint systems 151, 152, respectively.

To complete the assembly of the secondary battery 102, battery enclosure 104 is filled with a non-aqueous electrolyte (not shown) and lid 104*a* is folded over (along fold line, FL) and sealed to upper surface 104*b*. When fully assembled, the sealed secondary battery 102 occupies a volume bounded by its exterior surfaces (i.e., the displacement volume), the secondary battery enclosure 104 occupies a volume corresponding to the displacement volume of the battery (including lid 104*a*) less its interior volume (i.e., the prismatic volume bounded by interior surfaces 104*c*, 104*d*, 104*e*, 104*f*, 104*g* and lid 104*a*) and each growth constraint 151, 152 of set 106*a* occupies a volume corresponding to its respective displacement volume. In combination, therefore, the battery enclosure 104 and growth constraints 151, 152 occupy no more than 75% of the volume bounded by the outer surface of the battery enclosure 104 (i.e., the displacement volume of the battery). For example, in one such embodiment, the growth constraints 151, 152 and battery enclosure 104, in combination, occupy no more than 60% of the volume bounded by the outer surface of the battery enclosure 104. By way of further example, in one such embodiment, the constraints 151, 152 and battery enclosure 104, in combination, occupy no more than 45% of the volume bounded by the outer surface of the battery enclosure 104. By way of further example, in one such embodiment, the constraints 151, 152 and battery enclosure 104, in combination, occupy no more than 30% of the volume bounded by the outer surface of the battery enclosure 104. By way of further example, in one such embodiment, the constraints 151, 152 and battery enclosure 104, in combination, occupy no more than 20% of the volume bounded by the outer surface of the battery enclosure.

For ease of illustration in FIG. 20, secondary battery 102 includes only one set 106*a* of electrode assemblies 106 and the set 106*a* includes only six electrode assemblies 106. In practice, the secondary battery 102 may include more than one set of electrode assemblies 106*a*, with each of the sets 106*a* being disposed laterally relative to each other (e.g., in a relative direction lying within the X-Y plane of the Cartesian coordinate system of FIG. 20) or vertically relative to each other (e.g., in a direction substantially parallel to the Z axis of the Cartesian coordinate system of FIG. 20). Additionally, in each of these embodiments, each of the sets of electrode assemblies 106*a* may include one or more electrode assemblies 106. For example, in certain embodiments, the secondary battery 102 may comprise one, two, or more sets of electrode assemblies 106*a*, with each such set 106*a* including one or more electrode assemblies 106 (e.g., 1, 2, 3, 4, 5, 6, 10, 15, or more electrode assemblies 106 within each such set 106*a*) and, when the battery 102 includes two or more such sets 106*a*, the sets 106*a* may be laterally or vertically disposed relative to other sets of electrode assemblies 106a included in the secondary battery 102. In each of these various embodiments, each individual electrode assembly 106 may have its own growth constraint(s), as described above (i.e., a 1:1 relationship between electrode assemblies 106 and constraints 151, 152), two more electrode assemblies 106 may have a common growth constraint(s) 151, 152, as described above (i.e., a set of constraints 108 for two or more electrode assemblies 106), or two or more electrode assemblies 106 may share components of a growth constraint(s) 151, 152 (i.e., two or more electrode assemblies 106 may have a common compression member (e.g., second secondary growth constraint 158) and/or tension members 166, for example, as in the fused embodiment, as described above).

Other Battery Components

In certain embodiments, the set of electrode constraints 108, including a primary growth constraint system 151 and a secondary growth constraint system 152, as described above, may be derived from a sheet 2000 having a length $L_1$, width $W_1$, and thickness $t_1$, as shown for example in FIG. 20. More specifically, to form a primary growth constraint system 151, a sheet 2000 may be wrapped around an electrode assembly 106 and folded at folded at edges 2001 to enclose the electrode assembly 106. Alternatively, in one embodiment, the sheet 2000 may be wrapped around a plurality of electrode assemblies 106 that are stacked to form an electrode assembly set 106a. The edges of the sheet may overlap each other, and are welded, glued, or otherwise secured to each other to form a primary growth constraint system 151 including first primary growth constraint 154 and second primary growth constraint 156, and first primary connecting member 162 and second primary connecting member 164. In this embodiment, the primary growth constraint system 151 has a volume corresponding to the displacement volume of sheet 2000 (i.e., the multiplication product of $L_1$, $W_1$ and $t_1$). In one embodiment, the at least one primary connecting member is stretched in the stacking direction D to place the member in tension, which causes a compressive force to be exerted by the first and second primary growth constraints. Alternatively, the at least one secondary connecting member can be stretched in the second direction to place the member in tension, which causes a compressive force to be exerted by the first and second secondary growth constraints. In an alternative embodiment, instead of stretching the connecting members to place them in tension, the connecting members and/or growth constraints or other portion of one or more of the primary and secondary growth constraint systems may be pre-tensioned prior to installation over and/or in the electrode assembly. In another alternative embodiment, the connecting members and/or growth constraints and/or other portions of one or more of the primary and secondary growth constraint systems are not initially under tension at the time of installation into and/or over the electrode assembly, but rather, formation of the battery causes the electrode assembly to expand and induce tension in portions of the primary and/or secondary growth constraint systems such as the connecting members and/or growth constraints. (i.e., self-tensioning).

Sheet 2000 may comprise any of a wide range of compatible materials capable of applying the desired force to the electrode assembly 106. In general, the primary growth constraint system 151 will typically comprise a material that has an ultimate tensile strength of at least 10,000 psi (>70 MPa), that is compatible with the battery electrolyte, does not significantly corrode at the floating or anode potential for the battery 102, and does not significantly react or lose mechanical strength at 45° C., and even up to 70° C. For example, the primary growth constraint system 151 may comprise any of a wide range of metals, alloys, ceramics, glass, plastics, or a combination thereof (i.e., a composite). In one exemplary embodiment, primary growth constraint system 151 comprises a metal such as stainless steel (e.g., SS 316, 440C or 440C hard), aluminum (e.g., aluminum 7075-T6, hard H18), titanium (e.g., 6A1-4V), beryllium, beryllium copper (hard), copper ($O_2$ free, hard), nickel; in general, however, when the primary growth constraint system 151 comprises metal it is generally preferred that it be incorporated in a manner that limits corrosion and limits creating an electrical short between the electrodes 110 and counter-electrodes 112. In another exemplary embodiment, the primary growth constraint system 151 comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the primary growth constraint system 151 comprises a glass such as Schott D263 tempered glass. In another exemplary embodiment, the primary growth constraint system 151 comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the primary growth constraint system 151 comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the primary growth constraint system 151 comprises fibers such as Kevlar 49 Aramid Fiber, S Glass Fibers, Carbon Fibers, Vectran UM LCP Fibers, Dyneema, Zylon.

Thickness ($t_1$) of the primary growth constraint system 151 will depend upon a range of factors including, for example, the material(s) of construction of the primary growth constraint system 151, the overall dimensions of the electrode assembly 106, and the composition of a battery anode and cathode. In some embodiments, for example, the primary growth constraint system 151 will comprise a sheet having a thickness in the range of about 10 to about 100 micrometers. For example, in one such embodiment, the primary growth constraint system 151 comprises a stainless steel sheet (e.g., SS316) having a thickness of about 30 μm. By way of further example, in another such embodiment, the primary growth constraint system 151 comprises an aluminum sheet (e.g., 7075-T6) having a thickness of about 40 μm. By way of further example, in another such embodiment, the primary growth constraint system 151 comprises a zirconia sheet (e.g., Coorstek YZTP) having a thickness of about 30 μm. By way of further example, in another such embodiment, the primary growth constraint system 151 comprises an E Glass UD/Epoxy 0 deg sheet having a thickness of about 75 μm. By way of further example, in another such embodiment, the primary growth constraint system 151 comprises 12 μm carbon fibers at >50% packing density.

Without being bound to any particular theory, methods for gluing, as described herein, may include gluing, soldering, bonding, sintering, press contacting, brazing, thermal spraying joining, clamping, or combinations thereof. Gluing may include joining the materials with conductive materials such as conducting epoxies, conducting elastomers, mixtures of insulating organic glue filled with conducting metals, such as nickel filled epoxy, carbon filled epoxy etc. Conductive pastes may be used to join the materials together and the joining strength could be tailored by temperature (sintering), light (UV curing, cross-linking), chemical curing (catalyst based cross linking). Bonding processes may include wire bonding, ribbon bonding, ultrasonic bonding. Welding processes may include ultrasonic welding, resistance welding, laser beam welding, electron beam welding, induction welding, and cold welding. Joining of these materials can also be performed by using a coating process such as a thermal spray coating such as plasma spraying, flame spraying, arc spraying, to join materials together. For example, a nickel or copper mesh can be joined onto a nickel bus using a thermal spray of nickel as a glue.

Members of the electrode 110 and counter-electrode 112 populations include an electroactive material capable of absorbing and releasing a carrier ion such as lithium, sodium, potassium, calcium, magnesium or aluminum ions. In some embodiments, members of the electrode structure 110 population include an anodically active electroactive material (sometimes referred to as a negative electrode) and members of the counter-electrode structure 112 population include a cathodically active electroactive material (sometimes referred to as a positive electrode). In other embodiments, members of the electrode structure 110 population include a cathodically active electroactive material and members of the counter-electrode structure 112 population comprise an anodically active electroactive material. In each of the embodiments and examples recited in this paragraph, negative electrode active material may be a particulate agglomerate electrode or a monolithic electrode.

Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy thereof.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates and combinations thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of the negative electrode active material is at least 0.1. Typically, however, the void volume fraction of the negative electrode active material is not greater than 0.8. For example, in one embodiment, the void volume fraction of the negative electrode active material is about 0.15 to about 0.75. By way of the further example, in one embodiment, the void volume fraction of the negative electrode active material is about 0.2 to about 0.7. By way of the further example, in one embodiment, the void volume fraction of the negative electrode active material is about 0.25 to about 0.6.

Depending upon the composition of the microstructured negative electrode active material and the method of its formation, the microstructured negative electrode active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the negative electrode active material; for example, lithium ions may enter the negative electrode active material through the void openings after leaving the positive electrode active material. In another embodiment, the void volume comprises closed voids, that is, the negative electrode active material contains voids that are enclosed by negative electrode active material. In general, open voids can provide greater interfacial surface area for the carrier ions whereas closed voids tend to be less susceptible to solid electrolyte interface while each provides room for expansion of the negative electrode active material upon the entry of carrier ions. In certain embodiments, therefore, it is preferred that the negative electrode active material comprise a combination of open and closed voids.

In one embodiment, negative electrode active material comprises porous aluminum, tin or silicon or an alloy thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous negative electrode active material will generally have a porosity fraction of at least about 0.1, but less than 0.8 and have a thickness of about 1 to about 100 micrometers. For example, in one embodiment, negative electrode active material comprises porous silicon, has a thickness of about 5 to about 100 micrometers, and has a porosity fraction of about 0.15 to about 0.75. By way of further example, in one embodiment, negative electrode active material comprises porous silicon, has a thickness of about 10 to about 80 micrometers, and has a porosity fraction of about 0.15 to about 0.7. By way of further example, in one such embodiment, negative electrode active material comprises porous silicon, has a thickness of about 20 to about 50 micrometers, and has a porosity fraction of about 0.25 to about 0.6. By way of further example, in one embodiment, negative electrode active material comprises a porous silicon alloy (such as nickel silicide), has a thickness of about 5 to about 100 micrometers, and has a porosity fraction of about 0.15 to about 0.75.

In another embodiment, negative electrode active material comprises fibers of aluminum, tin or silicon, or an alloy thereof. Individual fibers may have a diameter (thickness dimension) of about 5 nm to about 10,000 nm and a length generally corresponding to the thickness of the negative electrode active material. Fibers (nanowires) of silicon may be formed, for example, by chemical vapor deposition or other techniques known in the art such as vapor liquid solid (VLS) growth and solid liquid solid (SLS) growth. Additionally, the negative electrode active material will generally have a porosity fraction of at least about 0.1, but less than 0.8 and have a thickness of about 1 to about 200 micrometers. For example, in one embodiment, negative electrode active material comprises silicon nanowires, has a thickness of about 5 to about 100 micrometers, and has a porosity fraction of about 0.15 to about 0.75. By way of further example, in one embodiment, negative electrode active material comprises silicon nanowires, has a thickness of about 10 to about 80 micrometers, and has a porosity fraction of about 0.15 to about 0.7. By way of further example, in one such embodiment, negative electrode active material comprises silicon nanowires, has a thickness of about 20 to about 50 micrometers, and has a porosity fraction of about 0.25 to about 0.6. By way of further example, in one embodiment, negative electrode active material comprises nanowires of a silicon alloy (such as nickel silicide), has a thickness of about 5 to about 100 micrometers, and has a porosity fraction of about 0.15 to about 0.75.

In one embodiment, each member of the electrode 110 population has a bottom, a top, and a longitudinal axis ($A_E$) extending from the bottom to the top thereof and in a direction generally perpendicular to the direction in which the alternating sequence of electrode structures 110 and counter-electrode structures 112 progresses. Additionally, each member of the electrode 110 population has a length ($L_E$) measured along the longitudinal axis ($A_E$) of the electrode, a width ($W_E$) measured in the direction in which the alternating sequence of electrode structures and counter-electrode structures progresses, and a height ($H_E$) measured in a direction that is perpendicular to each of the directions of measurement of the length ($L_E$) and the width ($W_E$). Each member of the electrode population also has a perimeter ($P_E$) that corresponds to the sum of the length(s) of the side(s) of a projection of the electrode in a plane that is normal to its longitudinal axis.

The length ($L_E$) of the members of the electrode population will vary depending upon the energy storage device and its intended use. In general, however, the members of the electrode population will typically have a length ($L_E$) in the range of about 5 mm to about 500 mm. For example, in one such embodiment, the members of the electrode population have a length ($L_E$) of about 10 mm to about 250 mm. By way of further example, in one such embodiment the members of the electrode population have a length ($L_E$) of about 25 mm to about 100 mm.

The width ($W_E$) of the members of the electrode population will also vary depending upon the energy storage device and its intended use. In general, however, each member of the electrode population will typically have a width ($W_E$) within the range of about 0.01 mm to 2.5 mm. For example, in one embodiment, the width ($W_E$) of each member of the electrode population will be in the range of about 0.025 mm to about 2 mm. By way of further example, in one embodiment, the width ($W_E$) of each member of the electrode population will be in the range of about 0.05 mm to about 1 mm.

The height ($H_E$) of the members of the electrode population will also vary depending upon the energy storage device and its intended use. In general, however, members of the electrode population will typically have a height ($H_E$) within the range of about 0.05 mm to about 10 mm. For example, in one embodiment, the height ($H_E$) of each member of the electrode population will be in the range of about 0.05 mm to about 5 mm. By way of further example, in one embodiment, the height ($H_E$) of each member of the electrode population will be in the range of about 0.1 mm to about 1 mm. According to one embodiment, the members of the electrode population include one or more first electrode members having a first height, and one or more second electrode members having a second height that is other than the first. For example, in one embodiment, the one or more first electrode members may have a height selected to allow the electrode members to contact a portion of the secondary constraint system in the vertical direction (Z axis). For example, the height of the one or more first electrode members may be sufficient such that the first electrode members extend between and contact both the first and second secondary growth constraints 158, 160 along the vertical axis, such as when at least one of the first electrode members or a substructure thereof serves as a secondary connecting member 166. Furthermore, according to one embodiment, one or more second electrode members may have a height that is less than the one or more first electrode members, such that for example the one or more second electrode members do not fully extend to contact both of the first and second secondary growth constraints 158, 160. In yet another embodiment, the different heights for the one or more first electrode members and one or more second electrode members may be selected to accommodate a predetermined shape for the electrode assembly 106, such as an electrode assembly shape having a different heights along one or more of the longitudinal and/or transverse axis, and/or to provide predetermined performance characteristics for the secondary battery.

The perimeter ($P_E$) of the members of the electrode population will similarly vary depending upon the energy storage device and its intended use. In general, however, members of the electrode population will typically have a perimeter ($P_E$) within the range of about 0.025 mm to about 25 mm. For example, in one embodiment, the perimeter ($P_E$) of each member of the electrode population will be in the range of about 0.1 mm to about 15 mm. By way of further example, in one embodiment, the perimeter ($P_E$) of each member of the electrode population will be in the range of about 0.5 mm to about 10 mm.

In general, members of the electrode population have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the electrode population.

By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the electrode population.

Additionally, it is generally preferred that members of the electrode population have a length ($L_E$) that is substantially greater than its perimeter ($P_E$); for example, in one embodiment, the ratio of $L_E$ to $P_E$ is at least 1.25:1, respectively, for each member of the electrode population. By way of further example, in one embodiment the ratio of $L_E$ to $P_E$ is at least 2.5:1, respectively, for each member of the electrode population. By way of further example, in one embodiment, the ratio of $L_E$ to $P_E$ is at least 3.75:1, respectively, for each member of the electrode population.

In one embodiment, the ratio of the height ($H_E$) to the width ($W_E$) of the members of the electrode population is at least 0.4:1, respectively. For example, in one embodiment, the ratio of $H_E$ to $W_E$ will be at least 2:1, respectively, for each member of the electrode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the electrode population.

Each member of the counter-electrode population has a bottom, a top, and a longitudinal axis ($A_{CE}$) extending from the bottom to the top thereof and in a direction generally perpendicular to the direction in which the alternating sequence of electrode structures and counter-electrode structures progresses. Additionally, each member of the counter-electrode population has a length ($L_{CE}$) measured along the longitudinal axis ($A_{CE}$), a width ($W_{CE}$) measured in the direction in which the alternating sequence of electrode structures and counter-electrode structures progresses, and a height ($H_{CE}$) measured in a direction that is perpendicular to each of the directions of measurement of the length ($L_{CE}$) and the width ($W_{CE}$). Each member of the counter-electrode population also has a perimeter ($P_{CE}$) that corresponds to the sum of the length(s) of the side(s) of a projection of the counter-electrode in a plane that is normal to its longitudinal axis.

The length ($L_{CE}$) of the members of the counter-electrode population will vary depending upon the energy storage device and its intended use. In general, however, each member of the counter-electrode population will typically have a length ($L_{CE}$) in the range of about 5 mm to about 500 mm. For example, in one such embodiment, each member of the counter-electrode population has a length ($L_{CE}$) of about 10 mm to about 250 mm. By way of further example, in one such embodiment each member of the counter-electrode population has a length ($L_{CE}$) of about 25 mm to about 100 mm.

The width ($W_{CE}$) of the members of the counter-electrode population will also vary depending upon the energy storage device and its intended use. In general, however, members of the counter-electrode population will typically have a width ($W_{CE}$) within the range of about 0.01 mm to 2.5 mm. For example, in one embodiment, the width ($W_{CE}$) of each member of the counter-electrode population will be in the range of about 0.025 mm to about 2 mm. By way of further example, in one embodiment, the width ($W_{CE}$) of each member of the counter-electrode population will be in the range of about 0.05 mm to about 1 mm.

The height ($H_{CE}$) of the members of the counter-electrode population will also vary depending upon the energy storage device and its intended use. In general, however, members of the counter-electrode population will typically have a height ($H_{CE}$) within the range of about 0.05 mm to about 10 mm. For example, in one embodiment, the height ($H_{CE}$) of each member of the counter-electrode population will be in the range of about 0.05 mm to about 5 mm. By way of further example, in one embodiment, the height ($H_{CE}$) of each member of the counter-electrode population will be in the range of about 0.1 mm to about 1 mm. According to one embodiment, the members of the counter-electrode population include one or more first counter-electrode members having a first height, and one or more second counter-electrode members having a second height that is other than the first. For example, in one embodiment, the one or more first counter-electrode members may have a height selected to allow the counter-electrode members to contact a portion of the secondary constraint system in the vertical direction (Z axis). For example, the height of the one or more first counter-electrode members may be sufficient such that the first counter-electrode members extend between and contact both the first and second secondary growth constraints 158, 160 along the vertical axis, such as when at least one of the first counter-electrode members or a substructure thereof serves as a secondary connecting member 166. Furthermore, according to one embodiment, one or more second counter-electrode members may have a height that is less than the one or more first counter-electrode members, such that for example the one or more second counter-electrode members do not fully extend to contact both of the first and second secondary growth constraints 158, 160. In yet another embodiment, the different heights for the one or more first counter-electrode members and one or more second counter-electrode members may be selected to accommodate a predetermined shape for the electrode assembly 106, such as an electrode assembly shape having a different heights along one or more of the longitudinal and/or transverse axis, and/or to provide predetermined performance characteristics for the secondary battery.

The perimeter ($P_{CE}$) of the members of the counter-electrode population will also vary depending upon the energy storage device and its intended use. In general, however, members of the counter-electrode population will typically have a perimeter ($P_{CE}$) within the range of about 0.025 mm to about 25 mm. For example, in one embodiment, the perimeter ($P_{CE}$) of each member of the counter-electrode population will be in the range of about 0.1 mm to about 15 mm. By way of further example, in one embodiment, the perimeter ($P_{CE}$) of each member of the counter-electrode population will be in the range of about 0.5 mm to about 10 mm.

In general, each member of the counter-electrode population has a length ($L_{CE}$) that is substantially greater than width ($W_{CE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each member of the counter-electrode population. By way of further example, in one embodiment the ratio of $L_{CE}$ to each of $W_{CE}$ and $H_{CE}$ is at least 10:1 for each member of the counter-electrode population. By way of further example, in one embodiment, the ratio of $L_{CE}$ to each of $W_{CE}$ and $H_{CE}$ is at least 15:1 for each member of the counter-electrode population. By way of further example, in one embodiment, the ratio of $L_{CE}$ to each of $W_{CE}$ and $H_{CE}$ is at least 20:1 for each member of the counter-electrode population.

Additionally, it is generally preferred that members of the counter-electrode population have a length ($L_{CE}$) that is substantially greater than its perimeter ($P_{CE}$); for example, in one embodiment, the ratio of $L_{CE}$ to $P_{CE}$ is at least 1.25:1, respectively, for each member of the counter-electrode population. By way of further example, in one embodiment the ratio of $L_{CE}$ to $P_{CE}$ is at least 2.5:1, respectively, for each member of the counter-electrode population. By way of further example, in one embodiment, the ratio of $L_{CE}$ to $P_{CE}$ is at least 3.75:1, respectively, for each member of the counter-electrode population.

In one embodiment, the ratio of the height ($H_{CE}$) to the width ($W_{CE}$) of the members of the counter-electrode population is at least 0.4:1, respectively. For example, in one embodiment, the ratio of $H_{CE}$ to $W_{CE}$ will be at least 2:1, respectively, for each member of the counter-electrode population. By way of further example, in one embodiment the ratio of $H_{CE}$ to $W_{CE}$ will be at least 10:1, respectively, for each member of the counter-electrode population. By way of further example, in one embodiment the ratio of $H_{CE}$ to $W_{CE}$ will be at least 20:1, respectively, for each member of the counter-electrode population. Typically, however, the ratio of $H_{CE}$ to $W_{CE}$ will generally be less than 1,000:1, respectively, for each member of the electrode population. For example, in one embodiment the ratio of $H_{CE}$ to $W_{CE}$ will be less than 500:1, respectively, for each member of the counter-electrode population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the counter-electrode population.

In one embodiment the negative electrode current conductor layer 136 comprised by each member of the negative electrode population has a length $L_{NC}$ that is at least 50% of the length $L_{NE}$ of the member comprising such negative electrode current collector. By way of further example, in one embodiment the negative electrode current conductor layer 136 comprised by each member of the negative electrode population has a length $L_{NC}$ that is at least 60% of the length $L_{NE}$ of the member comprising such negative electrode current collector. By way of further example, in one embodiment the negative electrode current conductor layer 136 comprised by each member of the negative electrode population has a length $L_{NC}$ that is at least 70% of the length $L_{NE}$ of the member comprising such negative electrode current collector. By way of further example, in one embodiment the negative electrode current conductor layer 136 comprised by each member of the negative electrode population has a length $L_{NC}$ that is at least 80% of the length $L_{NE}$ of the member comprising such negative electrode current collector. By way of further example, in one embodiment the negative electrode current conductor 136 comprised by each member of the negative electrode population has a length $L_{NC}$ that is at least 90% of the length $L_{NE}$ of the member comprising such negative electrode current collector.

In one embodiment, the positive electrode current conductor 140 comprised by each member of the positive electrode population has a length $L_{PC}$ that is at least 50% of the length $L_{PE}$ of the member comprising such positive electrode current collector. By way of further example, in one embodiment the positive electrode current conductor 140 comprised by each member of the positive electrode population has a length $L_{PC}$ that is at least 60% of the length $L_{PE}$ of the member comprising such positive electrode current collector. By way of further example, in one embodiment the positive electrode current conductor 140 comprised by each member of the positive electrode population has a length $L_{PC}$ that is at least 70% of the length $L_{PE}$ of the member comprising such positive electrode current collector. By way of further example, in one embodiment the positive electrode current conductor 140 comprised by each member of the positive electrode population has a length $L_{PC}$ that is at least 80% of the length $L_{PE}$ of the member comprising such positive electrode current collector. By way of further example, in one embodiment the positive electrode current conductor 140 comprised by each member of the positive electrode population has a length $L_{PC}$ that is at least 90% of the length $L_{PE}$ of the member comprising such positive electrode current collector.

In one embodiment negative electrode current collector layer 136 comprises an ionically permeable conductor material that is both ionically and electrically conductive. Stated differently, the negative electrode current collector layer has a thickness, an electrical conductivity, and an ionic conductivity for carrier ions that facilitates the movement of carrier ions between an immediately adjacent active electrode material layer one side of the ionically permeable conductor layer and an immediately adjacent separator layer on the other side of the negative electrode current collector layer in an electrochemical stack. On a relative basis, the negative electrode current collector layer has an electrical conductance that is greater than its ionic conductance when there is an applied current to store energy in the device or an applied load to discharge the device. For example, the ratio of the electrical conductance to the ionic conductance (for carrier ions) of the negative electrode current collector layer will typically be at least 1,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 5,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 10,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 50,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 100,000:1, respectively, when there is an applied current to store energy in the device or an applied load to discharge the device.

In those embodiments in which negative electrode current collector 136 comprises an ionically permeable conductor material that is both ionically and electrically conductive, negative electrode current collector 136 may have an ionic conductance that is comparable to the ionic conductance of an adjacent separator layer when a current is applied to store energy in the device or a load is applied to discharge the device, such as when a secondary battery is charging or discharging. For example, in one embodiment negative electrode current collector 136 has an ionic conductance (for carrier ions) that is at least 50% of the ionic conductance of the separator layer (i.e., a ratio of 0.5:1, respectively) when there is an applied current to store energy in the device or an applied load to discharge the device. By way of further example, in some embodiments the ratio of the ionic conductance (for carrier ions) of negative electrode current collector 136 to the ionic conductance (for carrier ions) of the separator layer is at least 1:1 when there is an applied current to store energy in the device or an applied load to discharge the device. By way of further example, in some embodiments the ratio of the ionic conductance (for carrier ions) of negative electrode current collector 136 to the ionic conductance (for carrier ions) of the separator layer is at least 1.25:1 when there is an applied current to store energy in the device or an applied load to discharge the device. By way of further example, in some embodiments the ratio of the ionic conductance (for carrier ions) of negative electrode current collector 136 to the ionic conductance (for carrier ions) of the separator layer is at least 1.5:1 when there is an applied current to store energy in the device or an applied load to discharge the device. By way of further example, in some embodiments the ratio of the ionic conductance (for carrier ions) of negative electrode current collector 136 to the ionic conductance (for carrier ions) of the separator layer is at least 2:1 when there is an applied current to store energy in the device or an applied load to discharge the device.

In one embodiment, negative electrode current collector 136 also has an electrical conductance that is substantially greater than the electrical conductance of the negative electrode active material layer. For example, in one embodiment the ratio of the electrical conductance of negative electrode current collector 136 to the electrical conductance of the negative electrode active material layer is at least 100:1 when there is an applied current to store energy in the device or an applied load to discharge the device. By way of further example, in some embodiments the ratio of the electrical conductance of negative electrode current collector 136 to the electrical conductance of the negative electrode active material layer is at least 500:1 when there is an applied current to store energy in the device or an applied load to discharge the device. By way of further example, in some embodiments the ratio of the electrical conductance of negative electrode current collector 136 to the electrical conductance of the negative electrode active material layer is at least 1000:1 when there is an applied current to store energy in the device or an applied load to discharge the device. By way of further example, in some embodiments the ratio of the electrical conductance of negative electrode current collector 136 to the electrical conductance of the negative electrode active material layer is at least 5000:1 when there is an applied current to store energy in the device or an applied load to discharge the device. By way of further example, in some embodiments the ratio of the electrical conductance of negative electrode current collector 136 to the electrical conductance of the negative electrode active material layer is at least 10,000:1 when there is an applied current to store energy in the device or an applied load to discharge the device.

The thickness of negative electrode current collector 136 (i.e., the shortest distance between the separator and the negative electrode active material layer between which negative electrode current collector layer 136 is sandwiched) in this embodiment will depend upon the composition of the layer and the performance specifications for the electrochemical stack. In general, when a negative electrode current collector layer is an ionically permeable conductor layer, it will have a thickness of at least about 300 Angstroms. For example, in some embodiments it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, negative electrode current collector 136 will have a thickness in the range of about 0.1 to about 10 micrometers. By way of further example, in some embodiments, negative electrode current collector 136 will have a thickness in the range of about 0.1 to about 5 micrometers. By way of further example, in some embodiments, negative electrode current collector 136 will have a thickness in the range of about 0.5 to about 3 micrometers. In general, it is preferred that the thickness of negative electrode current collector 136 be approximately uniform. For example, in one embodiment it is preferred that negative electrode current collector 136 have a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments negative electrode current collector 136 has a thickness non-uniformity of less than about 20%. By way of further example, in some embodiments negative electrode current collector 136 has a thickness non-uniformity of less than about 15%. In some embodiments the ionically permeable conductor layer has a thickness non-uniformity of less than about 10%.

In one preferred embodiment, negative electrode current collector 136 is an ionically permeable conductor layer comprising an electrically conductive component and an ion conductive component that contribute to the ionic permeability and electrical conductivity. Typically, the electrically conductive component will comprise a continuous electrically conductive material (such as a continuous metal or metal alloy) in the form of a mesh or patterned surface, a film, or composite material comprising the continuous electrically conductive material (such as a continuous metal or metal alloy). Additionally, the ion conductive component will typically comprise pores, e.g., interstices of a mesh, spaces between a patterned metal or metal alloy containing material layer, pores in a metal film, or a solid ion conductor having sufficient diffusivity for carrier ions. In certain embodiments, the ionically permeable conductor layer comprises a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

Being positioned between the negative electrode active material layer and the separator, negative electrode current collector 136 may facilitate more uniform carrier ion transport by distributing current from the negative electrode current collector across the surface of the negative electrode active material layer. This, in turn, may facilitate more uniform insertion and extraction of carrier ions and thereby reduce stress in the negative electrode active material during cycling; since negative electrode current collector 136 distributes current to the surface of the negative electrode active material layer facing the separator, the reactivity of the negative electrode active material layer for carrier ions will be the greatest where the carrier ion concentration is the greatest. In yet another embodiment, the positions of the negative electrode current collector 136 and the negative electrode active material layer may be reversed.

According to one embodiment, each member of the positive electrodes has a positive electrode current collector 140 that may be disposed, for example, between the positive electrode backbone and the positive electrode active material layer. Furthermore, one or more of the negative electrode current collector 136 and positive electrode current collector 140 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, positive electrode current collector 140 comprises gold or an alloy thereof such as gold silicide. By way of further example, in one embodiment, positive electrode current collector 140 comprises nickel or an alloy thereof such as nickel silicide.

In an alternative embodiment, the positions of the positive electrode current collector layer and the positive electrode active material layer may be reversed, for example such that that the positive electrode current collector layer is positioned between the separator layer and the positive electrode active material layer. In such embodiments, the positive electrode current collector 140 for the immediately adjacent positive electrode active material layer comprises an ionically permeable conductor having a composition and construction as described in connection with the negative electrode current collector layer; that is, the positive electrode current collector layer comprises a layer of an ionically permeable conductor material that is both ionically and electrically conductive. In this embodiment, the positive electrode current collector layer has a thickness, an electrical conductivity, and an ionic conductivity for carrier ions that facilitates the movement of carrier ions between an immediately adjacent positive electrode active material layer on one side of the positive electrode current collector layer and an immediately adjacent separator layer on the other side of the positive electrode current collector layer in an electrochemical stack. On a relative basis in this embodiment, the positive electrode current collector layer has an electrical conductance that is greater than its ionic conductance when there is an applied current to store energy in the device or an applied load to discharge the device. For example, the ratio of the electrical conductance to the ionic conductance (for carrier ions) of the positive electrode current collector layer will typically be at least 1,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 5,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 10,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 50,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 100,000:1, respectively, when there is an applied current to store energy in the device or an applied load to discharge the device.

Electrically insulating separator layers 130 may surround and electrically isolate each member of the electrode structure 110 population from each member of the counter-electrode structure 112 population. Electrically insulating separator layers 130 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the electrode and counter-electrode populations. In certain embodiments, for example, and ignoring the porosity of the microporous separator material, at least 70 vol % of electrically insulating separator material between a member of the electrode structure 110 population and the nearest member(s) of the counter-electrode structure 112 population (i.e., an "adjacent pair") for ion exchange during a charging or discharging cycle is a microporous separator material; stated differently, microporous separator material constitutes at least 70 vol % of the electrically insulating material between a member of the electrode structure 110 population and the nearest member of the counter-electrode 112 structure population. By way of further example, in one embodiment, and ignoring the porosity of the microporous separator material, microporous separator material constitutes at least 75 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 80 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 85 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 90 vol % of the electrically insulating separator material layer between adjacent pairs of members of the electrode structure 110 population and member of the counter-electrode structure 112 population, respectively. By way of further example, in one embodiment, and ignoring the porosity of the microporous separator material, the microporous separator material constitutes at least 95 vol % of the electrically insulating separator material layer between adjacent pairs of members of the electrode structure 110 population and members of the counter-electrode structure 112 population, respectively. By way of further example, in one embodiment, and ignoring the porosity of the microporous separator material, the microporous separator material constitutes at least 99 vol % of the electrically insulating separator material layer between adjacent pairs of members of the electrode structure 110 population and members of the counter-electrode structure 112 population, respectively.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, alum inates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

Microporous separator materials may be deposited, for example, by electrophoretic deposition of a particulate separator material in which particles are coalesced by surface energy such as electrostatic attraction or van der Waals forces, slurry deposition (including spin or spray coating) of a particulate separator material, screen printing, dip coating, and electrostatic spray deposition. Binders may be included in the deposition process; for example, the particulate material may be slurry deposited with a dissolved binder that precipitates upon solvent evaporation, electrophoretically deposited in the presence of a dissolved binder material, or co-electrophoretically deposited with a binder and insulating particles etc. Alternatively, or additionally, binders may be added after the particles are deposited into or onto the electrode structure; for example, the particulate material may be dispersed in an organic binder solution and dip coated or spray-coated, followed by drying, melting, or cross-linking the binder material to provide adhesion strength.

In an assembled energy storage device, the microporous separator material is permeated with a non-aqueous electrolyte suitable for use as a secondary battery electrolyte. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Furthermore, according to one embodiment, components of the secondary battery 102 including the microporous separator 130 and other electrode 110 and/or counter-electrode 112 structures comprise a configuration and composition that allow the components to function, even in a case where expansion of electrode active material 132 occurs during charge and discharge of the secondary battery 102. That is, the components may be structured such that failure of the components due to expansion of the electrode active material 132 during charge/discharge thereof is within acceptable limits.

Electrode Constraint Parameters

According to one embodiment, the design of the set of electrode constraints 108 depends on parameters including: (i) the force exerted on components of the set of electrode constraints 108 due to the expansion of the electrode active material layers 132; and (ii) the strength of the set of electrode constraints 108 that is required to counteract force exerted by the expansion of the electrode active material layers 132. For example, according to one embodiment, the forces exerted on the system by the expansion of the electrode active material are dependent on the cross-sectional electrode area along a particular direction. For example, the force exerted in the longitudinal direction will be proportional to the length of the electrode ($L_E$) multiplied by the height of the electrode ($H_E$); in the vertical direction, the force would be proportional to the length of the electrode ($L_E$) multiplied by the width of the electrode ($W_E$), and the force in the transverse direction would be proportional to the width of the electrode ($W_E$) multiplied by the height of the electrode ($H_E$).

The design of the primary growth constraints 154, 156 may be dependent on a number of variables. The primary growth constraints 154, 156 restrain macroscopic growth of the electrode assembly 106 that is due to expansion of the electrode active material layers 132 in the longitudinal direction. In the embodiment as shown in FIG. 8A, the primary growth constraints 154, 156 act in concert with the at least one primary connecting member 158 (e.g., first and second primary connecting members 158 and 160), to restrain growth of the electrode structures 110 having the electrode active material layers 132. In restraining the growth, the at least one connecting member 158 places the primary growth constraints 154, 156 in tension with one another, such that they exert a compressive force to counteract the forces exerted by growth of the electrode active material layers 132. According to one embodiment, when a force is exerted on the primary growth constraints 154, 156, depending on the tensile strength of the primary connecting members 158, the primary growth constraints 154, 156 can do at least one of: (i) translate away from each other (move apart in the longitudinal direction); (ii) compress in thickness; and (iii) bend and/or deflect along the longitudinal direction, to accommodate the force. The extent of translation of the primary growth constraints 154, 156 away from each other may depend on the design of the primary connecting members 158, 160. The amount the primary growth constraints 154, 156 can compress is a function of the primary growth constraint material properties, e.g., the compressive strength of the material that forms the primary growth constraints 154, 156. According to one embodiment, the amount that the primary growth constraints 154, 156 can bend may depends on the following: (i) the force exerted by the growth of the electrode structures 110 in the longitudinal direction, (ii) the elastic modulus of the primary growth constraints 154, 156; (iii) the distance between primary connecting members 158, 160 in the vertical direction; and (iv) the thickness (width) of the primary growth constraints 154, 156. In one embodiment, a maximum deflection of the primary growth constraints 154, 156 may occur at the midpoint of the growth constraints 154, 156 in a vertical direction between the primary connecting members 158, 160. The deflection increases with the fourth power of the distance between the primary connecting members 158, 160 along the vertical direction, decreases linearly with the constraint material modulus, and decreases with the $3^{rd}$ power of the primary growth constraint thickness (width). The equation governing the deflection due to bending of the primary growth constraints 154, 156 can be written as:

$$\delta = 60wL^4/Eh^3$$

where w=total distributed load applied on the primary growth constraint 154, 156 due to the electrode expansion; L=distance between the primary connecting members 158, 160 along the vertical direction; E=elastic modulus of the primary growth constraints 154, 156, and h=thickness (width) of the primary growth constraints 154, 156.

In one embodiment, the stress on the primary growth constraints 154, 156 due to the expansion of the electrode active material 132 can be calculated using the following equation:

$$\sigma = 3wL^2/4h^2$$

where w=total distributed load applied on the primary growth constraints 154, 156 due to the expansion of the electrode active material layers 132; L=distance between primary connecting members 158, 160 along the vertical direction; and h=thickness (width) of the primary growth constraints 154, 156. In one embodiment, the highest stress on the primary growth constraints 154, 156 is at the point of attachment of the primary growth constraints 154, 156 to the primary connecting members 158, 160. In one embodiment, the stress increases with the square of the distance between the primary connecting members 158, 160, and decreases with the square of the thickness of the primary growth constraints 154, 156.

Variables Affecting Primary Connecting Member Design

A number of variables may affect the design of the at least one primary connecting member 158, such as the first and second primary connecting members 158, 160 as shown in the embodiment depicted in FIG. 8A. In one embodiment, the primary connecting members 158, 160 may provide sufficient resistance to counteract forces that could otherwise result in the primary growth constraints 154, 156 translating away from each other (moving apart). In one embodiment, the equation that governs the tensile stress on the primary connecting members 158, 160 can be written as follows:

$$\sigma = PL/2t$$

where P=pressure applied due to expansion of the electrode active material layers 132 on the primary growth constraints; L=distance between the primary connecting members 158, 160 along the vertical direction, and t=thickness of the connecting members 158, 160 in the vertical direction.

Variables Affecting Secondary Growth Constraint Design

A number of variables may affect the design of the first and second secondary growth constraints 158, 160, as shown in the embodiment depicted in FIG. 8B. In one embodiment, the variables affecting the design of the secondary growth constraints 158, 160 are similar to the variables affecting the design of the primary growth constraints 154, 156, but translated into the orthogonal direction. For example, in one embodiment, the equation governing the deflection due to bending of the secondary growth constraints 158, 160 can be written as:

$$\delta = 60wy^4/Et^3$$

where w=total distributed load applied on the secondary growth constraints 158, 160 due to the expansion of the electrode active material layers 132; y=distance between the secondary connecting members 166 (such as first and second primary growth constraints 154, 156 acting as secondary connecting members 166) in the longitudinal direction; E=elastic modulus of the secondary growth constraints 158, 160, and t=thickness of the secondary growth constraints 158, 160. In another embodiment, the stress on the secondary growth constraints 158, 160 can be written as:

$$\sigma = 3wy^2/4t^2$$

where w=total distributed load applied on the secondary growth constraints 158, 160 due to the expansion of the electrode active material layers 132; y=distance between the secondary connecting members 154, 156 along the longitudinal direction; and t=thickness of the secondary growth constraints 158, 160.

Variables Affecting Secondary Connecting Member Design

A number of variables may affect the design of the at least one secondary connecting member 166, such as first and second secondary connecting members 154, 156, as shown in the embodiment depicted in FIG. 8B. In one embodiment, the tensile stress on secondary connecting members 154, 156 can be written similarly to that for the primary connecting members 158,160 as follows:

$$\sigma = Py/2h,$$

where P=pressure applied due to the expansion of the electrode active material layers 132 on the secondary growth constraints 158, 160; y=distance between the connecting members 154, 156 along the longitudinal direction, and h=thickness of the secondary connecting members 154, 156 in the longitudinal direction.

In one embodiment, the at least one connecting member 166 for the secondary growth constraints 158, 160 are not located at the longitudinal ends 117, 119 of the electrode assembly 106, but may instead be located internally within the electrode assembly 106. For example, a portion of the counter electrode structures 112 may act as secondary connecting members 166 that connect the secondary growth constraints 158, 160 to one another. In such a case where the at least one secondary connecting member 166 is an internal member, and where the expansion of the electrode active material layers 132 occurs on either side of the secondary connecting member 166, the tensile stress on the internal secondary connecting members 166 can be calculated as follows:

$$\sigma = Py/h$$

where P=pressure applied due to expansion of the electrode active material on regions of the secondary growth constraints 158, 160 that are in between the internal first and second secondary connecting members 166 (e.g., counter electrode structures 112 separated from each other in the longitudinal direction); y=distance between the internal secondary connecting members 166 along the longitudinal direction, and h=thickness of the internal secondary connecting members 166 in the longitudinal direction. According to this embodiment, only one half of the thickness of the internal secondary connecting member 166 (e.g., counter-electrode structure 112) contributes towards restraining the expansion due to the electrode active material on one side, with the other half of the thickness of the internal secondary connecting member 166 contributing to the restraining of the expansion due to the electrode active material on the other side.

EXAMPLES

Example 1

Figure 21:
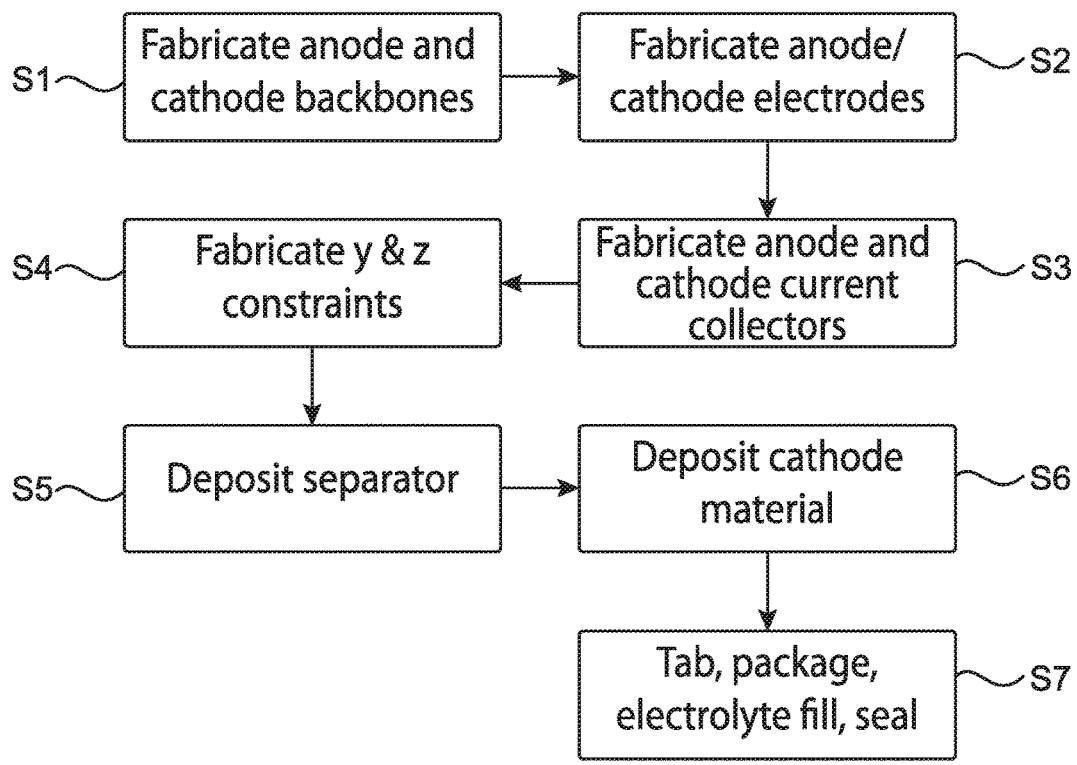
FIG. 21 illustrates an embodiment of a flowchart for the general assembly of an energy storage device or a secondary battery utilizing one embodiment of a set of growth constraints.

The present example demonstrates an example of a method of fabricating an electrode assembly 106 having the set of constraints 108. FIG. 21 is referred to herein as an embodiment of the method.

In the example, in Step S1, the anode and cathode backbones 134, 141, respectively, are fabricated. The anodes 110 are then fabricated by forming anodically active material 132, such as a silicon-containing material, on the anode backbones 134, as shown in Step S2. In Step S3, the anode and cathode current collectors 136, 140, respectively, are fabricated. The set of constraints 108 is fabricated, as in Step S4. In Step S5, the material for forming the separators 130 is deposited on the sides of the anode current collectors 136. In Step S6, the cathodically active material 138 is formed by depositing the material between the anode structures 110 and the cathode backbone 141. Finally, in Step S7, the electrode assembly 106 is connected to tabs, packaged, filled with electrolyte and sealed. According to one embodiment, the fabrication of the set of constraints 108 in Step S4 before the separator 130 and/or cathode active material 138 are deposited in Steps S5 and S6 may provide for improved adhesion of the anode structure 110 to the set of constraints 108, without excess residue that might otherwise remain if the set of constraints 108 were formed after the separator 130 and/or cathodically active material 138 was provided to the electrode assembly 106.

The following embodiments are provided to illustrate aspects of the disclosusre, although the embodiments are not intended to be limiting and other aspects and/or embodiments may also be provided.

Embodiment 1. A secondary battery for cycling between a charged and a discharged state, the secondary battery comprising a battery enclosure, an electrode assembly, carrier ions, a non-aqueous liquid electrolyte within the battery enclosure, and a set of electrode constraints, wherein the electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, the ratio of each of $L_{EA}$ and $W_{EA}$ to $H_{EA}$ being at least 2:1, respectively, the electrode assembly further comprises a population of electrode structures, a population of counter-electrode structures, and an electrically insulating microporous separator material electrically separating members of the electrode and counter-electrode populations, members of the electrode and counter-electrode structure populations being arranged in an alternating sequence in the longitudinal direction, each member of the population of electrode structures comprises a layer of an electrode active material and each member of the population of counter-electrode structures comprises a layer of a counter-electrode active material, wherein the electrode active material has the capacity to accept more than one mole of carrier ion per mole of electrode active material when the secondary battery is charged from a discharged state to a charged state, the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint system restrains growth of the electrode assembly in the longitudinal direction such that any increase in the Feret diameter of the electrode assembly in the longitudinal direction over 20 consecutive cycles of the secondary battery is less than 20%, the set of electrode constraints further comprising a secondary constraint system comprising first and second secondary growth constraints separated in a second direction and connected by at least one secondary connecting member, wherein the secondary constraint system at least partially restrains growth of the electrode assembly in the second direction upon cycling of the secondary battery, the second direction being orthogonal to the longitudinal direction, the charged state is at least 75% of a rated capacity of the secondary battery, and the discharged state is less than 25% of the rated capacity of the secondary battery.

Embodiment 2. The secondary battery of Embodiment 1, wherein the primary constraint array restrains growth of the electrode assembly in the longitudinal direction such that any increase in the Feret diameter of the electrode assembly in the longitudinal direction over 30 consecutive cycles of the secondary battery is less than 20%.

Embodiment 3. The secondary battery of Embodiment 1, wherein the primary constraint array restrains growth of the electrode assembly in the longitudinal direction such that any increase in the Feret diameter of the electrode assembly in the longitudinal direction over 50 consecutive cycles of the secondary battery is less than 20%.

Embodiment 4. The secondary battery of Embodiment 1, wherein the primary constraint array restrains growth of the electrode assembly in the longitudinal direction such that any increase in the Feret diameter of the electrode assembly in the longitudinal direction over 80 consecutive cycles of the secondary battery is less than 20%.

Embodiment 5. The secondary battery of Embodiment 1, wherein the primary constraint array restrains growth of the electrode assembly in the longitudinal direction to less than 20% over 100 consecutive cycles of the secondary battery.

Embodiment 6. The secondary battery of Embodiment 1, wherein the primary constraint array restrains growth of the electrode assembly in the longitudinal direction such that any increase in the Feret diameter of the electrode assembly in the longitudinal direction over 1000 consecutive cycles of the secondary battery is less than 20%.

Embodiment 7. The secondary battery as in any preceding Embodiment, wherein the primary constraint array restrains growth of the electrode assembly in the longitudinal direction such that any increase in the Feret diameter of the electrode assembly in the longitudinal direction over 10 consecutive cycles of the secondary battery is less than 10%.

Embodiment 8. The secondary battery as in any preceding Embodiment, wherein the primary constraint array restrains growth of the electrode assembly in the longitudinal direction such that any increase in the Feret diameter of the electrode assembly in the longitudinal direction over 20 consecutive cycles of the secondary battery is less than 10%.

Embodiment 9. The secondary battery as in any preceding Embodiment, wherein the primary constraint array restrains growth of the electrode assembly in the longitudinal direction such that any increase in the Feret diameter of the electrode assembly in the longitudinal direction over 30 consecutive cycles of the secondary battery is less than 10%.

Embodiment 10. The secondary battery as in any preceding Embodiment, wherein the primary constraint array restrains growth of the electrode assembly in the longitudinal direction such that any increase in the Feret diameter of the electrode assembly in the longitudinal direction over 50 consecutive cycles of the secondary battery is less than 10%.

Embodiment 11. The secondary battery as in any preceding Embodiment, wherein the primary constraint array restrains growth of the electrode assembly in the longitudinal direction such that any increase in the Feret diameter of the electrode assembly in the longitudinal direction over 80 consecutive cycles of the secondary battery is less than 10%.

Embodiment 12. The secondary battery as in any preceding Embodiment, wherein the primary constraint array restrains growth of the electrode assembly in the longitudinal direction such that any increase in the Feret diameter of the electrode assembly in the longitudinal direction over 100 consecutive cycles of the secondary battery is less than 10%.

Embodiment 13. The secondary battery as in any preceding Embodiment, wherein the primary constraint array restrains growth of the electrode assembly in the longitudinal direction such that any increase in the Feret diameter of the electrode assembly in the longitudinal direction over 5 consecutive cycles of the secondary battery is less than 5%.

Embodiment 14. The secondary battery as in any preceding Embodiment, wherein the primary constraint array restrains growth of the electrode assembly in the longitudinal direction such that any increase in the Feret diameter of the electrode assembly in the longitudinal direction over 10 consecutive cycles of the secondary battery is less than 5%.

Embodiment 15. The secondary battery as in any preceding Embodiment, wherein the primary constraint array restrains growth of the electrode assembly in the longitudinal direction such that any increase in the Feret diameter of the electrode assembly in the longitudinal direction over 20 consecutive cycles of the secondary battery is less than 5%.

Embodiment 16. The secondary battery as in any preceding Embodiment, wherein the primary constraint array restrains growth of the electrode assembly in the longitudinal direction such that any increase in the Feret diameter of the electrode assembly in the longitudinal direction over 30 consecutive cycles of the secondary battery is less than 5%.

Embodiment 17. The secondary battery as in any preceding Embodiment, wherein the primary constraint array restrains growth of the electrode assembly in the longitudinal direction such that any increase in the Feret diameter of the electrode assembly in the longitudinal direction over 50 consecutive cycles of the secondary battery is less than 5%.

Embodiment 18. The secondary battery as in any preceding Embodiment, wherein the primary constraint array restrains growth of the electrode assembly in the longitudinal direction such that any increase in the Feret diameter of the electrode assembly in the longitudinal direction over 80 consecutive cycles of the secondary battery is less than 5%.

Embodiment 19. The secondary battery as in any preceding Embodiment, wherein the primary constraint array restrains growth of the electrode assembly in the longitudinal direction such that any increase in the Feret diameter of the electrode assembly in the longitudinal direction per cycle of the secondary battery is less than 1%.

Embodiment 20. The secondary battery as in any preceding Embodiment, wherein the secondary growth constraint system restrains growth of the electrode assembly in the second direction such that any increase in the Feret diameter of the electrode assembly in the second direction over 20 consecutive cycles upon repeated cycling of the secondary battery is less than 20%.

Embodiment 21. The secondary battery as in any preceding Embodiment, wherein the secondary growth constraint system restrains growth of the electrode assembly in the second direction such that any increase in the Feret diameter of the electrode assembly in the second direction over 10 consecutive cycles of the secondary battery is less than 10%.

Embodiment 22. The secondary battery as in any preceding Embodiment, wherein the secondary growth constraint system restrains growth of the electrode assembly in the second direction such that any increase in the Feret diameter of the electrode assembly in the second direction over 5 consecutive cycles of the secondary battery is less than 5%.

Embodiment 23. The secondary battery as in any preceding Embodiment, wherein the secondary growth constraint system restrains growth of the electrode assembly in the second direction such that any increase in the Feret diameter of the electrode assembly in the second direction per cycle of the secondary battery is less than 1%.

Embodiment 24. The secondary battery as in any preceding Embodiment, wherein the first primary growth constraint at least partially covers the first longitudinal end surface of the electrode assembly, and the second primary growth constraint at least partially covers the second longitudinal end surface of the electrode assembly.

Embodiment 25. The secondary battery as in any preceding Embodiment, wherein a surface area of a projection of the electrode assembly in a plane orthogonal to the stacking direction, is smaller than the surface areas of projections of the electrode assembly onto other orthogonal planes.

Embodiment 26. The secondary battery as in any preceding Embodiment, wherein a surface area of a projection of an electrode structure in a plane orthogonal to the stacking direction, is larger than the surface areas of projections of the electrode structure onto other orthogonal planes.

Embodiment 27. The secondary battery as in any preceding Embodiment, wherein at least a portion of the primary growth constraint system is pre-tensioned to exert a compressive force on at least a portion of the electrode assembly in the longitudinal direction, prior to cycling of the secondary battery between charged and discharged states.

Embodiment 28. The secondary battery as in any preceding Embodiment, wherein the primary constraint system comprises first and second primary connecting members that are separated from each other in the first direction and connect the first and second primary growth constraints.

Embodiment 29. The secondary battery as in any preceding Embodiment, wherein the first primary connecting member is the first secondary growth constraint, the second primary connecting member is the second secondary growth constraint, and the first primary growth constraint or the second primary growth constraint is the first secondary connecting member.

Embodiment 30. The secondary battery as in any preceding Embodiment, wherein the at least one secondary connecting member comprises a member that is interior to longitudinal first and second ends of the electrode assembly along the longitudinal axis.

Embodiment 31. The secondary battery as in any preceding Embodiment, wherein the at least one secondary connecting member comprises at least a portion of one or more of the electrode and counter electrode structures.

Embodiment 32. The secondary battery as in any preceding Embodiment, wherein the at least one secondary connecting member comprises a portion of at least one of an electrode backbone structure and a counter-electrode backbone structure.

Embodiment 33. The secondary battery as in any preceding Embodiment, wherein the at least one secondary connecting member comprises a portion of one or more of an electrode current collector and a counter-electrode current collector.

Embodiment 34. The secondary battery as in any preceding Embodiment, wherein at least one of the first and second primary growth constraints is interior to longitudinal first and second ends of the electrode assembly along the longitudinal axis.

Embodiment 35. The secondary battery as in any preceding claim, wherein at least one of the first and second primary growth constraints comprises at least a portion of one or more of the electrode and counter electrode structures.

Embodiment 36. The secondary battery as in any preceding Embodiment, wherein at least one of the first and second primary growth constraints comprises a portion of at least one of an electrode backbone structure and a counter-electrode backbone structure.

Embodiment 37. The secondary battery as in any preceding Embodiment, wherein at least one of the first and second primary growth constraints comprises a portion of one or more of an electrode current collector and a counter-electrode current collector.

Embodiment 38. The secondary battery as in any preceding Embodiment, further comprising a tertiary constraint system comprising first and second tertiary growth constraints separated in a third direction and connected by at least one tertiary connecting member wherein the tertiary constraint system restrains growth of the electrode assembly in the third direction in charging of the secondary battery from the discharged state to the charged state, the third direction being orthogonal to the longitudinal direction and second direction.

Embodiment 39. The secondary battery as in any preceding Embodiment wherein the electrode active material is anodically active and the counter-electrode active material is cathodically active.

Embodiment 40. The secondary battery as in any preceding Embodiment wherein each member of the population of electrode structures comprises a backbone.

Embodiment 41. The secondary battery as in any preceding Embodiment wherein each member of the population of counter-electrode structures comprises a backbone.

Embodiment 42. The secondary battery as in any preceding Embodiment wherein the secondary constraint system restrains growth of the electrode assembly in the vertical direction with a restraining force of greater than 1000 psi and a skew of less than 0.2 mm/m.

Embodiment 43. The secondary battery as in any preceding Embodiment wherein the secondary growth constraint restrains growth of the electrode assembly in the vertical direction with less than 5% displacement at less than or equal to 10,000 psi and a skew of less than 0.2 mm/m.

Embodiment 44. The secondary battery as in any preceding Embodiment wherein the secondary growth constraint restrains growth of the electrode assembly in the vertical direction with less than 3% displacement at less than or equal to 10,000 psi and a skew of less than 0.2 mm/m.

Embodiment 45. The secondary battery as in any preceding Embodiment wherein the secondary growth constraint restrains growth of the electrode assembly in the vertical direction with less than 1% displacement at less than or equal to 10,000 psi and a skew of less than 0.2 mm/m.

Embodiment 46. The secondary battery as in any preceding Embodiment wherein the secondary growth constraint restrains growth of the electrode assembly in the vertical direction with less than 15% displacement at less than or equal to 10,000 psi and a skew of less than 0.2 mm/m after 50 battery cycles.

Embodiment 47. The secondary battery as in any preceding Embodiment wherein the secondary growth constraint restrains growth of the electrode assembly in the vertical direction with less than 5% displacement at less than or equal to 10,000 psi and a skew of less than 0.2 mm/m after 150 battery cycles.

Embodiment 48. The secondary battery as in any preceding Embodiment wherein members of the population of counter-electrode structures comprise a top adjacent to the first secondary growth constraint, a bottom adjacent to the second secondary growth constraint, a vertical axis $A_{CES}$ parallel to and in the vertical direction extending from the top to the bottom, a lateral electrode surface surrounding the vertical axis $A_{CES}$ and connecting the top and the bottom, the lateral electrode surface having opposing first and second regions on opposite sides of the vertical axis and separated in a first direction that is orthogonal to the vertical axis, a length $L_{CES}$, a width $W_{CES}$, and a height $H_{CES}$, the length $L_{CES}$ being bounded by the lateral electrode surface and measured in the transverse direction, the width $W_{CES}$ being bounded by the lateral electrode surface and measured in the longitudinal direction, and the height $H_{CES}$ being measured in the direction of the vertical axis $A_{CES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being affixed to the top and bottom of the population of electrode structures.

Embodiment 49. The secondary battery as in any preceding Embodiment wherein the inner surfaces of each of the first and second secondary growth constraints comprise a notch, and the population of counter-electrode structures height $H_{CES}$ extends into and is affixed within the notch, the notch having a depth defined along the vertical direction of 25% of the first and second secondary growth constraint heights.

Embodiment 50. The secondary battery as in any preceding Embodiment wherein the inner surfaces of each of the first and second secondary growth constraints comprise a notch, and the population of counter-electrode structures height $H_{CES}$ extends into and is affixed within the notch, the notch having a depth defined along the vertical direction of 50% of the first and second secondary growth constraint heights.

Embodiment 51. The secondary battery as in any preceding Embodiment wherein the inner surfaces of each of the first and second secondary growth constraints comprise a notch, and the population of counter-electrode structures height $H_{CES}$ extends into and is affixed within the notch, the notch having a depth defined along the vertical direction of 75% of the first and second secondary growth constraint heights.

Embodiment 52. The secondary battery as in any preceding Embodiment wherein the inner surfaces of each of the first and second secondary growth constraints comprise a notch, and the population of counter-electrode structures height $H_{CES}$ extends into and is affixed within the notch, the notch having a depth defined along the vertical direction of 90% of the first and second secondary growth constraint heights.

Embodiment 53. The secondary battery as in any preceding Embodiment wherein each of the first and second secondary growth constraints comprise a slot, and the population of counter-electrode structures height extends through and is affixed within the slot forming an interlocking connection between the population of electrode structures and each of the first and second secondary growth constraints.

Embodiment 54. The secondary battery as in any preceding Embodiment wherein members of the population of electrode structures comprise a top adjacent to the first secondary growth constraint, a bottom adjacent to the second secondary growth constraint, a vertical axis $A_{ES}$ parallel to and in the vertical direction extending from the top to the bottom, a lateral electrode surface surrounding the vertical axis $A_{ES}$ and connecting the top and the bottom, the lateral electrode surface having opposing first and second regions on opposite sides of the vertical axis and separated in a first direction that is orthogonal to the vertical axis, a length $L_{ES}$, a width $W_{ES}$, and a height $H_{ES}$, the length $L_{ES}$ being bounded by the lateral electrode surface and measured in the transverse direction, the width $W_{ES}$ being bounded by the lateral electrode surface and measured in the longitudinal direction, and the height $H_{ES}$ being measured in the direction of the vertical axis $A_{ES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being affixed to the top and bottom of the population of electrode structures.

Embodiment 55. The secondary battery as in any preceding Embodiment wherein the inner surfaces of each of the first and second secondary growth constraints comprise a notch, and the population of electrode structures height $H_{ES}$ extends into and is affixed within the notch, the notch having a depth defined along the vertical direction of 25% of the first and second secondary growth constraint heights.

Embodiment 56. The secondary battery as in any preceding Embodiment wherein the inner surfaces of each of the first and second secondary growth constraints comprise a notch, and the population of electrode structures height $H_{ES}$ extends into and is affixed within the notch, the notch having a depth defined along the vertical direction of 50% of the first and second secondary growth constraint heights.

Embodiment 57. The secondary battery as in any preceding Embodiment wherein the inner surfaces of each of the first and second secondary growth constraints comprise a notch, and the population of electrode structures height $H_{ES}$ extends into and is affixed within the notch, the notch having a depth defined along the vertical direction of 75% of the first and second secondary growth constraint heights.

Embodiment 58. The secondary battery as in any preceding Embodiment wherein the inner surfaces of each of the first and second secondary growth constraints comprise a notch, and the population of electrode structures height $H_{ES}$ extends into and is affixed within the notch, the notch having a depth defined along the vertical direction of 90% of the first and second secondary growth constraint heights.

Embodiment 59. The secondary battery as in any preceding Embodiment wherein each of the first and second secondary growth constraints comprise a slot, and the population of electrode structures height extends through and is affixed within the slot forming an interlocking connection between the population of electrode structures and each of the first and second secondary growth constraints.

Embodiment 60. A secondary battery as in any preceding Embodiment, wherein the set of electrode constraints further comprising a fused secondary constraint system comprising first and second secondary growth constraints separated in a second direction and fused with at least one first secondary connecting member.

Embodiment 61. The secondary battery as in any preceding Embodiment wherein members of the population of counter-electrode structures comprise a top adjacent to the first secondary growth constraint, a bottom adjacent to the second secondary growth constraint, a vertical axis $A_{CES}$ parallel to and in the vertical direction extending from the top to the bottom, a lateral electrode surface surrounding the vertical axis $A_{CES}$ and connecting the top and the bottom, the lateral electrode surface having opposing first and second regions on opposite sides of the vertical axis and separated in a first direction that is orthogonal to the vertical axis, a length $L_{CES}$, a width $W_{CES}$, and a height $H_{CES}$, the length $L_{CES}$ being bounded by the lateral electrode surface and measured in the transverse direction, the width $W_{CES}$ being bounded by the lateral electrode surface and measured in the longitudinal direction, and the height $H_{CES}$ being measured in the direction of the vertical axis $A_{CES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being fused to the top and bottom of the population of counter-electrode structures.

Embodiment 62. The secondary battery as in any preceding Embodiment wherein members of the population of electrode structures comprise a top adjacent to the first secondary growth constraint, a bottom adjacent to the second secondary growth constraint, a vertical axis $A_{ES}$ parallel to and in the vertical direction extending from the top to the bottom, a lateral electrode surface surrounding the vertical axis $A_{ES}$ and connecting the top and the bottom, the lateral electrode surface having opposing first and second regions on opposite sides of the vertical axis and separated in a first direction that is orthogonal to the vertical axis, a length $L_{ES}$, a width $W_{ES}$, and a height $H_{ES}$, the length $L_{ES}$ being bounded by the lateral electrode surface and measured in the transverse direction, the width $W_{ES}$ being bounded by the lateral electrode surface and measured in the longitudinal direction, and the height $H_{ES}$ being measured in the direction of the vertical axis $A_{ES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being fused to the top and bottom of the population of electrode structures.

Embodiment 63. The secondary battery as in any preceding Embodiment wherein at least one of an electrode structure and counter-electrode structure comprise a top adjacent to the first secondary growth constraint, a bottom adjacent to the second secondary growth constraint, a vertical axis $A_{ES}$ parallel to and in the vertical direction extending from top to bottom, a lateral electrode surface surrounding the vertical axis and connecting top and bottom, the lateral electrode surface having a width $W_{ES}$ bounded by the lateral surface and measured in the longitudinal direction, wherein the width $W_{ES}$ tapers from a first width adjacent the top to a second width that is smaller than the first width at a region along the vertical axis between the top and bottom.

Embodiment 64. The secondary battery as in any preceding Embodiment, wherein the at least one secondary connecting member corresponds to at least one of the first and second primary growth constraints at the longitudinal ends of the electrode assembly.

Embodiment 65. The secondary battery as in any preceding Embodiment wherein the electrically insulating microporous separator material comprises a particulate material and a binder, has a void fraction of at least 20 vol. %, and is permeated by the non-aqueous liquid electrolyte.

Embodiment 66. The secondary battery as in any preceding Embodiment wherein the carrier ions are selected from the group consisting of lithium, potassium, sodium, calcium, and magnesium.

Embodiment 67. The secondary battery as in any preceding Embodiment wherein the non-aqueous liquid electrolyte comprises a lithium salt dissolved in an organic solvent.

Embodiment 68. The secondary battery as in any preceding Embodiment wherein the first and second secondary growth constraints each comprise a thickness that is less than 50% of the electrode or counter-electrode height.

Embodiment 69. The secondary battery as in any preceding Embodiment wherein the first and second secondary growth constraints each comprise a thickness that is less than 20% of the electrode or counter-electrode height.

Embodiment 70. The secondary battery as in any preceding Embodiment wherein the first and second secondary growth constraints each comprise a thickness that is less than 10% of the electrode or counter-electrode height.

Embodiment 71. The secondary battery as in any preceding Embodiment wherein the set of electrode constraints inhibits expansion of the electrode active material layers in the vertical direction upon insertion of the carrier ions into the electrode active material as measured by scanning electron microscopy (SEM).

Embodiment 72. The secondary battery as in any preceding Embodiment wherein the first and second primary growth constraints impose an average compressive force to each of the first and second longitudinal ends of at least 0.7 kPa, averaged over the surface area of the first and second longitudinal ends, respectively.

Embodiment 73. The secondary battery as in any preceding Embodiment wherein the first and second primary growth constraints impose an average compressive force to each of the first and second longitudinal ends of at least 1.75 kPa, averaged over the surface area of the first and second longitudinal ends, respectively.

Embodiment 74. The secondary battery of any preceding Embodiment wherein the first and second primary growth constraints imposes an average compressive force to each of the first and second longitudinal ends of at least 2.8 kPa, averaged over the surface area of the first and second longitudinal ends, respectively.

Embodiment 75. The secondary battery of any preceding Embodiment wherein the first and second primary growth constraints imposes an average compressive force to each of the first and second longitudinal ends of at least 3.5 kPa, averaged over the surface area of the first and second longitudinal ends, respectively.

Embodiment 76. The secondary battery of any preceding Embodiment wherein the first and second primary growth constraints imposes an average compressive force to each of the first and second longitudinal ends of at least 5.25 kPa, averaged over the surface area of the first and second longitudinal ends, respectively.

Embodiment 77. The secondary battery according to any preceding Embodiment wherein the first and second primary growth constraints imposes an average compressive force to each of the first and second longitudinal ends of at least 7 kPa, averaged over the surface area of the first and second longitudinal ends, respectively.

Embodiment 78. The secondary battery according to any preceding Embodiment wherein the first and second primary growth constraints imposes an average compressive force to each of the first and second longitudinal ends of at least 8.75 kPa, averaged over the surface area of the first and second projected longitudinal ends, respectively.

Embodiment 79. The secondary battery according to any preceding Embodiment wherein the first and second primary growth constraints imposes an average compressive force to each of the first and second longitudinal ends of at least 10 kPa, averaged over the surface area of the first and second longitudinal ends, respectively.

Embodiment 80. The secondary battery of any preceding Embodiment wherein the surface area of the first and second longitudinal end surfaces is less than 25% of the surface area of the electrode assembly.

Embodiment 81. The secondary battery of any preceding Embodiment wherein the surface area of the first and second longitudinal end surfaces is less than 20% of the surface area of the electrode assembly.

Embodiment 82. The secondary battery of any preceding Embodiment wherein the surface area of the first and second longitudinal end surfaces is less than 15% of the surface area of the electrode assembly.

Embodiment 83. The secondary battery of any preceding Embodiment wherein the surface area of the first and second longitudinal end surfaces is less than 10% of the surface area of the electrode assembly.

Embodiment 84. The secondary battery of any preceding Embodiment wherein the constraint and enclosure have a combined volume that is less than 60% of the volume enclosed by the battery enclosure.

Embodiment 85. The secondary battery of any preceding Embodiment wherein the constraint and enclosure have a combined volume that is less than 45% of the volume enclosed by the battery enclosure.

Embodiment 86. The secondary battery of any preceding Embodiment wherein the constraint and enclosure have a combined volume that is less than 30% of the volume enclosed by the battery enclosure.

Embodiment 87. The secondary battery of any preceding Embodiment wherein the constraint and enclosure have a combined volume that is less than 20% of the volume enclosed by the battery enclosure.

Embodiment 88. The secondary battery of any preceding Embodiment wherein the first and second longitudinal end surfaces are under a compressive load when the secondary battery is charged to at least 80% of its rated capacity.

Embodiment 89. The secondary battery of any preceding Embodiment wherein the secondary battery comprises a set of electrode assemblies, the set comprising at least two electrode assemblies.

Embodiment 90. The secondary battery of any preceding Embodiment claim wherein the electrode assembly comprises at least 5 electrode structures and at least 5 counter-electrode structures.

Embodiment 91. The secondary battery of any preceding Embodiment wherein the electrode assembly comprises at least 10 electrode structures and at least 10 counter-electrode structures.

Embodiment 92. The secondary battery of any preceding Embodiment wherein the electrode assembly comprises at least 50 electrode structures and at least 50 counter-electrode structures.

Embodiment 93. The secondary battery of any preceding Embodiment wherein the electrode assembly comprises at least 100 electrode structures and at least 100 counter-electrode structures.

Embodiment 94. The secondary battery of any preceding Embodiment wherein the electrode assembly comprises at least 500 electrode structures and at least 500 counter-electrode structures.

Embodiment 95. The secondary battery of any preceding Embodiment wherein at least one of the primary and secondary constraint systems comprises a material having an ultimate tensile strength of at least 10,000 psi (>70 MPa).

Embodiment 96. The secondary battery of any preceding Embodiment wherein at least one of the primary and secondary constraint systems comprises a material that is compatible with the battery electrolyte.

Embodiment 97. The secondary battery of any preceding Embodiment wherein at least one of the primary and secondary constraint systems comprises a material that does not significantly corrode at the floating or anode potential for the battery.

Embodiment 98. The secondary battery of any preceding Embodiment wherein at least one of the primary and secondary constraint systems comprises a material that does not significantly react or lose mechanical strength at 45° C.

Embodiment 99. The secondary battery of any preceding Embodiment wherein at least one of the primary and secondary constraint systems comprises a material that does not significantly react or lose mechanical strength at 70° C.

Embodiment 100. The secondary battery of any preceding Embodiment wherein at least one of the primary and secondary constraint systems comprises metal, metal alloy, ceramic, glass, plastic, or a combination thereof.

Embodiment 101. The secondary battery of any preceding Embodiment wherein at least one of the primary and secondary constraint systems comprises a sheet of material having a thickness in the range of about 10 to about 100 micrometers.

Embodiment 102. The secondary battery of any preceding Embodiment wherein at least one of the primary and secondary constraint systems comprises a sheet of material having a thickness in the range of about 30 to about 75 micrometers.

Embodiment 103. The secondary battery of any preceding Embodiment wherein at least one of the primary and secondary constraint systems comprises carbon fibers at >50% packing density.

Embodiment 104. The secondary battery of any preceding Embodiment wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 3.

Embodiment 105. The secondary battery of any preceding Embodiment wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 3.

Embodiment 106. The secondary battery of any preceding Embodiment wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 4.

Embodiment 107. The secondary battery of any preceding Embodiment wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 5.

Embodiment 108. The secondary battery of any preceding Embodiment, wherein portions of the set of electrode constraints that are external to the electrode assembly occupy no more than 80% of the total combined volume of the electrode assembly and the external portions of the electrode constraints.

Embodiment 109. The secondary battery of any preceding Embodiment, wherein portions of the primary growth constraint system that are external to the electrode assembly occupy no more than 40% of the total combined volume of the electrode assembly and external portions of the primary growth constraint system.

Embodiment 110. The secondary battery of any preceding Embodiment, wherein portions of the secondary growth constraint system that are external to the electrode assembly occupy no more than 40% of the total combined volume of the electrode assembly and external portions of the secondary growth constraint system Embodiment 111. The secondary battery of any preceding Embodiment, wherein a projection of the members of the electrode population and the counter-electrode populations onto the first longitudinal end surface circumscribes a first projected area, and a projection of the members of the electrode population and the counter-electrode populations onto the second longitudinal end surface circumscribes a second projected area, and wherein the first and second projected areas each comprise at least 50% of the surface area of the first and second longitudinal end surfaces, respectively.

Embodiment 112. The secondary battery of any preceding Embodiment, wherein the first and second primary growth constraints deflect upon repeated cycling of the secondary battery between charged and discharged states according to the following formula:

$$\delta=60wL^4/Eh^3,$$

wherein w is total distributed load applied to the first and second primary growth constraints upon repeated cycling of the secondary battery between charged and discharged states, L is the distance between first and second primary connecting members in the vertical direction, E is the elastic modulus of the first and second primary growth constraints, and h is the thickness of the first and second primary growth constraints.

Embodiment 113. The secondary battery of any preceding Embodiment, wherein the stress on the first and second primary growth constraints upon repeated cycling of the secondary battery between charged and discharged states is as follows:

$$\sigma=3wL^2/4h^2$$

wherein w is total distributed load applied on the first and second primary growth constraints upon repeated cycling of the secondary battery between charged and discharged states, L is the distance between first and second primary connecting members in the vertical direction, and h is the thickness of the first and second primary growth constraints.

Embodiment 114. The secondary battery of any preceding Embodiment, wherein the tensile stress on the first and second primary connecting members is as follows:

$$\sigma=PL/2t$$

wherein P is pressure applied due to the first and second primary growth constraints upon repeated cycling of the secondary battery between charged and discharged states, L is the distance between the first and second primary connecting members along the vertical direction, and t is the thickness of the first and second primary connecting members in the vertical direction.

Embodiment 115. The secondary battery of any preceding Embodiment, wherein the first and second secondary growth constraints deflect upon repeated cycling of the secondary battery between charged and discharged states according to the following formula $$\delta=60wy^4/Et^3,$$

wherein w is the total distributed load applied on the first and second secondary growth constraints upon repeated cycling of the secondary battery between charged and discharged states, y is the distance between the first and second secondary connecting members in the longitudinal direction, E is the elastic modulus of the first and seond secondary growth constraints, and t is the thickness of the first and second secondary growth constraints.

Embodiment 116. The secondary battery of any preceding Embodiment, wherein the stress on the first and second secondary growth constraints is as follows:

$$\sigma = 3wy^2/4t^2$$

wherein w is the total distributed load applied on the first and second secondary growth constraints upon repeated cycling of the secondary battery between charged and discharged states, y is the distance between the first and second secondary connecting members along the longitudinal direction, and t is the thickness of the first and second secondary growth constraints.

Embodiment 117. The secondary battery of any preceding Embodiment, wherein the tensile stress on the first and second secondary connecting members is as follows:

$$\sigma = Py/2h,$$

wherein P is the pressure applied on the first and second secondary growth constraints upon repeated cycling of the secondary battery, y is the distance between the first and second secondary connecting members along the longitudinal direction, and h is the thickness of the first and second secondary connecting members in the longitudinal direction.

Embodiment 118. The secondary battery of any preceding Embodiment, wherein the tensile stress on internal secondary connecting members is as follows:

$$\sigma = Py/h$$

wherein P is the pressure applied to the first and second secondary growth constraints upon cycling of the of the secondary battery between charged and discharge states, due to expansion of the electrode active material on regions that are in between internal first and second secondary connecting members, y is the distance between the internal first and second secondary connecting members along the longitudinal direction, and h is the thickness of the internal first and second secondary connecting members in the longitudinal direction.

Embodiment 119. A secondary battery for cycling between a charged and a discharged state, the secondary battery comprising a battery enclosure, an electrode assembly, carrier ions, a non-aqueous liquid electrolyte within the battery enclosure, and a set of electrode constraints, wherein the electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, the ratio of each of $L_{EA}$ and $W_{EA}$ to $H_{EA}$ being at least 2:1, respectively, the electrode assembly further comprises a population of electrode structures, a population of counter-electrode structures, and an electrically insulating microporous separator material electrically separating members of the electrode and counter-electrode populations, members of the electrode and counter-electrode structure populations being arranged in an alternating sequence in the longitudinal direction, each member of the population of electrode structures comprises a layer of an electrode active material and each member of the population of counter-electrode structures comprises a layer of a counter-electrode active material, wherein the electrode active material has the capacity to accept more than one mole of carrier ion per mole of electrode active material when the secondary battery is charged from a discharged state to a charged state, the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint array restrains growth of the electrode assembly in the longitudinal direction such that any increase in the Feret diameter of the electrode assembly in the longitudinal direction over 20 consecutive cycles of the secondary battery is less than 20%, the charged state is at least 75% of a rated capacity of the secondary battery, and the discharged state is less than 25% of the rated capacity of the secondary battery.

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. A secondary battery for cycling between a charged and a discharged state, the secondary battery comprising a battery enclosure, an electrode assembly, carrier ions, a non-aqueous liquid electrolyte within the battery enclosure, and a set of electrode constraints, wherein the electrode assembly has mutually perpendicular longitudinal, transverse, and vertical axes, a first longitudinal end surface and a second longitudinal end surface separated from each other in the longitudinal direction, and a lateral surface surrounding an electrode assembly longitudinal axis $A_{EA}$ and connecting the first and second longitudinal end surfaces, the lateral surface having opposing first and second regions on opposite sides of the longitudinal axis and separated in a first direction that is orthogonal to the longitudinal axis, the electrode assembly having a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction, the ratio of each of $L_{EA}$ and $W_{EA}$ to $H_{EA}$ being at least 2:1, respectively, the electrode assembly further comprises a population of electrode structures, a population of counter-electrode structures, and an electrically insulating microporous separator material electrically separating members of the electrode and counter-electrode populations, members of the electrode and counter-electrode structure populations being arranged in an alternating sequence in the longitudinal direction, each member of the population of electrode structures comprises a layer of an electrode active material and each member of the population of counter-electrode structures comprises a layer of a counter-electrode active material, wherein the electrode active material has the capacity to accept more than one mole of carrier ion per mole of electrode active material when the secondary battery is charged from a discharged state to a charged state, the set of electrode constraints comprises a primary constraint system comprising first and second primary growth constraints and at least one primary connecting member, the first and second primary growth constraints separated from each other in the longitudinal direction, and the at least one primary connecting member connecting the first and second primary growth constraints, wherein the primary constraint array restrains growth of the electrode assembly in the longitudinal direction such that any increase in the Feret diameter of the electrode assembly in the longitudinal direction over 20 consecutive cycles of the secondary battery is less than 20%, the charged state is at least 75% of a rated capacity of the secondary battery, and the discharged state is less than 25% of the rated capacity of the secondary battery.

2. The secondary battery of claim 1, wherein the primary constraint system comprises first and second primary connecting members that are separated from each other in the first direction and connect the first and second primary growth constraints.

3. The secondary battery of claim 1, wherein
the set of electrode constraints further comprises a secondary constraint system comprising first and second secondary growth constraints separated in a second direction and connected by at least one secondary connecting member, wherein the secondary constraint system at least partially restrains growth of the electrode assembly in the second direction upon cycling of the secondary battery, the second direction being orthogonal to the longitudinal direction.

4. The secondary battery of claim 3, wherein the secondary growth constraint system restrains growth of the electrode assembly in the second direction such that any increase in the Feret diameter of the electrode assembly in the second direction over 20 consecutive cycles upon repeated cycling of the secondary battery is less than 20%.

5. The secondary battery of claim 3, wherein a surface area of a projection of the electrode assembly in a plane orthogonal to the stacking direction, is smaller than the surface areas of projections of the electrode assembly onto other orthogonal planes.

6. The secondary battery of claim 3, wherein at least a portion of the primary growth constraint system is pre-tensioned to exert a compressive force on at least a portion of the electrode assembly in the longitudinal direction, prior to cycling of the secondary battery between charged and discharged states.

7. The secondary battery of claim 3, wherein the first primary connecting member is the first secondary growth constraint, the second primary connecting member is the second secondary growth constraint, and the first primary growth constraint or the second primary growth constraint is the first secondary connecting member.

8. The secondary battery of claim 3, wherein at least one of the first and second primary growth constraints is interior to longitudinal first and second ends of the electrode assembly along the longitudinal axis.

9. The secondary battery of claim 3, wherein at least one of the first and second primary growth constraints comprises at least a portion of one or more of the electrode and counter electrode structures.

10. The secondary battery of claim 3, wherein at least one of the first and second primary growth constraints comprises a portion of at least one of an electrode backbone structure and a counter-electrode backbone structure.

11. The secondary battery of claim 3, wherein at least one of the first and second primary growth constraints comprises a portion of one or more of an electrode current collector and a counter-electrode current collector.

12. The secondary battery of claim 3, wherein the secondary constraint system restrains growth of the electrode assembly in the second direction with a restraining force of greater than 1000 psi and a skew of less than 0.2 mm/m.

13. The secondary battery of claim 3 wherein the secondary growth constraint restrains growth of the electrode assembly in the second direction with less than 1% displacement at less than or equal to 10,000 psi and a skew of less than 0.2 mm/m.

14. The secondary battery of claim 3 wherein members of the population of counter-electrode structures comprise a top adjacent to the first secondary growth constraint, a bottom adjacent to the second secondary growth constraint, a vertical axis $A_{CES}$ parallel to and in the vertical direction extending from the top to the bottom, a lateral electrode surface surrounding the vertical axis $A_{CES}$ and connecting the top and the bottom, the lateral electrode surface having opposing first and second regions on opposite sides of the vertical axis and separated in a first direction that is orthogonal to the vertical axis, a length $L_{CES}$, a width $W_{CES}$, and a height $H_{CES}$, the length $L_{CES}$ being bounded by the lateral electrode surface and measured in the transverse direction, the width $W_{CES}$ being bounded by the lateral electrode surface and measured in the longitudinal direction, and the height $H_{CES}$ being measured in the direction of the vertical axis $A_{CES}$ from the top to the bottom, wherein
the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being affixed to the top and bottom of the population of counter-electrode structures.

15. The secondary battery of claim 3, wherein members of the population of electrode structures comprise a top adjacent to the first secondary growth constraint, a bottom adjacent to the second secondary growth constraint, a vertical axis $A_{ES}$ parallel to and in the vertical direction extending from the top to the bottom, a lateral electrode surface surrounding the vertical axis $A_{ES}$ and connecting the top and the bottom, the lateral electrode surface having opposing first and second regions on opposite sides of the vertical axis and separated in a first direction that is orthogonal to the vertical axis, a length $L_{ES}$, a width $W_{ES}$, and a height $H_{ES}$, the length $L_{ES}$ being bounded by the lateral electrode surface and measured in the transverse direction, the width $W_{ES}$ being bounded by the lateral electrode surface and measured in the longitudinal direction, and the height $H_{ES}$ being measured in the direction of the vertical axis $A_{ES}$ from the top to the bottom, wherein the first and second secondary growth constraints each comprise an inner surface and an opposing outer surface, the inner surface and the outer surface of each are substantially co-planar and the distance between the inner surface and the opposing outer surface of each of the first and second secondary growth constraints defines a height of each that is measured in the vertical direction from the inner surface to the outer surface of each, the inner surfaces of each being affixed to the top and bottom of the population of electrode structures.

16. The secondary battery of claim 3, wherein the electrically insulating microporous separator material comprises a particulate material and a binder, has a void fraction of at least 20 vol. %, and is permeated by the non-aqueous liquid electrolyte.

17. The secondary battery of claim 3, wherein the carrier ions are selected from the group consisting of lithium, potassium, sodium, calcium, and magnesium.

18. The secondary battery of claim 3, wherein the non-aqueous liquid electrolyte comprises a lithium salt dissolved in an organic solvent.

19. The secondary battery of claim 3, wherein the first and second secondary growth constraints each comprise a thickness that is less than 20% of the electrode or counter-electrode height.

20. The secondary battery of claim 3 wherein the set of electrode constraints inhibits expansion of the electrode active material layers in the vertical direction upon insertion of the carrier ions into the electrode active material as measured by scanning electron microscopy (SEM).

21. The secondary battery of claim 3, wherein the surface area of the first and second longitudinal end surfaces is less than 15% of the surface area of the electrode assembly.

22. The secondary battery of claim 3, wherein the constraint and enclosure have a combined volume that is less than 30% of the volume enclosed by the battery enclosure.

23. The secondary battery of claim 3 wherein the electrode assembly comprises at least 10 electrode structures and at least 10 counter-electrode structures.

24. The secondary battery of claim 3, wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 3.

25. The secondary battery of claim 3, wherein portions of the secondary growth constraint system that are external to the electrode assembly occupy no more than 40% of the total combined volume of the electrode assembly and external portions of the secondary growth constraint system.

26. The secondary battery of claim 3, wherein the first and second primary growth constraints deflect upon repeated cycling of the secondary battery between charged and discharged states according to the following formula:

$$\delta = 60wL^4/Eh^3,$$

wherein w is total distributed load applied to the first and second primary growth constraints upon repeated cycling of the secondary battery between charged and discharged states, L is the distance between first and second primary connecting members in the vertical direction, E is the elastic modulus of the first and second primary growth constraints, and h is the thickness of the first and second primary growth constraints.

27. The secondary battery of claim 3, wherein the first and second secondary growth constraints deflect upon repeated cycling of the secondary battery between charged and discharged states according to the following formula $$\delta = 60wy^4/Et^3,$$

wherein w is the total distributed load applied on the first and second secondary growth constraints upon repeated cycling of the secondary battery between charged and discharged states, y is the distance between the first and second secondary connecting members in the longitudinal direction, E is the elastic modulus of the first and second secondary growth constraints, and t is the thickness of the first and second secondary growth constraints.

28. The secondary battery of claim 3, wherein the stress on the first and second primary growth constraints upon repeated cycling of the secondary battery between charged and discharged states is as follows:

$$\sigma = 3wL^2/4h^2$$

wherein w is total distributed load applied on the first and second primary growth constraints upon repeated cycling of the secondary battery between charged and discharged states, L is the distance between first and second primary connecting members in the vertical direction, and h is the thickness of the first and second primary growth constraints.

29. The secondary battery of claim 3, wherein the tensile stress on the first and second primary connecting members is as follows:

$$\sigma = PL/2t$$

wherein P is pressure applied due to the first and second primary growth constraints upon repeated cycling of the secondary battery between charged and discharged states, L is the distance between the first and second primary connecting members along the vertical direction, and t is the thickness of the first and second primary connecting members in the vertical direction.

30. The secondary battery of claim 3, wherein the tensile stress on the first and second secondary connecting members is as follows:

$$\sigma = Py/2h,$$

wherein P is the pressure applied on the first and second secondary growth constraints upon repeated cycling of the secondary battery, y is the distance between the first and second secondary connecting members along the longitudinal direction, and h is the thickness of the first and second secondary connecting members in the longitudinal direction.

* * * * *